United States Patent [19]
Scott et al.

[11] Patent Number: 5,900,722
[45] Date of Patent: * May 4, 1999

[54] MULTIMODE POWER CONVERTER

[75] Inventors: Harold C. Scott; Chiping Sun; Kandarp I. Pandya, all of Boulder, Colo.; William Anderson, Alamogordo, N.M.

[73] Assignee: Coleman Powermate, Inc., Kearney, Nebr.

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,558

[22] Filed: Aug. 12, 1996

Related U.S. Application Data

[63] Continuation-in-part of application No. 08/306,120, Sep. 14, 1994, Pat. No. 5,705,917, and a continuation-in-part of application No. 08/370,577, Jan. 9, 1995, Pat. No. 5,625,276, which is a continuation-in-part of application No. 08/322,012, Oct. 11, 1994, abandoned.

[51] Int. Cl.⁶ ............................................. H02P 9/44
[52] U.S. Cl. ................... 322/46; 322/29; 290/49
[58] Field of Search ................... 322/46, 29; 290/49

[56] References Cited

U.S. PATENT DOCUMENTS

| | | | |
|---|---|---|---|
| 3,340,448 | 9/1967 | Thiessen | 318/140 |
| 3,694,661 | 9/1972 | Minowa | 290/1 |
| 4,045,718 | 8/1977 | Gray | 320/17 |
| 4,163,187 | 7/1979 | Thomas | 322/29 |
| 4,217,538 | 8/1980 | Ziemacki | 322/29 |
| 4,239,978 | 12/1980 | Kofink | 307/16 |
| 4,293,756 | 10/1981 | Hoyt et al. | 219/133 |
| 4,379,990 | 4/1983 | Sievers et al. | 322/99 |
| 4,456,870 | 6/1984 | Rodari | 364/424 |
| 4,542,462 | 9/1985 | Morishita et al. | 322/29 |
| 4,595,841 | 6/1986 | Yaguchi | 290/1 A |
| 4,608,946 | 9/1986 | Tanaka et al. | 123/2 |
| 4,625,160 | 11/1986 | Hucker | 322/32 |
| 4,629,966 | 12/1986 | Quantz | 322/25 |
| 4,647,835 | 3/1987 | Fujikawa et al. | 322/1 |
| 4,654,577 | 3/1987 | Howard | 322/28 |
| 4,728,841 | 3/1988 | Sugden | 310/114 |
| 4,746,808 | 5/1988 | Kaeser | 290/52 |
| 4,766,362 | 8/1988 | Sadvary | 322/50 |
| 4,780,659 | 10/1988 | Bansal et al. | 322/58 |
| 4,782,257 | 11/1988 | Secher et al. | 310/114 |
| 4,788,486 | 11/1988 | Mashino et al. | 320/17 |
| 4,827,393 | 5/1989 | Clark | 363/79 |
| 4,835,405 | 5/1989 | Clancey et al. | 290/1 A |

(List continued on next page.)

FOREIGN PATENT DOCUMENTS

| | | |
|---|---|---|
| 0399146 A1 | 11/1990 | European Pat. Off. . |
| 0627811 A1 | 12/1994 | European Pat. Off. . |
| 60082098 | 5/1985 | Japan . |
| WO 96/09679 | 3/1996 | WIPO . |
| WO 96/23350 | 8/1996 | WIPO . |

*Primary Examiner*—Steven L. Stephan
*Assistant Examiner*—Nicholas Ponomarenko
*Attorney, Agent, or Firm*—Michael A. Lechter

[57] ABSTRACT

A particularly advantageous power converter, suitable for use in an engine powered generator system. A signal simulating a desired AC waveform is produced by a converter circuit at first and second converter output terminals. The converter circuit, responsive to respective switching signals applied thereto, selectively effects current paths between a juncture node and one of the first and second converter output terminals and between a common rail and the other of the first and second converter output terminals. A controller selectively generates control signals to the converter circuit and to a mechanism for varying the magnitude of the juncture node voltage, to create a predetermined waveform at the converter output terminals simulating the desired AC waveform. A number of alternative embodiments for producing a simulated sine wave are described, as well as accommodations for inductive loads, and mechanisms for minimizing power dissipation during the switching interval.

96 Claims, 62 Drawing Sheets

U.S. PATENT DOCUMENTS

| | | | |
|---|---|---|---|
| 4,882,513 | 11/1989 | Flygare et al. | 310/114 |
| 4,885,493 | 12/1989 | Gokhale | 310/114 |
| 4,914,373 | 4/1990 | Rivkine | 322/10 |
| 4,947,100 | 8/1990 | Dhyanchand et al. | 322/10 |
| 4,950,973 | 8/1990 | Kouba | 322/69 |
| 4,968,926 | 11/1990 | Dhyanchand | 322/10 |
| 4,992,920 | 2/1991 | Davis | 363/36 |
| 5,093,611 | 3/1992 | Nakamura et al. | 322/90 |
| 5,162,686 | 11/1992 | Royer | 310/156 |
| 5,168,208 | 12/1992 | Schultz et al. | 322/25 |
| 5,177,677 | 1/1993 | Nakata et al. | 363/89 |
| 5,214,371 | 5/1993 | Naidu | 322/29 |
| 5,225,712 | 7/1993 | Erdman | 290/44 |
| 5,239,253 | 8/1993 | Shimizu et al. | 322/25 |
| 5,254,936 | 10/1993 | Leaf et al. | 322/27 |
| 5,327,069 | 7/1994 | Radun et al. | 322/10 |
| 5,343,017 | 8/1994 | Karino et al. | 219/130.4 |
| 5,355,075 | 10/1994 | Wilson, III | 322/25 |
| 5,359,248 | 10/1994 | Nagate et al. | 310/156 |
| 5,369,325 | 11/1994 | Nagate et al. | 310/156 |
| 5,376,877 | 12/1994 | Kern et al. | 322/32 |
| 5,444,355 | 8/1995 | Kaneyuki et al. | 322/58 |
| 5,444,592 | 8/1995 | Shimizu et al. | 361/21 |
| 5,510,662 | 4/1996 | Tanimoto et al. | 310/156 |
| 5,512,811 | 4/1996 | Latos et al. | 322/10 |
| 5,581,168 | 12/1996 | Rozman et al. | 318/723 |
| 5,625,276 | 4/1997 | Scott et al. | 322/24 |
| 5,631,544 | 5/1997 | Syverson et al. | 322/46 |
| 5,656,922 | 8/1997 | LaVelle et al. | 322/46 |

FIG. 11

| A to D | 1102 |
| Rvolt | 1104 |
| Cvolt | 1106 |
| Vac | 1107 |
| ISEN | 1108 |
| Tvolt | 1109 |
| Iac | 1110 |
| RPM | 1112 |
| POINT | 1120 |
| SCR1-8 | 1122 |
| SCR9-14 | 1124 |
| INV CTRL | 1125 |
| SCRLEN | 1126 |
| SCRHEN | 1128 |
| PHAZ1CNT | 1130 |
| PHAZ2CNT | 1132 |
| PHAZ3CNT | 1134 |
| CNTRLCT | 1136 |

| Rvolt1 | | | 1138 |
| * | Cvolt1 | | 1140 |
| * | * | Vac1 | 1141 |
| Rvolt8 | * | * | |
| | Cvolt8 | * | |
| | | Vac8 | |

| 1/2 cyc | 1st cyc | byte | } FLAG ONE |
| I MODE | V MODE | INC | DEC | } 1142 |

| MODEREG | 1143 |
| PBTN | 1144 |
| OLDPBTN | 1146 |
| PBTNCT | 1148 |
| TPW | 1150 |
| TPWCNT | 1151 |
| Vtarget | 1152 |
| Itarget | 1154 |
| PHZFTR | 1156 |
| CPHZFTR | 1157 |
| OUTPUT SHIFT REG | 1158 |
| SHIFTCNT | 1160 |
| AC CNT | 1162 |
| T1 | 1164 |
| T2 | 1166 |
| T3 | 1168 |
| T4 | 1170 |

FIG. 10

FIXED FUNCTION REGISTERS

| TIMER MODE (TMR) | 1002 |
| TIMER 0 (T0) | 1004 |
| TIMER 1 (T1) | 1006 |
| PRESCALER 0 (PRE0) | 1008 |
| PRESCALER 1 (PRE1) | 1010 |
| PORT 2 MODE (P2M) | 1020 |
| PORT 3 MODE (P3M) | 1022 |
| PORT 0 & 1 MODE (P01M) | 1024 |
| INTERRUPT MASK (IMR) | 1026 |
| INTERRUPT PRIORITY (IPR) | 1028 |
| INTERRUPT REQUEST (IRQ) | 1030 |
| STACK POINTER (SPL) | 1032 |
| REGISTER POINTER (RP) | 1034 |
| FLAGS | 1036 |

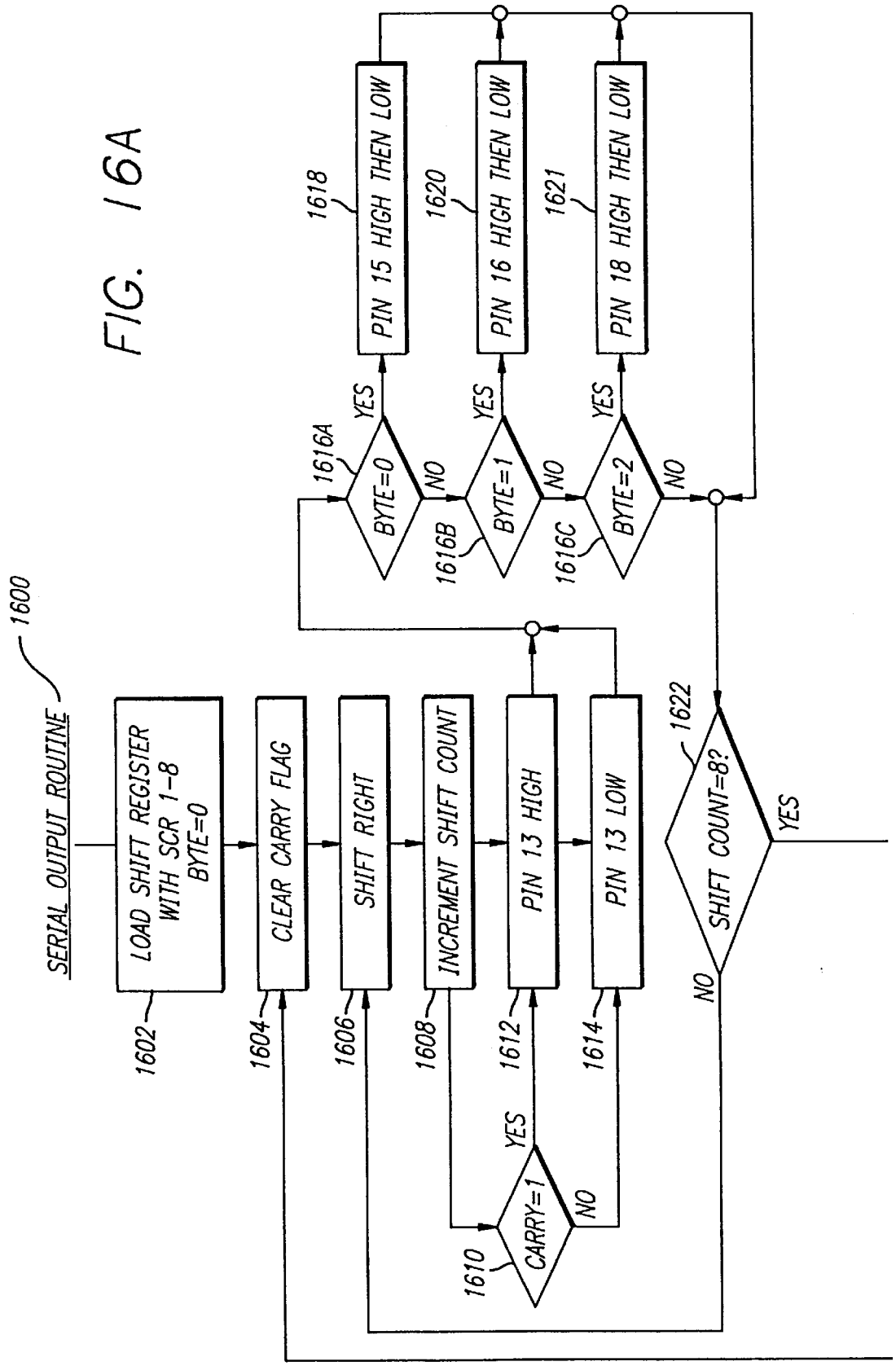

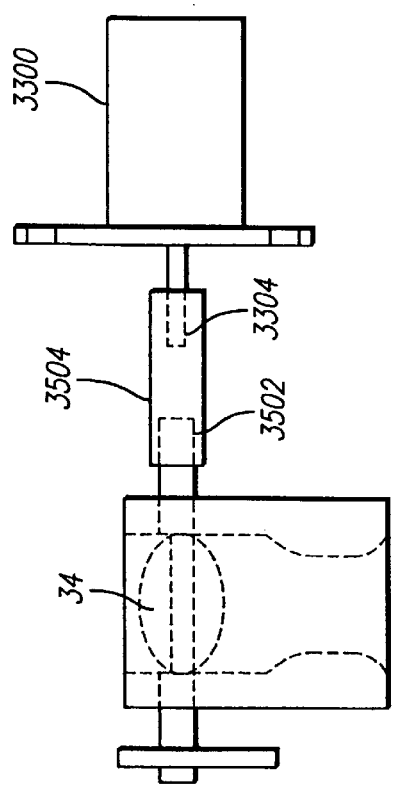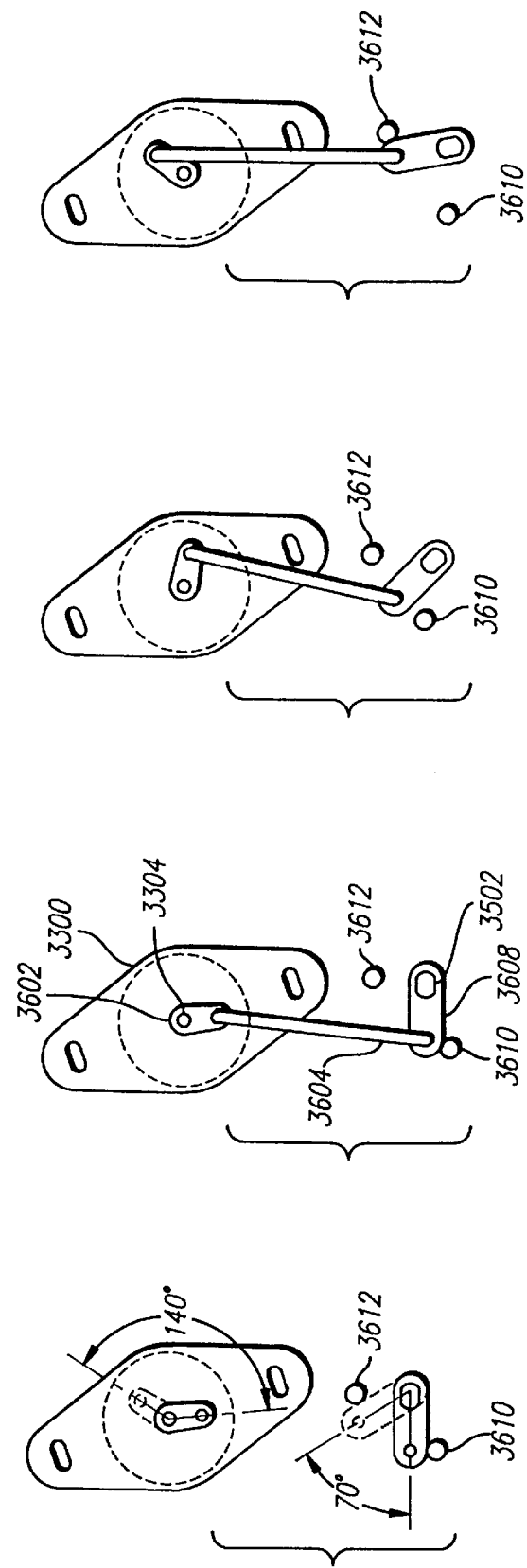

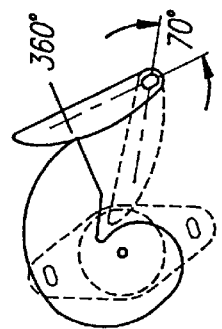
FIG. 38E
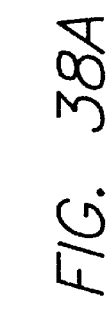
FIG. 38A
FIG. 38D
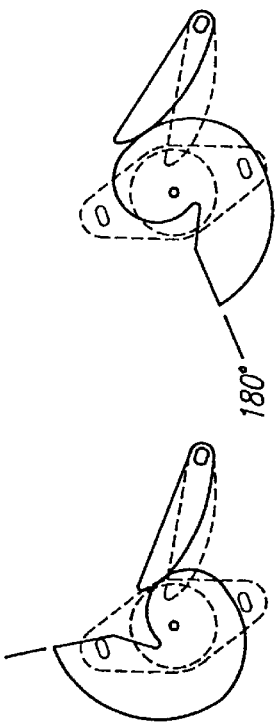
FIG. 38C
FIG. 37
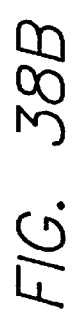
FIG. 38B

FIG. 46

| | | | | | | | |
|---|---|---|---|---|---|---|---|
| | | | T_DLY_TMR | | | | 4602 |
| | | | TM_BASE_60 | | | | 4604 |
| | | | AVRG_VOLT | | | | 4606 |
| | | | OLD_STATE | | | | 4608 |
| | | | AtoD_CNT | | | | 4610 |
| | | | VOLT_VAL | | | | 4612 |
| | | | TEMP2 | | | | 4614 |
| | | | RPM_CNT | | | | 4616 |
| | | | RPM_VAL | | | | 4618 |
| | | | BRDG_MSK | | | | 4620 |
| T_L | B_L | T_R | B_R | CAP | CAP_DUMP | | |
| | | | RPM_TMBS | | | | 4622 |
| | | | CYC_CNTR | | | | 4624 |
| | | | PP_CNT | | | | 4626 |
| | | | SW | | | | 4628 |
| | | | SW_HI | | | | 4630 |
| | | | SW_LOW | | | | 4632 |
| | | | PORT3 | | | | 4634 |
| | | | DLY_REG | | | | 4636 |
| | | | WLD_MODE | | | | 4638 |
| | | | P0(A to D) | | | | 4640 |
| PIN 26 | PIN 27 | PIN 30 | PIN 34 | PIN 5 | PIN 6 | PIN 7 | PIN 10 |
| | | | P2 | | | | 4642 |
| PIN 35 SCR | PIN 36 B_L | PIN 37 B_R | PIN 38 TOP | PIN 39 CAP | PIN 2 D_R | PIN 3 D_L | PIN 4 WELD_SENSE (INPUT) |
| | | | P3 | | | | 4644 |
| PIN 25 OVER_ CURRENT (INPUT) | PIN 16 RAIL_ VOLTAGE (INPUT) | PIN 17 ZEROX (INPUT) | PIN 18 REF RAMP (INPUT) | PIN 19 LDGA | PIN 22 LDGB | PIN 24 LDGC | PIN 23 LDGD |
| | | | IRQ | | | | 4646 |
| | | IRQ0 | IRQ2 | IRQ3 | IRQ4 | IRQ5 | |

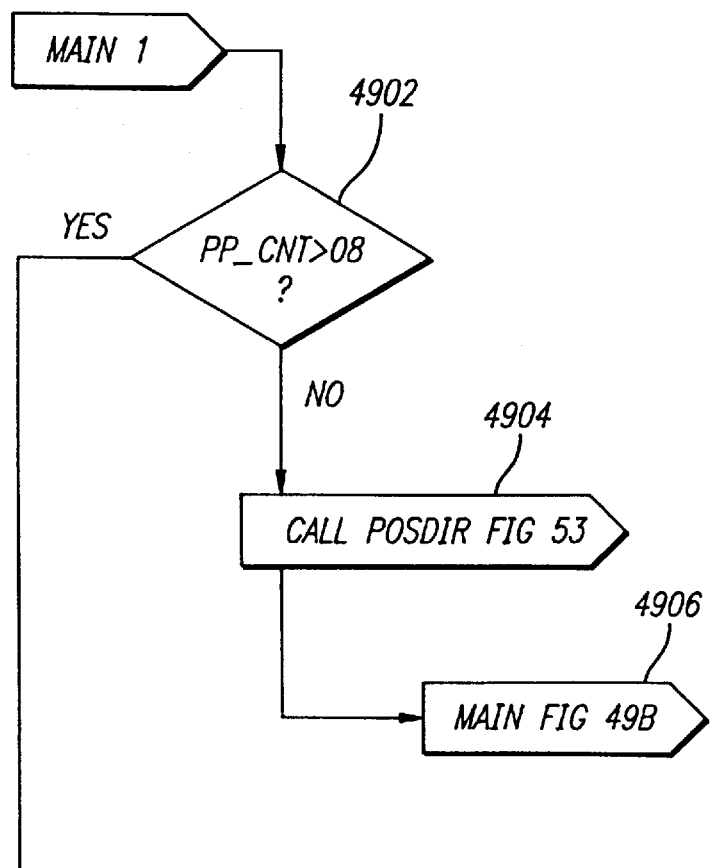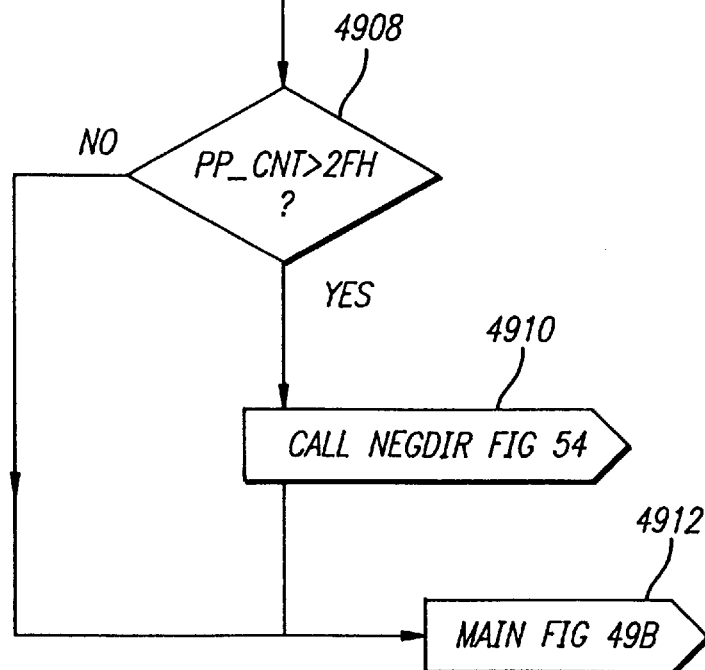
FIG. 49A

MULTIMODE POWER CONVERTER

REFERENCES TO RELATED APPLICATIONS

The present application is a continuation-in-part of U.S. patent application Ser. No. 08/306,120 now U.S. Pat. No. 5,705,917, filed on Sep. 14, 1994 by Scott et al., entitled LIGHT WEIGHT GENSET and a continuation-in-part of U.S. patent application Ser. No. 08/370,577 now U.S. Pat. No. 5,625,276, entitled CONTROLLER FOR PERMANENT MAGNET GENERATOR, filed Jan. 9, 1995 by Scott et al. (which is continuation-in-part of U.S. patent application Ser. No. 08/322,012, filed Oct. 11, 1994, entitled CONTROLLER FOR PERMANENT MAGNET GENERATOR (now abandoned), and U.S. patent application Ser. No. 08/306,120). All of the foregoing applications are incorporated herein by reference.

BACKGROUND OF THE INVENTION

The present invention relates to power converter systems, and, more specifically, to power conversion systems capable of providing a desired output waveform over a wide range of input and load conditions.

In general, power conversion systems comprising a generator and an energy source, such as a motor or turbine, are well known. The generator typically comprises a rotor and stator arranged for relative rotation. Generally, the rotor is driven by the energy source, often mounted on the shaft of the motor. The rotor typically generates a magnetic field (using either permanent magnets or windings), which interacts with windings maintained on the stator. As the magnetic field intercepts the windings, an electrical current is generated. The induced current is typically applied to a bridge rectifier, sometimes regulated, and provided as an output. In some instances, the rectified signal is applied to an inverter to generate an AC output.

Generators which use permanent magnets to generate the requisite magnetic field tend to be lighter and smaller than traditional wound field generators. However, the power supplied by permanent magnet generator has historically been difficult to regulate or control. The voltage supplied by the generator varies significantly according to the speed of the rotor. In addition, the voltage tends to vary inversely with the current delivered, i.e., as the current increases to a given load, the voltage drops.

For example, it is desirable to employ permanent magnet generators in electric welders. However, electric welders typically require a particular current to voltage relationship. For example, arc welders require an inverse slope of current to voltage, whereas metal inert gas (MIG) welders (wire feed welders) require a constant voltage and variable current and tungsten inert gas (TIG) welders require a constant current and variable voltage. Since permanent magnet generator's outputs are dependent upon motor speed, they are typically not suitable for electric welder applications. This is particularly true with respect to multipurpose welders that provide a plurality of electrical welding types.

It is also particularly desirable that a generator be able to accommodate wide and rapidly occurring variations in load, and hence output current. For example, when an incandescent lamp with a cold filament is "plugged in" to the generator, the generator is presented with extremely low resistance, resulting in an extremely high current, often in excess of ten times the average output current draw. In the absence of special provisions, components typically must be rated for the anticipated peak currents rather than the much lower magnitude of the average output current. The requirement for components rated for peak voltages much higher than the average output current tends to add considerable expense to the generator.

In addition, the load encountered by the generator is often inductive in nature, e.g., an induction motor. Accordingly, the phase of the current tends to lag the phase of the voltage. However, the switching devices in the inverter bridge are typically responsive to the voltage wave form, and often shut off, i.e., are rendered nonconductive, before the relevant portion of the current cycle has been completed. Accordingly, otherwise available energy is effectively lost. For example, when the load is an inductive motor, magnetism, and thus torque, ceases at the point that the current ceases to flow.

Moreover, generators capable of starting motor vehicles are typically ungainly, and heavy, weighing on the order of 180 pounds or more.

The present invention provides a particularly advantageous power converter, suitable for use in an engine powered generator system.

A signal simulating a desired AC waveform is produced by a converter circuit at first and second converter output terminals. The converter circuit, responsive to respective switching signals applied thereto, selectively effects current paths between a juncture node and one of the first and second converter output terminals and between a common rail and the other of the first and second converter output terminals. A controller for selectively generates control signals to the converter circuit and to a mechanism for varying the magnitude of the juncture node voltage, to create a predetermined waveform at the converter output terminals simulating the desired AC waveform.

In accordance with one aspect of the present invention, a simulated sine wave is provided. For example, in one embodiment, control signals are generated in sequence to (a) cause the converter to effect a current path between the juncture node and the first converter output terminal and between the common rail and the second converter output terminal, with the magnitude of the juncture node voltage initially at a first level; (b) increase magnitude of the juncture node voltage to a second level; (c) change in the magnitude of the juncture node voltage back to the first level; (d) cause the converter to effectively break at least one of the current paths between the juncture node and the first converter output terminal and between the common rail and the second converter output terminal; and (e) cause the converter to effect a current path between the juncture node and the second converter output terminal and between the common rail and the first converter output terminal. By way of further example, in another embodiment, a charging path to a capacitor is effected during dead time periods when there is no current path between the juncture node and one of the first and second converter output terminals, and a discharge path from the capacitor to the juncture node selectively effecting during a predetermined portion of the periods when one of the power switch circuits effect a current path between the juncture node and one of the first and second converter output terminals. By way of yet another example, in a further embodiment, a current path is selectively effected from the juncture node through a capacitance to the common rail to vary the magnitude of the juncture node voltage. In some applications, the capacitance may be controllably discharged to facilitate rapid generation of a relatively low magnitude juncture node voltage.

Another aspect of the present invention provides an accommodation for inductive loads. For example, in one embodiment, control signals are generated to cause the converter to effectively break the current path between the juncture node and the first converter output terminal, and thereafter, but before effect a current path between the juncture node and the second converter output terminal and between the common rail and the first converter output terminal cause the converter to effectively break the current path between the common rail and the second converter output terminal.

In accordance with another aspect of the present invention, power dissipation during the switching interval is minimized. For example, in one embodiment, the power switching devices are quickly driven into a saturated state when the associated control signal changes state.

BRIEF DESCRIPTION OF THE DRAWINGS

The present invention will hereinafter be described in conjunction with the figures of the appended drawing, wherein like designations denote like elements, and:

FIG. 10 is a schematic representation of the fixed function registers employed by the microcomputer of FIG. 9;

FIG. 11 is a schematic representation of the variable registers employed by the microcomputer of FIG. 9;

FIGS. 16A and 16B (collectively referred to as FIG. 16) is a functional flow chart of a serial output routine effected by the microcomputer of FIG. 9;

FIG. 35 is a block diagram of a direct drive throttle control;

FIGS. 36A, B, C and D (collectively referred to as FIG. 36) are mechanical linkage for a throttle control;

FIGS. 37 and 38 illustrate a cam drive for a throttle control;

FIG. 46 is a diagrammatic illustration of variable registers employed by the microprocessor of FIG. 41;

FIG. 49A is a functional flow chart of a main program relating to inverter mode operation;

DETAILED DESCRIPTION OF A PREFERRED EXEMPLARY EMBODIMENT

Figure 1:
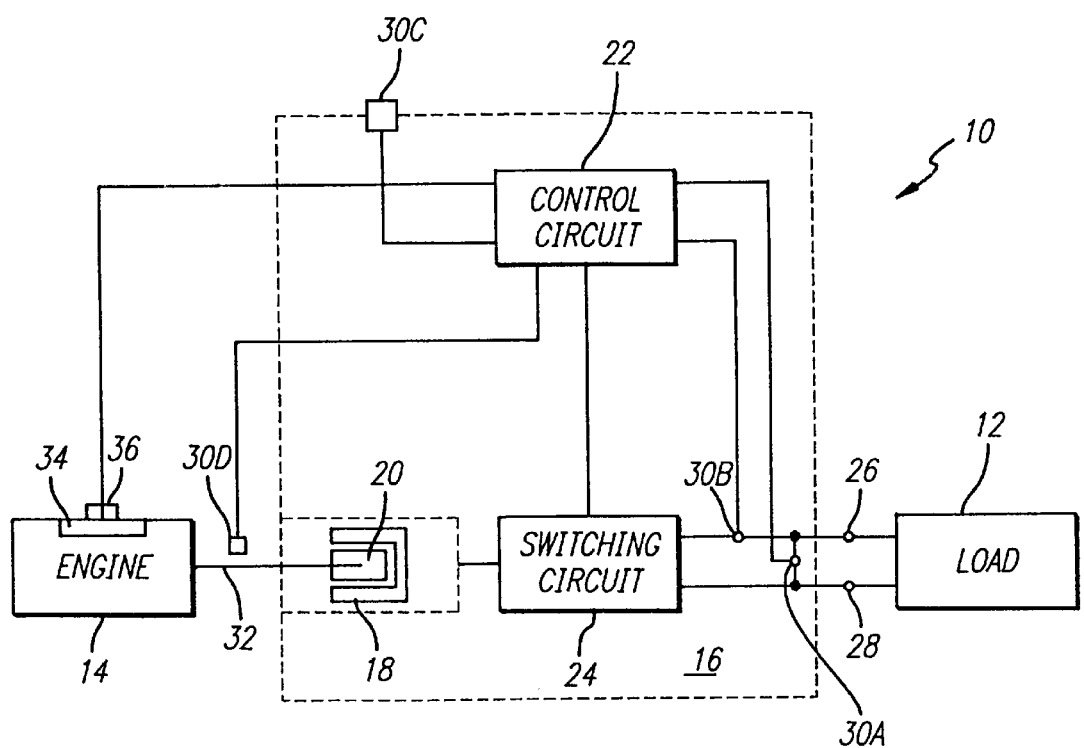
FIG. 1 is a block diagram of an exemplary generator system suitable for employing various aspects of the present invention.

Referring now to FIG. 1, an exemplary system 10 which various aspects of the present invention may advantageously be employed, is connected to a load 12. System 10 suitably comprises an energy source 14 and a generator unit 16. Generator unit 16 suitably includes a multi-winding stator 18; a rotor 20; a control circuit 22;

a switching circuit 24; output terminals 26 and 28; and at least one sensor, e.g., sensors 30A, 30B, 30C, and 30D, collectively referred to as sensors 30.

Energy source 14 may comprise any source of rotational energy, such as, for example, a conventional steam-driven turbine, a conventional diesel engine, or conventional internal combustion engine with a rotational output shaft 32 and throttle 34. Engine 14 transfers power to generator unit 16 by causing shaft 200 to rotate at a speed in accordance with the setting of throttle 34. If desired, system 10 may also include a throttle control device 36, cooperating with throttle 34. Throttle control device 36 suitably comprises an electromechanical actuator, for controlling the setting of throttle 34 in accordance with control signals from control circuit 22. Examples of suitable throttle control mechanisms will be described in conjunction with FIGS. 19, 20A and 20B, 33–38 and 59.

Generator unit 16 converts mechanical energy, e.g., rotation of shaft 32, into electrical energy to selectively supply load 12. Stator 18 and rotor 20 are disposed such that rotation of rotor 20 induces current in the windings of stator 18. Switching circuit 24, under the auspices of control circuit 22, selectively connects the respective stator windings to the generator output (and hence load 12) to achieve a desired output characteristic. The control is suitably effected in accordance with feedback provided by one or more of sensors 30.

Engine 14 and generator 16 may be directly coupled, i.e., shaft 32 may be the engine shaft, or may be indirectly coupled, e.g., as in an automotive application where shaft 32 is a separate belt driven shaft. If desired, engine 14 and generator 16 may be mounted together as a unit on a common frame, e.g., as in a genset.

Figure 2:
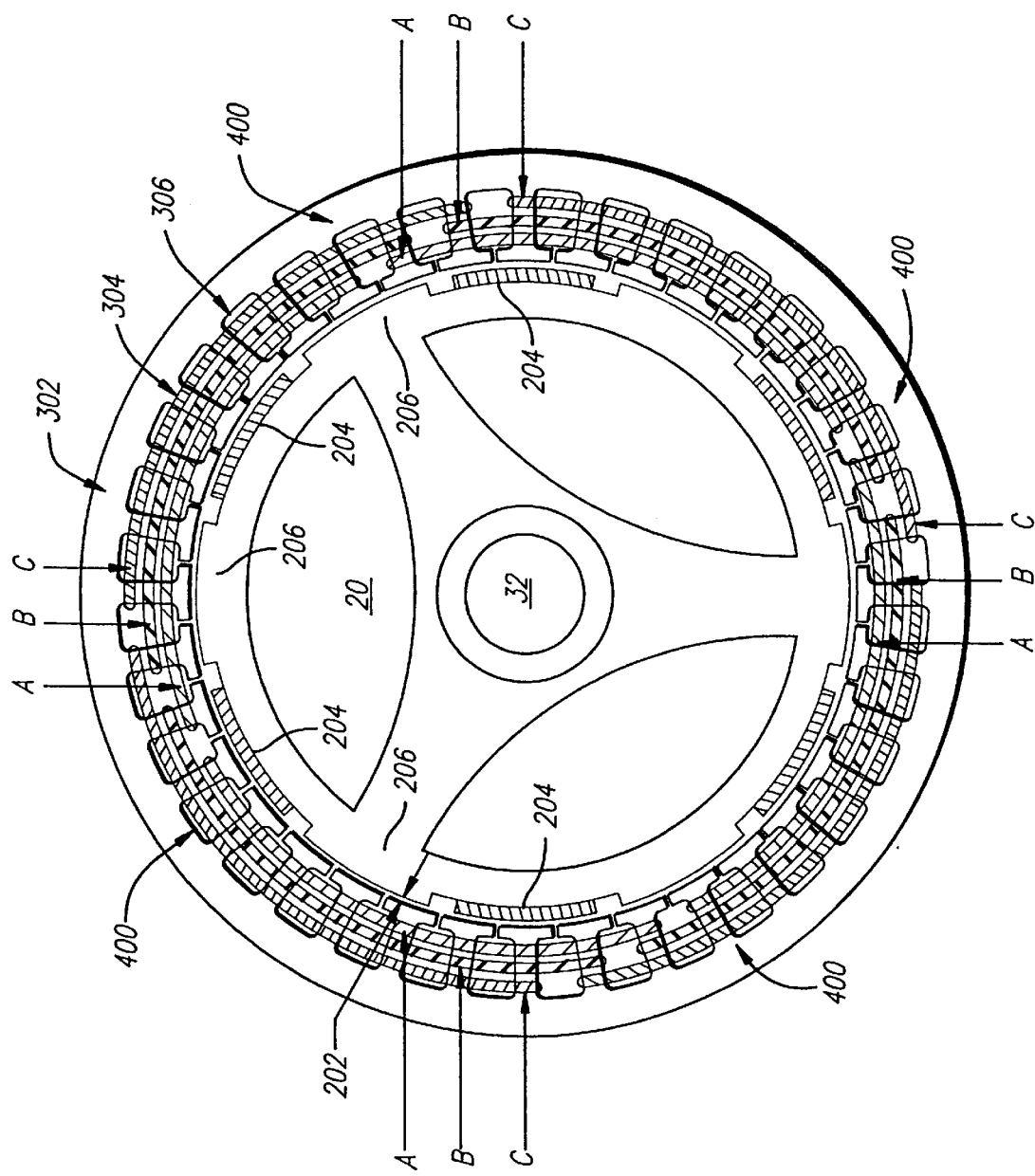
FIG. 2 is a schematic side view representation of a fully wound stator employing three-pole winding groups in a twelve pole system.

Referring now to FIG. 2, rotor 20 is preferably a permanent magnet rotor of sufficiently light weight that it can be maintained in axial alignment with, and rotated in close proximity to, stator 18 (i.e., with a relatively small predetermined air gap 202, e.g., in the range of 0.020 to 0.060 inch, and preferably 0.030 inch) without the necessity of any bearings in addition to those conventionally included within engine 14. Rotor 20 suitably manifests a generator output power to rotor weight ratio in excess of 150 or 200 watts per pound, preferably in excess of 500, more preferably in excess of 700, and most preferably in excess of 800. The preferred embodiment manifests a generator output power to rotor weight ratio in the range of 800 to 900 in watts per pound. For example, for a 2-kilowatt unit, rotor 20 would suitably weigh no more than approximately 2.40 pounds. Similarly, for a 900-watt unit rotor 20 preferably weighs no more than 1.06 pounds. This is achieved economically by employing high energy product magnets and consequence poles, as discussed in copending applications U.S. patent application Ser. Nos. 08/306,120 and 08/370,577 now U.S. Pat. No. 5,625,276. Briefly, rotor 20 preferably comprises a generally disc-shaped core bearing a plurality of high energy product magnets 204, preferably having a flux density of at least on the order of five kilogauss, and suitably formed of a rare earth alloy such as neodymium iron boron or samarium cobalt, disposed on its circumferential surface. The magnets are preferably disposed within insets in the circumferential surface, with the intervening portions of core comprising consequence poles 206, with the area of magnet face greater than the area of the face of consequence poles by approximately the ratio of the flux density produced by the permanent magnet to the allowed flux density of the consequence pole.

Figure 4:
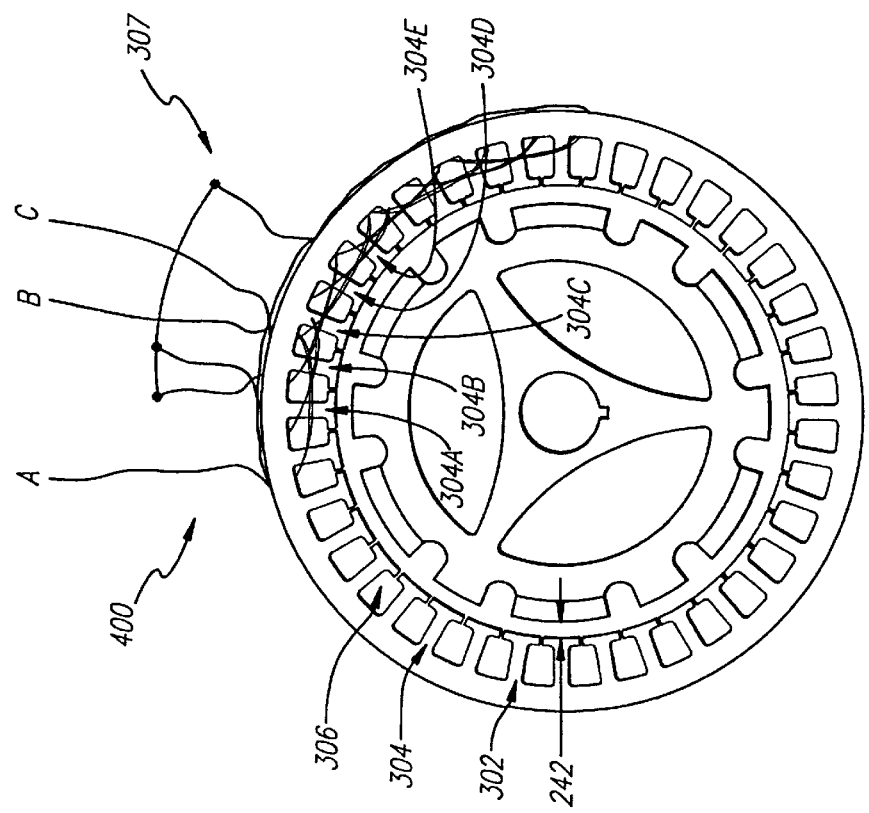
FIG. 4 is a schematic side view of a partially wound stator employing a three-pole winding group in a twelve pole system.
Figure 3:
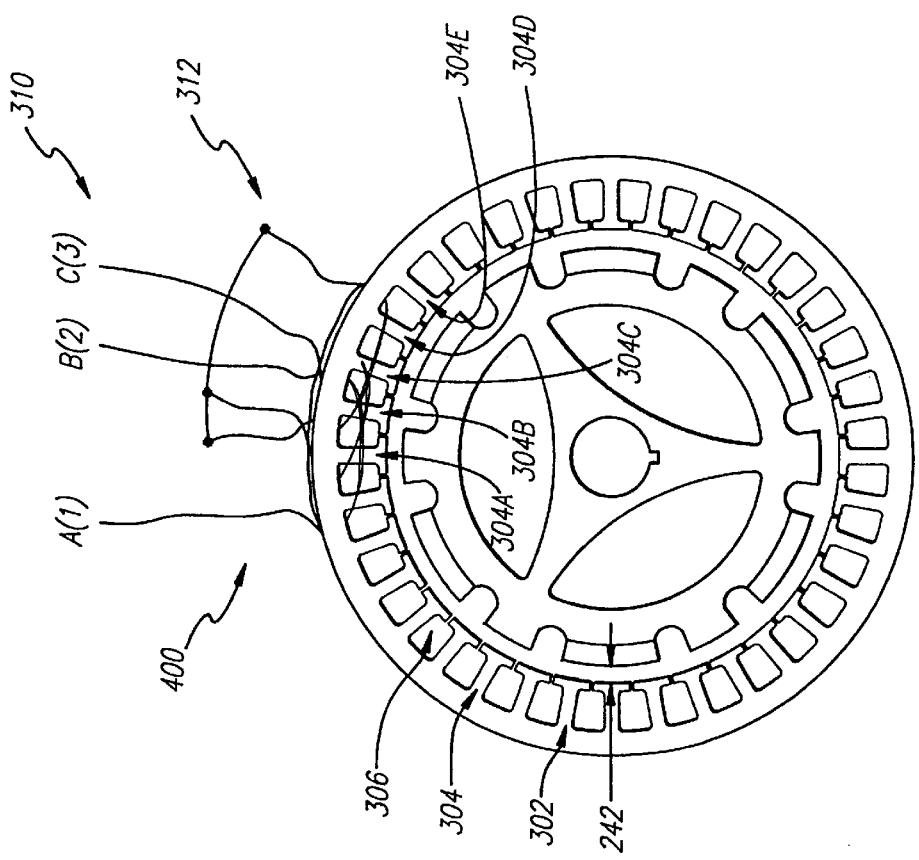
FIG. 3 is a schematic side view of a partially wound stator employing a one-pole winding group in a twelve pole system.

Stator 18 preferably includes a plurality of three-phase windings 400 to generate low voltage, high current outputs, preferably wound with the respective coils of each phase grouped together, and concurrently wound about a laminate core as a unit to provide particularly advantageous heat dissipation characteristics. In the present embodiment, stator 18 includes twelve windings configured as four sets of three-phase star windings (as schematically shown in FIGS. 2–4, for example). Each stator winding includes a predetermined number of turns corresponding to the voltage output associated with that winding.

More specifically, referring to FIGS. 3 and 4, stator 18 includes a soft magnet core 302 having a crenelated inner periphery with a predetermined number of equally spaced teeth 304 and slots 306. The number of slots 306 is equal to a predetermined multiple of the number of poles of rotor 20 times the number of phases. The minimum number of slots 306 is equal to the number of poles times the number of phases, i.e., the minimum number of teeth provided per pole is equal to the number of phases. For a 3-phase generator employing a rotor having 12 poles, at least 36 slots 306 will be provided in stator core 302.

A predetermined number of independent groups of windings are provided on core 302, wound through slots 306 about predetermined numbers of teeth 304. The predetermined number of groups of windings is an integer fraction of the number of poles, i.e., for 12 poles, there could be a single group using all 12 poles (conventional); two groups using six poles each; three groups using four poles each; four groups using three poles each; six groups using two poles each; or twelve groups using one pole each. The power provided by each group is relatively unaffected by the status of the other groups. As will be more fully explained, controller circuit 22 selectively completes current paths to the individual groups of windings to achieve a desired output.

Referring specifically to FIG. 3, a one-pole winding group 310 in a three-phase system comprises respective phase windings, A, B and C connected together at one end, 312, in a star configuration. The winding corresponding to each phase is wound about the predetermined number of teeth corresponding to a pole, e.g., 3, with each successive phase winding shifted by one slot, and wound in the opposite direction from the preceding phase winding. The one pole group is therefore wound about a group of five teeth: first phase A winding is wound about teeth 304A, 304B, and 304C; phase B is wound about teeth 304B, 304C, and 304D; and phase C is wound about teeth 304C, 304D, and 304E.

In a one pole group configuration, twelve such one pole winding groups 310 (only one shown) would be provided about stator core 302. As will be discussed, a separate controlled current path is provided with respect to each winding group to provide output control.

Referring to FIGS. 3 and 4, in the preferred embodiment the stator employs four three-pole winding groups 400 (only one shown in FIG. 3). Each phase winding (A, B, C) of each group 400 is wound in alternating directions about three successive three-tooth groups (each three-tooth group corresponding to a pole), with each successive phase winding shifted by one slot. As shown schematically in FIG. 4, the winding of one group corresponding to a given phase may partially overlap the windings of an adjacent group corresponding to the other phases, i.e., the winding of one group corresponding to a given phase may share two (the number of phases) teeth with the windings of an adjacent group.

The overlap of the windings causes some small magnetic interaction between adjacent groups. However, there is no magnetic interaction between non-adjacent groups, and the little interaction between adjacent groups has no substantial affect on the operation of the system.

Referring again to FIG. 1, sensors 30 suitably measure various system parameters, such as, voltage output (sensor 30A), current output (sensor 30B), temperature (sensor 30C) and/or rotor (engine) RPM (sensor 30D). Sensors 30 provide appropriate signals to control circuit 22 to indicate, for example, whether system 10 is providing appropriate output voltage or current, is operating at an appropriate engine speed, or whether a preselected maximum and/or minimum voltage, current, temperature has been reached.

Based on the signals generated by sensors 30 control circuit 22 suitably generates control signals to activate and deactivate the various windings 400 and/or adjusts the setting of throttle 34 to achieve the desired output, engine speed or temperature. For example, if signals from sensors 30 indicate that the system output voltage is below the desired voltage, control circuit 22 activates more windings 400, thus adding the current generated by the additional windings 400 and raising the overall current and voltage to the desired level; increases the percentage of the rotor cycle during which windings are activated by, e.g., varying firing angle (pulse width) or pulse population (number of pulses per unit time); and/or varies the throttle setting to increase rotor (e.g., engine) speed. Conversely, if too much current is being produced or if the voltage is too high, one or more windings 400 may be deactivated to reduce the number of windings 400 supplying load 12, the percentage of the rotor cycle during which windings are activated decreased, and/or the rotor speed decreased. As will be discussed, damage to components caused by current surges due to variations in load can be avoided by sensing an impending over-current condition, and using one or more of the forgoing techniques, decreasing the system output by a predetermined amount or to a predetermined level, then gradually increasing the output to bring the system back to desired operating conditions.

Switching circuit 24, under the auspices of control circuit 22, selectively completes current paths through the respective winding groups to achieve desired output characteristics or temperature. Various suitable configurations of switching circuit 24 are described in copending applications U.S. patent application Ser. Nos. 08/306,120 and 08/370,577 now U.S. Pat. No. 5,625,276. Switching circuit 24 may be responsive to digitally generated control signals or to analog generated control signals, and may be configured to effectively connect the windings in parallel to provide a high current output at relatively low voltage levels, or may be configured to effectively connect the windings in series to provide high voltage capacity. As will hereinafter be more fully discussed, switching circuit 24, suitably comprises a controlled current path associated with each winding 400, effectively configured as a plurality of switching rectifier circuits. The controlled current paths are suitably effected using a power diode; a connecting switch or relay, such as a semiconductor controlled rectifier (SCR); a control diode; and a control switch or relay, such as a transistor. Each current path is suitably responsive to a control signal from control circuit 22.

Control circuit 22 suitably comprises a microprocessor-based system for receiving data from sensors 30 and activating or deactivating the control switches of switching circuit 24, accordingly. Control circuit 22 may be voltage regulated, i.e., the control circuit activates and deactivates the various windings to achieve a desired voltage. In addition, control circuit 22 may be current and temperature limiting, so that if either the current or the temperature exceeds a preselected threshold, control circuit 22 automatically reduces the number of activated windings 400, regardless of the voltage output. The current and temperature limiting functions diminish the likelihood of overloading or burning out components of generator unit 16. These functions could be varied, of course, to regulate the output according to any parameter, and limit output according to any others. In addition, control circuit 22 may suitably be designed to alternate which windings 400 are activated and deactivated and the duration for which they remain activated. For example, to avoid overheating any individual winding 400, the windings may be activated and deactivated on a first in, first out (FIFO) basis. Thus, the current path that has been activated for the longest time is the first to be deactivated as required. Similarly, the current path that has been deactivated for the longest time is the first to be activated as required. As a result, none of the windings 400 remains activated significantly longer than any other winding 400 so that heat generation is distributed more or less evenly among windings 400. Various suitable configurations of control circuit 22 are described in copending applications U.S. patent application Ser. Nos. 08/306,120 and 08/370,577 now U.S. Pat. No. 5,625,276.

As previously noted, a stator winding control system can be utilized in a number of different applications and is of particular utility where a rotary source (e.g., engine) is driven over a wide range of speeds, or in which voltage or current must be controlled or varied over a significant range, e.g., the load varies rapidly and widely. Examples of such applications include welders (particularly multi-mode welders), generators and inverters operating over a wide range of rotor speeds because of the nature of the power source, e.g., an inverter powered by a diesel engine utilized in a refrigeration truck, or as a result of throttle control employed to facilitate noise abatement and/or fuel efficiency and generators and inverters operating with widely and rapidly varying loads.

Figure 5:
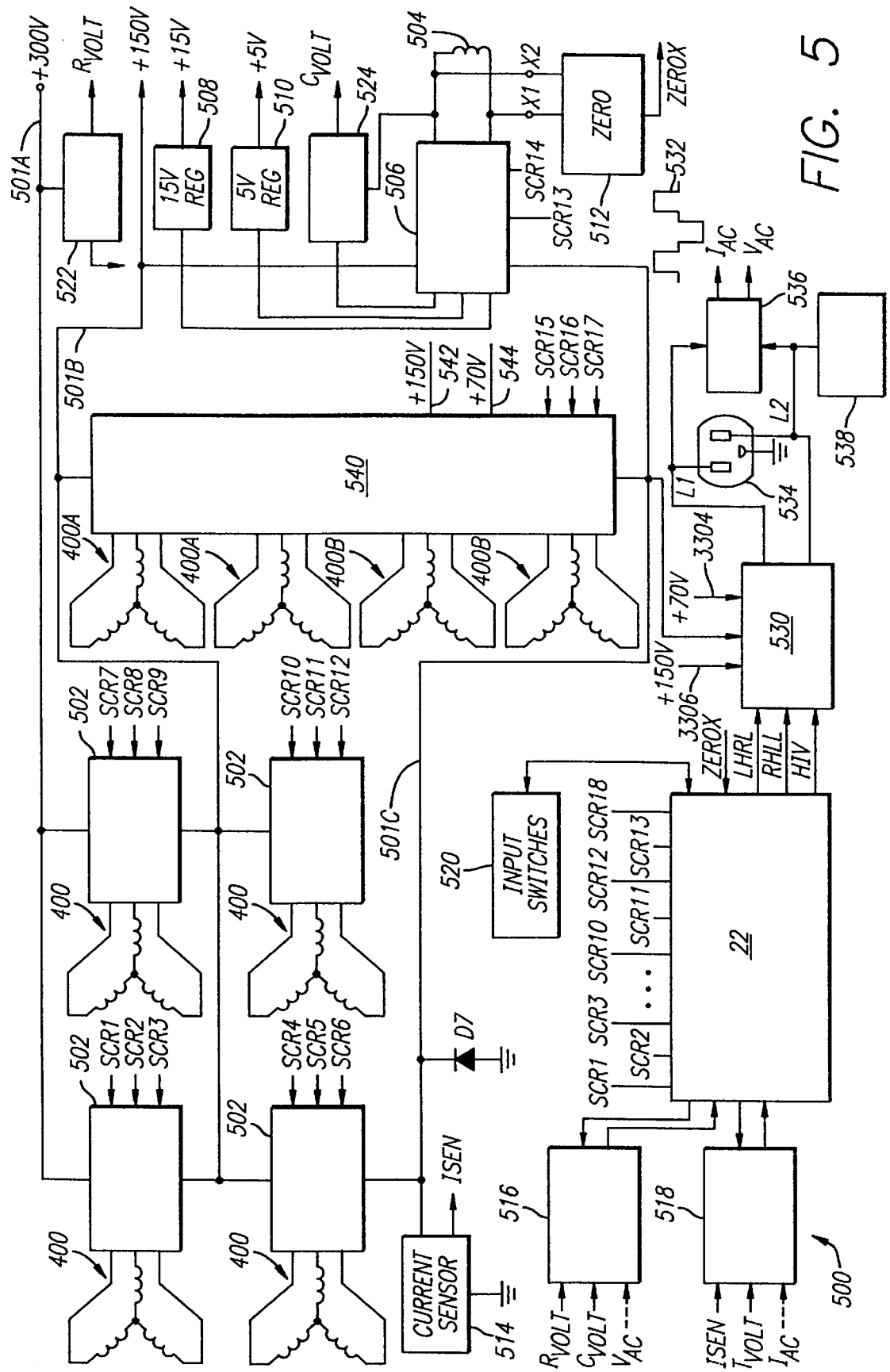
FIG. 5 is a block schematic diagram of a multi-coil system for generating a plurality of regulated DC rail voltages and an AC output.

Referring now to FIG. 5, a system 500 for generating a plurality of regulated DC rail voltages responsive to a wide range of input drive speeds, may be formed utilizing: a predetermined number, e.g., four (4), of winding groups 400 to supply respective positive DC rails 501A, 501B; a respective controlled current path associated with each winding, effectively configured as a switching regulator (e.g., three-phase regulated rectifier bridge) 502, associated with each winding group 400; a single phase control winding 504; a single phase regulator (e.g., regulated rectifier bridge 506), cooperating with control winding 504; respective conventional regulator devices 508 and 510 (such as, e.g., Motorola 78LXX series pass three lead regulator devices) to provide stable regulated DC outputs at designated levels (e.g., 15 volts, 5 volts); a suitable zero crossing detector 512; a suitable controller 22; a suitable current sensor 514; respective sets of conventional analog switches 516 and 518 (e.g., CD4055) (or a suitable analog multiplexer chip), operating under the control of controller 22; respective push button input switches 520; and respective voltage sensors 522 and 524, e.g., voltage dividers, to generate indicia (Rvolt) of the DC rail and (Cvolt) control coil voltages at suitable voltage levels. Respective DC voltages of predetermined values, e.g., 300 V and 150 V or 150 V and 75 V, are provided on positive DC rails 501A and 501B, relative to a negative rail 501C (suitably floating relative to system ground, via a diode D7).

If desired, system 500 can also include a suitable power converter (inverter) 530 to generate an AC signal 532 at the terminals L1, L2 of a conventional outlet 534. In this connection, suitable sensor circuits 536 for providing indicia of the voltage (Vac), and 538 for providing indicia of the current (Iac), of output signal 532 would also be provided. Converter 530 may derive power from one or more of DC rails 501A and 501B. Preferably, however, an inverter rail generation system 540 is provided to establish one or more independent inverter rails (542, 544).

Inverter rail generation system 540, as will be more fully described, suitably comprises a separate set of one or more winding groups 400A, 400B on stator core 302 and cooperating rectifiers (e.g., three-phase regulated rectifier bridges and/or unregulated rectifier bridges), which do not contribute to the voltages on DC rails 501A or 501B, but rather establish separate, generally independent inverter rails (542, 544). Use of independent winding groups 400A, 400B and cooperating rectifiers to establish substantially independent DC voltage(s) to supply inverter 530 facilitates concurrent operation of inverter and, e.g., welder operation.

Regulators 502 provide a respective controlled current path associated with each winding, and may be any switching regulator, e.g., multi-phase rectifier bridge, responsive to input control signals associated with the respective windings of the group (e.g., phases), and capable of accommodating the voltage and currents at which the system is intended to operate. For example, regulators 502 suitably comprise a multi-phase (e.g., three-phase) SCR rectifier bridge having a respective leg associated with each phase comprising: a power diode; a connecting switch or relay (e.g., a SCR); a control diode; and a control switch or relay, such as a transistor responsive to a control signal, suitably from controller 22.

To achieve generation of the desired voltages and current control in the embodiment of FIG. 5, a predetermined number (e.g., 2) of regulators 502 are connected in parallel and a predetermined number (e.g., 2) of groups of parallel-connected regulators 502 are connected in series. Rotation of the rotor induces current in each of the windings of groups 400 (and inverter winding groups 400A and 400B). Controller 22 provides signals to regulators 502 to effectively connect or disconnect respective coils in the operative circuit to provide a desired level of current, and adjust the relative firing angles of the respective phases to control voltage output. Rotor and stator are designed such that the unit is capable of generating a DC output signal meeting certain criteria (and if inverter 530 is employed, also an AC output signal meeting certain criteria) even at the lowest operational rotor RPM (e.g., idle speed). At the minimum operational speed (RPM), all (or at least most) of winding groups 400 (and 400A and 400B) would typically be connected in the operative circuit, and the regulator SCR's "full on" for maximum firing angle. The respective coils are then connected into or disconnected from the operative circuit to provide a desired level of current, and the SCR firing angles are varied to attain and maintain the desired output voltage at higher RPM.

Controller 22 may be any circuit capable of responding to the sensor signals and providing suitable construable control signals for regulators 502 to generate the dsired output, (and preferably to regulator 506, and converter 530 and inverter rail generator 540, if employed). For example, in the embodiment of FIG. 5, controller 22 generates control signals (SCR1–SCR12) to regulators 502, and control signals (SCR13–SCR14) to regulator 506. As will be discussed, regulator 506 is employed to ensure the availability of a stable power source for the various components of the system. In addition, when power converter 530 is included in the system, controller 22 generates switching control signals to power converter 530 (LHRL, RHLL, and/or in various embodiments HIV, and/or Top_Left (T_L), Bottom_Left (B_L), Top_Right (T_R), and Bottom_Right (B_R), and Cap_Dump (C_D)). Controller 22 may also, if desired, generate switching control signals (e.g., SCR15, SCR16, SCR17, SCR18) to inverter rail generator 540, when employed.

As will be discussed, controller 22 is suitably responsive to: signals from zero crossing detector 512; signals indicative of the state of input switches 520; and respective sensor signals, selectively applied to controller 22 through analog switch sets (MUX's) 516 and 518. Sensor signals suitably include: a signal (Rvolt) indicative of the level of high DC rail 501A; a signal (Cvolt) indicative of the level of the voltage across control coil 504; a signal (ISEN) indicative of the output current from current sensor 514; a signal (Tvolt)

indicative of the temperature of the unit, from temperature sensor 30C (FIG. 1) and a signal (Vac) indicative of the average voltage of the AC output signal of power converter 530.

Indicia (Rvolt) of DC rail voltage and indicia of control coil voltage (Cvolt) are provided by voltage sensors 522 and 524, respectively, suitably signals having a voltage (within appropriate ranges) indicative of the measured voltage. Sensors 522 and 524 may be any device capable of providing a signal (e.g., voltage within appropriate ranges) indicative of the magnitude of the measured voltage.

Indicia (ISEN) of DC output current is provided by current sensor 514, suitably a signal having a voltage indicative of the current output of the system. Current sensor 514 may be any device capable of providing a signal (voltage within appropriate ranges) indicative of current magnitude. In high current applications, it is advantageous to utilize a Hall effect sensor to avoid power loss. In lower current systems, the voltage generated by current flow through a small resistor (e.g., 0.1 ohm) may be measured to develop indicia of the current.

Indicia (Vac) of the voltage of output signal 532 is provided by sensor circuit 536. Sensor circuit 536 may be any device capable of suitably generating a signal (e.g., voltage within a suitable range) proportional to the average voltage of output signal 532. For example, a suitable sensor circuit 536 may be formed of: a single phase diode bridge connected to output terminals L1 and L2; suitable low pass filter circuits; a Zener diode; and a voltage divider. Output signal 532, as provided at output terminals L1 and L2, is applied to the bridge to generate an average DC signal. The DC signal is filtered, smoothed and limited by the filters and Zener diode, and applied to the voltage divider to generate a signal proportional to the average voltage of output signal 532. The signal is applied to analog multiplexer (switch set) 516 for selective application to controller 22.

Figure 21:
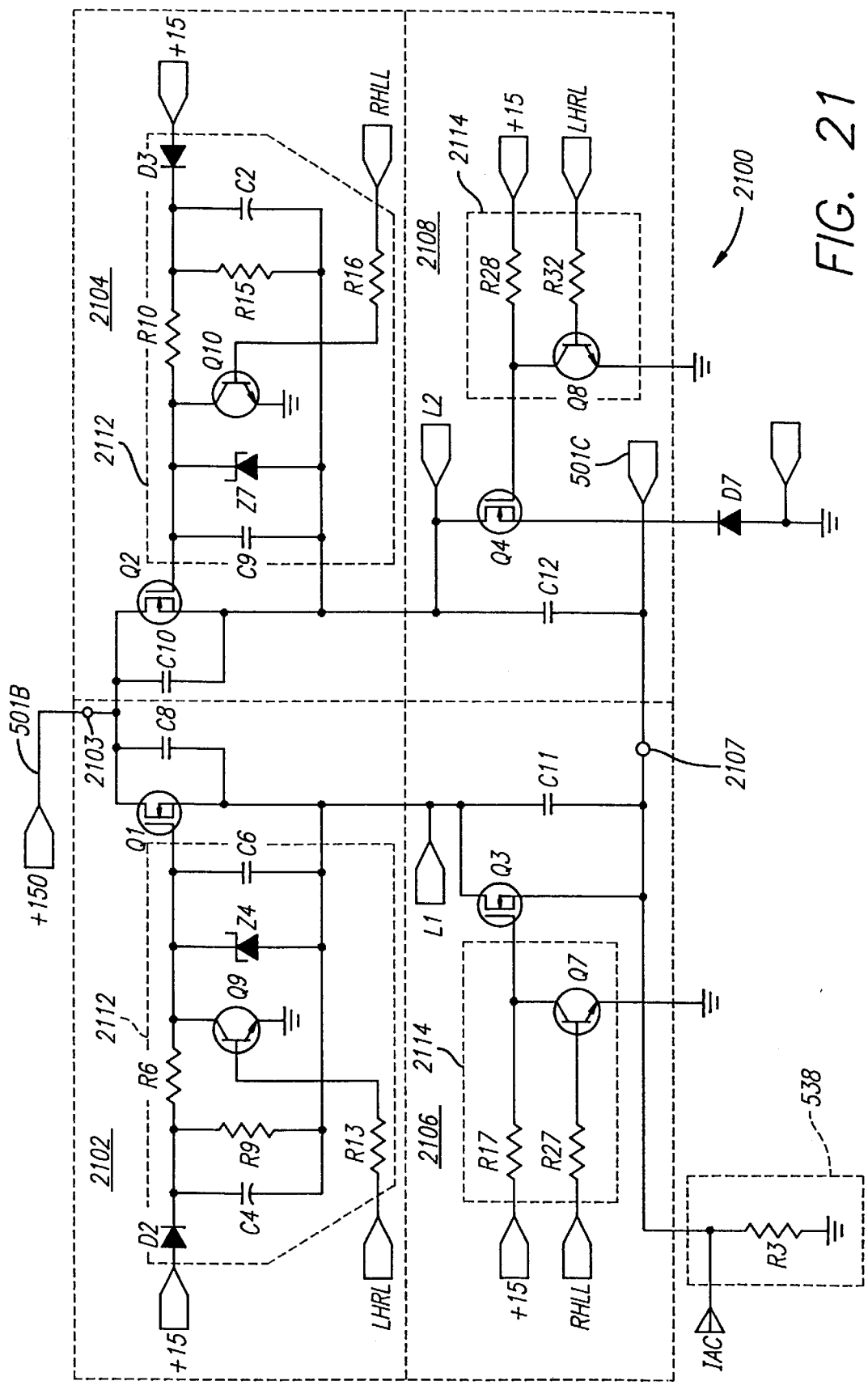
FIG. 21 is a schematic diagram of a power converter suitable for use in the system of FIG. 5.

Indicia (Iac) of the AC output current level of signal 532 is provided by current sensor 538 to analog MUX 518. Current sensor 538 may be any device capable of providing a voltage indicative of current. In typical systems, the Iac voltage may be generated by current flow through a small resistor (e.g., 0.1 ohm) R3 (FIG. 21). In high current applications, it is advantageous to utilize a Hall effect sensor to avoid power loss.

Control winding 504 is suitably wound concurrently on stator core 302 with a predetermined one of the phases (e.g., phase A) of one of the winding groups 400. Although physically wound with a winding group 400, control winding 504 is independently controlled (by regulator 506), and is operatively connected in the system irrespective of the status of the winding group 400 with which it is wound.

Control winding 504 cooperates with regulator 506 and regulator devices 508 and 510 to generate stable supply voltages (e.g., 5 volts, 15 volts) for the various circuitry. Regulator 506 may be any suitable regulated single phase regulator, e.g., SCR rectifier bridge, of appropriate power rating. In applications where rotor RPM varies over a substantial range, a regulated rectifier is preferable to an unregulated bridge to accommodate the range of induced voltages, and assure suitably stable supply voltages over the entire range of operation. As with respect to windings 400, the parameters of coil 504 are chosen such that it generates a sufficient current to generate the supply voltages at the minimum operational speed (RPM), e.g., at idle speed, with regulator SCR's "full on". The SCR firing angles are then varied to maintain the desired control voltage at higher RPM. In applications where the expected range of rotor speeds is sufficiently narrow, an unregulated rectifier may be used.

Control winding 504 also provides a signal from which indicia of phase can be derived. Since control coil 504 is physically wound with one of the phases of a winding group 400, winding 504 is in phase with the particular group phase winding. Accordingly, zero crossings in the signal induced in coil 504 are concurrent with those in the group phase winding with which control winding 504 is wound. Accordingly, the indicia of zero crossings generated by zero crossing detector 512, with respect to the control winding voltage, can be utilized to derive the relative phases of the respective windings of groups 400, 400A, and 400B (and engine speed, since the frequency of zero crossings is also indicative of rotor RPM).

Figure 6:
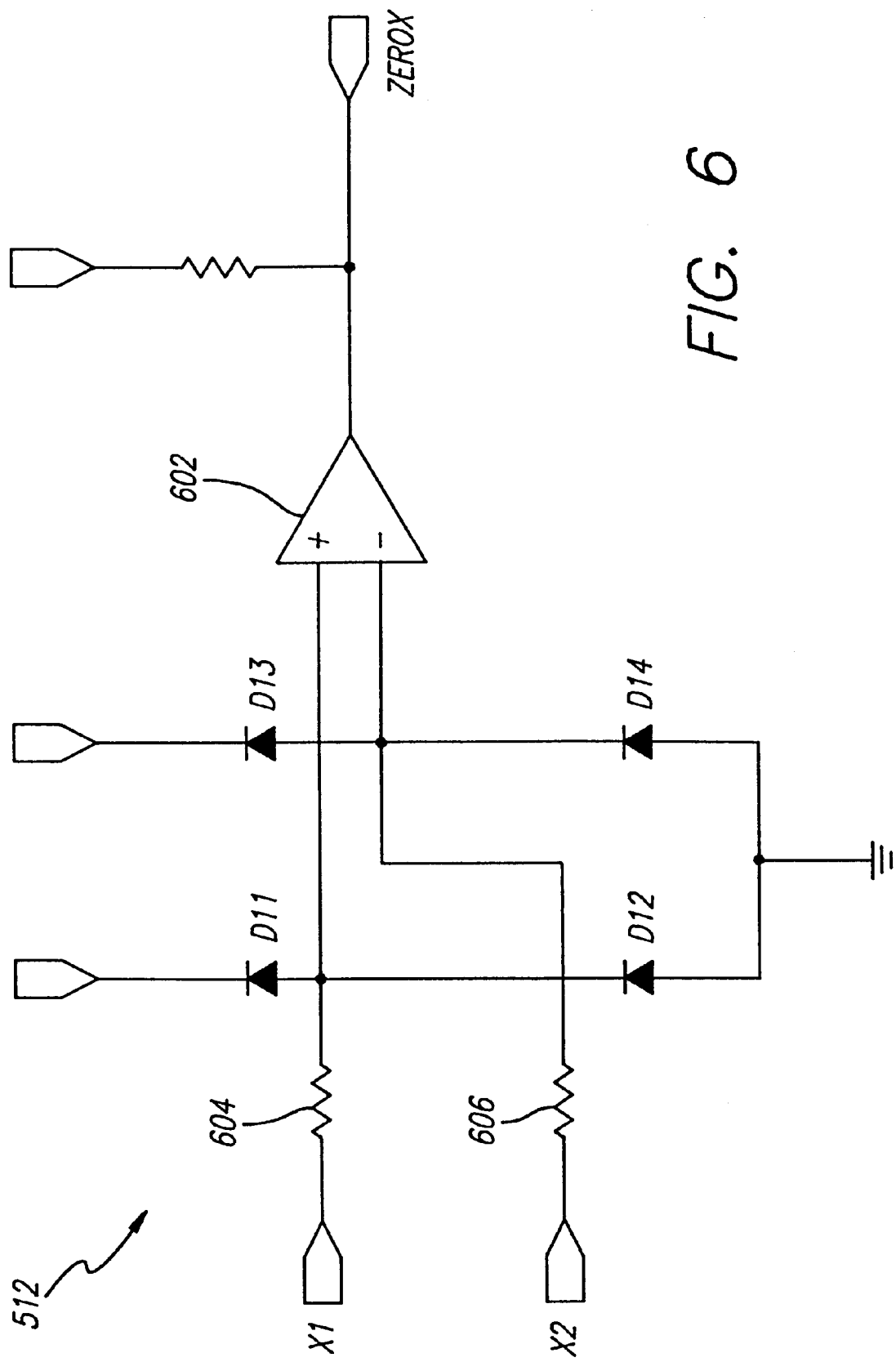
FIG. 6 is a schematic diagram of a zero crossing detector suitable for use in the system of FIG. 5.

Referring to FIG. 6, a suitable zero crossing detector 512 comprises a conventional comparator 602, with the respective inputs thereof connected across control coil 504 (at terminals X1 and X2) through respective resistors 604 and 606. The inputs are suitably clamped by diodes D11, D12, D13, and D14, to prevent the inputs from exceeding supply voltages of the comparator. When the voltage at input X1 exceeds input X2, comparator 602 will generate a logic high output. Conversely, when input X1 is less than the input X2, comparator 602 will generate a logic low output. Accordingly, zero crossings are signified by transitions in the output (ZEROX) of comparator 602. To transition between supply voltage levels of different components of the system, comparator 602 is suitably an open drain or open collector device; when a low logic output is generated, the output is effectively connected to ground. When a high level output is indicated, the connection to ground is opened and the output effectively connected to a power supply of the desired logic high level.

Power converter 530 (in the preferred embodiment, in effect, a variable frequency inverter) generates an output signal 532 at terminals L1 and L2 of a conventional outlet 534 with a predetermined waveform simulating (e.g., having the same RMS value as) the desired AC signal (e.g., 120 V, 60 Hz in the U.S.; 240 V, 50 Hz in Europe).

Figures 7, 8:
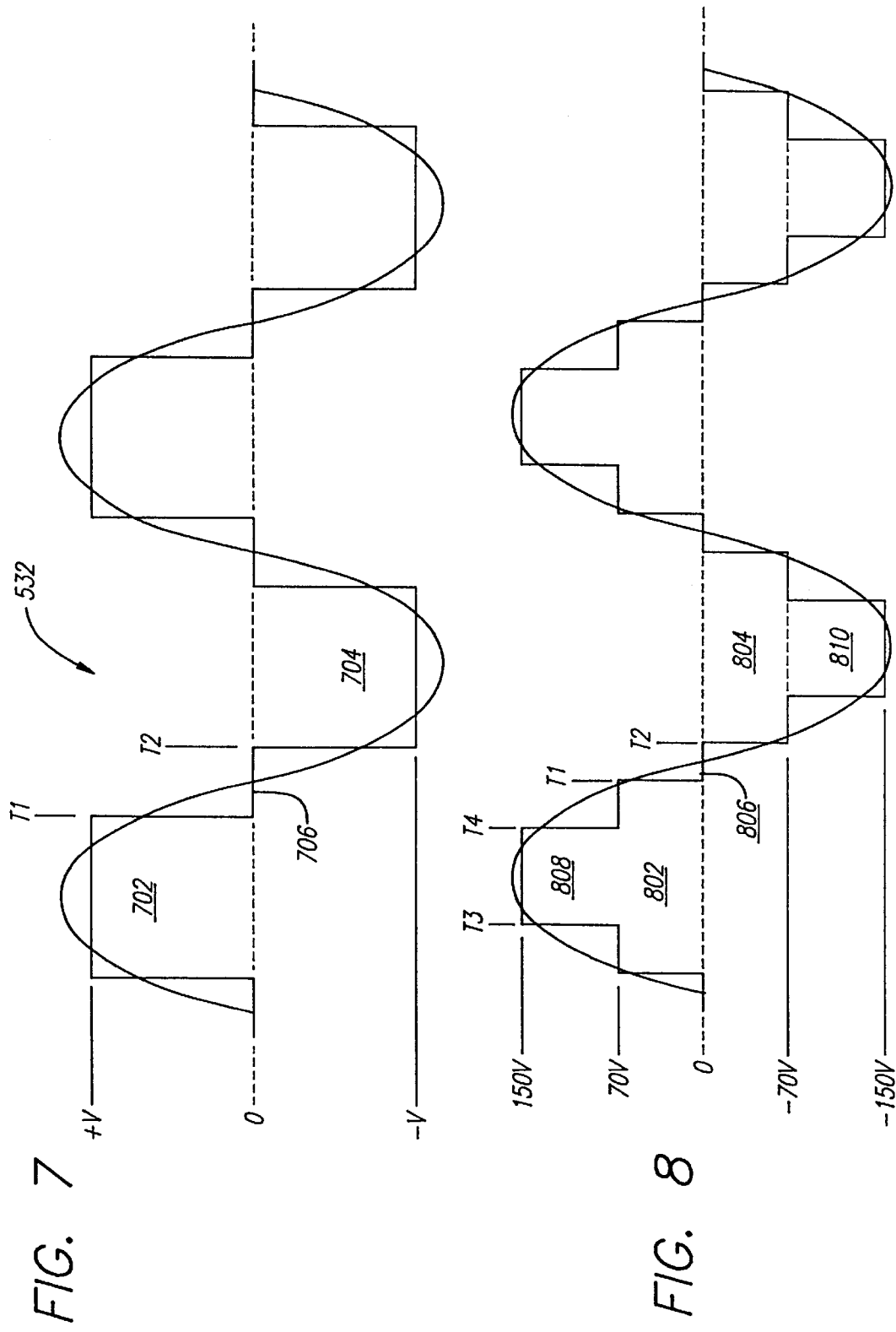
FIG. 7 is an illustration of a sine wave simulated by first and second pulses of opposite polarity.
FIG. 8 is an illustration of a sine wave simulated by stacked sets of pulses.

Referring briefly to FIG. 7, a sine wave is simulated by selectively connecting a DC source (e.g., inverter rails 542, 544) to terminals L1 and L2 in response to switching control signals to generate first and second pulses of opposite polarity 702, 704, with an intervening dead-time 706 from the trailing edge of the first pulse at time T1, to the leading edge of the second pulse at time T2. The RMS value of the signal is a function of dead time 706. Control of the dead time in relationship to the voltage levels provides an RMS value approximately equal to that of the desired sine wave.

A desired sine wave output can be more closely approximated by shaping the waveform of output signal 532, e.g., using stacked sets of a predetermined number of pulses. For example, referring to FIG. 8, a sine wave is more closely simulated by generating first and second base pulses of opposite polarity 802 and 804, with an intervening dead time 806 from the trailing edge of the first pulse 802 at time T1, to the leading edge of second pulse 804 at time T2. A third pulse 808 is provided effectively stacked on pulse 802, with a leading edge at time T3 and trailing edge at time T4. A fourth pulse 810 is similarly provided effectively stacked on pulse 804. Control of the pulse widths, and dead time in relationship to the voltage levels provides an RMS value approximately equal to that of the desired sine wave. The larger the number of pulses the more closely the sine wave can be simulated.

Figure 22:
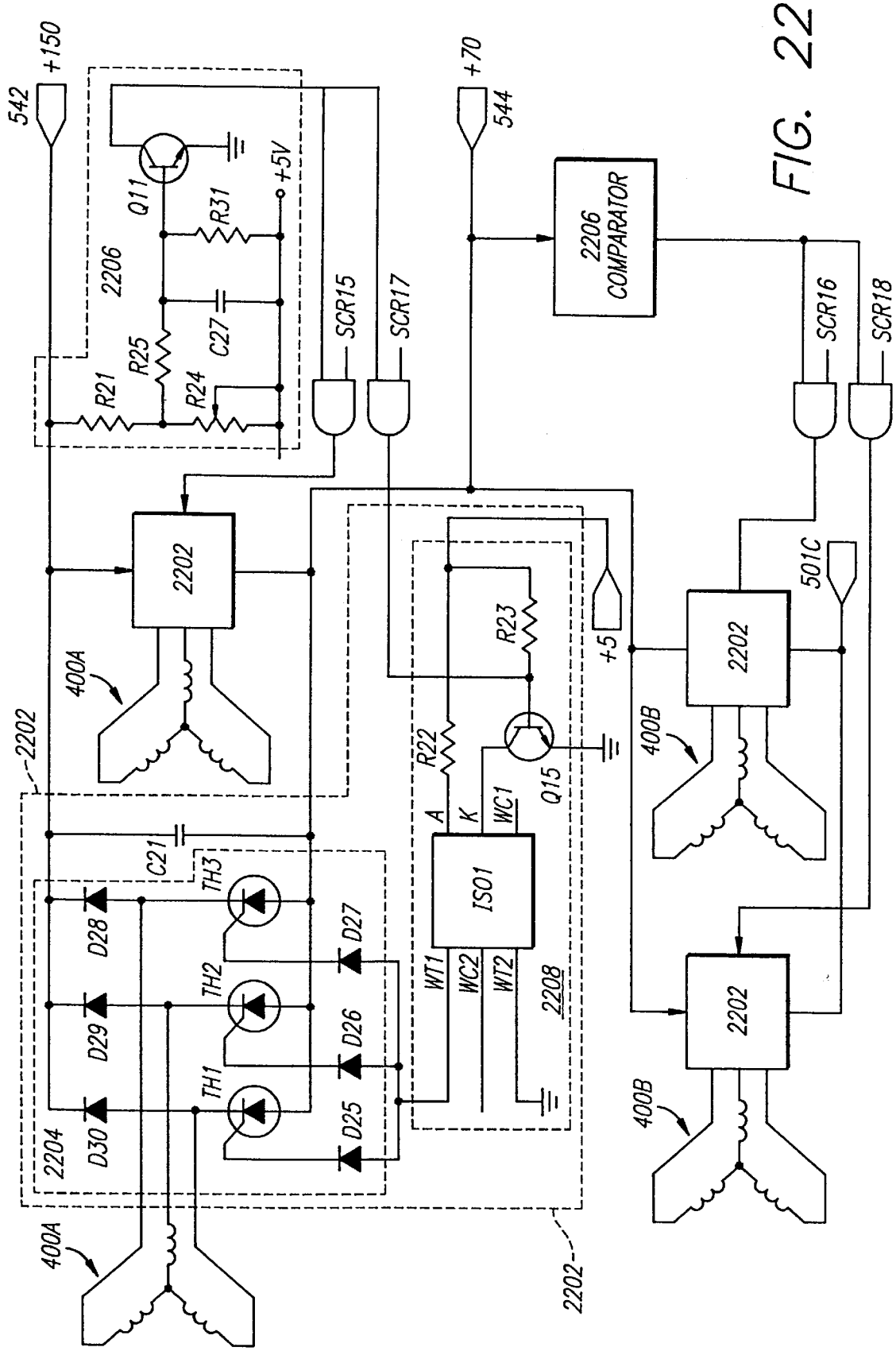
FIG. 22 is a block schematic diagram of an inverter rail generator suitable for use in the system of FIG. 5.
Figure 23:
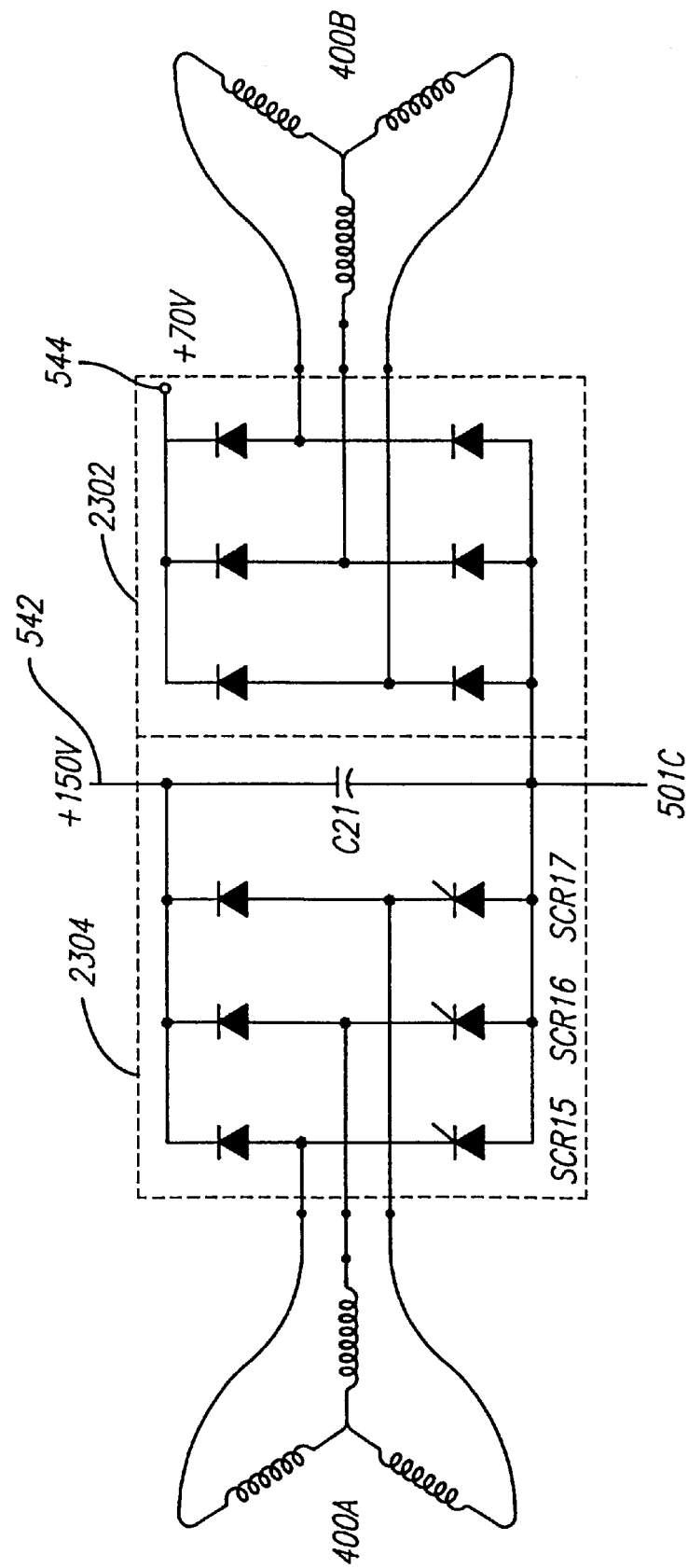
FIGS. 23 and 24 are block schematic representations of alternative inverter rail generators suitable for use in the system of FIG. 5.

Inverter rail generation system 540, provides DC rails for power converter 530. As will be more fully described in conjunction with FIGS. 22, 23, and 24, suitably comprises a separate set of one or more (e.g., 4) winding groups 400A, 400B and cooperating three-phase rectifiers (e.g., regulated rectifier bridges and/or unregulated rectifier bridges), which do not contribute to the voltages on DC rails 501A or 501B, but rather establish separate, generally independent inverter rails (542, 544). Use of independent winding groups 400A, 400B and cooperating rectifiers to establish substantially independent DC voltage(s) to supply inverter 530 facilitates concurrent operation of inverter and, e.g., welder operation.

Controller 22 preferably comprises a suitable microcomputer controller 900. For example, referring to FIG. 9, a suitable microcomputer controller 900 comprises a conventional microcomputer chip 902; a predetermined number of suitable eight-bit, serial input, latched parallel output registers (serial input counters) 904, 905, 906 and 907, such as 74HC595 devices; a conventional seven stage counter 908; a suitable ceramic oscillator 910 providing a clock signal at predetermined frequency, e.g., 8 MHz, to microcomputer 902; and a resistive ladder 912. If desired, circuit 900 can also include a suitable throttle control driver 914.

Microcomputer 902 may be a conventional microcomputer chip including internal counters, registers, random access memory (RAM) and read only memory (ROM). The registers may be separately addressable hardware registers or may be implemented as locations in RAM. Conversely, the microcomputer RAM may be implemented as separately addressable hardware registers. Preferably the microcomputer chip includes also internal comparators capable of generating interrupt commands in response to external signals. External comparators, providing inputs to interrupt ports of the microcomputer chip, can also be utilized.

Microcomputer chip 902 suitably performs a sequence of operations in accordance with a program maintained, e.g., in ROM. The operations are effected using the internal processor, registers and comparators of (or cooperating with) the chip.

In certain microcomputer chips the amount of random access memory is relatively limited. Such microcomputers typically include a predetermined number of fixed function processor registers, and a plurality of individually addressable registers that effectively serve as RAM. In some instances, however, the registers are divided into nominal groups (pages) that are accessible only on a mutually exclusive basis. In general, each routine effected by the microcomputer operates within a particular page of registers. However, when the routine requires a data value (variable) stored in a different page of registers, since the respective pages of registers can be accessed only on a mutually exclusive basis, a page change process must be effected. For example, the desired value is placed in a buffer included among the fix processor registers (particularly a stack), a page change process effected to return to the original page, and the data value transferred from the buffer (stack) to the register on the original page (the transfer process is referred to as passing data between pages).

Certain variables, referred to herein as universal variables, are so widely accessed, that they are routinely passed to a new page when it is accessed. Each of the universal variables is, in effect, assigned a dedicated register in each of the various pages of register. Generally, a plurality of universal variables are involved and the data passing is effected employing a last-in, first-out (LIFO) stack.

For example, microcomputer 902 is suitably a Zialog Z86EO4 chip which includes a bank of fixed function registers, at least one processor defined fixed function stack, and 16 pages of 16 addressable registers each. The respective pages of memory, however, are accessible only on a mutually exclusive basis, and conventional page change processes are effected as necessary.

In control circuit 900, microcomputer 902 is suitably configured to include two internal comparators, which compare respective selected sensor voltages (provided at microcomputer pins 8 and 9, respectively) to a common reference signal applied at pin 10.

The common reference signal is suitably a controlled substantially linear (albeit stepped) ramp voltage ranging from 0 to 5 volts, generated by applying an incremented count to resistive ladder 912. The digital count applied to ladder 912 is suitably generated by counter 908, in response to a clock signal from microcomputer 902 (pin 4). The voltage across resistive network 912 is filtered and applied at pin 10 of microcomputer 902.

Figure 9A:
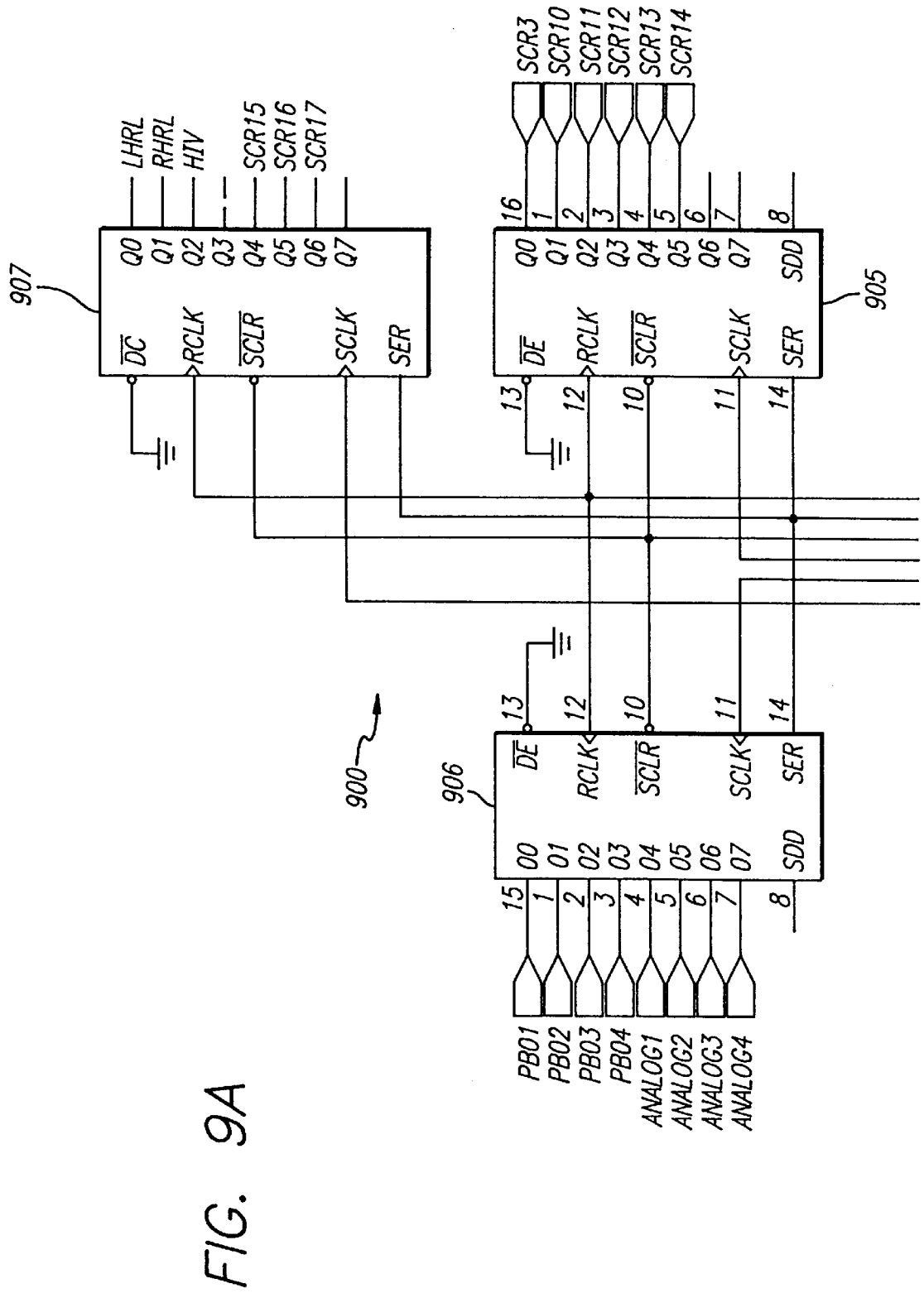
FIG. 9 is a schematic diagram of one embodiment of microprocessor-based digital control circuit.
Figure 9B:
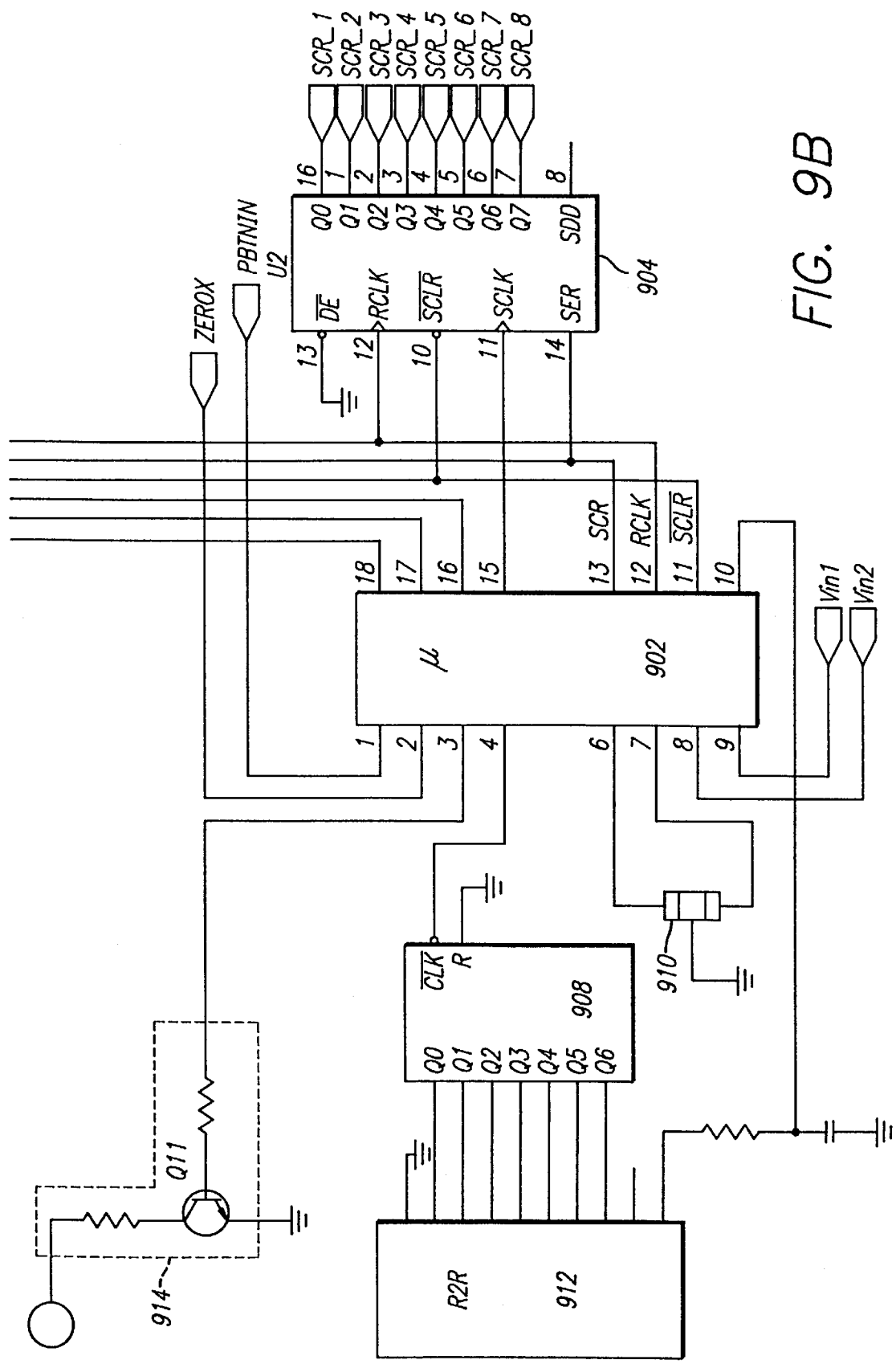

To facilitate sensing a plurality of external parameters with a limited number of microcomputer comparator input terminals, the sensor outputs are selectively applied to the comparator inputs through analog switch sets 516 and 518 (FIG. 5). The sensed parameters are divided into a number of groups equal to the number of available microcomputer inputs, e.g., two for the present embodiment, pins 8 and 9 of microcomputer 902 (FIG. 9). Analog switches 516 and 518 are selectively actuated, under control of microcomputer 902 to apply a selected one of the group of parameters to the associated microcomputer input. Analog multiplexer chips (e.g., 8 to 1) can be utilized to accommodate larger numbers of sensor inputs. Switch sets (MUX's) 516 and 518 apply each parameter in the associated group to the microcomputer input sequentially, in successive measurement cycles through switch set 516, and selectively applied to microcomputer pin 8. Indicia of output current ISEN from sensor 514, and indicia of the temperature of the unit (Tvolt) from sensor 30C (FIG. 1) are grouped together and selectively supplied through switch set 518 to microcomputer pin 9. If system 500 includes inverter 530, signals Vac, indicative of the load on (average voltage of) inverter 530 and Iac, indicative of the current output of inverter 530 are applied as part of the groups associated with pins 8 and 9, respectively.

Comparisons of the selected sensed parameter indicia against the ramp signal are employed to generate digital indicia of the parameters; at the point when the reference voltage ramp reaches the parameter indicia, an accumulated count (A to D), paralleling the contents of counter 908 that generate the ramp, is indicative of the value of the parameter. As will be explained, the capture of the parameter value is effected by initiating an appropriate interrupt.

Microcomputer 902 cooperates with serial-input-parallel-output registers 904–907 to generate control signals to the SCR's of regulators 502 and 506, analog switches 516 and 518 and push button input switches 520, and an inverter circuit, if employed. One of the output pins (e.g., pin 13) of microcomputer 902 may be effectively employed as a serial data provided on the pattern is serially provided on the line and applied at the data inputs of all of the output registers. Serial data clock signals (SCLK) are selectively provided at respective output pins (e.g., 15–18) synchronously with the serial data. The serial data clock signals are provided only at the output pins corresponding (coupled) to a selected one of registers 904–907 to select, and load the data into the appropriate register. A subsequent control signal (RCLK) is provided at pin 12 of microcomputer 902 and applied concurrently to each of registers 904–907 to load the accumulated pattern into an output latch, and hence, apply the bit pattern as control signals to the designated recipient devices. Each of the serial counters is also receptive of a disable signal from microcomputer 902.

For example, serial-input-parallel-output registers 904 and 905 cooperate with microcomputer 902 to generate the control signals SCR1–SCR14 to the various control SCR's of three-phase regulators 502 and single phase regulator 506. A data bit pattern corresponding to the desired states of SCR's 1–8 is provided serially at pin 13 of microcomputer 902. Serial clock input pulses (SCLK) are concomitantly generated at the microcomputer output pin (e.g., pin 18) corresponding to serial register 904, to shift the bit pattern into register 904. Once register 904 has captured the serial bit pattern, a latch output signal (RCLK) is generated at pin 12 of microcomputer 902. The latch output signal (RCLK) causes each of registers 904–907 to load the bit pattern contained in the serial input register into the output latch of the device, and hence, apply the bit pattern as control signals to the corresponding devices, in the case of register 904, SCR's 1–8. The latch output signal (RCLK) is concurrently applied to each of registers 904–907. However, only the input shift register of counter 904 accumulated any new data; the contents of the input registers of the other counters remained unchanged.

Analogous processes are effected: with respect to register 905 (utilizing a serial clock signal generated at microcomputer pin 16) to provide the control signals to SCR's 9–14; with respect to counter 906 (utilizing a serial clock signal generated at microcomputer pin 17) to provide the excitation signals (PB01–PB04) to input switches 520 and to provide control signals (AN1–AN4) to analog switches 516 and 518 to select the desired sensor input; and, in applications where an inverter is employed, with respect to register 907 (utilizing a serial clock signal generated at microcomputer pin 18) to provide the control signals to inverter circuit 530.

Input push button switches 520 (FIG. 5) are employed to provide operator input to the system with respect to, e.g., desired mode of operation, desired output voltage, and desired output current. For example, in the context of a multi-mode welder, push button switches 520 would include: a welding-mode button, which would be sequentially depressed to sequence through the different types of welding operations; an increment button, which is depressed to increment the target value for current or voltage, depending upon the chosen operational mode; and a decrement button, which is depressed to decrement the target value of current or voltage depending upon the selected mode. Briefly, input switches 520 are each connected to a respective output pin (PB01–PB04) of register 906, and, connected in common, to a push button input line (PBTNIN) to microcomputer 902 (pin 1, FIG. 9). Serial data and concomitant clock signals are generated by microcomputer 902 to generate a bit pattern in register 906 that provides a logic high signal on a particular one of switches 520. The state of input signal (PBTNIN) is read at pin 1 of microcomputer 902. If the particular switch corresponding to the logic high bit is closed, a high level PBTNIN input signal will be provided to pin 1 of microcomputer 902. If the switch is not closed, the PBTNIN signal will be logic low. The state of a bit corresponding to the designated switch in a register (PBNT) is responsively adjusted, as appropriate. The serial data applied to register 906 is varied to cycle through each input switch 520 in sequence.

In one embodiment, controller 900 generates control signals to the regulator switching devices in response to the signals indicative of output voltage, and indicia of phase, to effectively connect and disconnect respective windings in the operative circuit and adjust the relative firing angles of the regulators to control output voltage. Referring to FIG. 10, in such an embodiment, microcomputer 902 suitably includes among the fixed function registers: a timer mode register 1002, respective timers, timer zero (T0) 1004 and timer one (T1) 1006; respective pre-scalers (PRE0, PRE1) 1008, 1010 employed to set the timer output intervals; respective registers 1020, 1022, 1024 employed to control the mode (input or output) of the respective device I/O ports (P2M, P3M, P01M); an interrupt mask register (IMR) 1026 for enabling or disabling the respective interrupts; an interrupt priority register (IPR) 1028 for setting relative priority of interrupts; an interrupt request register (IRQ) 1030 for reading and controlling the status of the interrupts; a stack pointer (SPL) 1032 for controlling access to the fixed function stack; a register pointer (RP) 1034 for identifying the currently accessible page of registers; and a register 1036 of various flags.

Microcomputer 902, as will be more fully explained, develops and/or maintains a number of variables in RAM. As noted above, depending upon the particular microcomputer chip employed as microcomputer 902, separate hardware registers may be utilized for each variable. If the registers are organized in separate pages, conventional universal variable and page changing techniques would be employed. As set forth in Table 1, and referring to FIG. 11, exemplary variables include:

TABLE 1

| VARIABLE | REGISTER | CONTENT |
|---|---|---|
| A to D | 1102 | Analog to digital A to D conversion count, indicative of the reference ramp voltage |
| Rvolt | 1104 | Indicia of the average DC high rail voltage |
| Cvolt | 1106 | Indicia of the voltage generated by control winding 504 |
| Vac | 1107 | Indicia of the voltage generated by at AC terminals L1, L2 |
| ISEN | 1108 | Indicia of the current output |
| Tvolt | 1109 | Indicia of the temperature of the unit from temperature sensor 704 |
| Iac | 1110 | Indicia of the AC current output from sensor 538 |
| RPM | 1112 | Count indicative of the instantaneous phase of the rotor cycle; incremented every Timer 0 interrupt (125 microseconds); reset upon zero crossing after updating winding firing phase counts |
| POINT | 1120 | Indicia of the particular input to the microcomputer comparators, i.e., which of analog switches 516 are actuated |
| SCR1–8 | 1122 | 2-byte SCR Control word containing a bit pattern indicative of the desired status of the respective SCR's corresponding to each phase and control winding. 1st byte of the SCR control word SCR's 1–8; 2nd byte of the SCR control word for SCR's 9–14 |
| SCR9–14 | 1124 | |
| INVCTRL | 1125 | Inverter control byte; lower nibble contains bits corresponding to switching control signals (LHRL, RHLL, HIV) and upper nibble contains enable bits for the respective inverter winding groups 400A, 400B |
| SCRLEN | 1126 | SCR Enable word; Enable registers for SCR's 1–8 and SCR's 9–14, |
| SCRHEN | 1128 | |

TABLE 1-continued

| VARIABLE | REGISTER | CONTENT |
|---|---|---|
| | | respectively. Contains a pattern indicative of the particular windings 400 desired to be operative in the system |
| PHAZ1CNT | 1130 | Phase Counts; count indicative of relative firing phases of the phase 1, phase 2 and phase 3 windings. Phase counts 1130–1934 are, in effect, count down timers set to establish the firing angle for each of the respective phases by establishing a count corresponding to the zero crossing point for the phase, minus a phase factor offset |
| PHAZ2CNT | 1132 | |
| PHAZ3CNT | 1134 | |
| CNTRLCT | 1136 | The count indicative of the firing phase of control winding 504 |
| Rvolt1–Rvolt8 | 1138 | Respective arrays of 8 locations each, containing successive measurements of Rail voltage, control winding voltage, and AC output voltage. The Rvolt, Cvolt and Vac arrays are preferably interleaved to facilitate relative addressing |
| Cvolt1–Cvolt8 | 1140 | |
| Vac1–Vac8 | 1141 | |
| FLAG ONE | 1142 | Process flag register |
| byte | 1142bits6,7 | Used in connection with the serial output of the SCR control word and inverter control byte to develop the control signals for the SCR's and inverter; identifies which byte (1922 or 1124 or 1125) is being operated upon |
| 1st cycle | 1142bit5 | Signifies that any initial partial cycle has been completed and a RPM count started at zero crossing is indicative of rotor cycle phase |
| 1/2 cycle | 1142bit4 | Indicates history of zero crossing signal to identify negative going zero crossing (180 degrees) |
| I mode | 1142bit3 | Indicates selection of current mode of operation |
| V mode | 1142bit2 | Indicates selection of voltage mode of operation |
| INC | 1142bit1 | Indicates that the increment push button has been depressed |
| DEC | 1142bit0 | indicates that the decrement push button has been depressed |
| MODEREG | 1143 | Indicates the operational mode of the system |
| PBTN | 1144 | Push Button Register with bits indicative of the state of push buttons 520 |
| OLDPBTN | 1146 | Push Button Memory; indicia of the prior states of the respective push buttons |
| PBTNCT | 1148 | Push Button Count Register: a count indicative of the sampling cycle of push buttons |
| TPW | 1150 | Throttle Pulse Width; a count indicative of the desired width of the throttle pulse |
| TPWCNT | 1151 | Count controlling throttle state |
| Vtarget | 1152 | Indicia of the desired rail output voltage |
| Itarget | 1154 | Current target; indicia of the desired current level |
| PHZPTR | 1156 | Phase offset; phase factor subtracted from the zero crossing to establish the firing angles of the SCR's in regulators 502 and control the rail voltage |

TABLE 1-continued

Figure 16B:
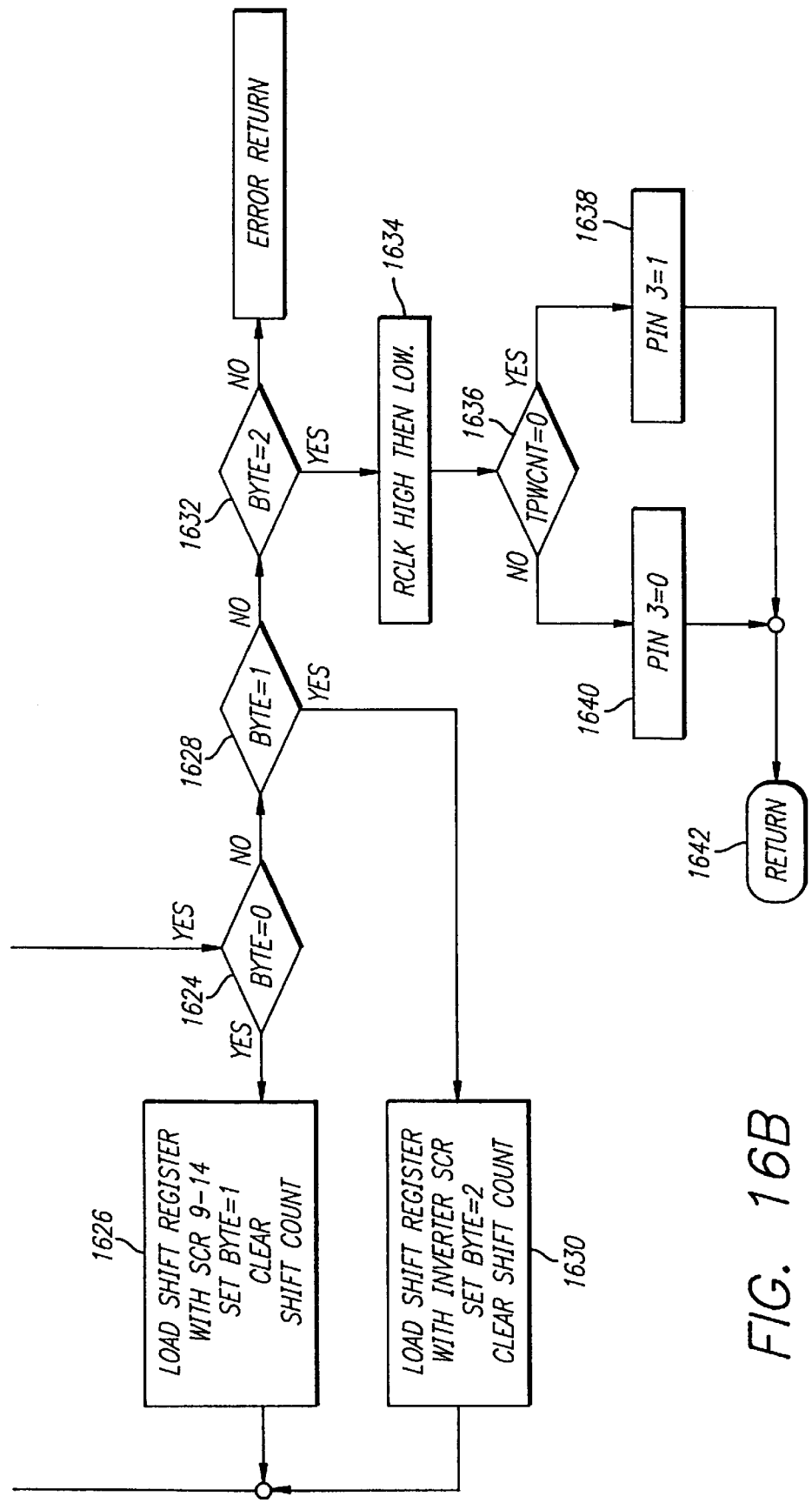

| VARIABLE | REGISTER | CONTENT |
|---|---|---|
| CPHZFTR | 1157 | Phase offset; phase factor subtracted from the zero crossing to establish the firing angles of the SCR's in single phase regulator 506 and control the supply voltages |
| OUTPUT SHIFTREG | 1158 | Register that generates serial output on pin 13 of microcomputer chip 902 |
| SHIFTCNT | 1160 | A count indicative of the shifting position of SHIFTREG 1158 |
| AC CNT | 1162 | Count representative of the cycle (instantaneous phase) of AC output signal 532 of inverter 530 |
| T1 | 1164 | A count indicative of the trailing edge (T1 on Figure 16) of the foundation switching pulses |
| T2 | 1166 | A count indicative of a half cycle of the output frequency of inverter 530 |
| T3 | 1168 | A count indicative of the leading edge of the HIV step |
| T4 | 1170 | A count indicative of the trailing edge of the HIV step |

In the preferred embodiment, microcomputer 902 is interrupt driven; various interrupt signals are generated in response predetermined conditions to effect predetermined functions example, the interrupts set forth in the following Table 2 are generated in the preferred embodiment:

TABLE 2

| INTERRUPT | TRIGGER | EFFECT |
|---|---|---|
| IRQ0 | Reference ramp voltage at pin 10 exceeds sensor voltage applied at microcomputer pin 8 (comparator 1) | Update measurement of sensor output voltage provided by first set of analog switches 518 to pin 8 (Rvolt or Cvolt). |
| IRQ2 | Reference ramp voltage at pin 10 exceeds sensor voltage applied at microcomputer pin 9 (comparator 2) | Update measurement of sensor output voltage provided by second set of analog switches 518 to pin 9 (ISEN or Tvolt). |
| IRQ4 | Timer 0 time out (e.g., every 130 μsec) | Selectively generate SCR control signals; update firing angles for SCR's, updated inverter switching control signals |
| IRQ5 | Timer 1 time out (e.g., every 8.2 msec) | If in current mode: adjust firing angle of SCR's to vary voltage to maintain constant current value. If in voltage mode: vary number of winding groups 400 in operative circuit to vary current to maintain a constant voltage value. Update user input; throttle control. |

In addition to various routines initiated in response to the various interrupts, various subroutines may be employed. Use of subroutines is particularly advantageous in instances where hardware registers are employed, to facilitate page changing. Exemplary subroutines are described in Table 3.

TABLE 3

| NAME | DENOMINATION | FUNCTION |
| --- | --- | --- |
| Inverter Update | 2340 | Update status of inverter switching control signals LHRL, RHLL, HIV |
| ZEROX | 2400 | Zero (0) Crossing Detector: Detects zero crossings, determines RPM, and sets the phase angle employed to set firing angle. |
| Throttle | 2900 | Sets the throttle pulse width in accordance with RPM and rail voltage. |
| Push Button | 2800 | Updates the status readings on the push button input switches 520 to determine modes and set parameters for voltage and current |
| Power Out | 2700 | Updates the phase factor (firing angle) in accordance with the rail voltage when in voltage mode, and updates the SCR enable word in accordance with current output when in the current mode |
| Serial Output | 2500 | Generates a serial output in accordance with data contents of the SCR control registers. |

Microcomputer 902 suitably operates in a continuous primary loop (simple race track) program for implementing the generation of the ramp reference voltage. Other functions are driven by the interrupts set forth in Table 2.

Figure 12:
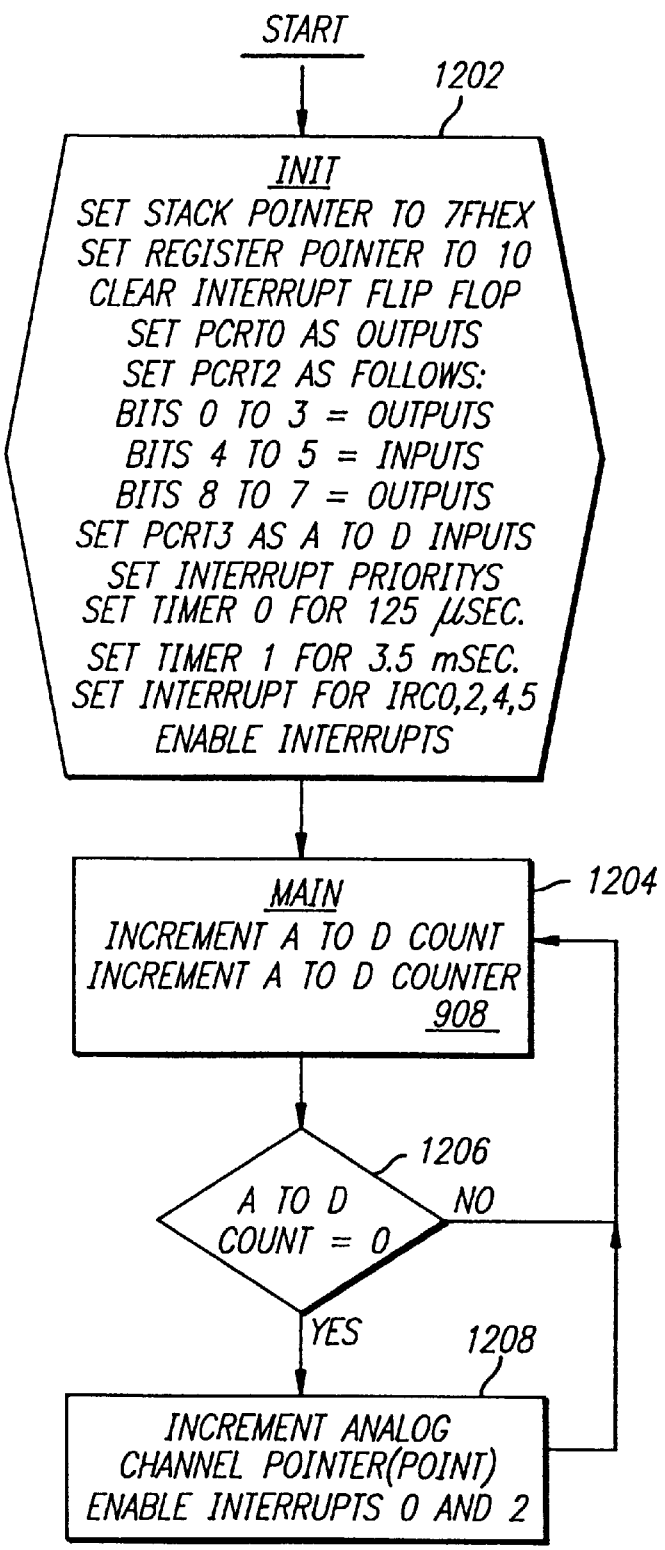
FIG. 12 is a functional flow chart of a MAIN routine effected by the microcomputer of FIG. 9.

Referring now to FIG. 12 when power is first supplied to microcomputer 902, the various timers, registers, ports, and designated variables (e.g., throttle pulse width, throttle pulse width minimum and maximum values, first cycle flag, inverter switching times T1, T2, T3, T4) are initialized (Step 1202). After initialization, microcomputer 902 effects a continuous primary loop to generate the ramp reference voltage used to develop indicia of the sensed external parameters (e.g., rail voltage, output current, etc.), and increment POINT in register 1120 to cycle through the various sensed parameters (through the addresses of analog MUX's 516, 518), applying each to microcomputer 902 in successive cycles.

As previously noted, the ramp difference voltage is generated by developing a count in counter 908, and applying that count to resistive ladder 912. A controlled ramp voltage ranging from zero to 5 volts is thus generated and applied at pin 10 of microprocessor 902. A commensurate analog to digital conversion count A to D is maintained in register 1102. More specifically, the A to D count in register 1102, is incremented, and a clock signal to counter 908 generated at pin 4 of microcomputer 902 (Step 1204). The A to D count suitably runs from zero to 256, then rolls over to zero. (Counter 908 similarly rolls over.) Each time the A to D count is incremented, the count is tested to determine if a roll over has occurred (Step 1206). Assuming a roll over has not occurred, the A to D count is again incremented and another clock signal generated to counter 908 (Step 1204). When a roll over occurs (indicating a new sensing cycle) the contents of the interrupt mask (IMR) in register 1026 (FIG. 10) are modified to re-enable interrupts IRQ0 and IRQ2 (the sensor comparison interrupts) (Step 1208). As will be explained, the sensor voltage interrupts are permitted to occur only once per ramp cycle to avoid spurious readings.

As previously noted, a pointer to the analog switches to be actuated is maintained as universal variable POINT in register 1120. A single pointer is used to, in effect, provide for relative addressing within each group of switches (MUX); the contents of the point register are used to derive the bit pattern provided to register 906 and presented as control signals (ANALOG1–ANALOG4; FIG. 9) to switch sets 516 and 518. The respective sensors in a group are coupled to microcomputer 902 in sequence. Accordingly, analog channel pointer POINT is incremented (Step 1208).

As previously noted, a measurement of the parameters selected from the first group of parameters, (e.g., rail voltage Rvolt, control coil voltage Cvolt, or AC output voltage Vac) is effected in response to each IRQ0 interrupt. Similarly, a measurement of a selected parameter from the second group (e.g., DC output current ISEN, temperature Tvolt or AC current Iac) is effected in response to the IRQ2 interrupt. The IRQ0 interrupt is generated when the reference ramp at pin 10 of microcomputer 902 initially exceeds the indicia of the selected first group parameter at pin 8 during the reference ramp cycle. Similarly, the IRQ2 interrupt is generated when the reference ramp initially exceeds the indicia of the selected second group parameter at pin 9. Since the interrupt is generated when the ramp voltage initially exceeds the selected sensed voltage, the A to D count in register 1102 is indicative of the sampled value of the sensed parameter. However, to avoid the effects of spurious readings, various of the parameters (e.g., Rvolt, Cvolt, Vac) are suitably averaged over a predetermined number of samples, e.g., eight (8). Suitable sensor comparison interrupt (IRQ0 and IRQ2) routines are described in copending application Ser. No. 08/370,577 now U.S. Pat. No. 5,625,276. As previously noted, the control signals to the respective SCR's of regulators 502 and 506 (and switching control signals for inverter 530) are generated as a serial data stream, captured by the appropriate serial input parallel output register 904 and 905 (and 907) which provide the control signals to the SCR's (and inverter 530). The states of the SCR's are controlled in accordance with the instantaneous phase of the cycle (rotor rotation), and, depending upon whether the system is in current mode and/or voltage mode operation, deviations of the system output signal current and/or voltage from respective target values (Itarget in register 1154 and Vtarget in register 1152). In current mode operation SCR's corresponding to respective coils are activated or de-activated to provide a desired level of current. In voltage mode operation the firing angles of the SCR's are varied to control voltage output.

Switching control signals for inverter 530 (e.g., LHRL, RHLL, HIV) and enable signals for the respective inverter winding groups 400A, 400B are likewise generated as a serial data stream, captured by the appropriate serial input parallel output register 907 which provides the control signals to inverter 530. The states of the switching control signals are controlled in accordance with count AC CNT representing the instantaneous phase of the AC cycle. The control signals are suitably turned on and off at predetermined points in the cycle, represented by counts T1, T2, T3, and T4, as will be more fully described.

The desired status of the SCR's, reflected in the SCR control word registers 1116 and 1118 (and desired status of the inverter switching control signals, reflected in the lower nibble of register 1125) are updated and output signals to the SCR's refreshed on a periodic basis, suitably at 130 microsecond intervals in response to the timer zero interrupt.

Figure 13:
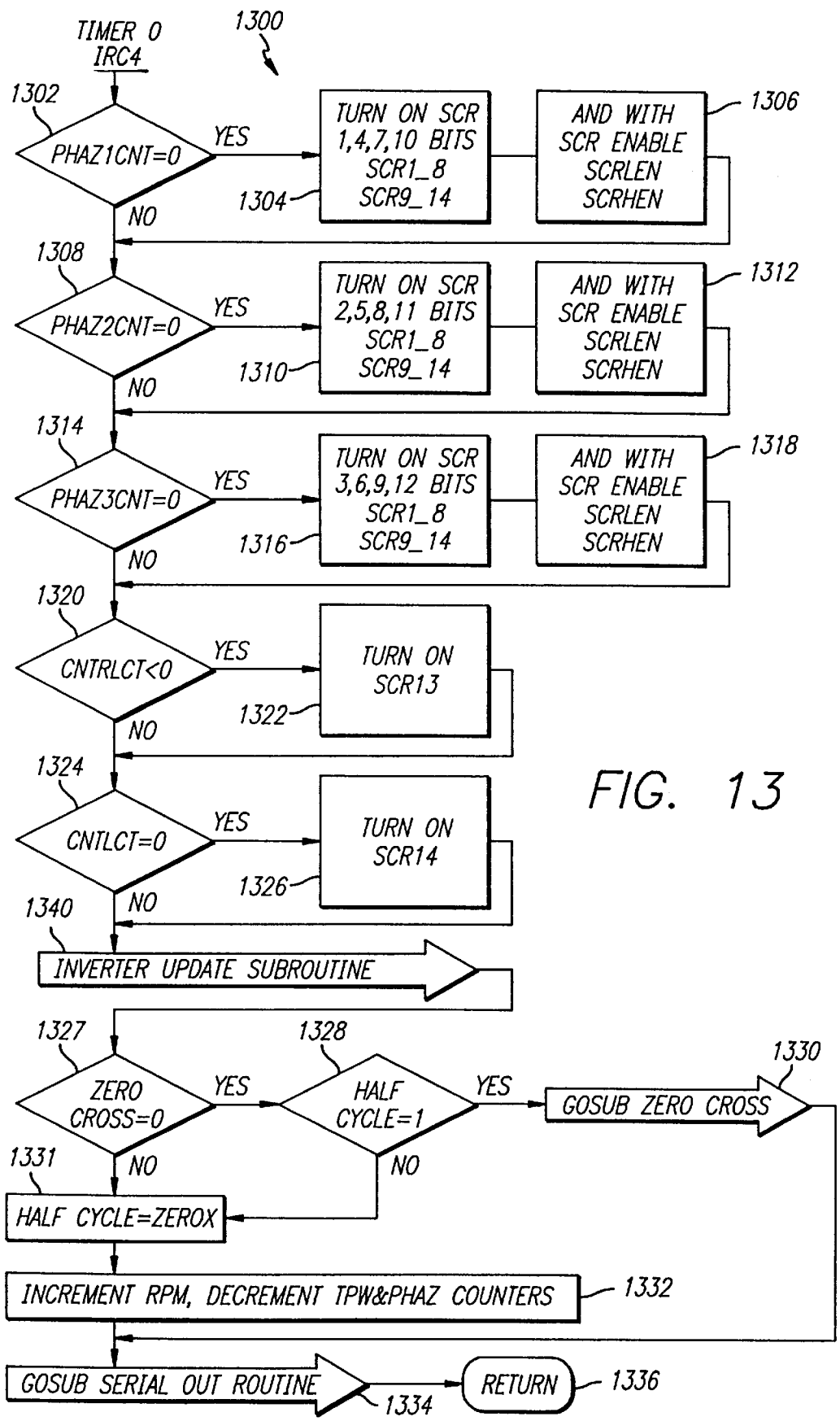
FIG. 13 is a functional flow chart of a TIMER0 routine effected by the microcomputer of FIG. 9.

Referring to FIG. 13, timer zero interrupt routine 1300 is effected in response to the timing out of timer zero on a periodic basis, e.g., every 130 microseconds. As previously noted, a count RPM indicative of the rotor cycle phase is maintained in register 1112, and counts indicative of the relative points in the cycle when the respective phases of the stator windings should be rendered conductive are maintained in registers 1130, 1132, and 1134. The firing phase counts in registers 1130, 1132, and 1134 are each checked in turn (Steps 1302, 1308 and 1314) to determine if the firing angle for the phase has been reached, i.e., the count has reached zero. If the firing angle for the phase has been reached, the bits of SCR control registers 1122 and 1124 corresponding to the SCR's associated with the particular phase (e.g., phase one SCR's 1, 4, 7, and 10; phase two SCR's 2, 5, 8, and 11; phase three SCR's 3, 6, 9, and 12) are turned on (Steps 1304, 1310 and 1316). The updated contents of SCR control registers 1122 and 1124 are then masked with (i.e., a logical AND function is performed with) the corresponding bits of the SCR enable registers 1126 and 1128, and the result written back into SCR control registers 1122 and 1124 (Steps 1306, 1312 and 1318). The result is that only the bits in SCR control registers 1122 and 1124 that correspond to SCR's for which the firing angle has been reached, and are associated with windings that are intended to be in the operative system are at logic one.

After the status of control registers 1122 and 1124 update has been completed for all three phases, the status of the bits corresponding to the SCR's associated with control winding 504, e.g., SCR's 13 and 14 are updated. More specifically, the control of control count register 1136 is checked to determine if it is negative, indicative of the negative half of the cycle (Step 1302). If the control count is negative, the bit of SCR control register 1124 corresponding to SCR 13 is turned on and the bit in SCR control register 1124 corresponding to SCR 14 is turned off (Step 1322). If the control count in register 1136 is not negative, the control count is checked to determine if it is equal to zero (Step 1324) and if so, the bit in SCR control register 1124 corresponding to SCR 14 is set and the bit corresponding to SCR 14 is turned off (Step 1326).

After SCR control register 1124 has been updated with respect to the desired status of SCR's 13 and 14, SCR control registers 1122 and 1124 contain a bit pattern corresponding to the desired states of the various SCR's in regulators 502 and 506.

Figure 14:
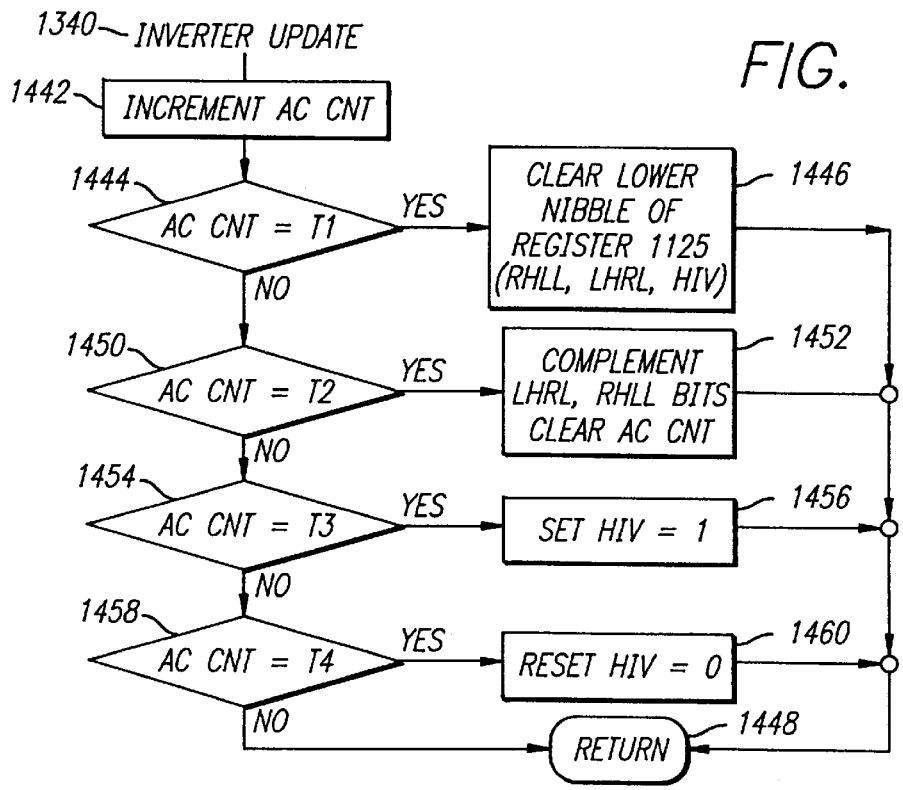
FIG. 14 is a functional flow chart of an INVERTER UPDATE routine effected by the microcomputer of FIG. 9.

Inverter update subroutine 1340 is then effected to update the contents of inverter control register 1125. Referring briefly to FIGS. 14 and 8, AC cycle count AC CNT in register 1162 is incremented (Step 1442), then tested against respective counts corresponding to T1, T2, T3 and T4 in FIG. 8, and the bits in register 1125 corresponding to switching signals LHRL, RHLL, and HIV set accordingly. If AC CNT equals T1 (corresponding to the trailing edge of the base pulse) (Step 1444), the lower nibble of register 1125 is cleared (LHRL, RHLL, and HIV all turned off) (Step 1446), and a return effected (Step 1448). If AC CNT equals T2 (corresponding to a half cycle point) (Step 1450), the bits corresponding to switching control signals LHRL and RHLL are complemented, and the AC CNT count cleared (Step 1452), then a return effected (Step 1448). If AC CNT equals T3 (corresponding to the leading edge of the boost pulse) (Step 1454), the bit in register 1121 (Step 1456) and a return effected (Step 1448). If AC CNT is equal to T4 (corresponds to the trailing edge of the boost pulse) (Step 1458), the bit corresponding to HIV is reset to 0 (Step 1460) and a return effected (Step 1448). If AC CNT is not equal to any of counts T1, T2, T3, or T4, a return is effected (Step 1448) without changing the state of any of the switching control signals.

The respective phase counts are then updated, as appropriate. As previously noted, the ZEROX signal, provided by zero crossing detector 512 to pin 2 of microcomputer chip 902, changes logic level in accordance with the polarity of the signal generated by control winding 504. Since control winding 504 is physically wound with one of the phases (e.g., phase 3) of a winding group 400, winding the respective corresponding phase windings of each group are in phase with each other). The indicia of zero crossings (transitions in the state of ZEROX) generated by zero crossing detector 512 can thus be utilized to derive the relative phases of the respective windings of groups 400 as well as control winding 504. Accordingly, referring again to FIG. 13, the state of the ZEROX input at pin 2 of microcomputer chip 902 is sampled, to determine if a zero crossing has occurred (Step 1327) to initiate the resetting and updating of the phase counts, as appropriate.

However, the phase counts are preferably reinitialized only once, at the beginning of the cycle. Accordingly, the system must discriminate between zero crossings occurring at 100 degrees and zero crossings occurring at 360 degrees (flag register 1142 bit 5) is employed to this end. When a zero crossing is detected, the ½ cycle flag is tested (Step 1323), to determine if the zero crossing is e.g., negative going. When ZEROX is logic low and the ½ cycle flag is a logical one, a negative going zero crossing (360 degrees) is indicated. If a negative zero crossing has occurred, zero crossing subroutine 1500 is effected (Step 1330) to reinitialize and update the firing angle counts for each of the respective phases contained in registers 1130–1136, and the firing angle count for control winding 504 contained in register 1136 and initialize the RPM count in register 1112. Zero crossing subroutine 1500 will be more fully explained in conjunction with FIG. 15. If no zero crossing is detected, or if the ½ cycle bit indicates the wrong variety of zero crossing, the ZEROX value is loaded into the ½ cycle flag (Step 1331). The RPM count in register 1112 and is incremented and the firing phase counts in registers 1130–1136 and throttle control count in register 1151 decremented (Step 1332) to reflect the advance in rotor cycle phase.

Serial output routine 1600 is then called to output the updated contents of the SCR control registers 1122 and 1124 to serial input parallel output registers 904 and 905 (Step 1334). A return is then effected (Step 1336).

Figure 15:
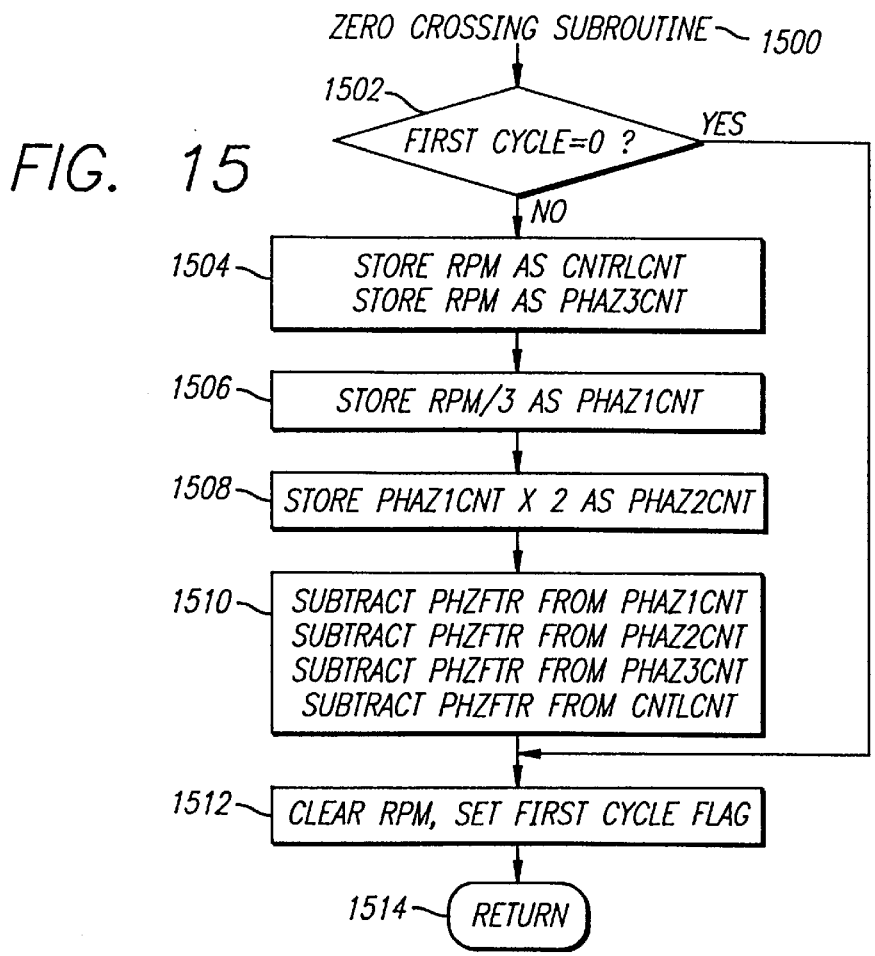
FIG. 15 is a functional flow chart of a zero crossing subroutine effected by the microcomputer of FIG. 9.

As previously noted, zero crossing subroutine 1500 is effected (Step 1330) to reinitialize and update the firing angle counts for each of the respective windings contained in registers 1130–1136, at the end of each cycle and reset the RPM count in register 1112. Referring now to FIG. 15, when zero crossing subroutine 1500 is initially called, a check is made to ensure that the RPM count started at the beginning of a cycle and thus accurately represents rotor cycle phase. Specifically, the first cycle flag (register 1142 bit 6) is checked (Step 1502). The first cycle flag was initialized to zero during start-up (Step 1202) and is set to one only after the zero crossing routine has been initiated. Accordingly, if the first cycle flag is not zero, the system has completed at least one complete cycle, and the RPM count in register 1112 represents the period of the rotor cycle.

Assuming the first cycle flag is not zero, the respective firing phase counts in registers 1130–1136 are then recalculated in accordance with the updated RPM (cycle) data. Suitably, the RPM count is loaded into register 1134 as the phase 3 count (indicative of 360 degrees), and also into register 1136 as CNTRLCNT (Step 1504). The phase 3 count is then divided by 3 and the result stored as the phase 1 count (indicative of 120 degrees) (Step 1506). The contents of phase 1 count in register 1130 are then multiplied by two and the result (indicative of 240 degrees) stored as the phase two count in register 1132 (Step 1508). Thus, respective counts reflecting the expected zero crossings in each of the winding phases and control winding 504 are established in phase counters 1130–1136.

The respective counts are then adjusted to reflect the desired firing angle (Step 1510). More specifically, the phase factor PHZFTR, representing the offset from zero crossing necessary to achieve the desired phase winding firing angle, is contained in register 1156, and is subtracted from each of the firing phase counts in registers 1130–1136. Similarly, the phase factor CPHZFTR, representing the offset from zero crossing necessary to achieve the desired control firing angle, is contained in register 1157, and is subtracted from each of the firing phase count in register 1136.

After the updated firing angles have been established in registers 1130–1136, the RPM count in register 1112 is cleared in preparation for tracking rotor phase and through the next cycle, and the first cycle flag set (Step 1512), and a return effected (Step 1514).

If, when the zero crossing subroutine is initially called, the first cycle flag is zero (Step 1502), indicative of an initial, possibly incomplete, cycle, the RPM and phase count updating (Steps 1504–1510) are by-passed; the RPM count in register 1112 is cleared, and the first cycle flag set (Step 1512) in preparation for tracking rotor phase through the next cycle, and a return effected (Step 1514).

As previously discussed, microcomputer 902 cooperates with serial-input-parallel-output registers 904–907 to generate control signals to the SCR's of regulators 502 and 506, analog switches 516 and 518 and push button input switches 520 (and an inverter circuit, if employed). A desired bit pattern is serially provided on one of the output pins (e.g., pin 13) of microcomputer 902 and applied at the data inputs of all of the output registers. Serial data clock signals (SCLK) synchronous with the serial data are provided only at the output pin (e.g., one of pins 15–17) corresponding (coupled) to the particular register 904–907 corresponding to the destination device. Thus, the data is loaded into only the appropriate register. A subsequent control signal (RCLK) is provided at pin 12 of microcomputer 902 and applied concurrently to each of registers 904–907 to load the accumulated pattern into an output latch, and hence, apply the bit pattern as control signals to the designated recipient devices.

Serial output routine 1600 is employed to transfer the updated contents of SCR control registers 1122 and 1124 to serial-input-parallel-output registers 904 and 905 on a periodic basis (Step 1334), here, every 130 microseconds in response to the TIMER 0 interrupt. More specifically, referring to FIGS. 16A and 16B, output shift register 1158 is initially loaded with the contents of SCR control register 1122, corresponding to the desired states of SCR's 1–8 and the byte (register 1142 bit 7) is set to 0, indicating operation upon the first byte of the control word (Step 1602).

The carry flag of processor 902, typically maintained in a fixed function flags register 1036 (FIG. 10), provides indicia of whether shifting the contents of output register 1158 causes a one to carry, i.e., the bit shifted out of the least significant bit of the register is a one. The carry flag is initially cleared (Step 1604). The contents of output shift register 1158 are then shifted right, causing the least significant bit of output shift register 1158 to be reflected in the state of the carry flag (Step 1606).

A count indicative of the number of bits are shifted out of the output shift register is maintained in shift count register 1160. After the shift right operation is effected, shift count register 1160 is incremented (Step 1608).

The carry flag is then tested to determine its state (Step 1610) and the value of the SER output at pin 13 set accordingly. If the carry flag is one, the SER signal at pin 13 is set high (Step 1612). If the carry bit is zero, SER is set to a low value (Step 1614).

After the appropriate value of the serial data is established at pin 13, the Sclock signal to the appropriate one of registers 904, 905 or 907 is generated. More specifically, BYTE (register 1142 bits 6, 7) is checked (Steps 1616A, 1616B, 1616C). If the byte is zero, indicating SCR control register 1122 (corresponding to SCR's 1–8), the output pin, e.g., pin 15, corresponding to the Sclock input of corresponding register 904, is pulsed high, then low, to cause the data bit to be shifted into register 904 (Step 1618). Similarly, if BYTE is one, indicating SCR control register 1124 corresponding to SCR's 9–14, then the pin, e.g., pin 16 of microcomputer 902, corresponding to the Sclock input of register 905 is pulsed (Step 1620). Likewise, if BYTE is two, indicating the inverter control register 1125, then the pin, e.g., pin 18 of microcomputer 902 corresponding to the Sclock input of register 907 is pulsed (Step 1621).

The process is repeated for each bit in output shift register 1158. More specifically, the shift count in register 1160 is incremented each time a bit is output. The shift count is checked after each clock output to determine if all the bits have been output (Step 1622). If all of the bits have not been output, the shifting processing (Steps 1606–1622) is repeated.

Once all of the bits in the output register have been output, a determination is then made as to whether both SCR control registers 1122 and 1124 and inverter control register 1125 have been output. More specifically, BYTE in register 1142 is checked to determine if it is equal to 0, i.e., if register 1122 associated with SCR's 1–8 was just output (step 1624). If so, output shift register 1158 is loaded with the contents of SCR control register 1124, indicative of the desired states of SCR's 9–14, BYTE is set to 1, the shift count in register 1160 cleared (Step 1626) and the output process (Steps 1604–1626) are then repeated. If BYTE does not equal 0, it is checked to determine if it is equal to 1, i.e., if register 1124 associated with SCR's 9–14 was just output (Step 1628). If so, output shift register 1158 is loaded with the contents of inverter control register 1125, indicative of the desired states of switching signals LHRL, RHLL, and HIV, and group enable signals SCR15–SCR18, BYTE is set to 2, the shift count in register 1160 cleared (Step 1630) and the output process (Steps 1604–1626) again repeated.

If BYTE does not equal one, it is checked to determine if it is equal to two, i.e., both SCR control registers and the inverter control register have been output (Step 1632). If so, a capture signal (RCLK) is generated at pin 12 of microcomputer 902 to transfer the accumulated data bytes in the serial input registers to the output latches of registers 904 and 905 (Step 1634).

To facilitate fuel economy and noise abatement and accommodate widely and rapidly varying loads, automated throttle control is suitably effected. This is achieved by utilizing an electromagnetic governor cooperating with throttle 34 of engine 14 and driver circuit 914 (FIG. 9). In one embodiment rotor RPM is maintained at the lowest value necessary to provide the desired rail voltage to the load. In another embodiment, the throttle is employed as a mechanism for controlling output voltage, and to avoid over-current conditions, as will be explained. Embodiments of suitable throttle control mechanisms will be described in conjunction with Figures: 20A and 20B; 33A, 33B, 34–38; and 59.

In general, in a first embodiment, a pulse width modulated signal is provided at e.g., pin 3 of microcomputer 902 (e.g., port p2, bit 6) to driver 914. Referring briefly to FIG. 9, when the signal at pin 3 is high, transistor Q11 in driver 914 is rendered conductive, actuating the electromagnetic governor. The signal at pin 3 of microcomputer 902 reflects the state of the throttle control count TPWCNT in register 1151. TPWCNT in register 1151 is counted down from the desired throttle pulse width TPW in register 1150 to zero, i.e., register 1151 is periodically loaded with TPW from register 1150 (e.g., in connection with throttle control subroutine 1900 called in timer 1 interrupt routine 1700), and, as previously noted, decremented during timer 0 interrupt routine (FIG. 13, Step 1332).

Accordingly, after inverter control register 1125 has been output, the throttle control signal is refreshed. The throttle control count is checked to see if it has counted down to zero (Step 1636). If TPWCNT is not zero, a high signal is provided at pin 3 of microcomputer 902 (e.g., port p2, bit 6) (Step 1638). Conversely, if TPWCNT is zero, a low signal is provided at pin 3 of microcomputer 902 (Step 1640). It will remain zero until TPW is again loaded into register 1151 by throttle control subroutine 1900 during the next successive execution of timer 1 interrupt routine 1700. After the throttle control signal has been refreshed, a return is then effected (Step 1642)

Updating of the phase factor, operating parameters (user input information), and throttle setting are also made on a periodic basis. Timer 1 interrupt routine 1700 is initiated upon time out of timer 1006, e.g., every 8.2 milliseconds. Power out subroutine 1800 is called (Step 1702) to make the appropriate adjustments in: the number of winding groups 400 in the operative circuit in accordance with the deviation of the output current from a desired target value; the firing angle of SCR's regulators 502 in accordance with the deviation of rail voltage Rvolt from a desired target value; the firing angle of SCR's in regulators 504 in accordance with the deviation of control coil voltage Cvolt from a desired target value; and/or the number of winding groups 400A, 400B in the operative circuit in accordance with the deviation of the AC output current Iac from a desired target value. Power out subroutine 1800, will be more fully described in conjunction with FIGS. 18A and 18B.

Figure 17A:
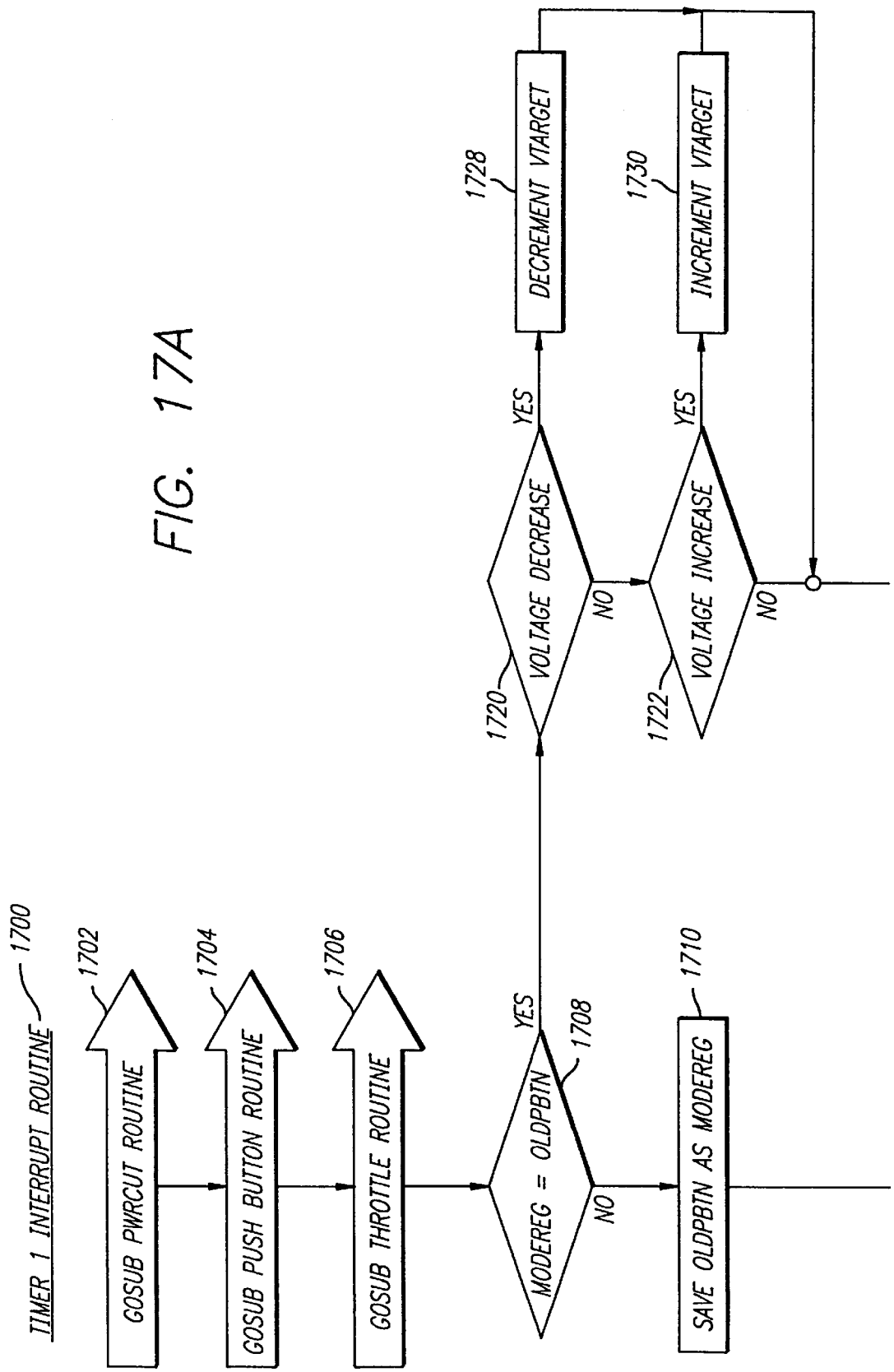
FIGS. 17A and 17B (collectively referred to as FIG. 17) is a functional flow chart of a TIMER 1 routine effected by the microcomputer of FIG. 9.
Figure 17B:
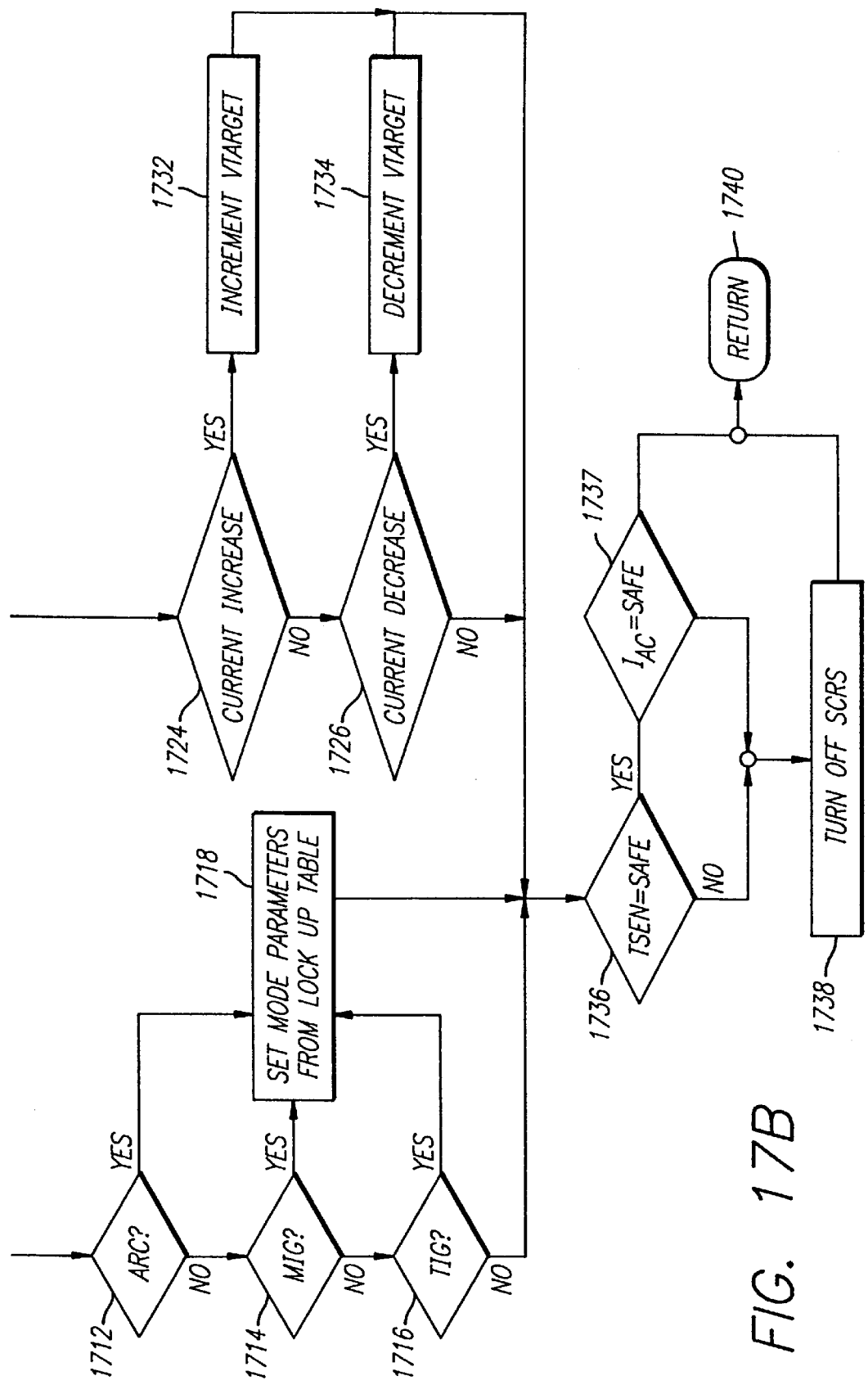

Operating parameters are then updated in accordance with any changes in user input information; push button subroutine is called (Step 1704) to capture user input through push button input switches 520, determine and store indicia of the desired mode of operation (Op 0,1, in flag register 1142), and set target values for voltage (Vtarget, register 1152) and current (Itarget, register 1154). For example, in the context of a multi-mode welder, push button switches 520 suitably include: a welding-mode button, which would be depressed to sequence through the different types of welding operations; and increment and decrement buttons which are depressed to decrement the voltage or current target value, depending upon the chosen operational mode. A suitable push-button sub-routine is described more fully in copending application Ser. No. 08/370,577. Briefly, as previously noted, microcomputer 900 includes: a push button (PBTN) register 1144 with a bit corresponding to each push button switch 520; an old push button (OLDPBTN) register 1146, likewise including a bit corresponding to each switch 520; and push button counter (PBTNCT) 1148. OLDPBTN register 1146 maintains indicia of the state of the respective push buttons prior to the read cycle. Push button counter (PBTNCT) 1148 maintains a count indicative of the sampling cycle of the push buttons. Push buttons 520 are each connected to a respective output pin (PB01–PB04) of register 906 (FIG. 9) and connected in common to a push button input line (PBTNIN) to an input, here pin 1, of microcomputer 902 (FIG. 9). Serial data and synchronous clock signals are generated by microcomputer 902 to generate a bit pattern in register 906 that provides a logic high signal to a single designated switch 520, and logic low to the others. If the particular switch receptive of the logic high bit is depressed, a high level PBTNIN input signal will be communicated to pin 1 of microcomputer 902. If the switch is not closed, the PBTNIN signal will be logic low. The state of the bit in PBTN register 1144 corresponding to the designated switch is set accordingly. The serial data applied to register 906 is then varied to designate the next input switch, so that each switch is provided the logic high in sequence. This process is effected through a suitable push-button sub-routine, on a periodic basis, e.g., every 8.2 milliseconds in response to the timer 1 interrupt (Step 1704, FIGS. 17A and 17B). The period between read cycles is preferably chosen to be short enough, relative to the typical operator response times, to ensure that any depression of the push buttons is detected, but not so short as to be susceptible to bounce.

Throttle subroutine 1900 is then called to adjust the throttle pulse width in accordance with rotor RPM and rail voltage. Throttle subroutine 1900 will hereinafter be more fully described in conjunction with FIG. 19.

Various parameters are then set to predetermined values in accordance with the designated mode of operation. For example, a multi-mode welder could operate in one of three different modes: ARC (stick); metal inert gas (MIG) (wire feed) and tungsten inert gas (TIG). Arc welding requires an inverse slope of current to voltage, whereas, MIG welding requires constant voltage and a variable current, and TIG welding requires variable current and variable voltage.

The desired mode of operation is input by the operator through push buttons 520 and, at this point, reflected in the I and V mode flags (FLAG1 register 1142 bits 0,1) and in bits 0 and 1 of OLDPBTN register 1146. For example, ARC, TIG, and MIG operation are suitably designated by current and voltage flag (I, V) settings of 11, 01, and 10, respectively. The mode prior to the last read cycle is reflected as MODEREG in register 1143.

Accordingly, bits 0 and 1 of OLDPBNT are tested against bits 0 and 1 of MODEREG to determine if there was a change in the desired mode (Step 1708). If a change in mode is detected, OLDPBNT in register 1146 is loaded into register 1143 as MODEREG (Step 1710), then checked against the values corresponding to ARC, (e.g., 1,1), TIG (e.g., 0,1) and MIG (e.g., 1,0) (Steps 1712, 1714, and 1716), and the Itarget and Vtarget values in registers 1152 and 1154 set to initial values accordingly, for example, as set forth in Table 4 (Step 1718).

TABLE 4

| WELDING MODE | I MODE | V MODE | Itarget (Amps) Initial | Itarget (Amps) Operating Range | Vtarget (Volts) Initial | Vtarget (Volts) Operating Range |
| --- | --- | --- | --- | --- | --- | --- |
| ARC (1,1) | 1 | 1 | 10 | 10–300 | 75 | 22–25 |
| TIG (0,1) | 0 | 1 | 10 | 10–300 | 30 | 15–30 |
| MIG (1,0) | 1 | 0 | 300 | | 25 | 22–25 |

The Vtarget and Itarget values in registers 1152 and 1154 are initially set to predetermined values e.g., those shown in Table 4, when a new mode of operation is entered. Thereafter, the target values are adjusted by depression of the increment and decrement buttons. In operation the Itarget and Vtarget values can be varied over substantial ranges, e.g., those shown in Table 4.

If no mode change has occurred, determinations are made as to whether adjustments to target voltage or current are indicated, i.e., an unserviced depression of the increment button, or decrement button has occurred (Steps 1720, 1722, 1724, 1726), and the Vtarget and/or Itarget values in registers 1152 and 1154 incremented or decremented accordingly by a predetermined unit amount, e.g., corresponding to ten amps or ten volts (Steps 1728, 1730, 1732, 1734). More specifically, the state of the voltage mode, decrement and increment flags are tested (Steps 1720, 1722), and Vtarget in register 1152 adjusted accordingly (Steps 1728, 1730). The state of the current mode, decrement and increment flags are then tested (Steps 1724, 1726), and Vtarget in register 1154 adjusted accordingly (Steps 1732, 1734).

If only one or the other of the voltage and current control modes is active, depression of the increment or decrement button will adjust the voltage or current target value, respectively. However, if both voltage and current control modes, are active, as in the ARC welding mode, depression of the increment or decrement button will adjust both the voltage or current target value.

It is possible that the mode button and one of the increment or decrement buttons will be depressed concurrently. When this occurs the mode change is serviced first, and the change in target parameter serviced in the next successive cycle. Since the period between cycles is extremely short (e.g., 8.2 milliseconds) compared to human reaction times, there is no substantial risk that the depression of the increment button, or decrement button would be missed.

Safety checks are then made to ensure that the device is not overheated or in an over current condition; the indicia of measured temperature is compared against indicia of a maximum permitted operating temperature (suitably a predetermined value incorporated into the program) (Step 1736) and the indicia of measured AC output current (Iac, register 1110) is compared against indicia of a maximum permitted AC current (Step 1737). If the temperature or AC current has exceeded the maximum values, SCR enable registers 1126 and 1128 are cleared, to effectively disable operation (1738) and a return is effected (Step 1740). As will hereinafter be more fully explained, when an impending over-current condition is sensed, the output voltage may be decreased to a predetermined value (zero in the example of FIGS. 17A and 17B), then gradually increased until the desired operating level is reached (or another over-current condition is sensed).

As previously noted, respective counts reflecting the expected zero crossings in each of the winding phases (and control winding 504), are established in the firing phase counters 1130–1136, and adjusted to reflect the desired firing angle (Step 1508), by subtracting the phase factor, representing the offset from zero crossing necessary to achieve the desired firing angle, contained in register 1156. The offset, PHAZFTR, in register 1156, is periodically recalculated, e.g., through powerout subroutine 1800, called every 8.2 milliseconds during Timer 1 interrupt routine 1700.

Figure 18A:
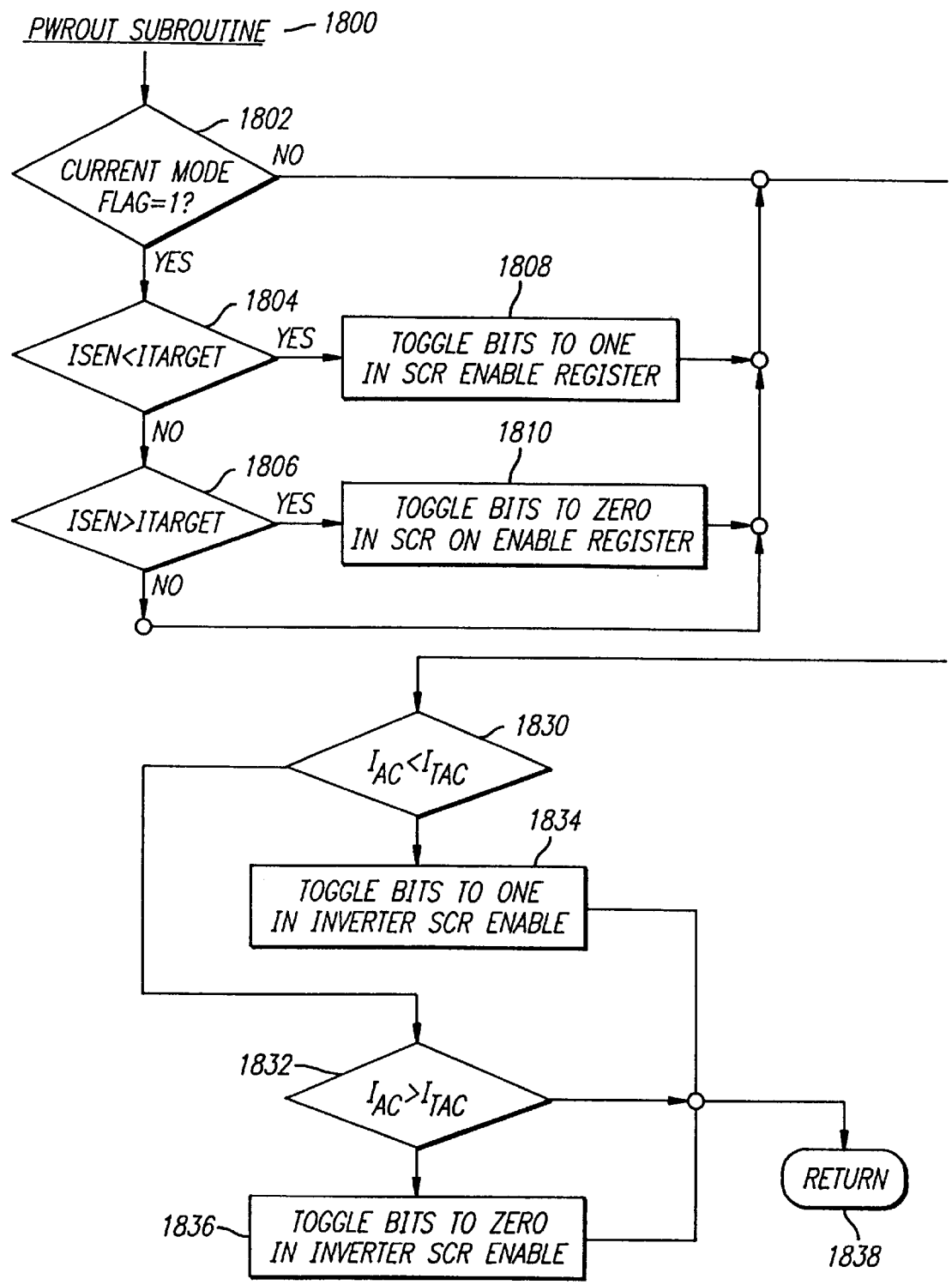
FIGS. 18A and 18B (collectively referred to as FIG. 18) is a functional flow chart of a power out subroutine routine effected by the microcomputer of FIG. 9.
Figure 18B:
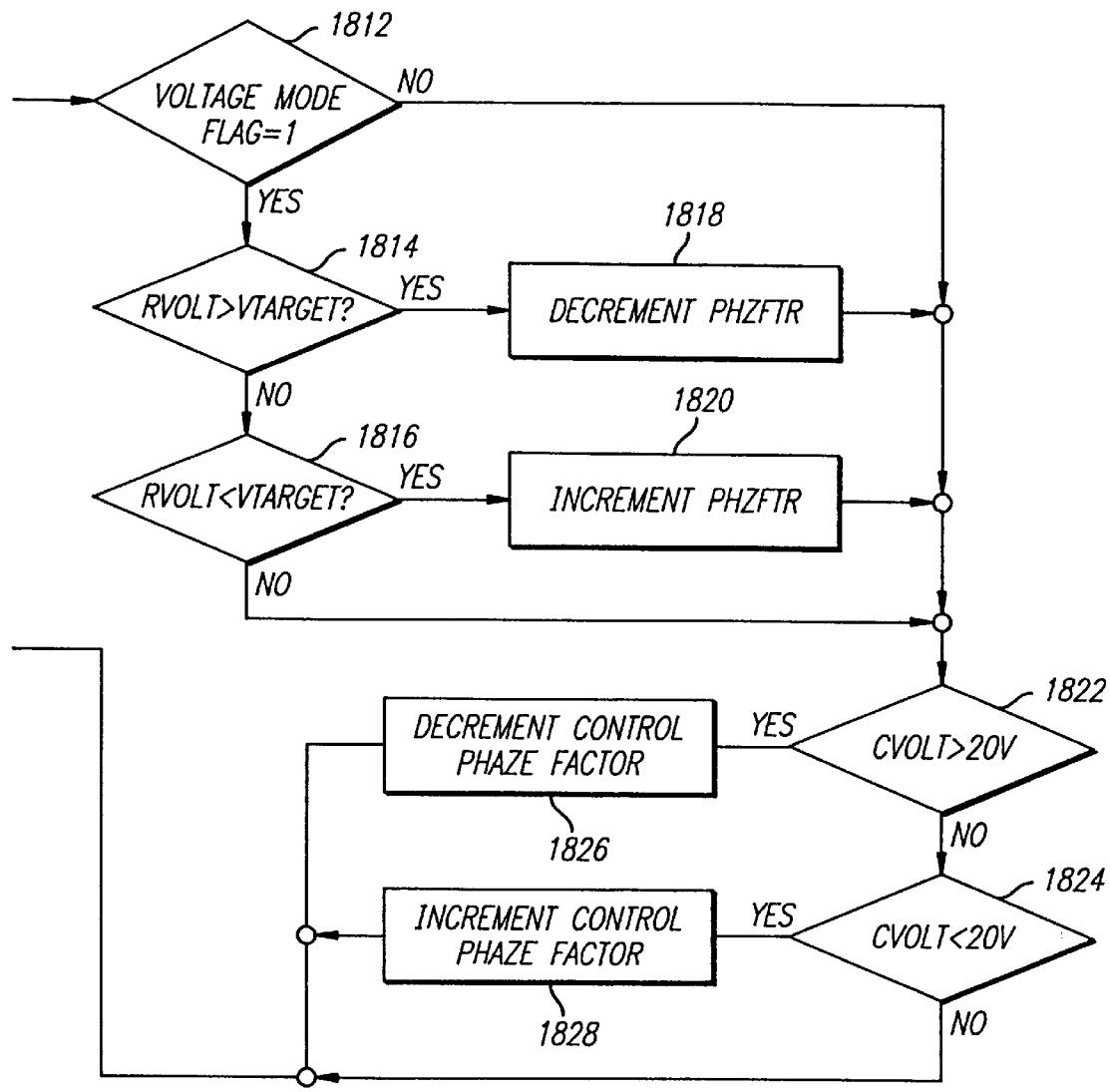

Referring briefly to FIGS. 18A and 18B, when power output routine 1800 is called (Step 1702, FIGS. 17A and 17B), the current mode flag (Imode) in flag one register 1142 is checked to determine the desired mode of operation of the device (Step 1802). For example, the system can operate in a current mode in which current is kept constant, and/or in a voltage mode in which input voltage is kept constant; e.g., in a welder, the current mode or voltage mode would be selected according to the particular type of welding operation desired.

As previously noted, if current mode is selected, the number of winding groups in the system is adjusted to maintain the desired current level. More specifically, the indicia of current level (ISEN) maintained in register 1108 is compared against the current target (Itarget) in register 1154 (Steps 1804 and 1806). The desired current value Itarget is established in accordance with user input through push buttons 520, as discussed in conjunction with FIGS. 17A and 17B. If the sensed current value is less than the target current, the number of winding groups 400 in the operative circuit is increased (Step 1808); a predetermined number of, e.g., at least one, additional bits in SCR enable registers 1126 and 1128 is toggled from zero to one, to enable generation of an output signal to those SCR's (see Steps 1306, 1312, and 1318, of timer zero interrupt routine 1300). Conversely, if the sensed current value ISEN is greater than desired value Itarget, the number of winding groups 400 in the operative circuit is decreased; the predetermined number of bits in SCR enable registers 1126 and 1128 are toggled from one to zero to disable output signals to the corresponding SCR's (Step 1810). The predetermined number of bits toggled is suitably one, two, three (all three phases of a winding group), or a multiple of three. If desired, the particular bits in SCR enable registers 1126 and 1128 toggled in steps 1808 and 1810 can be chosen in accordance with a predetermined algorithm to ensure that no particular winding group is used significantly more or less than the others, and to evenly distribute heat generated in the stator, and/or control noise. After the contents of SCR enable registers 1126 and 1128 are adjusted as appropriate, or if the sensed DC current value ISEN is equal to the desired value I Target, the firing angle PHZFTR in register 1156 is adjusted as appropriate.

A check (Step 1812) is made to determined whether voltage mode operation has been selected. If so, the firing angle of the respective phases is varied in accordance with the deviation of the voltage level from a predetermined desired value. More specifically, the measured rail voltage (Rvolt) in register 1104 is compared against a target voltage, Vtarget in register 1152 (Steps 1814, 1816) and the phase factor count in register 1156 adjusted accordingly. If it is determined that the measured value of rail voltage (Rvolt) is greater than the desired voltage level (Vtarget) (Step 1814), the count indicative of the firing angle in register 1156 is decremented by a predetermined unit amount (e.g., corresponding to 10 degrees) to decrease the firing angle (Step 1818). Conversely, if it is determined that the rail voltage (Rvolt) is less than the desired voltage the target (Step 1816) the phase factor count in register 1156 is incremented to increase the firing angle and thus increase voltage (Step 1820). If desired, the size of the adjustment increment can be varied with RPM over a range of e.g., 1 to 10 degrees.

After the phase factor for the SCR's of regulators 502 has been adjusted, or it is determined that the rail voltage is equal to the desired voltage and no adjustment to the firing angle is necessary, the firing angle CPHZFTR for single phase regulator 506 in register 1157 is adjusted in accordance with the deviation of the control voltage level from a predetermined desired value. More specifically, the measured control voltage (Cvolt) in register 1106 is compared against a predetermined target voltage, e.g., 12V (Steps 1822, 1824) and the phase factor count in register 1157 adjusted accordingly. If it is determined that the measured value of control voltage (Cvolt) is greater than the desired voltage level (e.g., 20V) (Step 1822), the count indicative of the firing angle in register 1157 is decremented by a predetermined unit amount (e.g., corresponding to 10 degrees) to decrease the firing angle (Step 1826). Conversely, if it is determined that the control voltage (Cvolt) is less than the desired voltage, e.g., 20V (Step 1824), the phase factor count in register 1157 is incremented to increase the firing angle and thus increase voltage (Step 1828). If desired, the size of the adjustment increment can be varied with RPM over a range of e.g., 1 to 10 degrees.

After the control winding phase factor has been adjusted, or it is determined that the rail voltage is equal to the desired voltage and no adjustment to the firing angle is necessary, the inverter system is adjusted to maintain a desired AC current level. More specifically, the indicia of AC current level (Iac) maintained in register 1110 is compared against a predetermined desired AC current value Itac (suitably a predetermined value incorporated into the program) (Steps 1830 and 1832). If the indicia current value is less than target current Itac, the number of winding groups 400A, 400B in the operative circuit is increased (Step 1834); a predetermined number of, e.g., at least one additional bit in upper nibble of register 1125 (preferably pairs of bits corresponding to a cooperating pair of windings 400A, 400B) is toggled from zero to one, to enable operation of regulator. Conversely, if the indicia current value Iac is greater than desired value Itac (Step 1832), the number of winding groups 400A, 400B in the operative circuit is decreased (Step 1836); the predetermined number of bits in inverter control register 1125 are toggled from one to zero to disable operation of regulator. The predetermined number of bits toggled is suitably one, two, three (all three phases of a winding group) or a multiple of three. If desired, the particular bits in inverter control register 1125 toggled in Steps 1834 and 1836 can be chosen in accordance with a predetermined algorithm to ensure that no particular winding group is used significantly more or less than the others, and to evenly distribute heat generated in the stator, and/or control noise. For example, by actuating opposing windings (i.e., windings that are approximately 180 degrees from each other on the physical stator), then quadrature (i.e., windings that are approximately 90 degrees from each other on the physical stator), in succession, both magnetic noise suppression and heat dissipation can be optimized. After the contents of inverter control register 1125 are adjusted as appropriate, or if the indicia current value Iac is equal to the desired value Itac, a return is effected (Step 1838).

As previously noted, to conserve energy and control noise, in the present embodiment, engine speed control is suitably effected in accordance with load; rotor RPM is suitably maintained at the lowest value necessary to provide the desired rail voltage to the load. Rotor RPM is controlled by varying the pulse width of the signal provided at pin 3 of microcomputer 902 to driver 914. That pulse width is established by the value of TPW in register 1150. Changes in load are reflected as a variation of the values of the DC rail voltage Rvolt and AC output voltage Vac from predetermined target values, e.g., Vtarget and Vtag. For example, if the load decreases, the output voltages tend to become less than the target values, and the RPM may be lowered, i.e., the pulse width of the signal provided to throttle driver 914 is decreased. Conversely, if the load increases the rail voltage tends to become less than the target value, the increased load requires that the RPM be increased, i.e., the pulse width of the signal provided to driver 914 is increased. This is effected through throttle control subroutine 1900.

Figure 19:
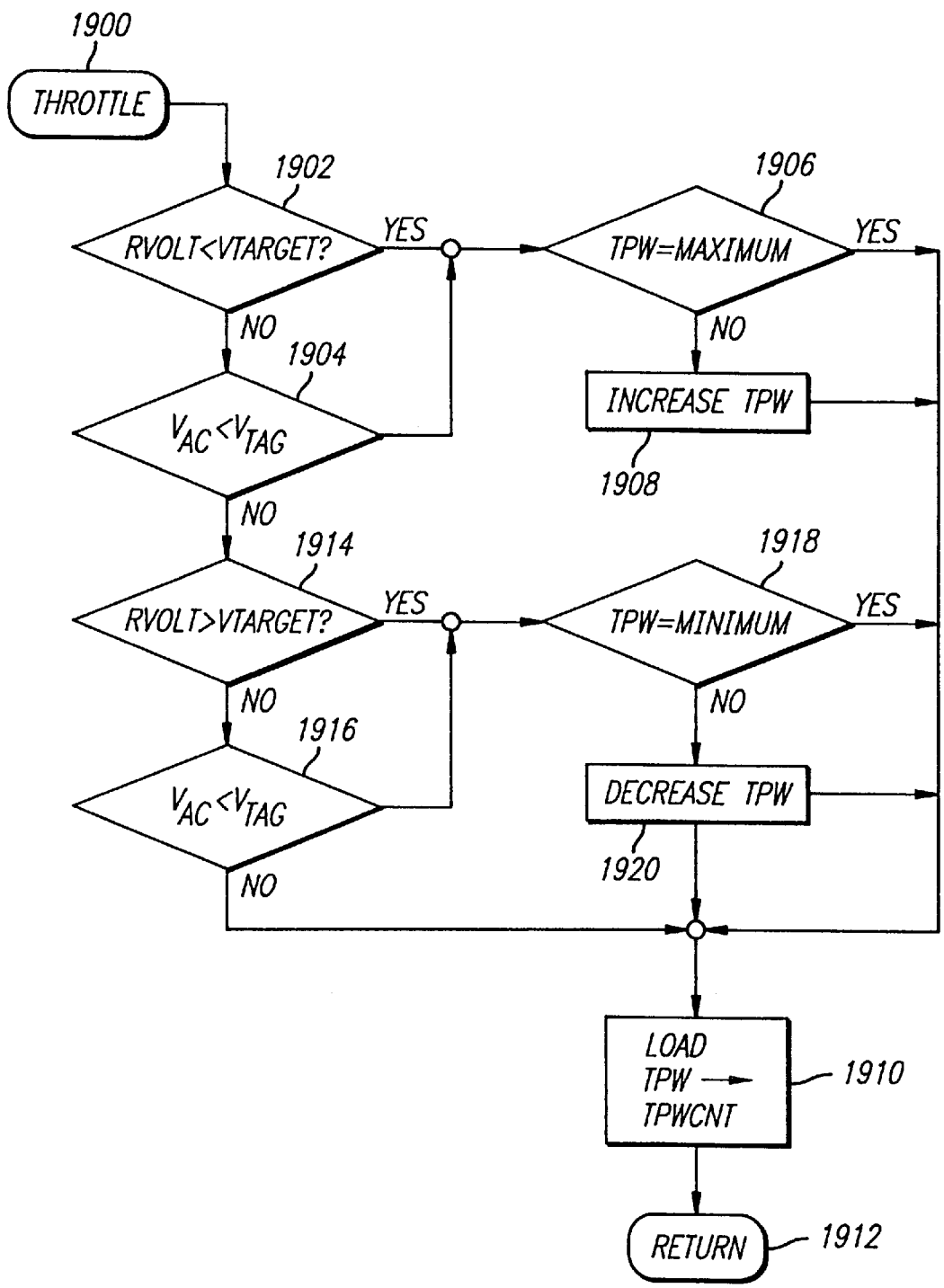
FIG. 19 is a functional flow chart of a THROTTLE routine effected by the microcomputer of FIG. 9.
Figure 20A:
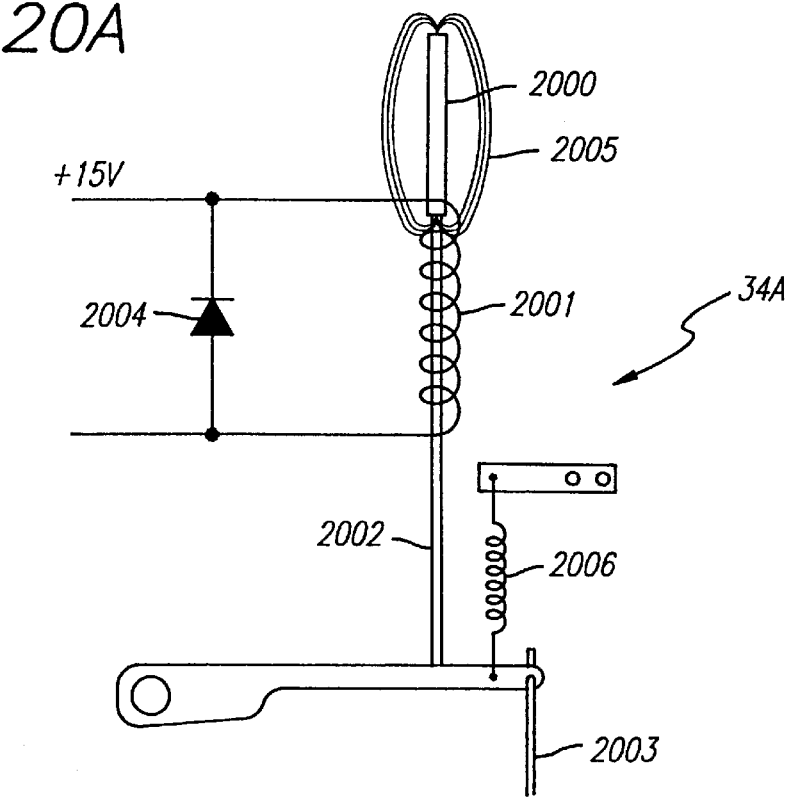
FIGS. 20A and 20B (collectively referred to as FIG. 20) are schematic illustrations of a throttle control in respective states routine effected by the microcomputer of FIG. 9.
Figure 20B:
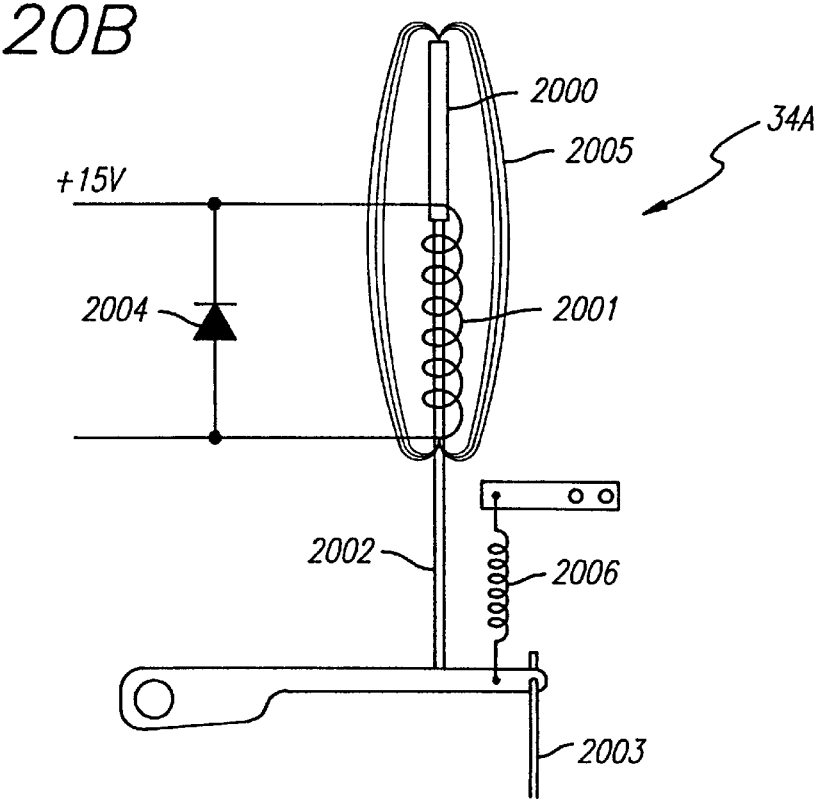

Referring now to FIG. 19, in a first embodiment employing a throttle control 34 which is responsive to the pulse width of the control signals applied thereto, when throttle control subroutine 1900 is called, the indicia of Rail voltage (Rvolt) in register 1104 is tested against, e.g., Vtarget in register 1152 (Step 1902). Vtarget is initially set in accordance with the selected welding mode (see Table 4), and thereafter adjusted by depressing the increment and decrement buttons. The indicia of AC voltage (Vac) contained in register 1107 is likewise tested against a predetermined value, e.g., Vtag (suitably a predetermined value incorporated into the program) (Step 1904). If either the DC rail voltage or AC voltage is less than the corresponding target value, the throttle pulse width indicia (TPW) in register 1150 is tested against a predetermined maximum (suitably a predetermined value) incorporated into the program code (Step 1906), and so long as the pulse width has not reached the maximum value, the pulse width TPW is incremented by one predetermined unit, (Step 1908), the updated TPW value in register 1150 is loaded into the pulse width counter 1151 (Step 1910) and a return effected (Step 1912).

If neither the DC rail voltage or AC voltage are greater than the corresponding desired values, a test is effected to see if the loads have decreased, i.e., the DC rail voltage or AC voltage has increased to above the corresponding target value (Steps 1914, 1916). If the DC rail voltage or AC voltage is greater than the corresponding target value, the throttle pulse width is decreased, down to a minimum value. The indicia of throttle pulse width contained in register 1150 is tested against the predetermined minimum value (again, suitably hard programmed) (Step 1918), and, if greater than the minimum, decremented by a predetermined unit value (Step 1920). The updated TPW value is then loaded into TPWCNT register 1151 (Step 1910) in preparation for the next output cycle (Steps 1332, 1630–1634) and a return effected (Step 1912). Throttle control can be effected, if desired, as a function of either DC rail voltage or AC voltage alone.

Often, engine speed is controlled by varying the physical angle of a throttle plate or valve pivotally mounted in the engine carburetor (or in connection with a fuel injection system); the larger the angle of the plate, the larger the opening of the throttle, and the faster the speed (rpm) of the engine. Conventionally, the plate angle is manually adjusted by movement of a lever arm linked to the plate. Movement of the lever arm is sometimes effected using a cable cooperating with another (more easily accessible) remotely located lever.

The throttle control apparatus 34 suitably comprises an electro-mechanical actuator, responsive to control signals applied thereto, for controlling the setting of the engine. For example, referring to FIGS. 9, 20A and 20B, one embodiment of a throttle control 34A responsive to the pulse width of the control signals applied thereto, comprises a cylindrical magnet 2000, magnetized through the length, suitably formed of Alnico, cooperating with a non-magnetic push rod 2002, for example, formed of nylon, and a winding 2001 wound around a suitable core, e.g., formed of cast nylon. Push rod 2002 cooperates with throttle lever arm 2003. Throttle lever arm 2003 typically cooperates with the carburetor (not shown in FIG. 20) of the engine. A spring 2006 biases throttle arm 2003 into an idle position.

When the signal at pin 3 of microprocessor 902 (FIG. 9) is generated, and transistor Q11 (FIG. 9) rendered conductive, a current path is formed through winding 2001 causing magnetic interaction with cylindrical magnet 2000. The magnetic interaction between coil 2001 and magnet 2000, causes magnet 2000 to move forward (FIG. 20B) against the bias of spring 2006, throttling up (increasing the RPM) of engine 14. As previously noted, the control signal generated at pin 3 of microcomputer 902 is suitably pulse-width modulated. The wider the pulse width, the more power to coil 2001, and concomitantly, the greater the movement of magnet 2000, push rod 2002, and throttle arm 2003. If desired, a fly-back diode 2004 can be provided across coil 2001.

Alternatively, throttle control can be effected using a conventional stepping motor mechanically coupled to the engine throttle. Any suitable implementation of the mechanical connection can utilized, such as, for example, a direct drive, a mechanical linkage, or a cam drive. Where a stepping motor is employed in the throttle control, control would be effected by selectively actuating the stator coils of the stepper motor, e.g., by varying a count employed to generate the control signals. More specifically, referring to FIGS. 33A, and 33B, a conventional step motor 3300 typically comprises a rotor 3302, coupled to a shaft 3304, cooperating with respective coils 3306, and 3308. Rotor 3302 includes a predetermined number of poles, preferably formed of permanent magnets. Windings, provided power through a conventional slip ring or brush mechanism, can also be utilized. The number of poles establishes the resolution of the stepper motor. A typical stepper motor includes e.g., 48 poles.

Figure 33A:
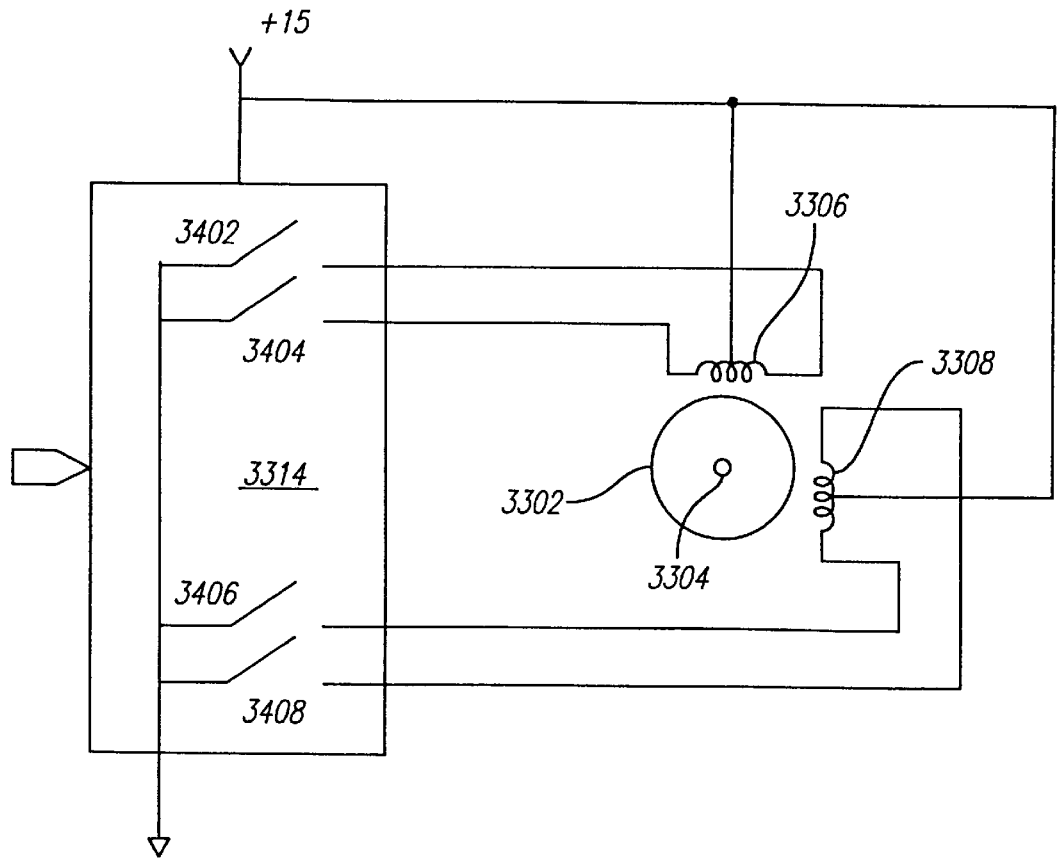
FIGS. 33A and 33B are block diagrams illustrating stepping motors and controls.
Figure 33B:
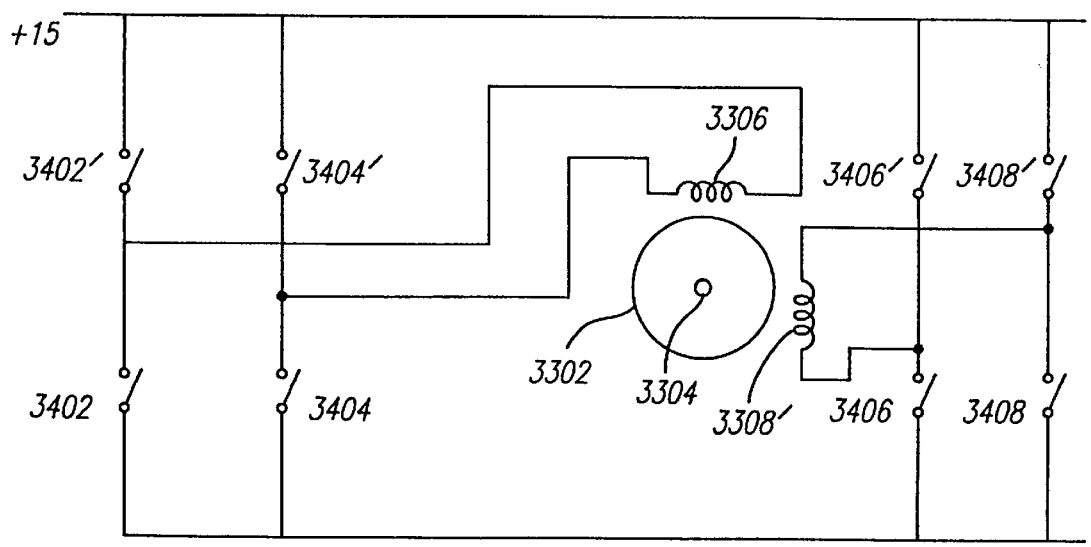

While schematically shown in FIGS. 33A, and 33B, coils 3306, and 3308, are suitably disposed on a soft magnetic core 3310. Core 3310 suitably includes a crenelated inner periphery with a predetermined number of equally spaced teeth and slots (generally analogous to core 302 of FIGS. 3 and 4). The number of slots are equal to a predetermined multiple of the number of poles of rotor 3302, with at least one slot per pole. If desired, two separate soft magnetic cores, disposed in planes parallel to rotor 3302, having with teeth extending axially from the periphery of the core, about the periphery of rotor 3302. The teeth of the respective cores are interdigitated. Coils 3306, and 3308 are wound about alternating teeth (or groups of teeth corresponding to a rotor pole,) of their associated cores, and present alternating polarities to the rotor poles Incremental rotation of rotor 3302 is effected by effecting current paths through coils 3306 and 3308 in predetermined sequences to generate magnetic fields which interact with the magnetic components of rotor 3302, and cause rotor 3302 to move in predetermined increments. The poles of rotor 3302 tend to move into alignment with the coils through which current is flowing.

Figure 34:
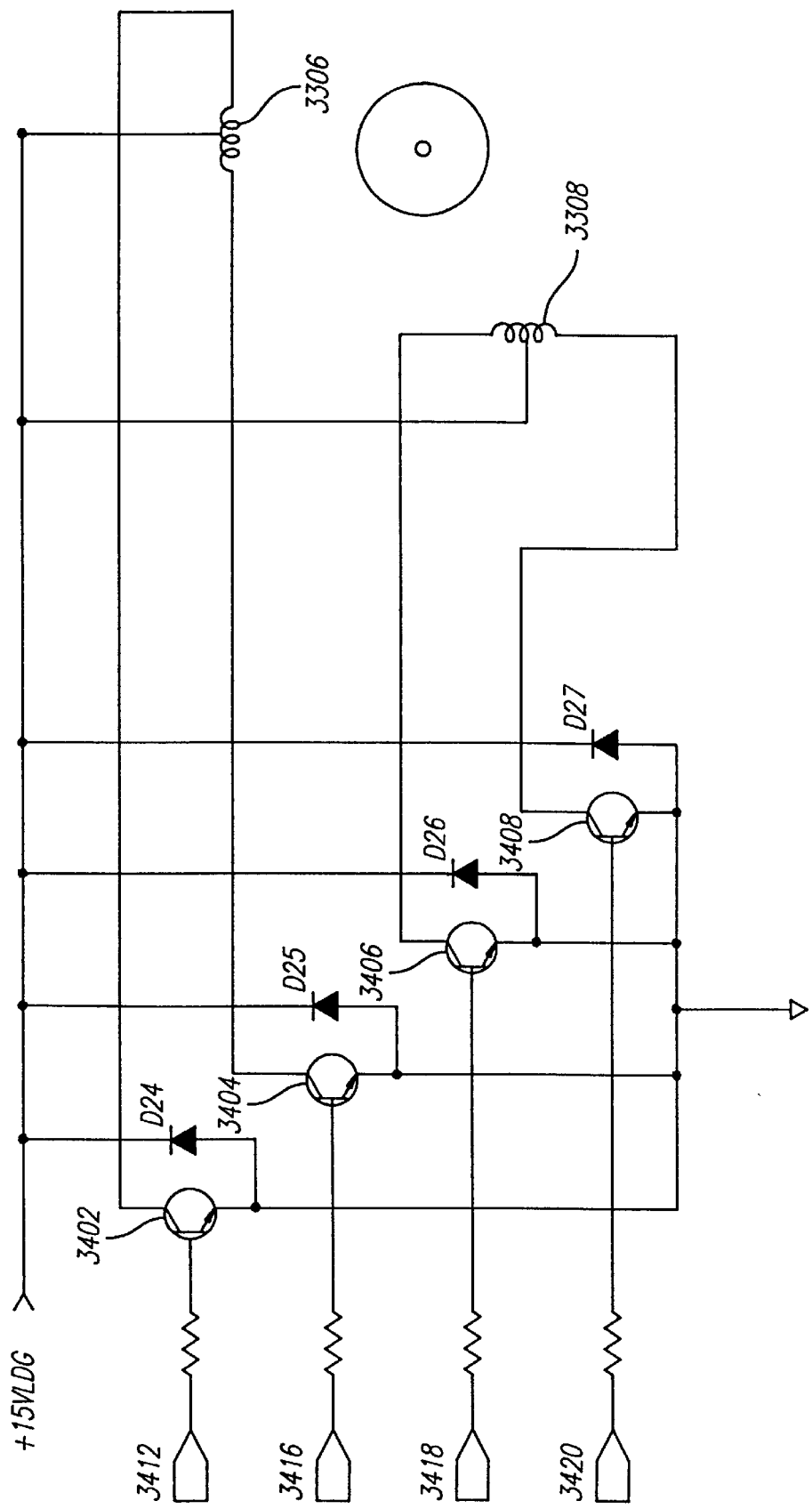
FIG. 34 is a block diagram more particularly illustrating a unidirectional stepping motor configuration.

The current paths through the coils are effected by a suitable drive circuit 3314. Referring briefly to FIGS. 33A, and 34, in a unidirectional configuration, coils 3306 and 3308 each include a center tap, typically connected to positive supply voltage (e.g., 15 V). Drive circuit 3314 suitably comprises conventional switching devices 3402, 3404, 3406 and 3408, operating in accordance with control signals from controller 22, disposed to selectively complete a current path from each end of windings 3306 and 3308 to ground. For example, as shown in FIG. 34, one side of each of coils 3306, 3308 is connected to switching devices 3402, 3404, 3406 and 3408, each suitably comprising a transistors with collector effectively connected to a respective end of a stepper motor winding (3306, 3308) and emitter connected to ground. Transistors 3402–3408 are selectively rendered conductive by control signals from controller 22 applied (at terminals 3412–3420) to the bases of the transistors. When rendered conductive by the control signal from controller 22, the transistors selectively effect a current path through the associated coil 3306–3308. If desired, fly-back diodes can be provided.

Conventionally, step motor 3300 is operated either in a single activate winding (low power) mode or in paired winding (high torque) mode. For a unidirectional driver, respective current paths are effected, in sequence, to incrementally advance the rotor by a full step, from pole to pole:

TABLE 5

| Switch | 3402 | 3404 | 3406 | 3408 |
|---|---|---|---|---|
| State 1 | ON | OFF | OFF | OFF |
| State 2 | OFF | OFF | ON | OFF |
| State 3 | OFF | ON | OFF | OFF |
| State 4 | OFF | OFF | OFF | ON |

If the windings on adjacent poles are both actuated, with currents of the same polarity the rotor pole is forced to a position midway between the stator poles. Accordingly, if pairs of current paths are effected, in sequence, the rotor can be incrementally advanced by a full step, at full torque, from midpoint to midpoint:

TABLE 6

| Switch | 3402 | 3404 | 3406 | 3408 |
|---|---|---|---|---|
| State 1 | ON | OFF | ON | OFF |
| State 2 | OFF | ON | ON | OFF |
| State 3 | OFF | ON | OFF | ON |
| State 4 | ON | OFF | OFF | ON |

Such switching sequences, in which the two halves of each winding are never energized at the same time, repetitively effected, effectively cycles the magnetic flux about the stator, and causes the rotor poles to incrementally advance, as the rotor poles align with the magnetic fields created by the instantaneous current flow through the coils. Such incremental rotation, in degrees, equals 360° divided by the number of poles (e.g., 360/48=7.5°). By thereafter switching the current flow to the next successive state, another incremental step is effected when the rotor magnets realign themselves with the newly prevailing magnetic flux and so on. The direction of rotation may be reversed by following the step sequence in reverse order.

In a bi-polar configuration such as shown in FIG. 33B, the winding center tap is not employed. Instead, in addition to switching devices, 3402–3408 selectively connecting each end windings 3306 and 3308 to ground, a further set of switching devices, 3402'–3408' to selectively couple each end of windings 3306 and 3308 to the positive source, e.g., 15 V, are provided. Switching devices, 3402–3408, and 3402'–3408' cooperate as, in effect, double pole, double throw switches, with a center off position, which selectively effect current flows of selected polarity through the windings. For example, the following switching sequence, in which only a single winding is energized at any given time, incrementally advances the rotor by a full step, from stator pole to stator pole:

TABLE 7

| Switch | 3402' | 3402 | 3404' | 3404 | 3406' | 3406 | 3408' | 3408 |
|---|---|---|---|---|---|---|---|---|
| State 1 | ON | OFF | OFF | ON | OFF | OFF | OFF | OFF |
| State 2 | OFF | OFF | OFF | OFF | ON | OFF | OFF | ON |
| State 3 | OFF | ON | ON | OFF | OFF | OFF | OFF | OFF |
| State 4 | OFF | OFF | OFF | OFF | OFF | ON | ON | OFF |

Similarly, the following switching sequence, in which both windings are concurrently activated, incrementally advances the rotor by a full step, at full torque, from midpoint between stator poles to midpoint between stator poles, in sequence:

TABLE 8

| Switch  | 3402' | 3402 | 3404' | 3404 | 3406' | 3406 | 3408' | 3408 |
|---------|-------|------|-------|------|-------|------|-------|------|
| State 1 | ON    | OFF  | OFF   | ON   | OFF   | ON   | ON    | OFF  |
| State 2 | OFF   | OFF  | ON    | OFF  | ON    | OFF  | OFF   | ON   |
| State 3 | OFF   | ON   | ON    | OFF  | ON    | OFF  | OFF   | ON   |
| State 4 | OFF   | OFF  | OFF   | OFF  | OFF   | ON   | ON    | OFF  |

Such a switching sequence, in which the respective windings generate flux of the same polarity at the same time, effectively cycles the magnetic flux about the stator, and causes the rotor poles to incrementally advance, as the rotor poles align with the magnetic fields created by the instantaneous current flow through the coils. When two windings are simultaneously energized, the torque versus position curve is the sum of the torque versus position curve for one or the other winding (assuming that no part of the magnetic circuit saturates). For a permanent magnet motor, the two curves will be T degrees out of phase, and if the currents in the two windings are equal, the peak of the sum will be displaced T/2 degrees from each and the amplitude of the sum will be 1.414 times the amplitude of the two components. As with the uni-polar drive configuration, the incremental advance, in degrees, equals 360° divided by the number of poles (e.g., 360/48=7.5°).

It is known that by variously energizing a single winding, to bring rotor 3302 into alignment with the stator pole, then energizing a pair of windings, to bring rotor 3302 into alignment with the midpoint between that stator pole and the next, the resolution of stepper motor 3300, can be improved by a factor of two, i.e., equal to 360° divided by, twice the number of poles (e.g., 360/2(48) =3.75°). More specifically, when a single winding (half winding in the case of the uni-polar drive) rotor 3302 aligns with the winding. However, rotor 3302 steps to a position intermediate two adjacent coils when adjacent windings are energized concurrently energizing both coils. Accordingly, for a unipolar configuration, the following switching sequence provides half step resolution:

TABLE 9

| Switch  | 3402 | 3404 | 3406 | 3408 |
|---------|------|------|------|------|
| State 1 | ON   | OFF  | OFF  | OFF  |
| State 2 | ON   | OFF  | ON   | OFF  |
| State 3 | OFF  | OFF  | ON   | OFF  |
| State 4 | OFF  | ON   | ON   | OFF  |
| State 5 | OFF  | ON   | OFF  | OFF  |
| State 6 | OFF  | ON   | OFF  | ON   |
| State 7 | OFF  | OFF  | OFF  | ON   |
| State 8 | ON   | OFF  | OFF  | ON   |

Similarly, for a bipolar configuration, the following switching sequence provides half step resolution:

TABLE 10

| Switch  | 3402' | 3402 | 3404' | 3404 | 3406' | 3406 | 3408' | 3408 |
|---------|-------|------|-------|------|-------|------|-------|------|
| State 1 | ON    | OFF  | OFF   | ON   | OFF   | OFF  | OFF   | OFF  |
| State 2 | ON    | OFF  | OFF   | ON   | ON    | OFF  | OFF   | ON   |
| State 3 | OFF   | OFF  | OFF   | OFF  | ON    | OFF  | OFF   | ON   |
| State 4 | OFF   | ON   | ON    | OFF  | ON    | OFF  | OFF   | ON   |
| State 5 | OFF   | ON   | ON    | OFF  | OFF   | OFF  | OFF   | OFF  |
| State 6 | OFF   | ON   | ON    | OFF  | OFF   | ON   | ON    | OFF  |
| State 7 | OFF   | OFF  | OFF   | OFF  | OFF   | ON   | ON    | OFF  |
| State 8 | ON    | OFF  | OFF   | ON   | OFF   | ON   | ON    | OFF  |

It is, in general, also known that smaller fractional steps, typically referred to as "microsteps" can be effected by establishing different levels of current in the respective windings.

As noted above, simultaneous actuation of two windings results in a torque versus position curve equal to the sum of the torque versus position curves of the windings. For a permanent magnet motor, the two curves will be out of phase by a predetermined amount, and by varying the relative magnitudes of the currents, the resultant position can be skewed relative the winding with the higher magnitude current, i.e., generating the greater flux. Thus, incremental movements of a fraction of the angle subtended by a pole (microstepping) can be effected. Such a system, however, tends to require a variable current source, and relatively complicated control, and thus tends to be expensive.

The present inventors, however, have determined that in the context of a throttle control system, that the effective resolution, i.e., number of steps, from the perspective of the controlled engine, can be multiplied by dithering (switching back and forth) between successive coil actuation states in the rotation sequence, at a rate faster than the mechanical response time of the rotor (as coupled into the overall system) but less than the inductive rise time of the stepper winding, the engine reacts as if the throttle was at a setting equal to the average setting over the response period of the engine. If the dithering frequency, i.e., the rate at which the activation control signals applied to switches 3402–3408 (and 3204'–3408', if employed) are switched, exceeds the inductive rise time of stepper windings 3306, 3308, the motor, unable to react to the activation currents, loses torque. If, on the other hand, the switching frequency is less than the inductive rise time of the stepper winding, but exceeds the response time of the engine (e.g., between 10 microseconds in smaller engines, and 0.25 to 0.5 seconds in larger engines) the effective throttle setting, as perceived by the engine is the position corresponding to the average of the activation states over the period. More specifically, if the frequency is less than the time constant of the system linkage (rotor as connected in the system), but exceeds the response time of the engine, the throttle tends to move between positions corresponding to the respective actuation states at the dithering frequency. However, the engine is unable to respond to the throttle movement, and perceives the throttle as being in the average position.

The same averaging effect can, however, be attained without physical oscillation of the throttle plate. If the switching frequency exceeds the time constant of the system linkage, i.e.,the rotor as connected in the system, mechanical momentum effectively moves the throttle into an intermediate position, corresponding to the time average of the actuation states. The linkage is unable to respond to the actuation states before they change, and accordingly, the throttle retained in the intermediate position. In general, it is desirable to use a switching frequency that only minimally exceeds the time constant of the system linkage; the lowest frequency that permits the throttle to assume a static position to avoid wear on the throttle plate and pivot mechanism.

For example, still referring to FIG. 33, from the engine's perspective, the throttle can readily, and without additional hardware, be adjusted in steps equivalent to one quarter of angle subtended by the poles of rotor 3302, by dithering for equal periods between successive coil actuation states. More specifically, what would otherwise be a "half-step" activation state sequence employed in a 48 pole step motor, results in a resolution of 3.75°, dithering at an appropriate frequency between activation states (for equal periods) results in an effective resolution of 1.875°. For example, the activation state sequence for a unipolar configuration employing dithering would be:

TABLE 11

| Switch | 3402 | 3404 | 3406 | 3408 |
|---|---|---|---|---|
| State 1 | ON | OFF | OFF | OFF |
| State 2 | Dither Between Activation States 1 and 3 for equal periods | | | |
| State 3 | ON | OFF | ON | OFF |
| State 4 | Dither Between Activation States 3 and 5 for equal periods | | | |
| State 5 | OFF | OFF | ON | OFF |
| State 6 | Dither Between Activation States 5 and 7 for equal periods | | | |
| State 7 | OFF | ON | ON | OFF |
| State 8 | Dither Between Activation States 7 and 9 for equal periods | | | |
| State 9 | OFF | ON | OFF | OFF |
| State 10 | Dither Between Activation States 9 and 11 for equal periods | | | |
| State 11 | OFF | ON | OFF | ON |
| State 12 | Dither Between Activation States 11 and 13 for equal periods | | | |
| State 13 | OFF | OFF | OFF | ON |
| State 14 | Dither Between Activation States 13 and 15 for equal periods | | | |
| State 15 | ON | OFF | OFF | ON |
| State 16 | Dither Between Activation States 15 and 1 for equal periods | | | |

Depending upon the response time of the engine, a plurality of intermediate positions can be effectively attained by varying the relative time periods during which the respective coil activation states are maintained. For example, in a 48 pole step motor, a resolution of 0.9375° can be achieved, again without any additional hardware, with the following activation sequence:

TABLE 12

| Switch | 3402 | 3404 | 3406 | 3408 |
|---|---|---|---|---|
| State 1 | ON | OFF | OFF | OFF |
| State 2 | Dither between Activation States 1 and 5: 3/4 period State 1; 1/4 period State 5 | | | |
| State 3 | Dither between Activation States 1 and 5: 1/2 period State 1; 1/2 period State 5 | | | |
| State 4 | Dither between Activation States 1 and 5: 1/4 period State 1; 3/4 period State 5 | | | |
| State 5 | ON | OFF | ON | OFF |
| State 6 | Dither between Activation States 5 and 9: 3/4 period State 5; 1/4 period State 9 | | | |
| State 7 | Dither between Activation States 5 and 9: 1/4 period State 5; 3/4 period State 9 | | | |
| State 8 | Dither between Activation States 5 and 9: 1/4 period State 5; 3/4 period State 9 | | | |
| State 9 | OFF | OFF | ON | OFF |
| * | | | | |
| * | | | | |
| * | | | | |
| State 32 | Dither between Activation States 29 and 1: 1/4 period State 29; 3/4 period State 1 | | | |

As noted above, in the mechanical coupling of the stepping motor to the engine throttle can be effected in any suitable manner. For example, referring to FIG. 35, a direct drive can be employed to couple step motor 3300 to throttle 34. More specifically, step motor 3300 is disposed in general axial alignment with the carburetor throttle shaft, generally indicated at 3502. A flexible coupling 3504, e.g., a rubber tube, is suitably employed to connect step motor shaft 3304 and carburetor throttle shaft 3502. A flexible coupling tends to facilitate assembly. Where a direct drive is employed, the control resolution, i.e., the increment of movement of throttle shaft 3502, is equal to the resolution of step motor 3300.

The typical range of movement of a throttle arm is 60–70 degrees. It is sometimes desirable to rotate throttle shaft 3502 through an angle different from that through which the step motor moves. For example, to obtain greater resolution, throttle shaft 3502 is made to move through a first angle, e.g., 70 degrees, in response to a larger angle, e.g., 140 degrees or 360 degrees, of movement of the step motor shaft 3304. To this end, a mechanical linkage or cam drive may be employed. For example, referring to FIGS. 36A, 36B, 36C, and 36D (collectively referred to as FIG. 36), a mechanical linkage providing two-to-one resolution, i.e., throttle shaft moves one degree for every two degrees rotation of step motor shaft 3304, suitably comprises a step motor actuator arm 3602, a linkage rod 3604 and a throttle actuator arm 3608. Step motor actuator arm 3602 is mounted for rotation with, and extends radially outward from step motor shaft 3304. Similarly, throttle actuator arm 3608 is mounted for rotation with and extends radially outward from throttle shaft 3502. Linkage rod 3604 couples the distal ends of actuator arms 3602 and 3608. Linkage 3604 is connected to actuator arms 3602 and 3608 such that it is free to move radially (rotate), but transmits axial forces between the actuator arms.

The mechanical advantage attained though use of the mechanical linkage provides for, e.g., two-to-one resolution. In other words, for every two degrees of movement of motor actuator arm 3602, throttle actuator arm 3608 moves through one degree. For example, actuator arm 3602 moves through 140 degrees to effect 70 degrees movement of throttle actuator arm 3608. If desired, respective stops 3610 and 3612, suitably cooperating with either actuator arm 3608 or 3602, may be employed to limit the range of motion permitted the throttle.

If desired, higher resolution can be obtained through a suitable cam drive. For example, referring to FIG. 37 and FIGS. 38A through 38E (collectively referred to as FIG. 38), a cam drive for providing in excess of five to one resolution, i.e., 70 degrees of throttle actuator arm rotation is effected in response to 360 degrees of step motor shaft rotation, suitably comprises a cam actuator 3702, and cooperating cam follower throttle actuator arm 3704. Cam actuator 3702 is mounted for rotation on the step motor shaft 3304 and includes a peripheral side cam surface 3702A, suitably configured to effect throttle movement corresponding to a linear engine response.

Cammed throttle actuator arm 3704 similarly includes a peripheral side cammed surface 3704A. Throttle actuator arm cammed surface 3704A rides on, preferably under spring bias (not shown), and cooperates with motor actuator cam surface 3702A. Interaction between cam surfaces 3702A and 3704A causes actuator arm 3704 to turn in response to rotation of cam 3702. The progression of movement is illustrated in FIGS. 38A through 38E.

A closed loop servo system can also be employed as throttle control 36. For example, referring to FIG. 59, a suitable servo system 5900 comprises a conventional servo motor 5902, with positive and negative input terminals, connected in an H bridge with respective switching devices 5904, 5906, 5908, 5910, e.g., MOSFET power switches. Switches 5904–5910 are suitably selectively driven by a pulse width modulated (PWM) signal generally analogous to that described in connection with FIGS. 9 and 19. In general, a common PWM signal from microprocessor 22 is employed to drive switches 5904 and 5910, and inverted to drive switches 5906 and 5908. Thus, switches 5904 and 5910, and switches 5906 and 5908 provide alternative polarity current paths to motor 5902; switches 5904 and 5910 conductive during the high (positive) portion of the PWM signal, and switches 5906 and 5908 conductive during the low (zero) portion of the PWM signal.

When the one and zero portions of the pulse width modulator signal are of equal duration, servo motor 5902 is effectively nulled; no motion is effected. However, if the durations of the one and zero portions of the PWM output is varied, motor 5902 effects rotary motion of its shaft in a direction corresponding to polarity of greater duration.

The PWM control signal would suitably be controlled using a conventional feedback loop, correcting in accordance with the difference between desired and actual voltage. Initialization would suitably be effected by moving the motor in a single direction for a time period sufficient to lodge the carburetor valve shaft against a stop.

Servo motor 5902 is suitably coupled to the carburetor valve shaft by, for example, a belt drive (suitably formed of a rubber O-ring) providing approximately 5:1 ratio. Alternatively, a light duty plastic gear set may be employed, one mounted gear (e.g., 12 tooth) mounted on the servo motor shaft and the other (e.g., 62 tooth) mounted on the carburetor pulse shaft, to provide a predetermined drive ratio (e.g., approximately 5:1).

As previously noted, power converter 530 effects controlled application of the DC rail voltage(s) to output terminals L1 and L2, in response to respective switching control sign-in-parallel output register 907. More specifically, referring again briefly to FIG. 9, microcomputer 902 suitably cooperates with serial-in-parallel output register 907 to generate respective switching control signals, e.g., LHRL (Left High, Right Low), and RHLL (Right High, Left Low) to power converter 530. In response, power converter 530 effects controlled application of the DC rail voltage(s) to output terminals L1 and L2. More specifically, microcomputer 902 and register 907 cooperate to generate, (at pins Q0 and Q1 of register 907), respective alternative pulses of controlled pulse-width, relative timing, and repetition rate as switching signals LHRL and RHLL. Microcomputer 902 and register 907, may also generate, if desired, further a switching signal HIV (High Voltage) (at pin Q2 of register 907), to power converter 530 to effect advantageous shaping of output signal 532, and, in various embodiments separate control signals (T_L, B_L, T_R, and B_R) to the individual drivers and a control signal (CAP_DUMP) to selectively discharge the converter filter capacitor.

Power converter 530, in response to switching control signals LHRL and RHLL, (or T_L, B_L, T_R, and B_R and/or further switching signal HIV, if utilized), selectively applies DC voltage(s) to terminals L1 and L2 of outlet 534 to generate output signal 532 with a predetermined waveform.

Referring to FIG. 21, power conversion circuit 530 suitably comprises, in a basic form 2100: respective high-side power switch circuits 2102 and 2104; and respective low-side power switch circuits 2106 and 2108. High-side power switch circuits 2102 and 2104 and low-side power switch circuits 2106 and 2108 each include a power transistor (Q1, Q2, Q3, and Q4, respectively) and a suitable firing circuit (2112, 2114) for turning the power transistor on and off in accordance with switching signals LHRL and RHLL. High-side power switch circuits 2102 and 2104 are preferably isolated and low-side power switch circuits 2106 and 2108 are preferably non-isolated.

Power switch circuits 2102–2108 are interconnected in an H-configuration: high-side power switch circuits 2102 and 2104 define controlled current paths between a high-side terminal 2103 termed a juncture node or first rail (e.g., the juncture of the drains of power transistors Q1 and Q2) and first and second output terminals L1 and L2, respectively; and low-side power switch circuits 2106 and 2108 define controlled current paths between a low-side terminal 2107, termed a common or second rail, (e.g., the juncture of the sources of power transistors Q3 and Q4) and output terminals L1 and L2, respectively.

In the basic configuration of FIG. 21, high-side terminal 2103 is connected to a positive DC source of predetermined nominal voltage (+150 V) and low-side terminal 2107 is connected to a relatively negative potential, e.g., negative rail 501C (and through isolation diode D7 to system ground). The positive DC source may be e.g., a signal derived from intermediate DC rail 501B, or, preferably, separate inverter rail 544.

Power switch circuits 2102–2108 effectively operate as an electronically controlled double throw, double pole switch, selectively connecting the DC source to terminals L1 and L2 in response to switching control signals LHRL and RHLL (or, in various embodiments, separate independent signals to each power switch, e.g., Top_Left (T_L), Bottom_Right (B_R), and Top_ Right (T_R), Bottom_Left (B_L)). More specifically, switching signal LHRL is applied to high-side driver 2102 and low-side driver 2108, and switching signal RHLL is applied to high-side driver 2104 and low-side non-isolated driver 2106 (switching signal T_L is applied to high-side driver 2102, B_R to low-side driver 2108, T_R to high-side driver 2104 and B_L low-side driver 2106). When LHRL (T_L, B_R) is of a predetermined state, (e.g., low), high-side terminal L1 is connected by driver 2102 to high-side terminal 2103, and thus positive DC rail 501A, and low-side terminal L2 is connected by driver 2108 to low-side terminal 2107, and thus negative DC rail 501C. Conversely, when RHLL (T_R, B_L) is of a predetermined state, (e.g., low), high-side terminal L1 is connected to by driver 2104 to low-side terminal 2107, and thus negative DC rail 501C, and low-side terminal L2 is connected by driver 2106 to high-side terminal 2103, and thus positive DC rail 501A. By alternately generating switching signals LHRL (T_L, B_R), and RHLL (T_R, B_L), a simulated sine wave 532, shown in FIG. 7, can be produced; one pair of drivers is turned off at time T1 and the opposing pair is thereafter turned on at time T2. The RMS value of the signal is controlled by the period of time ("dead time") between turning off one pair of drivers (time T1) and the turning on of the opposing pair (time T2). Control of the dead time in relationship to the voltage levels provides an RMS value approximately equal to that of the desired sine wave.

It is desirable that the firing circuits of isolated drivers 2102 and 2104 quickly bring the associated power transistor Q1, (Q2) into a saturated state when the associated switching signal LHRL (T_L, B_R), RHLL (T_R, B_L) changes state to minimize power dissipation during the switching interval. A particularly economical firing circuit 2112 that provides advantageous turn on and turn off characteristics comprises: a resistor R13 (R16); an NPN transistor Q9(Q10); a diode D2 (D3); a capacitor C4 (C2); and respective resistor R9 (R15) and R6 (R10). If desired, respective capacitors C8 (C10) and C6 (C9) may be connected of power between the drain and source and gate and source transistor Q1 (Q2) to prevent any high frequency oscillations, and a Zener diode Z4 (Z7) connected between the drain and source of power transistor Q1 (Q2) to limit the gate voltage to no more than a predetermined value, e.g., 15 V.

In the embodiment of FIG. 21, control signals LHRL (T_L, B_R), and RHLL (T_R, B_L) are at a low level when actuated and a high level when non-actuated. When the associated control signal LHRL (RHLL) is non-actuated, i.e., high, transistor Q9 (Q10) is rendered conductive. This, in effect, grounds the gate of power transistor Q1 (Q2) and renders it nonconductive. However, a current path is created from the 15 volt supply through diode D2 (D3) capacitor C4 (C2) is effectively in parallel with resistor R6 (R10) and is therefore charged to a level (approximately 15 V) somewhat in excess of the threshold gate voltage (e.g., 8 V) necessary to place power transistor Q1 (Q2) into saturation.

When the associated control signal LHRL (RHLL) changes to an actuated state, i.e., goes low, transistor Q9 (Q10) is rendered nonconductive. This, in effect, places the gate of power transistor Q1 (Q2) at 15 V and renders it conductive. When power transistor Q1 (Q2) is rendered conductive, the device exhibits very little resistance, and the source voltage approaches the voltage of the drain (e.g., 150 volts) the negative terminal of capacitor C4 (C2) thus assumes a voltage approximating the rail voltage (150 volts). Since capacitor C4 (C2) is already charged to approximately 15 volts, the positive side of the capacitor is at a voltage approaching the rail voltage plus the charge voltage, i.e., 165 volts. This, in effect, reverse biases diode D2 (D3), rendering the diode non-conductive and effectively blocking the 15 volts. However, since capacitor C4 (C2) is charged to a level above the set saturation threshold gate voltage of power transistor Q1 (Q2) accordingly, transistor Q1 (Q2) continues to conduct. The level of the source voltage (15 volts) and the level to which capacitor C4 (C2) is initially charged, is chosen to initially place power transistor Q1 (Q2) into a hard full conduction. However, once diode D2 (D3) is blocked, capacitor C4 (C2) begins to discharge through resistor R9 (R15). The time constant of capacitor C4 (C2) and resistor R9 (R15) is chosen such that the charge on capacitor C4 (C2) (hence the gate voltage) approaches (is only slightly above) the threshold value of power transistor Q1 (Q2) at the point in time when the associated control signal LHRL (RHLL) changes state. In those systems where the frequency varies, the time constant is chosen such that the gate voltage is approaching (slightly higher than) the threshold value at the lowest frequency at which the system is intended to operate. When the associated control signal (RHLL) initially resumes a non-actuated state, i.e., goes high, transistor Q9 (Q10) is again rendered conductive, grounding the gate of, and turning off, power transistor Q1 (Q2) and the cycle is repeated. By discharging capacitor C4 (C2) to a point approaching the threshold voltage (eliminating excess charge), the turn off speed of power transistor Q1 (Q2) is increased.

As previously noted, converter 530 may derive power from one or more of DC rails 501A and 501B, or from one or more independent inverter rails 542, 544 established by inverter rail generation system 540. Inverter rail generation system 540 suitably comprises one or more winding groups 400A, 400B wound on stator core 202 (e.g., two sets, four coils) and cooperating rectifiers (e.g., three-phase regulated rectifier bridges and/or unregulated rectifier bridges). The outputs of the rectifiers preferably do not contribute to the voltages on DC rails 501A or 501B, but rather establish separate, generally independent inverter rails (542, 544). Use of independent winding groups 400A, 400B and cooperating rectifiers to establish substantially independent DC voltage(s) to supply inverter 530 facilitates concurrent operation of inverter and, e.g., welder operation.

Inverter winding groups 400A, 400B may be wound concurrently on stator core 302 with the corresponding windings of winding groups 400. In such case, although physically wound with a winding group 400, winding 400A, 400B would be independently controlled (by system 540), and may be operatively connected in the system irrespective of the status of the winding group 400 with which it is wound. Winding inverter rail windings 400A, 400B in the same physical space and in continuous thermal contact with DC rail windings 400 can provide particularly advantageous heat dissipation characteristics; the close proximity of the respective coils effectively makes the entire mass of the skein available to dissipate the heat generated by the working winding(s). Alternatively, inverter winding groups 400A, 400B may be respective ones of winding groups 400. Where a plurality of winding groups 400A, 400B are used, the groups are preferably disposed angularly equidistant about stator core 202.

The regulators of inverter rail generation system 540 can, if desired (and microcomputer capacity permitting), substantially replicate regulators 502, with the SCR's controlled in a manner analogous to the control of regulators 502. Alternatively, referring to FIG. 22, the regulators of inverter rail generation system 540 may be "self-timing" regulators 2202. A suitable self-timing regulator 2202 comprises: a rectifier bridge 2204; a leveling capacitor C21; a comparator 2206; and an optoisolator 2208. Rectifier bridge 2204 is suitably formed of respective diodes D28, D29 and D30 and respective SCR's TH1, TH2,and TH3. Comparator 2206 suitably comprises transistor Q11 and a voltage divider formed of resistors R21 and R24.

The output leads from 3-phase winding 400A (400B) provides 3-phase input signals to bridge 2204. The output signals of winding 400A (400B) are of variable voltage and frequency in accordance with the RPM of the engine. Comparator 2206 selectively generates an activating signal to opto-isolator 2208 (and gated with the enable signal (SCR15–SCR18) from controller 22) to turn on SCR's TH1, TH2, and TH3 to generate a regulated output across DC rails 542 and 544. In essence, comparator 2206 provides active feedback to maintain the rail voltage at the predetermined level, e.g., 150 volts. Indicia of the rail voltage is derived, and compared against a reference voltage (a stable regulated DC voltage provided by regulator 510). Assuming the winding to be in the system, (i.e., the associated enable signal SCR15–SCR18 is high), when the rail drops below the designated voltage, e.g., 150 volts, comparator 2206 activates opto-isolator 2208 to turn on SCR's TH1–TH3.

In some instances, one or more of the rectifiers 2202 can be unregulated. For example, where the outputs of all rectifiers associated with windings 400A are connected in parallel, the outputs of all rectifiers associated with windings 400B are connected in parallel, and the parallel groups connected in series, the rectifiers associated with windings 400B can be unregulated.

As previously noted, a closer approximation to a desired sine wave output can be achieved by shaping the waveform of output signal 532. Referring to FIG. 8, such a waveform may be generated by controllably applying first and second DC signals through the activated high side power transistor to the associated output terminal. The simulated sine wave waveform of FIG. 8 is generated by, in effect, connecting the active terminal (L1, L2) to signals derived from intermediate positive rail 542, and positive rail 544, in sequence. Alternatively, the first and second DC signals may be signals derived in whole or in part from high positive rail 501A and intermediate positive rail 501B, respectively.

Referring to FIGS. 8, 23, 24, and 25, additional winding groups 400B and 400A are wound on stator 18. Winding 400B cooperates with a conventional three-phase diode bridge 2302 to generate an independent intermediate positive rail 544 of predetermined voltage (e.g., 70 V). Winding 400A cooperates with a three-phase regulated bridge 2304 to generate an independent high positive rail 542 of predetermined voltage (e.g., 150 V).

Figure 24:
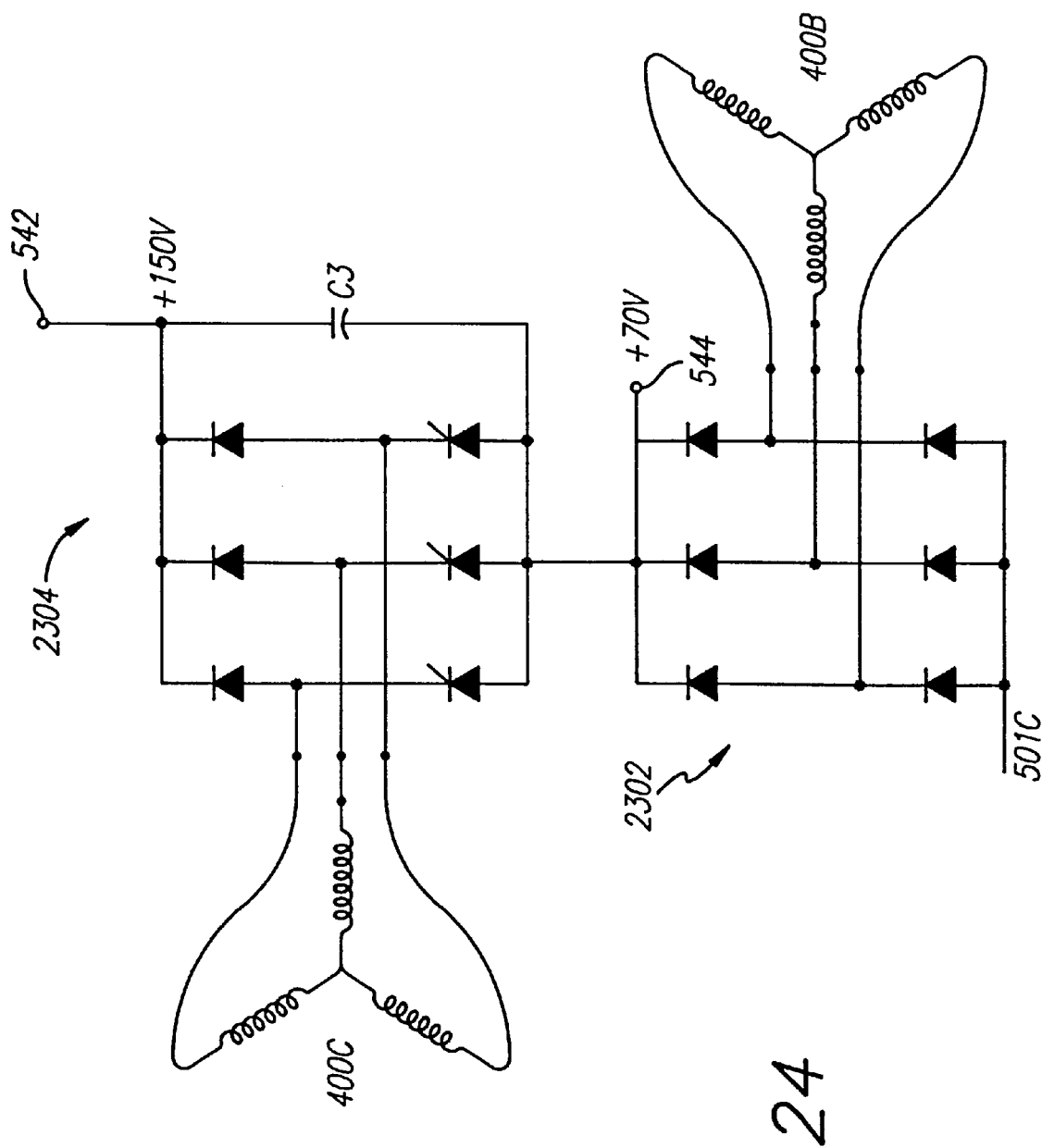

The intermediate voltage can be alternative to the high voltage provided by winding 400A, or it can be additive. For example, referring to FIG. 23, the intermediate positive rail and positive rail voltages can be independently developed, e.g., winding 400B generates the intermediate voltage, and winding 400A generates the entirety of the high voltage, substantially independently from winding 400B. If desired, however, windings 400A and 400B can be utilized to cooperatively generate the desired voltage at high positive rail 544. Referring briefly to FIG. 24, in such an arrangement winding 400B would include a predetermined number of windings corresponding to the desired voltage at intermediate rail 544, and diode bridge 2302 would be interposed between regulator 2302 and negative rail 501C. A winding 400C, corresponding to winding 400A, but including a predetermined number of turns corresponding to the difference between the desired voltage at intermediate rail 544 and the voltage, e.g., 150 volts, at positive rail 542 is provided.

Figure 25:
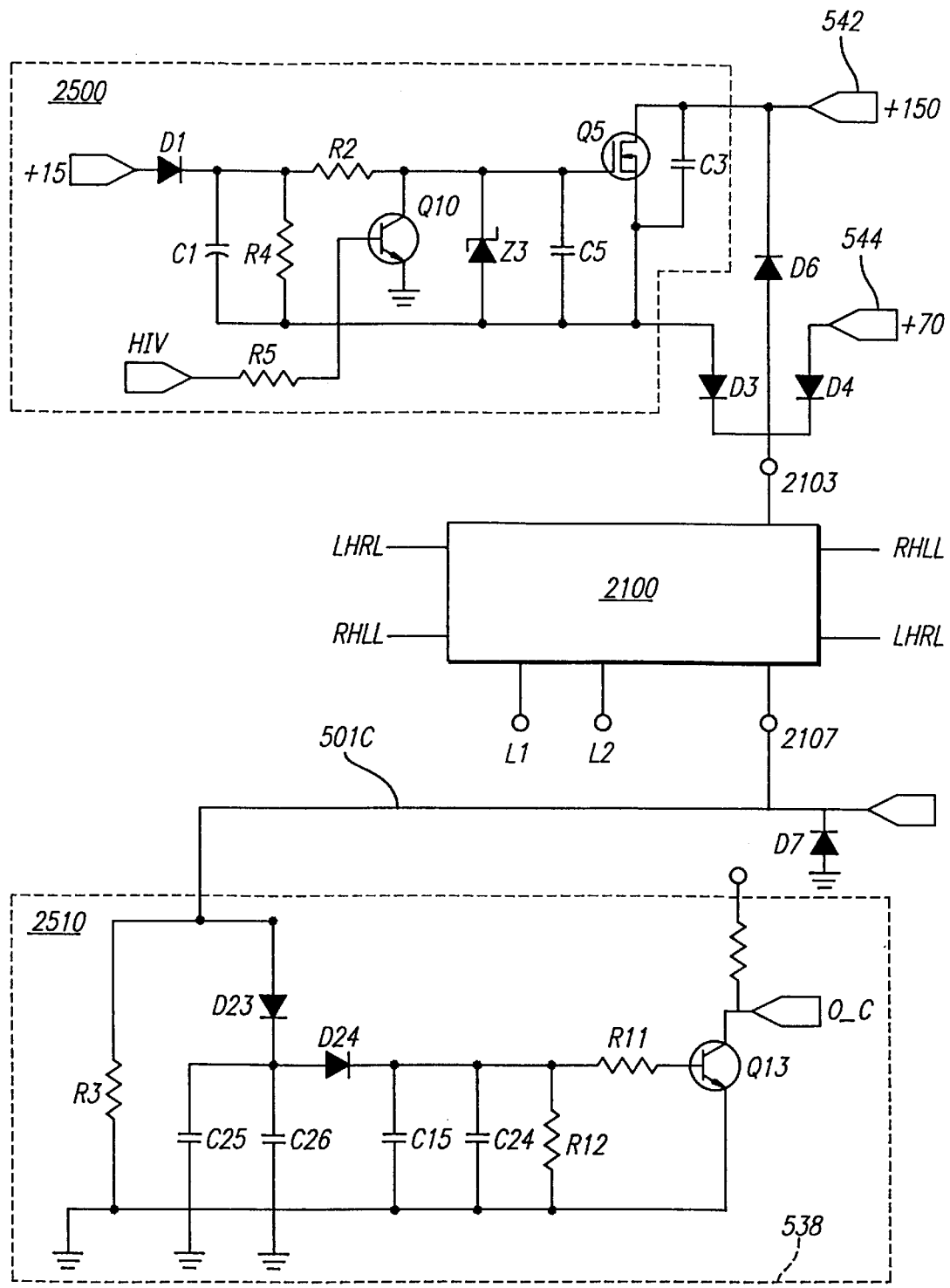
FIGS. 25 and 26 are schematic diagrams of alternative power converters suitable for use in the system of FIG. 5.

Referring to FIG. 25, the intermediate voltage (70 V) rail 544 is connected to high side terminal 2103 of basic power converter 2100 (i.e., to the drains of power transistors (FET's) Q1 and Q2 in high slide isolated power switches 532 and 2104), through a suitable isolation diode D4. High voltage (e.g., 150 V) positive rail 542 is selectively coupled to high side terminal 2103 of basic power conversion circuit 2100 through a booster circuit 2500. Booster circuit 2500 is substantially identical to high side isolated power switching circuits 2102 and 2104, including an FET Q5, and an associated firing circuit. Booster circuit 2500, however, is responsive to control signal HIV from controller 900, corresponding to pulse 808 (T3–T4) in FIG. 8. The drain of booster circuit FET Q5 is connected to high voltage positive rail 542. The source of the power transistor is connected through an isolation diode D3 to the drains of the power transistors Q1 and Q2 in high side power switching circuits 2102 and 2104. A reverse polarity fly-back diode D6 may be provided, if desired.

Figure 26:
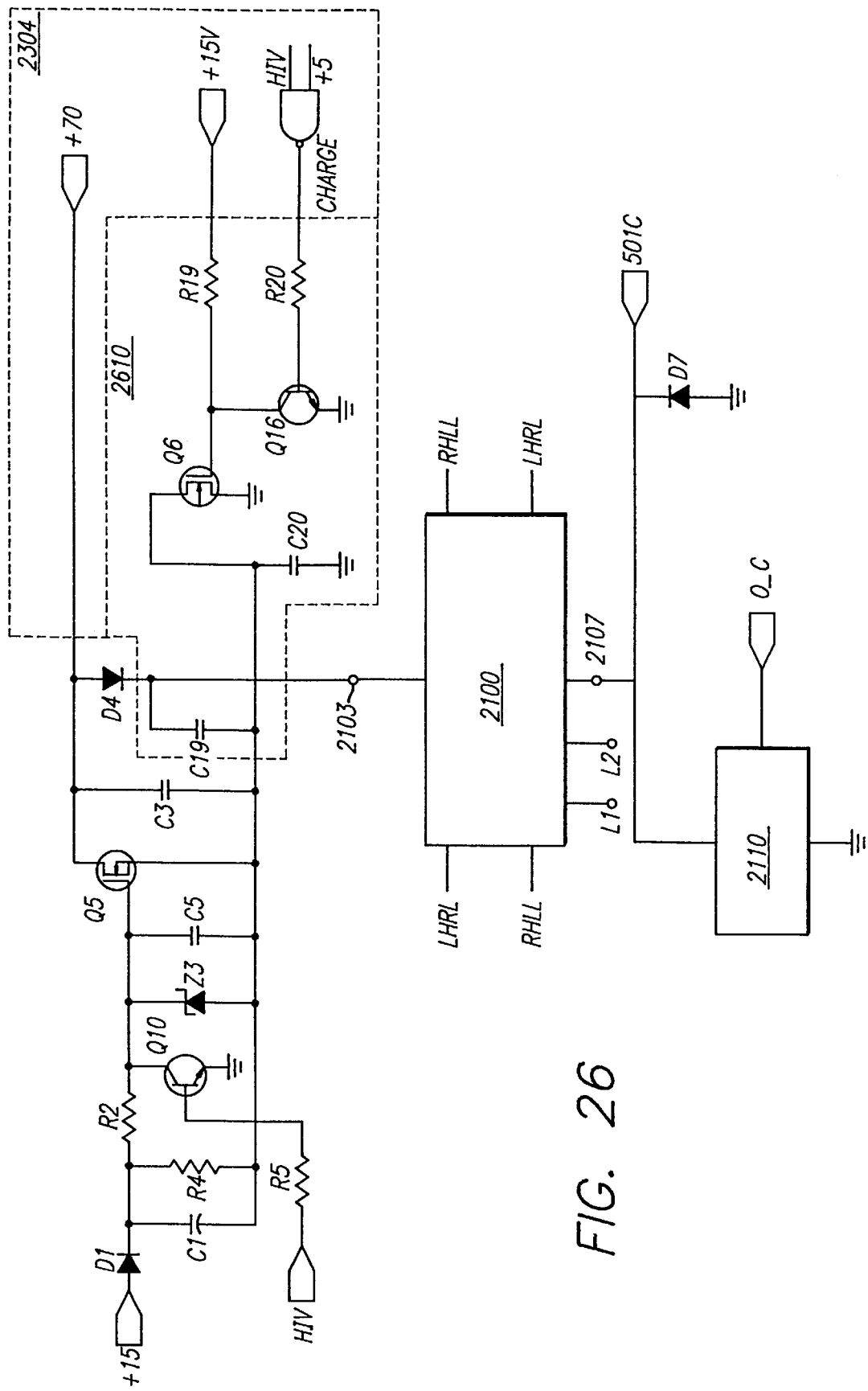

An auxiliary (BOOST) voltage can also be generated without the addition of an auxiliary winding 400A from, for example, the energy generated during the output signal dead time. This is accomplished by, in effect, storing the energy generated during the output signal dead time (which otherwise would be wasted) in a capacitor, and controllably discharging the capacitor to generate the booster pulse. Specifically, referring briefly to FIGS. 8 and 26, a separate control signal (CHARGE) is generated by inverting (through NAND Gate 2602) the HIV control signal, i.e., the CHARGE signal is active during those periods from the trailing edge of a booster pulse (T3) to the leading edge of the booster pulse in the next successive half-cycle. The CHARGE signal is applied to a controlled storage/discharge circuit 2610 which effects charging and discharging of a capacitor to generate the booster pulse. Circuit 2610 suitably comprises an NPN transistor Q16, an FET Q6 and a capacitor C19. The CHARGE control signal is applied to the base of transistor Q16. When the charge signal is activated (e.g., low), FET Q6 is rendered conductive, effectively connecting capacitor C19 to positive rail 544. (The use of the dead time energy to generate the booster pulse permits a lower rail voltage to be employed.) When the HIV control signal is actuated and hence control signal CHARGE deactuated, FET Q6 is rendered non-conductive, and capacitor C19 additively discharges to the high side terminal 2103 of basic power convertor 530A to provide the boost pulse.

It is desirable that system 10 be capable of accommodating widely and rapidly varying loads. However, the nature of, and variation in, the load can drastically affect system performance. For example, in many instances, inverters are used to supply power to one or more incandescent lamps. However, a cold incandescent lamp filament manifests an extremely low resistance, which thereafter increases significantly as the filament heats up to normal operating temperatures. Thus, when a cold incandescent lamp is initially introduced (plugged) into the system, it tends to cause an abrupt drop in load impedance. When a signal having a wave form with relatively vertical edges such as a square wave is applied to a cold incandescent lamp filament, a relatively large current surge results. Such current surges tend to be many multiples in magnitude larger than the average operating current (e.g., 8–9 amps), sometimes as high as 100 amps. The current surges thus tend to create over-current conditions, or require that more expensive components with higher power ratings than necessary to accommodate steady state (normal) operational levels be employed. To militate the affects of load variations, e.g., plugging a cold incandescent lamp into the system, it is advantageous to employ an inverter that generates a signal having a wave form with sloping edges, i.e., the current level varies gradually, rather than abruptly. This can be achieved by selectively connecting and disconnecting a capacitive element into the system, as will be explained. In addition, it is desirable to start various pieces of equipment, e.g., incandescent loads, with a low voltage and gradually increase the voltage to bring current up to an appropriate level. Accordingly, it is also desirable to controllably discharge the capacitor to facilitate provision of a low voltage.

Large inductive loads such as, for example, AC inductive motors, also can be problematical. More specifically, where a load is primarily inductive, the current wave form will tend to lag the voltage wave form. However, switching in the inverter is typically effected in accordance with the desired voltage wave form; the current is interrupted when the voltage wave form crosses zero and the switching devices in the inverter turn off. Since the current wave form is lagging voltage, a significant part of the higher magnitude portion of the current wave form is lost. Since the magnetism that causes torque in the induction motor depends upon current flow, the torque generated by the motor is decreased. Applicants have determined that such decrease may be as high as twenty-five percent compared to the torque generated in response to a complete, uninterrupted current wave form in typical circumstances. As will hereinafter be described, lagging current wave forms due to inductive loads can be accommodated by providing a recirculation current path to maintain current flow after zero crossings in the voltage wave form.

Figure 27:
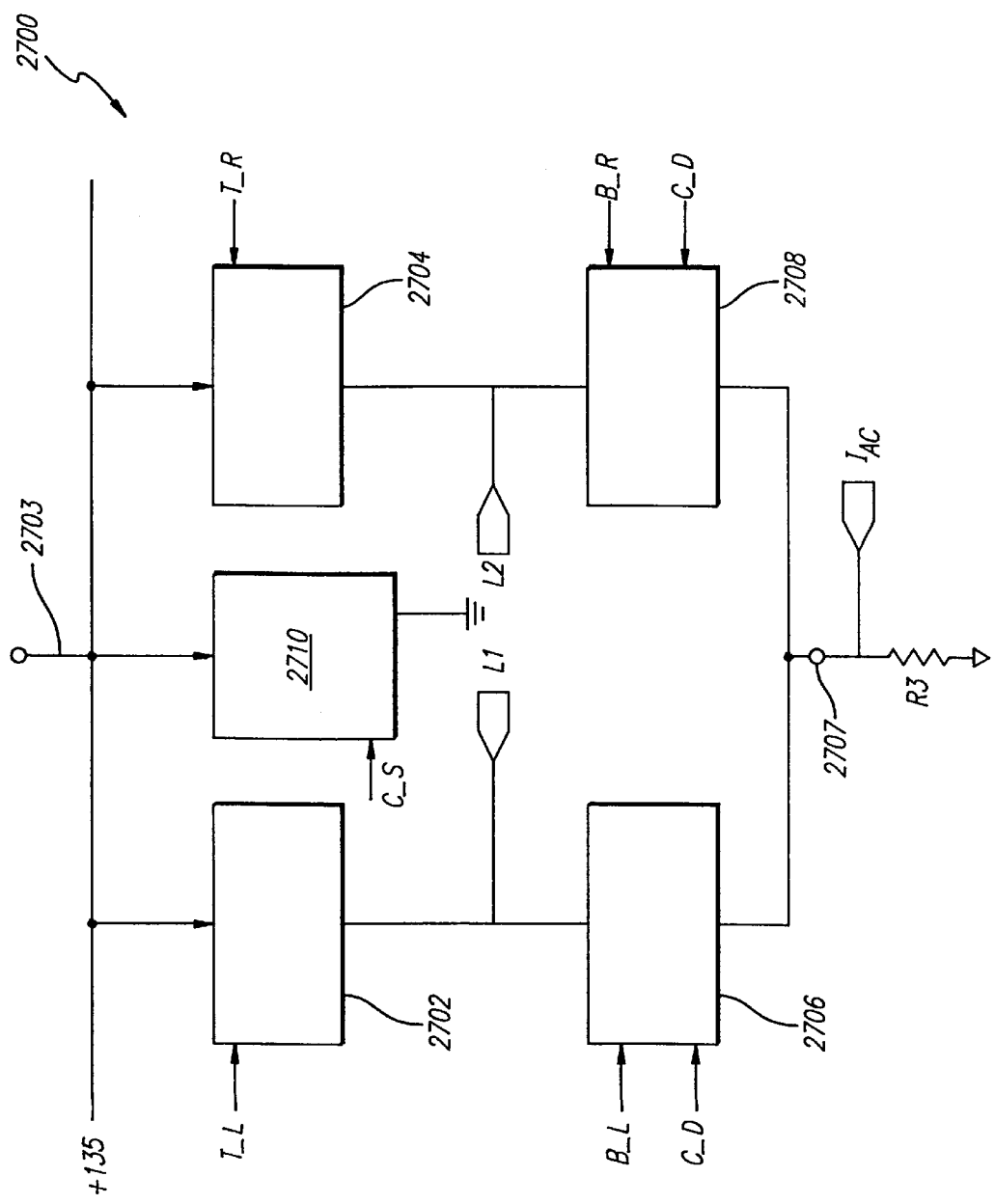
FIG. 27 is a block schematic diagram of a power converter employing a switched capacitor suitable for use in the system of FIG. 5.

Referring now to FIG. 27, an embodiment 2700 of power converter 530 which limits current, and shapes the wave form to render the rising and falling edges gradual, more closely simulating a sine wave, as opposed to sharp rising and falling edges normally occurring in a square wave type inverter comprises: respective high side power switch circuits 2702 and 2704 (analogous to circuits 2102 and 2104 of FIG. 21); respective low side power switch circuits 2706 and 2708 (analogous to circuits 2106 and 2108 of FIG. 21); and a suitable switched capacitor (filter) circuit 2710. The abrupt edges of a typical square wave, tend to generate significant harmonic signals, which are dissipated in the windings as heat. The wave form provided by power converter 2700, avoiding the abrupt edges of a typical square wave, generates significantly fewer harmonics.

Power switch circuits 2702–2708 are, like power switch circuits 2102–2108 in the basic configuration of FIG. 21, interconnected in an H-configuration. High side power switch circuits 2702 and 2704 define controlled current paths between first and second a high side terminal 2703, termed a juncture node or first rail, and output terminals L1 and L2, respectively. Low side power switch circuits 2706 and 2708 define controlled current paths between a low side terminal 2707, termed a common or second rail, and output terminals L1 and L2, respectively. High side terminal 2703 is connected to a positive DC source of predetermined nominal voltage (e.g., 135 volts), and low side terminal 2707 is connected to a relatively negative potential, e.g., negative rail 501C (and through an isolation diode to system ground).

Figure 32:
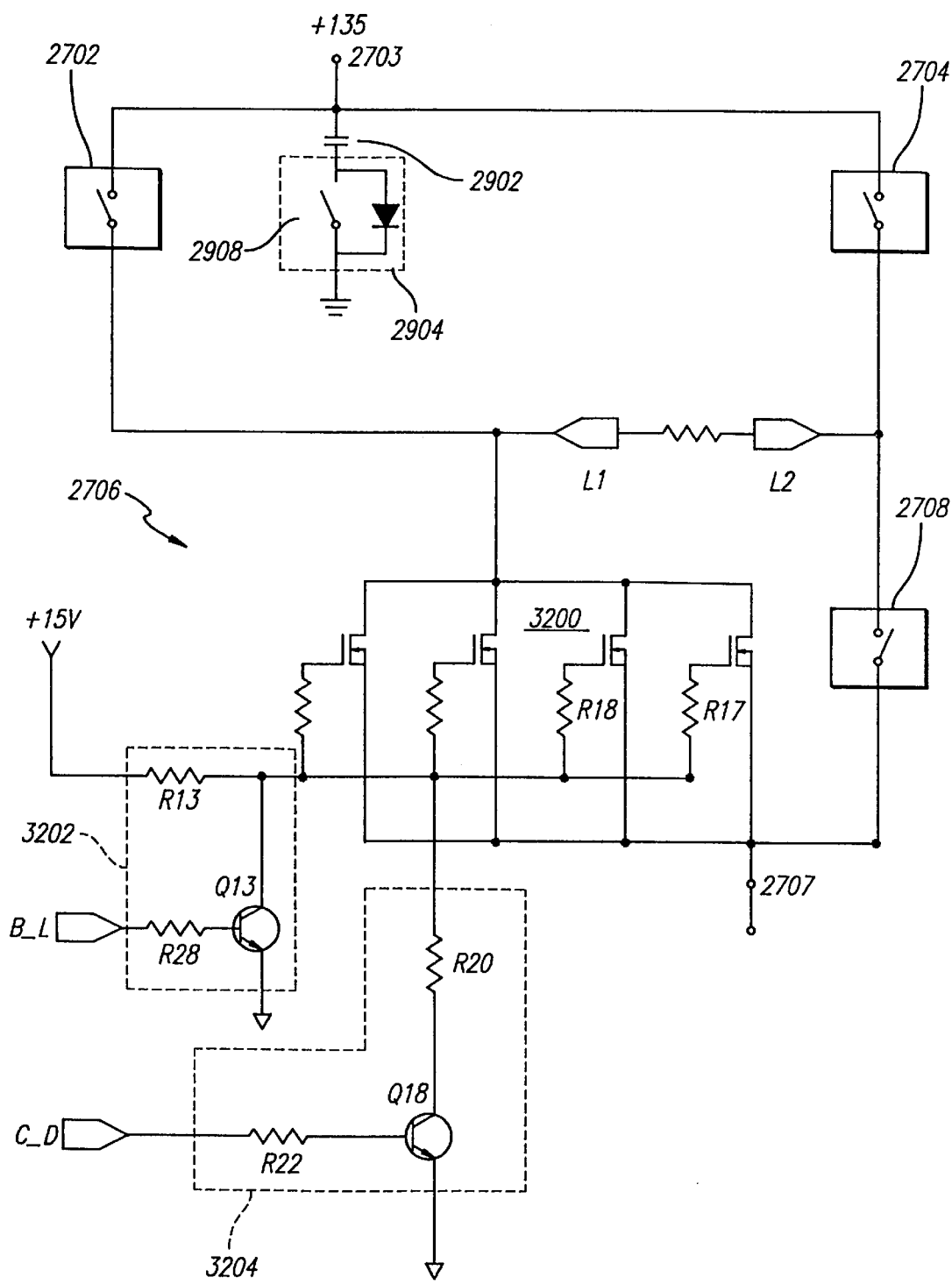
FIG. 32 is a block schematic of converter 2700 employing a capacitive dump feature.

Power switch circuits 2702–2708 each suitably include a power switching device (analogous to MOSFET's Q1, Q2, Q3, and Q4 in FIG. 21) and a suitable firing circuit (analogous to circuits 2112 and 2114 in FIG. 21) for turning the switching device on and of in accordance with switching signals provided by controller 22. High side power switch circuits 2702 and 2704 are preferably isolated, and low side power switch circuits 2706 and 2708 are suitably non-isolated. In each instance, the switching device suitably comprises a set of four parallel connected MOSFET's. The driving circuit of high side power switch circuits 2702 and 2704 substantially identical to driving circuits 2112 (FIG. 21) to quickly bring the switching device into a saturated (fully conductive) state when the associated switching signal changes state to minimize power dissipation during the switching interval. Indeed, power switch circuits 2702–2708 may be identical to circuits 2102–2108 (FIG. 21). However, power switch circuits 2702–2708 are suitably independently operable (e.g., responsive to separate control signals Top__Left, Top__Right, Bottom__Left, Bottom__Right, respectively), and low side power switch circuits 2706 and 2708 preferably include provisions for selectively dumping (dissipating) the charge on the capacitor to accommodate low voltage operation. A suitable non-isolated low side power switching circuit 2706 (2708) including a capacitor dump circuit will be described in conjunction with FIG. 32.

Switched capacitor (filter) 2710 selectively couples a capacitance (filter) into the operative circuit only during a predetermined portion of the output signal cycle. More specifically, referring to FIG. 29, switched capacitor circuit suitably comprises a capacitance, generally indicated as 2902, and a switching circuit 2904 for providing a unidirectional charging path, and a switched unidirectional (opposite polarity) discharge path.

Figure 29:
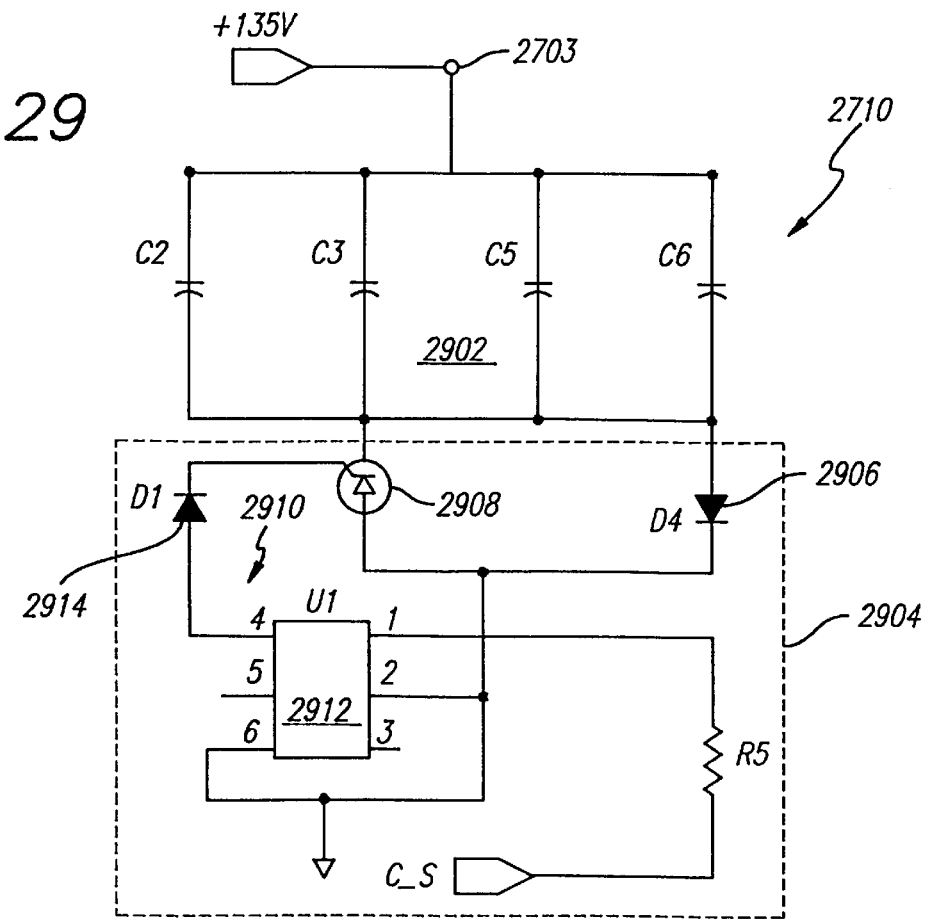
FIG. 29 is a schematic block diagram of a switched capacitor circuit suitable for use in power converter of FIG. 27.

Capacitance 2902, suitably comprising a plurality (e.g., 4) of capacitors connected in parallel, to provide a capacitance of predetermined value, e.g., approximately 700 microfarads per kilowatt for a three phase generator operating at in the range of from 200 to 500 Hz. In the embodiment of FIG. 29, capacitance 2902 is formed of a parallel combination of four 610 microfarad 200 volts rated capacitors for a four KW generator. In a one KW unit a single 640 microfarad capacitor is suitably employed.

Switching circuit 2904 may be any suitable circuit for providing a unidirectional charging path, and a switched (controlled) unidirectional (opposite polarity) discharge path. For example, switching circuit 2904 suitably comprises a diode 2906, a switching device (e.g., SCR) 2908, and a driver circuit 2910. Driver circuit 2910 suitably includes an opto-isolator (e.g., a WCP3911) 2912 and a diode 2914.

Diode 2906 provides a unidirectional charging path from high side juncture 2703 (e.g., from the positive rail) through capacitance 2902 to ground. Thus, capacitance 2902 will accept a charge whenever the voltage across the capacitance 2902 is less than the voltage at juncture 2703 (e.g., generated by inverter rail generator 540 at rail 542). The capacitance will therefore charge, for example, during the dead time (periods between output pulses when none of power switches 2702–2708 are conductive. The inverter rail signal, is, in effect, a fall wave rectified signal combining the outputs of all of the respective phases of the alternator (stator) coils associated with the inverter rail. Preferably, the coils are configured in a multi-phase, e.g., three-phase, arrangement; a three-phase network generates considerably more energy than would a single phase system.

Switching device (e.g., SCR) 2908, in response to the Cap__Switch control signal generated by controller 22, controllably discharges capacitance 2902 through the current paths provided by the actuated power switch circuits set of 2702–2708. SCR 2908 will commutate off when the voltage Vcap across the capacitance 2902 drops below the voltage at juncture 2703 (e.g., the generated by inverter rail generator 540 at rail 542).

Figure 28:
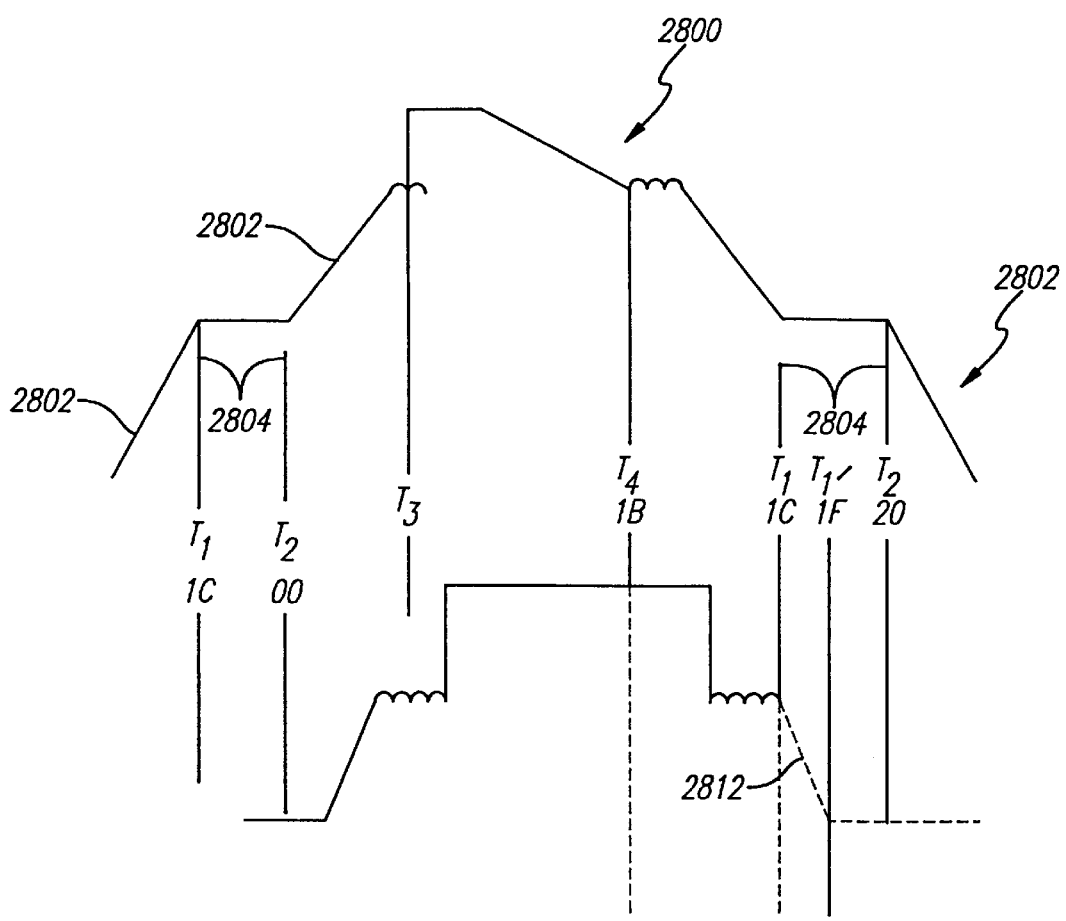
FIG. 28 is an illustration of a sine wave generated by the power converter of FIG. 27.

Referring now to FIGS. 27, 28 and 29, a simulated sine wave voltage waveform 2800 is generated by selectively actuating and deactuating power switch circuits 2702–2708 to controllably connect terminals L1 and L2 to a DC source, and capacitive switch circuit 2710 to selectively vary the source voltage. More specifically, respective pulses 2802 (only one shown in entirety) of alternating polarity are generated, with an intervening dead time 2804.

Each cycle thus includes a first pulse 2802 of one polarity, an intervening dead time 2804, and a second pulse 2802 of the opposite polarity. Dead time 2804 extends from the trailing edge of the first pulse, at time T1, to the leading edge of the next successive pulse at time T2. At time T2 during each half cycle, the associated set of high side and low side power circuits (e.g., 2702 and 2708 or 2704 and 2706), are rendered conductive to effectively connect one of terminals L1, L2, to the high potential (uncture 2703) and the other to common (juncture 2707). At this point in the cycle, switching circuit 2904, is, in effect, nonconductive, so that capacitance 2902 is effectively out of the operative circuit (and charging through diode 2906) i.e., capacitance 2902 is not within a complete current path relative to the high side terminal. Accordingly, the signal provided across output signals L1 and L2 is effectively the raw output of inverter rail generator 540, i.e., a full wave rectified signal combining the outputs of the respective phases. The impedance apparent to the output terminals is effectively that of the alternator coils, e.g., an inductor at high frequency, e.g., 360 Hz. Accordingly, the rising edge of voltage pulse 2802 is sloped, generally analogous to the rising edge of a true sine wave, as opposed to the abrupt rising edge of a square wave.

At time T3, switching device 2908 is rendered conductive, effectively providing a discharge current path through high side juncture 2703, and the operative high side power switching circuit (2702 or 2704) to the high side terminal, e.g., L1. The high side terminal, is thus driven to the capacitor voltage.

After a predetermined time period, i.e., at time T4, switching device 2908 is rendered nonconductive, effectively removing capacitance 2902 from the operative circuit that of a true sine wave is generated. At time T1 (occurring at the zero crossing of the voltage), the operative power switch circuits are rendered nonconductive to provide a predetermined dead time 2804. As will be hereinafter described, the operative low side power switch (2706 or 2708) can be rendered nonconductive slightly after (at time T1') the operative high side power switch circuit (2702 or 2704), to accommodate lagging currents caused by highly inductive loads such as motors.

More specifically, when terminals L1 and L2 are presented with a significantly inductive load, such as an induction motor of the type typically found in many tools and appliances, the current wave form tends to lag the voltage wave form. The phase differential may be as much as 30 degrees. However, since switching in power switch circuits 2702-2708 are typically effected in accordance with the voltage wave form, i.e., rendered non-conductive at time T1, corresponding to a zero crossing in the voltage wave form, in the absence of special provisions, the portion of the lagging current wave form occurring after time T1 is effectively lost. Thus, since the torque generated in the induction motor depends upon current flow, the torque generated by the motor is decreased.

Accordingly, lagging currents caused by inductive loads are accommodated by providing a path for the current flow occurring after the zero crossing in the voltage waveform. This is accomplished by maintaining the low side power switching circuit 2706 or 2708 conductive for a predetermined period (e.g., ³⁄₃₂nds of the half cycle of the output signal) after the operative high side power switching circuit 2702 or 2704, is turned off. More specifically, the operative high side switching circuit, 2702 or 2704, is rendered non-conductive at time T1. This effectively breaks the current path to the high side output terminal L1 or L2, creating the dead time 2804 in the voltage wave form. However, the current path through the low side power switching circuit 2706 or 2708, is maintained for an additional period of time, resulting in a continued flow of current after time T1, generally indicated as 2812.

Figure 30:
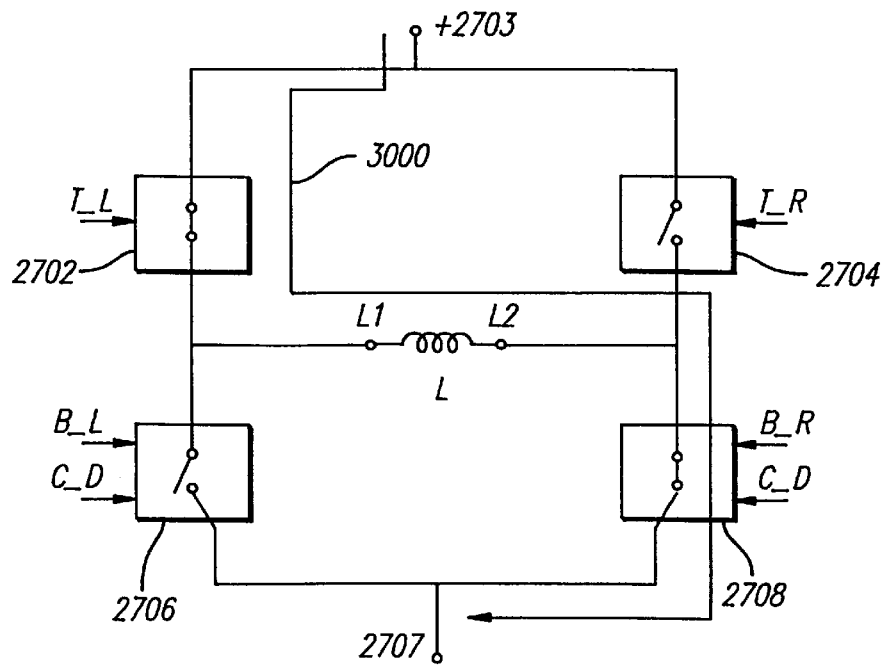
FIGS. 30 and 31 are schematic illustrations of power converter 2700 illustrating accommodation of lagging currents caused by inductive load.
Figure 31:
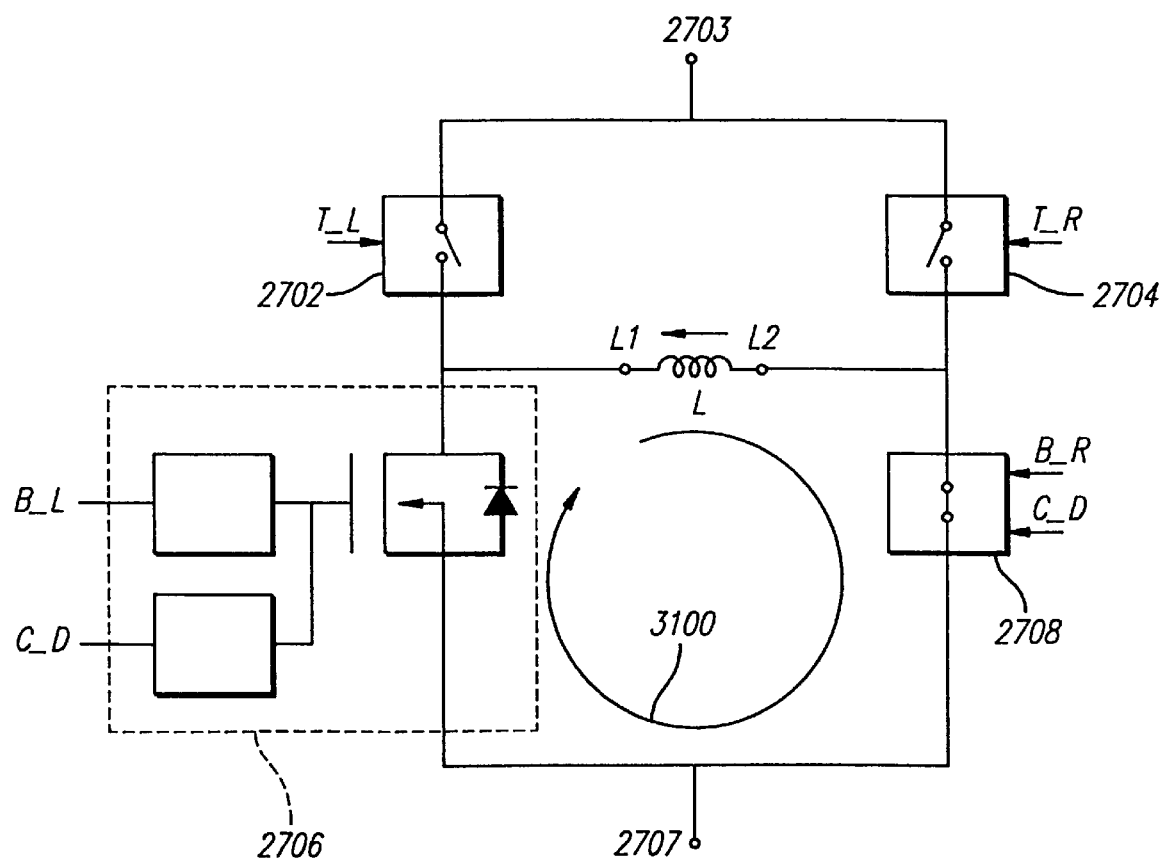

Referring now to FIGS. 30 and 31, during the positive pulse, i.e., between times T2 and T1, a current path, generally indicated as 3000, is effected from high side juncture 2703 through power switch circuit 2702 to output terminal L1, through the inductive load (L) to output terminal L2, through low side switching circuit 2708 to low side juncture 2707. At time T1, power switch circuit 2702 is rendered non-conductive, effectively isolating output terminals L1 and L2 from high side juncture 2703. However, the current path through power switch circuit 2708 remains conductive. As previously noted, power switching circuits 2702-2708 suitably employ power MOSFET's. Conventional power MOSFET's typically include an inherent high speed rectifier (diode). Where other types of switching devices are employed, a separate diode may be utilized. Such diode provides a return current path from low side juncture 2707 to high side output terminal L1, providing for a recirculating current, generally indicated as 3100 thus, current flow through inductive load L is not cut off at time T1 (the zero crossing in the voltage wave form), and full advantage of the current is attained.

As previously noted, rapid changes in load, such as the introduction of a cold incandescent lamp into the system, e.g., an incandescent lamp is plugged in, causes a current surge. It is desirable to avoid damage to components by prolonged exposure to such current surge, without use of components with significantly increased power ratings over those necessary to accommodate normal operational levels. This may be accomplished by sensing over current conditions, and responsively effecting a predetermined recovery mode operation. During the recovery mode operation the output voltage is decreased to a relatively low level, then gradually increased to desired operational levels. The decrease, and subsequent increase in voltage can be effected through various mechanisms such as, for example, varying the engine throttle setting to control rotor rpm, and thus rail voltage, modulating the signal on the DC rail (e.g., pulse width modulation or pulse population modulation) through selective actuation of the switching devices in the rail generator, or a combination of both. The choice of mechanism for controlling the voltage is a function of, for example, the reaction time of the overall mechanical system, and in particular, the engine, and expense.

In any event, it is desirable that the voltage be reduced quickly upon detection of an impending over current condition. However, in a circuit employing a capacitive boost mechanism, such as that described in conjunction with FIGS. 27–29, the charge present on the capacitor tends to prevent immediate changes in output voltage. Thus, if the capacitor is to be employed during the recovery cycle, the accumulated charge on the capacitor (e.g., 135 volts) must be at least partially discharged, to bring it to the desired recovery starting voltage, e.g., 30 volts.

Selective discharge of the capacitance can be effected in any manner capable of discharging the capacitor to the desired level, in response to a control signal from controller 22, preferably within a half cycle of the AC output, and without generating more heat than can be dissipated. This can be effected by providing a controlled discharge path utilizing a relatively large resistance and an additional power switch capable of accommodating the discharge from the capacitor. This, however, adds cost, and complexity to the circuit.

An alternative approach to discharging the capacitor is to create a resistive discharge path through the power switching devices; one or both of the power switches are rendered only partially conductive, e.g., operating in a linear operation mode, to thus present a resistance in the discharge path. To effect such a dump, at least one, and preferably both (for simplicity of control), of the high side switches is rendered fully conductive, and, at least one, preferably both of the low side power switching circuits are rendered partially conductive, e.g., the power switching devices biased into a linear operation mode. More specifically, referring to FIG. 32, the low side power switching circuits 2706, 2708, each suitably comprise: a switching device 3200, (analogous to switching device Q3 (Q4) of low side switching circuit 2106 (2108) of FIG. 21), suitably a plurality of MOSFET's in parallel; a full conduction driver circuit 3202 responsive to the Bottom_Left (B_L) (Bottom_Right (B_R)) control signal from controller 22, (analogous to R17, R27, and Q7 of low side power switching circuit 2106 (2108) of FIG. 21); and a partial conduction driver circuit 3204 responsive to a Cap_Dump control signal (C_D).

Driver circuit 3202 suitably comprises a transistor Q13 and respective resistors R13 and R28. When control signal B_L is in actuated state, i.e., low, transistor Q13 is rendered nonconductive, causing a positive voltage to be applied to the base of MOSFET's 3200 and rendering them conductive.

Driver 3204, on the other hand, is responsive to control signal Cap_Dump (C_D) from controller 22. Driver 3204 suitably comprises a transistor Q18 and respective resistors R22 and R20. The Cap_Dump signal, when active, is high level, rendering transistor Q18 conductive. This creates a voltage at the gate of MOSFET's 3200 in accordance with the ratio of the resistances of R13 and R20. The ratio of resistances is chosen to generate a voltage at the gate of transistors 3200 to render the FETs only partially conductive, e.g., in linear operational mode. In such a partially conductive mode, FETs 3200 manifest a resistance in accordance with the level of voltage at the gate. The level of voltage at the gate is chosen to achieve a desired balance between the time necessary to discharge capacitance 2902, and heat generated that must be dissipated by the components.

As previously noted, potential damage to components caused by current surges due to, for example, variations in load, can be avoided by: sensing an impending over-current condition; decreasing the system output by a predetermined amount or to a predetermined level; then gradually increasing the output to bring the system back to desired operating conditions. Such control can be effected by, for example, varying the throttle setting to adjust rotor speed, controlling the DC rail level, or a combination of both. This approach is particularly advantageous in applications where loads comprise incandescent lamps; load resistance decreases as the filament is heated by the lower level current. Likewise, such approach is particularly advantageous in applications where the load is an electric motor driving a compressor, as in an air conditioner, particularly if the inverter output frequency is also decreased during recovery.

Figure 39:
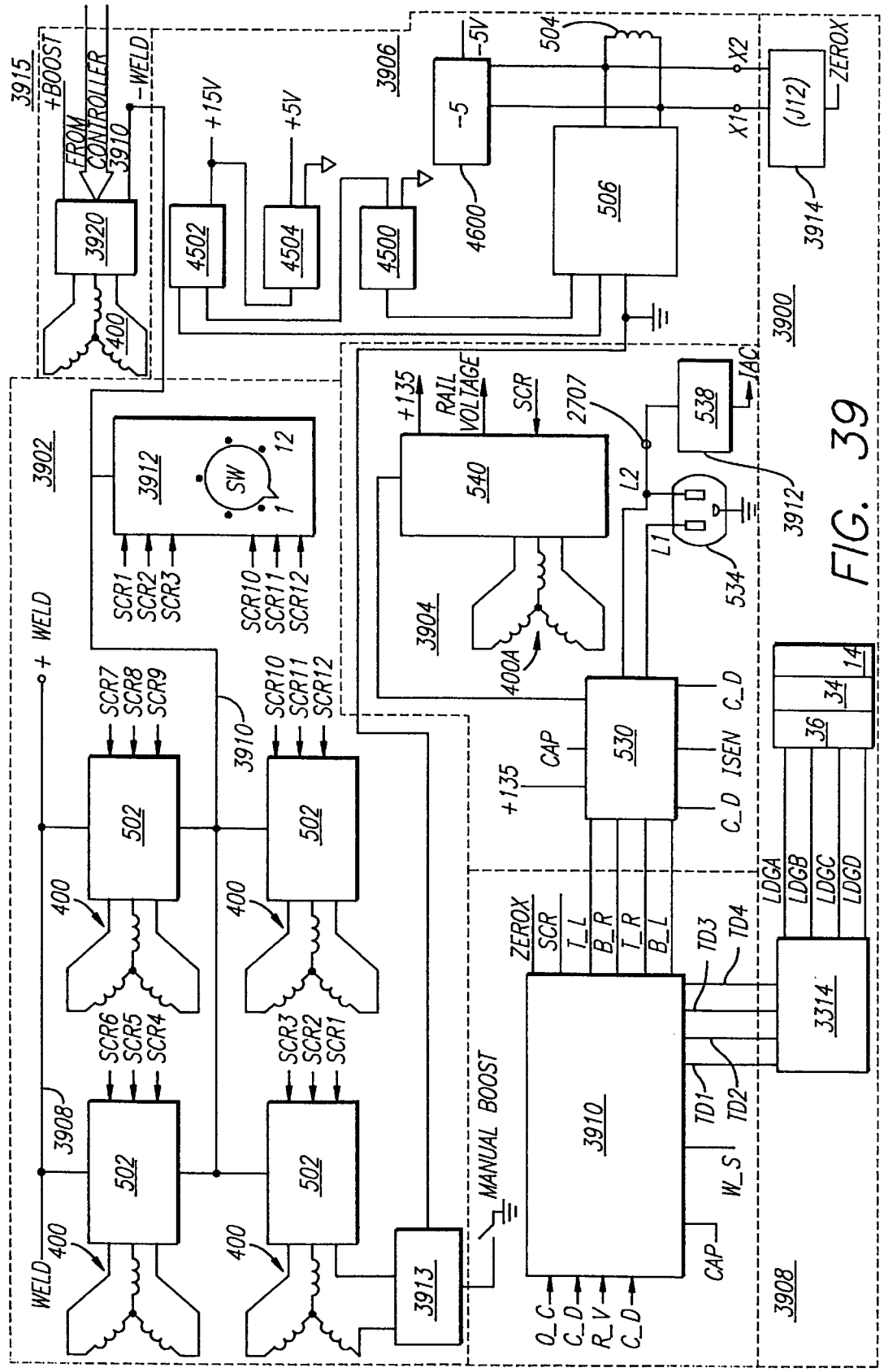
FIG. 39 is a block schematic diagram of a multipurpose system for providing a relatively high voltage, low current AC signal suitable for powering lighting and appliances, a relatively high output current suitable for battery charging and starting vehicles, and an output suitable for arc welding.

Certain synergies can be obtained in a multi-purpose system specifically adapted to provide: a relatively high voltage, low current AC signal suitable for powering lighting, conventional appliances and tools; a relatively high current output suitable for battery charging; and an output suitable for arc welding. Referring now to FIG. 39, such a multi-purpose system 3900, suitably comprises: a first portion 3902 for generating the welding output signal at rail 3908; a power converter (e.g., inverter) section 3904 for generating the AC output signal (simulated sine wave) at an outlet 534; a regulated supply section 3906, for generating respective stable voltages for use by the various components of the system; a throttle control section 3908; and a controller 22. If desired, system 3900 may also include an additional section 3915 for generating, e.g., a battery charging "boost" signal.

Welder output generating section 3902 suitably comprises a predetermined number, e.g., four (4) of winding groups 400; associated controlled bridges 502; a welder control unit 3909 (which may be integral to controller 22) and a current sensor 3913 cooperating with one or more of windings 400, for generating a signal, Weld_Sense, indicative of welding operations.

Power converter section 3904 suitably includes: a power converter 530; an inverter rail generator 540; a conventional outlet 534; and a suitable current sensor 3912. Power converter 530, in response to the control signals from controller 22 generates a simulated sine wave at outlet 534.

Regulated supply section 3906 suitably comprises a single phase control winding 504 and cooperating single phase rectifier 506 (corresponding to coil 504 and rectifier 506 in FIG. 5); a voltage sensor 4500; a conventional 15 volt regulator 4502; a conventional 5 volt regulator 4504; and a negative 5 volt generator circuit 4600.

Throttle control section 3908 suitably comprises a throttle driver circuit 3314, preferably of the type described in conjunction with FIG. 34, cooperating with a suitable throttle control mechanism 36, preferably of the type described in conjunction with FIGS. 33 and 35–38.

In general, a welder generates an open circuit voltage e.g., 80 VDC, considerably in excess of that (e.g., 20 VDC) than can safely be employed for battery charging with out risk of damage to electronic equipment, such as ignitions, microprocessors in emission control systems, etc. Accordingly, referring briefly to FIGS. 39 and 60, battery charging section 3915 suitably comprises a separate group of multi-phase (e.g., 3-phase) windings 400, and multi-phase rectifier 3920 (e.g., diode bridge) to generate appropriate voltage levels.

Figure 60:
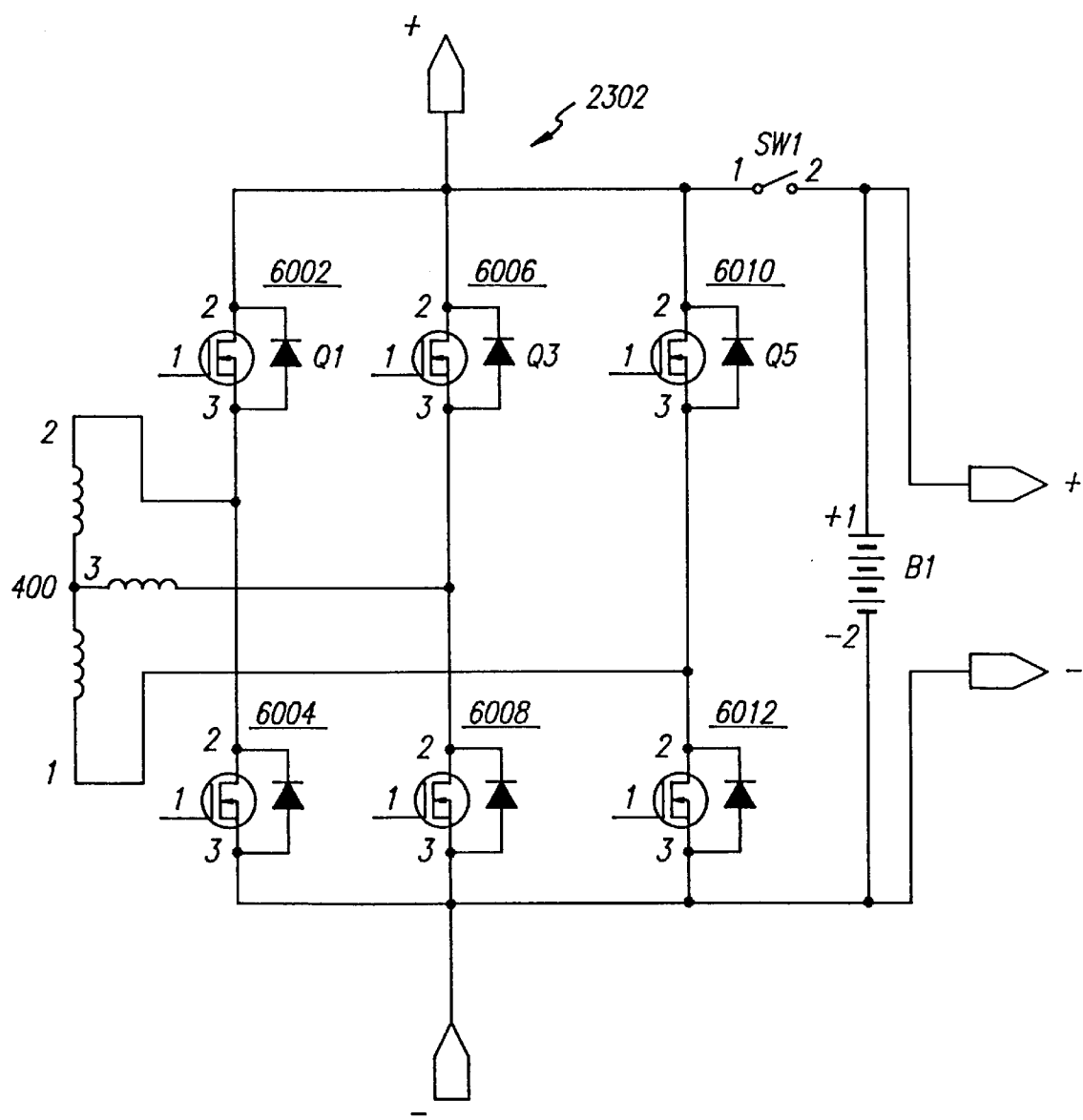
FIG. 60 is a block schematic diagram of a combination starter, battery charger suitable for use in the system of FIG. 39.

As best seen in FIG. 60, rectifier 3920 is suitably formed using six switching devices, preferably power MOSFET's 6002–6012 cooperating with 3-phase coil group 400 on stator 18 of generator 16. If desired, a suitable battery B1 can be added across rectifier 3920 to provide an electric start capability.

As previously noted, and as illustrated in FIG. 60, conventional MOSFET devices typically include a parasitic reverse current diode. Such diodes in effect form a three-phase, full wave bridge rectifier to recharge battery B1 from current induced in coils 400 once engine is running.

As apparent from FIG. 60, coils 400, in effect, cooperate with rotor 20 of generator 16 as a three-phase brushless starting motor (starter). Switches 6002–6012, under control of microprocessor 2910, in a manner generally analogous to the control of power converter 530, are selectively activated to create a six-step three-phase output to winding 400 from battery B1. The signals through coils 400 magnetically interact with rotor 18 (FIG. 1), causing the engine shaft to rotate.

Figure 57:
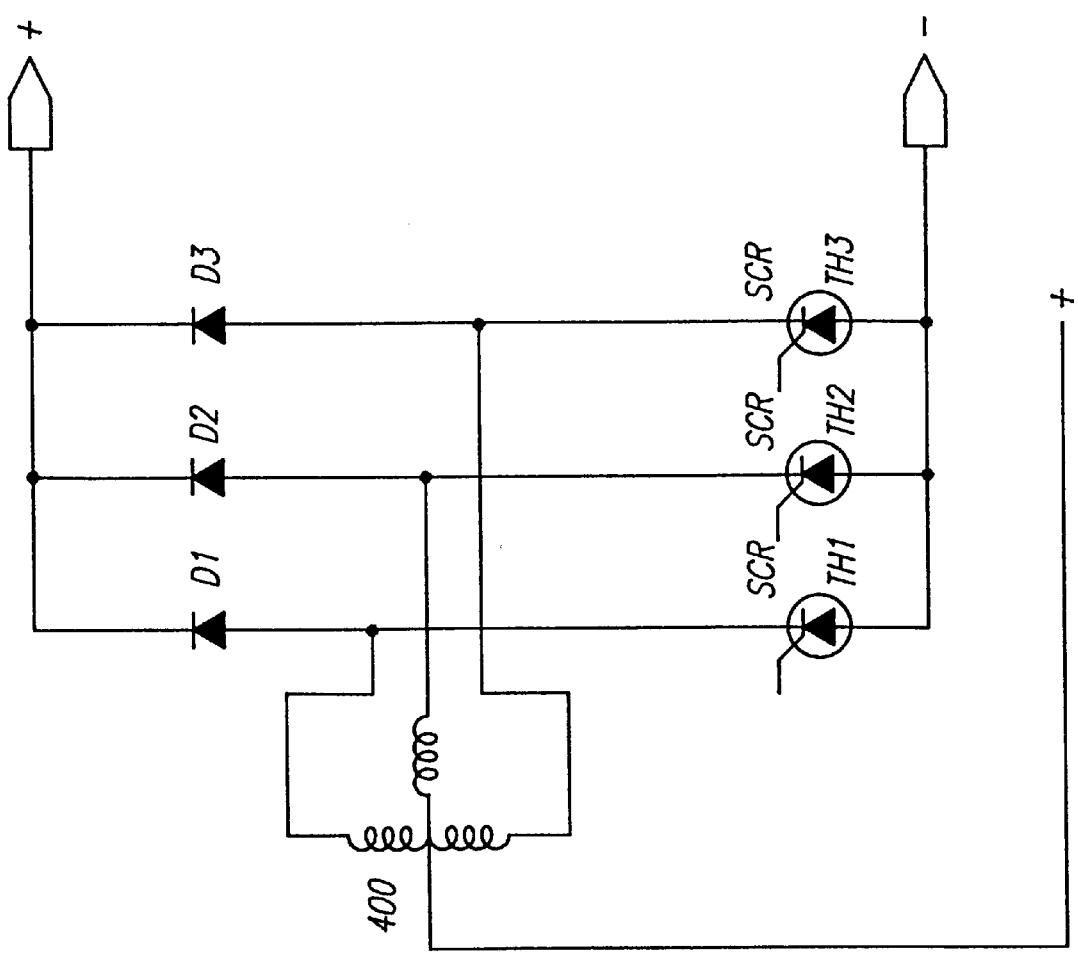
FIG. 57 is a schematic diagram of a circuit for generating a welding signal and battery charging signal from the same alternator winding.

Alternatively, the charger signal can be derived from the same coils that general signal. Referring briefly to FIG. 57, a half wave from the "star" of the three-phase welder windings. By adjusting the throttle setting to lower the speed of engine 14 to decrease the rail voltage to an appropriate level, and further controlling the firing angle of the rectifier SCR's, a relatively low voltage e.g., 20 VDC, high current signal appropriate for charging automotive batteries and starting vehicles is provided.

Referring again to FIG. 39, controller 22 is receptive of various input signals, e.g.,:

Rail Voltage, from rail generator 540, indicative of the magnitude of the inverter rail;

Over_Current, from current sensor 3912, indicative of over-current conditions in the AC output;

ZEROX, from zero crossing detector 3914, indicative of rotor (engine) speed; and Weld_Sense, from current sensor 3912 indicative of welding operations;

and generates suitable control signals, e.g.,:

SCR to inverter rail generator 540;

T_L, B_R, T_R, B_L, Cap_Dump_R, Cap_Dump_L and CAP to power converter 530;

TD1–TD4 to throttle control section 3908 and, if the function of controller 3909 is incorporated into controller 22, SCR1–SCR12 to bridges 502 in welder section 3902.

System 3900, in the absence of contrary indications, suitably operates in an inverter mode. During normal inverter mode operation, controller 22 suitably generates control signals SCR to inverter rail generator 540 to effect pulse population modulation control of the rail voltage, in accordance with signal Rail_Voltage, to maintain the inverter rail voltage at a predetermined value, e.g., 135 volts or 150 volts. Control signals T_L, B_R, T_R, B_L and CAP are generated to power converter 530 to effect generation of a simulated sine wave output signal at AC outlet 534. If an over-current condition is sensed, as indicated by signal Over_Current, power converter 530 is inhibited, a recovery mode operation is initiated. During recovery mode the rail voltage is lowered to a predetermined value, or by a predetermined amount, then power converter 530 reenabled and the rail voltage gradually increased to normal operating levels. Cap_Dump_R and/or Cap_Dump_L signals may be generated to dissipate the accumulated charge on the converter capacitor to facilitate a rapid initial decrease in rail voltage. Voltage control is suitably effected through pulse population modulation of the rail voltage, or by varying the throttle setting, or both. If a welding operation is sensed, as indicated by control signal Weld_Sense, normal inverter operation is, in effect, over-ridden. Depending upon the selected welder mode; signals are generated to throttle control 3908 to maintain the engine speed (as indicated by control signal ZEROX) at a predetermined constant value, e.g., 3600 rpm, or varied to maintain constant voltage and/or constant current (see Table 4).

As previously noted, power converter (e.g., inverter) section 3904 generates a simulated sine wave output signal at AC outlet 534. More specifically, winding groups 400 cooperate with controlled bridges 502 to supply respective DC signals on the DC rails. As previously described in connection with FIG. 5, rectifiers 502 provide a respective controlled current path associated with each winding. Control signals SCR1–SCR12 are suitably provided to bridges 502 by welder control unit 3912. Welder control unit 3912 may be an integral part of a common controller 22 (e.g., controller 3910) employed in connection with the various sections of the system, as was the case in the embodiment of FIG. 5. Alternatively, welder control unit 3912 can comprise a separate controller analogous to controller 22. For example, controller 3912 can be one of the various analog, or microprocessor based embodiments of control circuit described in parent application Ser. No. 08/370,577 now U.S. Pat. No. 5,625,276.

However, in the context of system 3900 if rotor speed is controlled during welding operations (maintained constant or used as the control variable to maintain constant current, and/or voltage), a simplified embodiment of welder control unit 3912 can be employed. As will be discussed, rotor speed control, e.g., constant rotor speed, can be effected through controllably adjusting the throttle setting. More specifically, a welder control unit 3912 can be utilized by which the respective SCR's are actuated in accordance with the setting of e.g., a rotary switch. For example, a driving voltage would be applied only to the selected SCR gates so that only the selected coils would be in the operative circuit. Controller 3912 (manual, analog, or microprocessor based) may also incorporate provisions for switching coils on a timed basis to facilitate heat distribution and noise control such as described in parent application Ser. No. 08/370,577.

Figure 43:
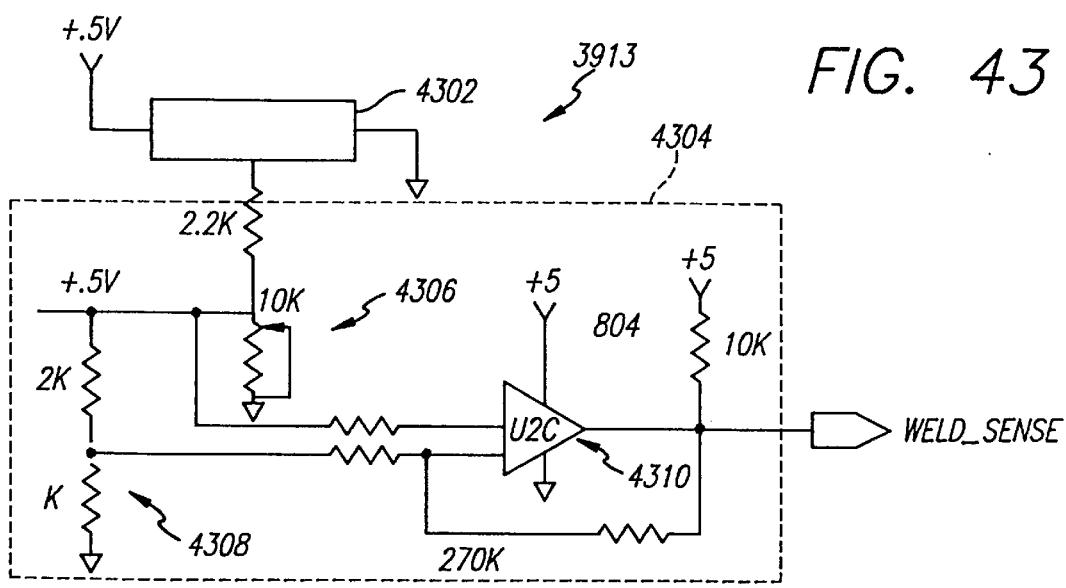
FIG. 43 is a current sensor suitable for sensing welding operations.

In system 3900, potential damage to components of converter 530 caused by current surges due to, for example, variations in load, are avoided by: sensing an impending overcurrent condition; decreasing the converter output by a predetermined amount or to a predetermined level; then gradually increasing the output to bring the converter back to desired operating conditions. In system 3900, such control is effected by, for example, varying the throttle setting to adjust rotor speed, controlling the DC rail level, or a combination of both. However, as will hereinafter be discussed, during welding operations, system 3900 maintains a constant predetermined rotor (engine) speed, e.g., 3600 rpm, employing controller 22 and throttle control section 3908. Accordingly, welding operation is sensed so that the control mode can be appropriately switched. To this end, current sensor 3913 generates a signal, Weld_Sense, for application to controller 22 indicative of welding operations, as reflected by current flow in any of one or more of windings 400 a suitable current sensor 3913 is illustrated in FIG. 43. If a particular winding is typically the first to be activated, and thus is always activated during generation of a welding output, sensor 3913 may detect current flow in that coil alone as indicia of welding operations. If the order of winding actuation is varied to facilitate heat distribution and/or noise control, welding operation would preferably be detected by sensing current flow in any of those windings 400 that might be first actuated.

In the embodiment of FIG. 39, a zero crossing detector 3914, in cooperation with a control winding 504 (as previously described in conjunction with FIGS. 5 and 6) is employed to generate a signal, ZEROX, indicative of the speed (and rotational phase) of the rotor (e.g., engine speed).

Regulated supply section 3906 generates respective stable voltages for use by the various components of the system and may comprise any circuit capable of generating such stable voltages. Preferably, such signals are derived from control winding 504. For example, with reference to FIG. 39, regulated supply section 3906 suitably comprises single phase control winding 504 and cooperating single phase regulator 506 (corresponding to coil 504 and rectifier 506 in FIG. 5), a conventional 15 volt regulator 4502; a conventional 5 volt regulator 4504, and a negative 5 volt generator circuit 4600.

Figure 44A:
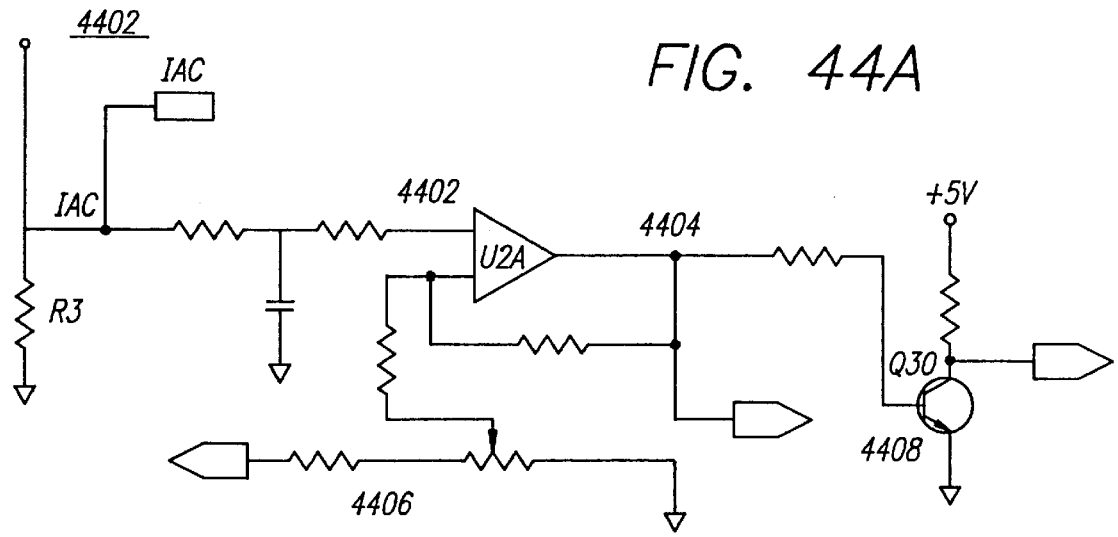
FIG. 44A is a suitable current sensor for use in the system of FIG. 39.
Figure 44B:
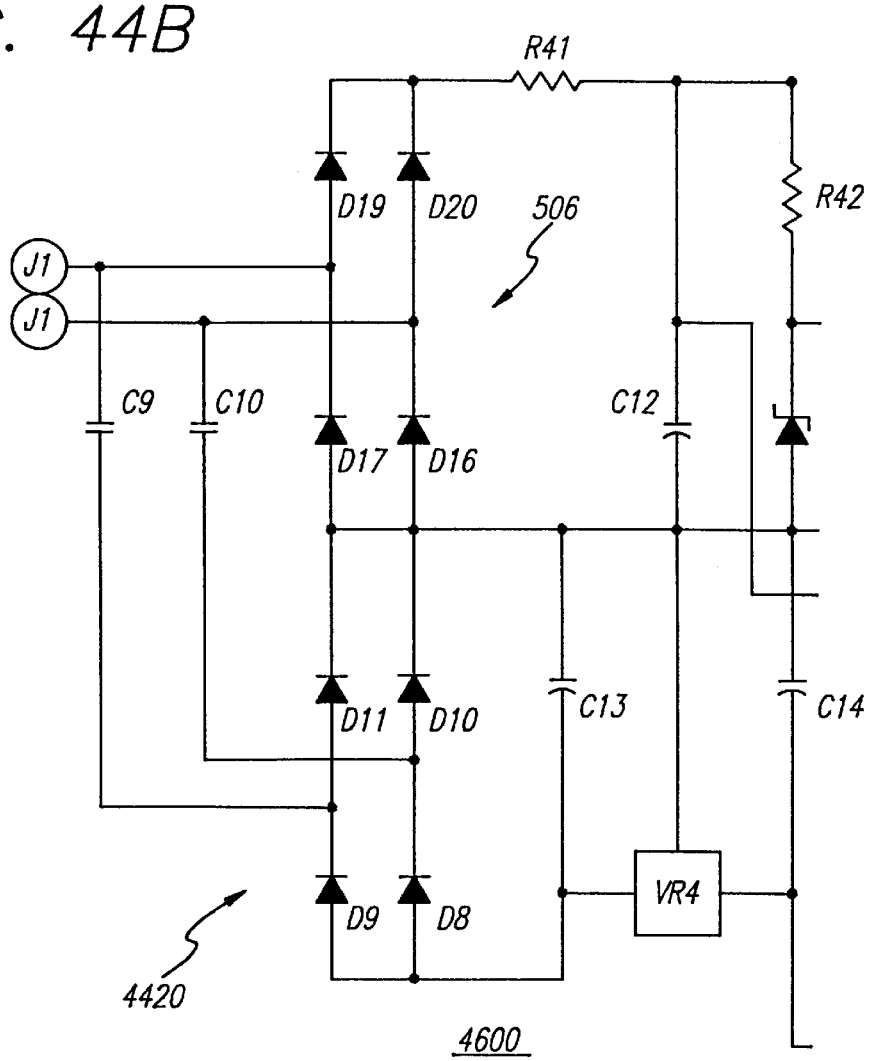
FIG. 44B is a block schematic of a suitable negative voltage supply.

A suitable negative 5 volt generator 4600 is illustrated in FIG. 44B. A pair of capacitors C9 and C10, in effect decouple a second diode bridge 4420, which supplies a voltage to a charge pump capacitor C13. The negative side of capacitor C13 is applied to a voltage regulator device VR4.

Figure 45:
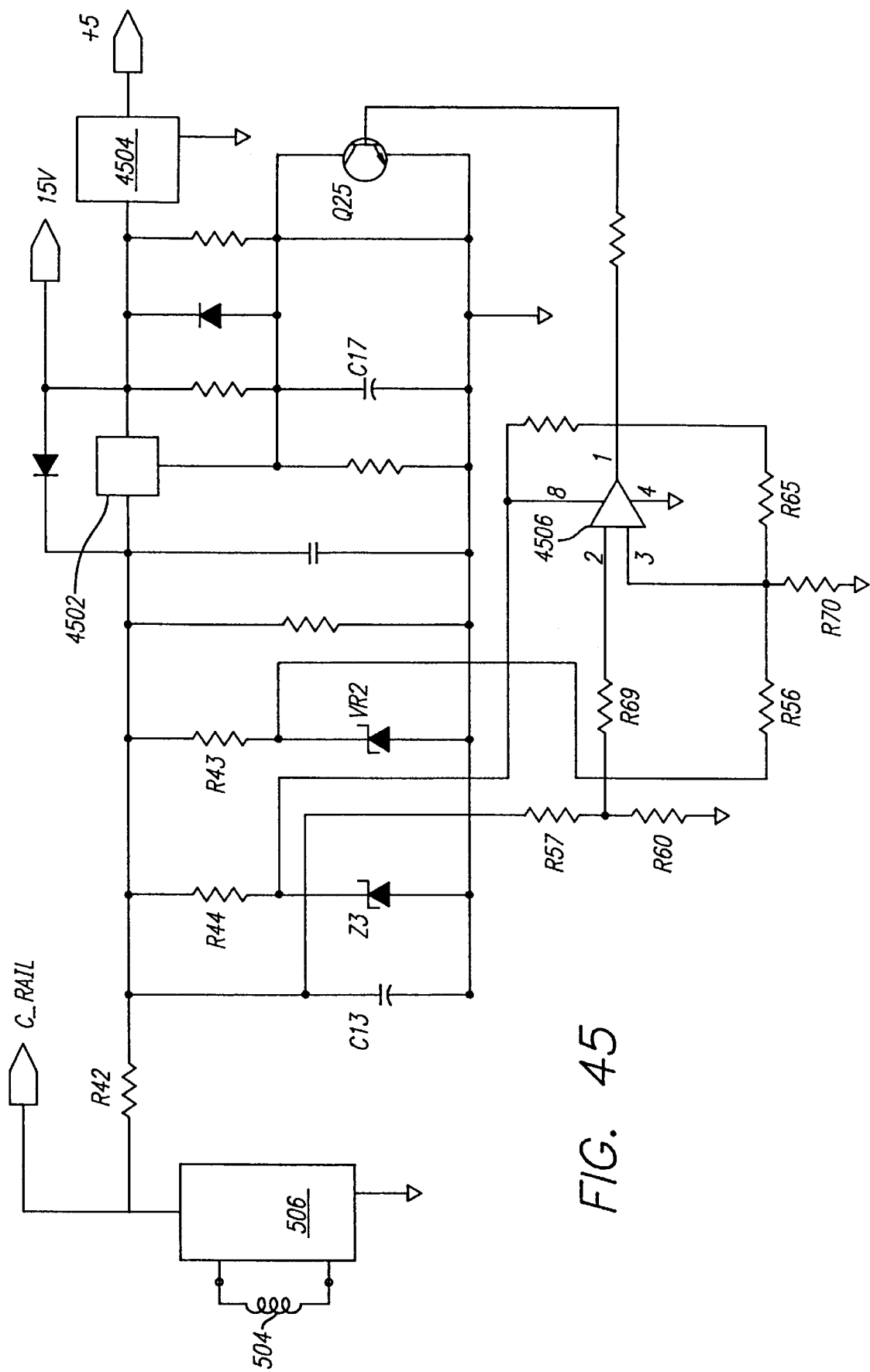
FIG. 45 is a block schematic of a suitable voltage sensor for inhibiting premature operation of the system.

Operation of various components of system 3900 (such as, for example, the MOSFET's of convertor 530) with supply voltages below a predetermined minimum, is potentially damaging to those components. Accordingly, referring again to FIG. 39, it is desirable that operation be inhibited until the supply voltages reach a predetermined level since the voltages are generated by interaction of the rotor with winding 504, supply voltages below the safe level are of concern at particularly low engine speeds. Accordingly, voltage sensor 4500 is employed to sense the voltage generated by bridge 506, and, in effect, inhibit the operation of the system until an operating system that is safe for the various components of the system is attained. For example, voltage sensor 4500 may be a circuit analogous to current sensor 3912, comparing a voltage indicative of the operative rectifier 506 against a reference for generating a control signal for use in the same manner as the Over_Current signal, to inhibit operation of convertor 530. Alternatively, voltage sensor 4500 can be employed to maintain the outputs of voltage regulators 4502 and 4504 at zero until an appropriate output from coil 504 is reached. More specifically, referring now to FIGS. 39 and 45, voltage sensor 4500 suitably comprises a comparator 4506 and Zener diode VR2, a voltage divider network comprising resistors R42, R57, R60 and R69, and a transistor Q25.

The voltage supply input of comparator 4506 (pin 8) Zener diode Z3, in effect, provides a 15 volt supply for comparator 4506. The inverting input (e.g., pin 2) of comparator 4506 is receptive of a signal indicative of the output of rectifier 506, in effect, a raw unfiltered voltage from rectifier 506. The non-inverting input (pin 3) of comparator 4506 is receptive of a signal indicative of a predetermined reference voltage (e.g., 6.9 volts) generated by Zener diode VR2. More specifically, the 6.9 reference voltage is divided down by the voltage divider network comprising resistors R56, R70, and R65.

When transistor Q25 is conductive, voltage regulator 4502 is effectively grounded, and thus inhibited. Transistor Q25 is initially on, deriving a base signal from Zener diode Z3. However, when the output voltage of rectifier 506 reaches a predetermined level (e.g., 10.5 volts) comparator 4506 goes low, in effect, connecting the base of transistor Q25 to ground, and rendering transistor Q25 non-conductive. This, in turn, enables a 15 volt regulator 4502 which, in turn, provides a drive signal to 5 volt regulator 4504. Thus, supply voltages to the components are inhibited, until a safe operating level is attained.

Referring again to FIG. 39, power converter section 3904 suitably includes: a power converter 530; an inverter rail generator 540; a conventional outlet 534; and a suitable current sensor 3912. Power converter 530, in response to the control signals from controller 22 generates a simulated sine wave at outlet 534.

Current sensor 3912 may be any circuit capable of generating the Over_Current signal, indicative of sustained current flow in excess of a predetermined maximum, such as would be caused by a sudden change in load. Preferably, when the integral of current flow exceeds the predetermined maximum, (i.e., an over-current condition is sensed) the Over_Current signal is driven low, i.e., connected to ground. For example, referring briefly to FIG. 25, current sensor 3912 may comprise a current sensing amplifier 2510 comprising resistor R3, and an amplifier including a transistor Q13. Resistor R3 develops a voltage indicative of the AC output current, which is integrated by capacitors C15 and C24. If the voltage accumulated in capacitors C15 and C24 exceeds a predetermined limit, transistor Q13 is rendered conductive, effectively pulling the Over_Current signal to ground. As will be explained, the Over_Current signal is applied as a gating control to controller 22.

Alternatively, referring to FIG. 44A, current sensor 3912 may comprise a circuit 4400 comprising a filter circuit 4402, comparator 4404, a voltage divider 4406 for generating a reference signal, and a transistor 4408. Voltage IAC, indicative of the level of the current output of converter 530 is filtered by filter 4402 and applied to the positive input of comparator 4404. The inverting input of comparator 4404 is receptive of a reference signal generated by voltage divider 4406 (e.g., 6.9 volts). When IAC exceeds the reference voltage, indicative of a current in excess of a predetermined level a positive output is generated by comparator 4404, rendering transistor Q30 conductive. When transistor Q30 is rendered conductive, Over_Current is pulled to ground.

Once more referring to FIG. 39, power converter 530, may be any circuit capable of selectively applying DC voltage(s) to terminals L1 and L2 of outlet 534 in response to switching control signals from controller 22 (e.g., T_L, B_L, T_R, and B_R and further control signals Cap, Cap_Dump_R and Cap_Dump_L, if utilized), to generate output signal 532 with a predetermined waveform. In the embodiment of FIG. 39, power converter 530 is preferably a switched capacitor converter 2700 (FIG. 27).

Figure 40:
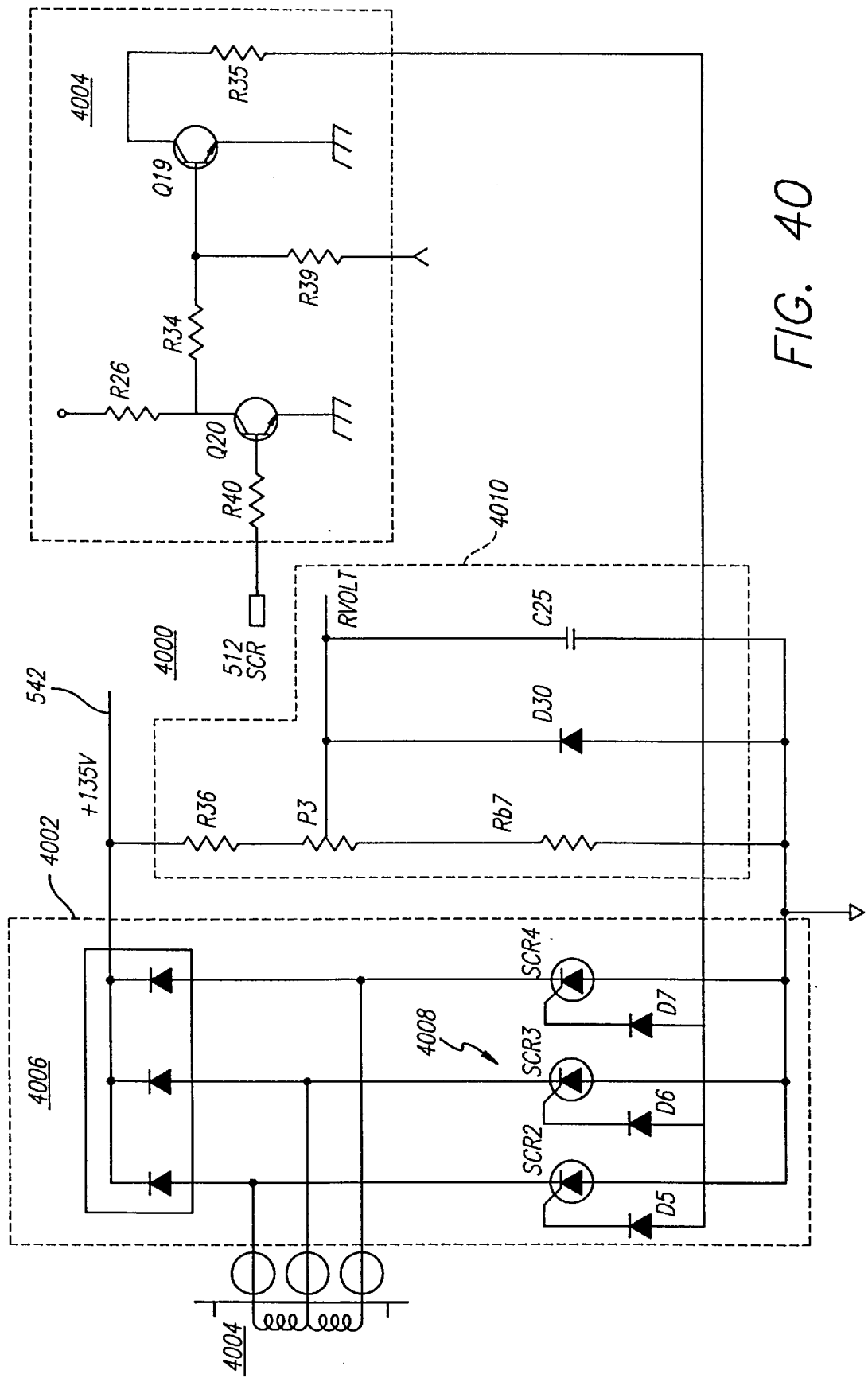
FIG. 40 is a schematic diagram of an inverter rail generator suitable for the system of FIG. 39.

Inverter rail generator 540 may be any circuit capable of providing a suitable DC rail signal to power converter 530 (e.g., 135 VDC). For example, inverter rail generator 540 maybe of the type described in conjunction with FIG. 5. In the embodiment of FIG. 39, which, as will be discussed, employs throttle control as one mechanism for maintaining output voltage within limits, inverter rail generator 540 preferably employs a single three-phase winding group 400A, and cooperating three-phase controlled bridge responsive to a single control signal (SCR) provided by controller 22. More specifically, referring briefly to FIG. 40, in the embodiment of FIG. 39, inverter rail generator 540 suitably comprises a simplified inverter rail generator 4000 comprising a single three-phase winding group 400A, cooperating with a three-phase controlled rectifier bridge 4002, and a level shifting control circuit 4004. Bridge 4002 suitably comprises a three-diode block 4006, and a set of three associated SCR's, 4008. The anodes of diodes 4006 are connected to the respective windings of winding group of 400A, and the cathodes are tied in common to an inverter rail 542. The cathodes of SCR's 4008 are connected to windings 400A and the anodes connected to system ground. The gates of SCR's 4008 are tied through respective diodes D5, D6 and D7 to level shift control circuit 4004. Diodes D5, D6 and D7 provide isolation between the respective SCR's, preventing the firing of one SCR from feeding back and firing the other SCR's.

Level shift control circuit 4004 suitably comprises a PNP transistor Q19 and NPN transistor Q20, and respective resistors R26, R34, R35, R39 and R40. The base of NPN transistor Q20 is responsive to control signal SCR from controller 22. Resistors R26, R34 and R39 cooperate as a voltage divider between +5 and −5 volts. The collector of transistor Q20 is connected to the juncture between resistors R26 and R34. The base of PNP transistor Q19 is connected to the juncture of resistors R34 and R39. When control signal SCR is applied, NPN transistor Q20 is rendered conductive, in effect pulling the juncture of resistors R26 and R34 to ground potential. This causes a predetermined negative voltage, e.g., 1.2 volts, to be applied at the base of PNP transistor Q19, turning on the transistor. When transistor Q19 is rendered conductive, current flows from ground through transistor Q19, resistor R35, and isolation diodes D5, D6, and D7 respectively, causing SCR's 4008 to fire. So long as PNP transistor Q19 is conductive, current is injected into the control electrode (gate) of the SCR's. Control signal SCR is suitably a relatively short duration pulse, asynchronous (random) relative to the 3-phase signal from stator windings 400A. Preferably the duration of control signal SCR is just sufficient to reliably fire the SCR (e.g., in the range of 5–50 $\mu$seconds, and typically in the range of 20–50 $\mu$seconds depending upon the sensitivity of the SCR). In response to application of control signal SCR, causing negative current to be applied to the gates of each of SCR's 4008, the most negatively biased SCR (corresponding to the most negative phase) is rendered conductive. The SCR remains conductive until commutated off by the voltage of the particular phase of the input signal associated with the SCR. Generally, control signal SCR is sufficiently short, and the phases such, that only a single output pulse is provided at rail 542 per control signal SCR. Accordingly, by varying the number of times the SCR control signal is generated during a given period of time, the pulse population (number of pulses during the period) of the output pulses, and hence the average voltage on inverter rail 542, can be modulated (controlled). This approach permits a wide range of voltages to be generated, and facilitates assuming a low voltage during the over current recovery mode of operation, permitting generation of a voltage ramp from as low as, for example, 15 volts up to full voltage.

Inverter rail generator 4000 preferably also includes a level shifting circuit 4010 (voltage divider and filter) to provide a signal, Rail_Voltage for application to controller 22, indicative of the magnitude of rail voltage within a predetermined range of voltages that can be accommodated by the components of controller 22. Circuit 4010 suitably comprises respective resistors R36 and R67, a suitable potentiometer P3, a Zener diode D30, and a capacitor C25. Zener D30 prevents the signal to controller 22 from exceeding safe limits. Capacitor C25 operates as a filter.

In the embodiment of FIG. 39, controller 22 may be any circuit capable of responding to the various input signals (e.g., ZEROX indicative of rotor (engine) speed; Over_Current, indicative of over-current conditions: Weld_Sense, indicative of welding operations; and Rail_Voltage, indicative of the magnitude of the inverter rail), and generating suitable control signals for inverter rail generator 540 (e.g., control signal SCR), power converter 530 (e.g., T_L, B_R, T_R, B_L, Cap_Dump_L, Cap_Dump_R, CAP), throttle control section 3908 (e.g., TD1–TD4) and, if desired (if controller 3912 is incorporated into controller 22), bridges 502 in welder section 3902 (SCR1–SCR12).

Figure 41A:
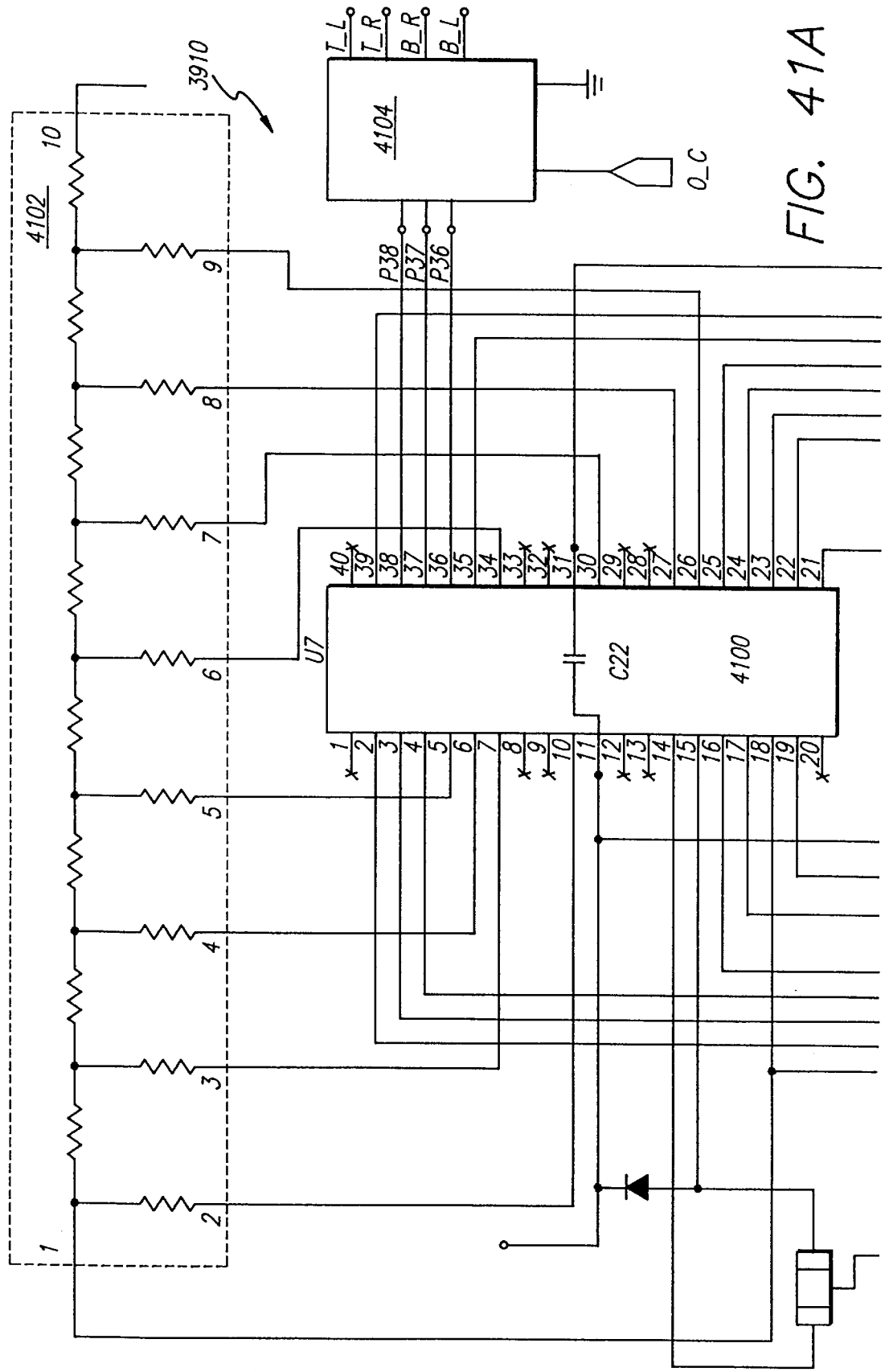
FIG. 41 is a block schematic of a controller suitable for the system of FIG. 39.
Figure 41B:
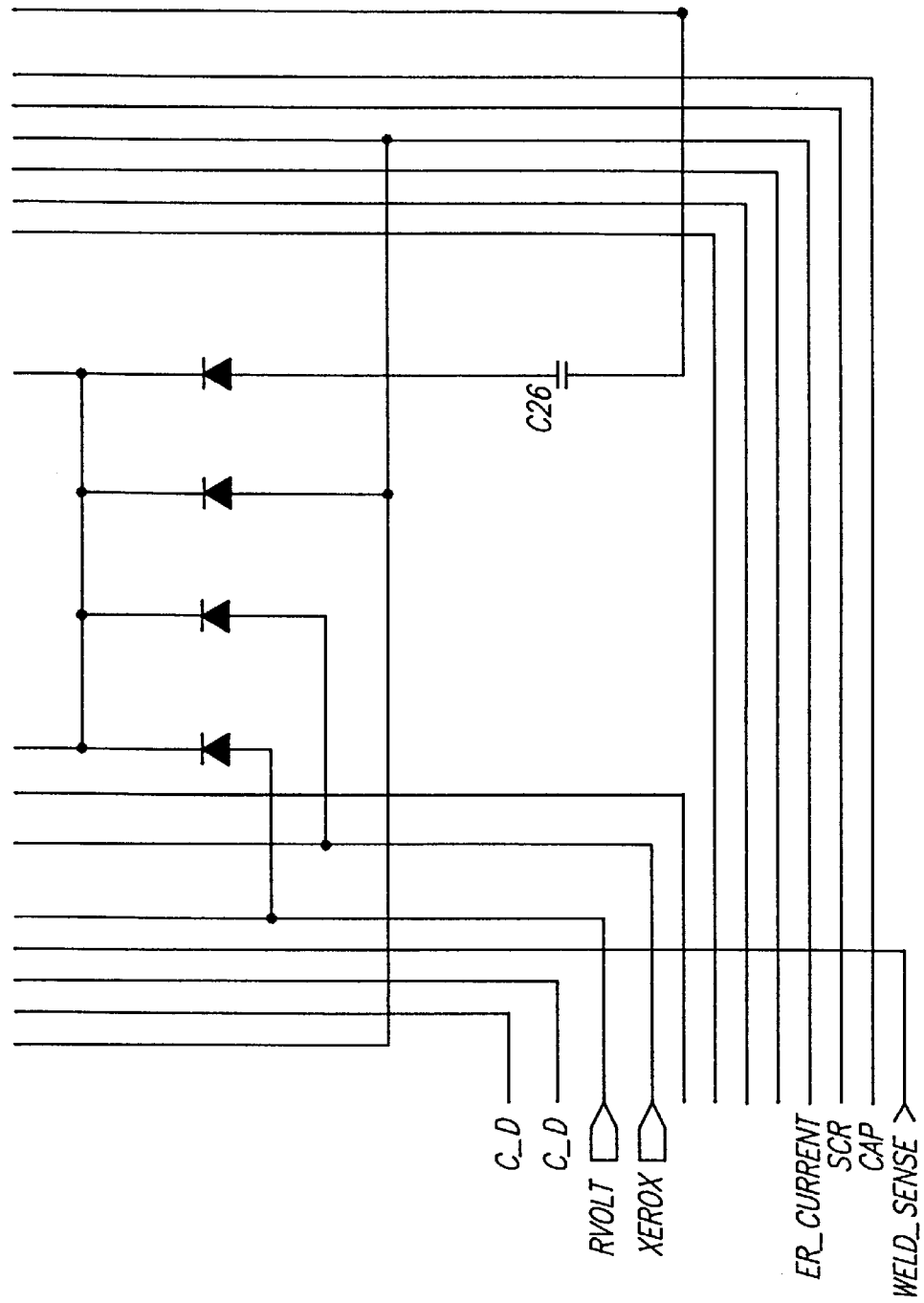

For example, referring now to FIGS. 39 and 41, controller 22 is suitably a microcomputer controller 3910, comprising: a conventional microprocessor chip 4100; an R/2R resistive network 4102, generally analogous to R/2R network 912 of FIG. 9; and a suitable gating logic circuit 4104 for disabling the respective power switch circuits in the event of an over-current condition.

Microprocessor 4100 is suitably a 40 pin microprocessor including internal counters, registers, RAM, ROM, and comparators capable of generating interrupt signals in response to external signals, such as a Zialog Z86E40 microprocessor. Alternatively, one or more of such components can be external to the microprocessor chip. Microprocessor 4100 is receptive of the various input signals to the controller, for example: Over_Current indicative of over-current conditions, applied to pins 23, and 18 (also applied to R/2R ladder 4102 and Gating logic 4104); ZEROX, indicative of rotor (engine) speed, applied to pin 17; Rail_Voltage, indicative of the magnitude of the inverter rail voltage applied to pin 16, and Weld_Sense, indicative of welding operations, applied to pin 4.

As in the embodiment of FIG. 9, a common reference signal for the comparators is generated by applying incremental count to resistive ladder 4102. The ramp voltage is applied to pin 18 of microprocessor 4100 for use as a reference voltage by the internal comparators. When an over current condition is sensed, Over_Current assumes a low level (0) effectively grounding pin 18, and effectively inhibiting operation of R2R network 4102. In the particular embodiment of FIG. 39, only the rail voltage is compared against the reference ramp. Counts indicative of the desired state of the respective switching circuits of power converter 530 are provided at, e.g., pins 36, 37 and 38, for application to gating logic 4104. Similarly, a count indicative of the desired throttle setting is provided at, e.g., pins 19, 22, 23 and 24, for application to throttle control 3908. Output signals Cap_Switch, controlling the state of capacitor switching circuit 2710 (FIG. 27) and Cap_Dump to facilitate capacitive dumping, are provided at, e.g., pins 39, 2 and 3 respectively, if those features are employed.

Figure 42:
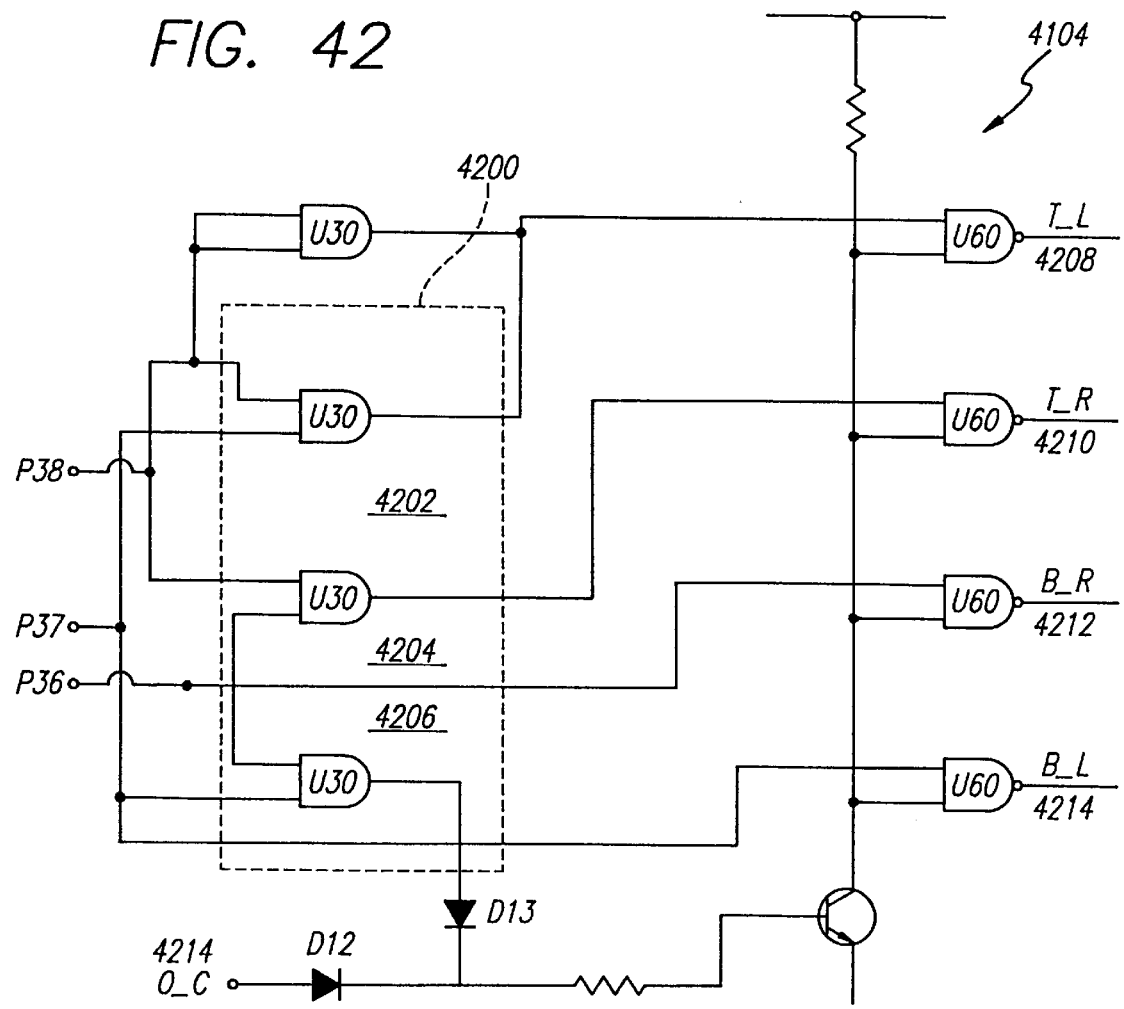
FIG. 42 is a block schematic of suitable gating circuit for the system of FIG. 39.

Referring now to FIGS. 39, 41 and 42, gating logic 4104 suitably comprises: a decoder 4200 including respective two input AND gates 4202, 4204 and 4206; and cooperating with respective NAND gates 4208, 4210, 4212, and 4214. Decoder 4200 is responsive to the three-bit signal provided by microprocessor 4100 (e.g., pins 36, 37 and 38) indicative of the desired state of the respective power switch circuits of power converter 530.

Microprocessor 4100 suitably maintains a number of variables in memory. Depending upon the particular microprocessor chip employed, separate hardware registers, fixed and/or variable function, be utilized in connection with the variables. Where the registers are organized in separate pages, conventional universal variable and page changing techniques would be employed. The variables could likewise be maintained in respective locations of random access memory. As set forth in Table 13, and referring to FIG. 46, exemplary variable include:

TABLE 13

| VARIABLE | REGISTER | CONTENT |
| --- | --- | --- |
| T_DLY_TMR | 4602 | Throttle Recovery Time Count (running count indicative of the time period since the last adjustment to throttle setting) |
| TM_BASE_60 | 4604 | Inverter output frequency time base (count indicative of the desired output frequency, e.g., 60 Hz, of converter 530) used in connection with generating the IRQ4 interrupt. |
| Avrg_Volt | 4606 | Voltage Count (count indicative of running average of voltage measurements, used to |
| Old_State | 4608 | Rpm check mask (Flag indicative of receipt of a ZEROX pulse at pin 17 that has not been accounted for) |
| A to D_CNT | 4610 | A to D Count (count captured upon generation of interrupt IRQ2) |
| Volt_VAL | 4612 | Voltage Count (count indicative average voltage value used to) |
| Temp2 | 4614 | Temp working register used in delay subroutine |
| RPM_CNT | 4616 | Zero Crossing Count (running count of number of zero crossings in control winding 504 output detected during predetermined number, e.g., 4 of output cycles of converter 530) |
| RPM_Val | 4618 | Last Measured RPM (count representing number of zero crossings in control winding 504 output detected during the preceding predetermined number, e.g., 4 of output cycles of converter 530) |
| BRDG_MSK | 4620 | H-bridge pattern (bit pattern indicative of the desired state of the control signals to converter 530, e.g., T_L, B_L, T_R, and B_R and further control signals Cap, and Cap_Dump, if utilized) |
| RPM_TMBS | 4622 | Output Cycle Count in 8.2 ms increments (a count representing the number of half cycles of the converter output since the last engine speed measurement) |
| CYC_CNTR | 4624 | H-BRIDGE COUNTER (count indicative of the instantaneous phase of (number of incremental periods elapsed in) the present half cycle of the converter output signal) |
| PP_CNT | 4626 | SCR Regulator Clock (count indicative of the desired delay period between SCR pulses to inverter rail generator 540 for pulse population modulation of the rail voltage; low count |

TABLE 13-continued

| VARIABLE | REGISTER | CONTENT |
|---|---|---|
| | | corresponds to short delay between pulses, hence high pulse population) |
| SW | 4628 | an array of bit patterns corresponding to respective sequential activation states to be outputs to a step motor throttle control |
| SW_HI | 4630 | (LDG) D_High (upper half of address of data string representative of value output to step motor 3300) |
| SW_LOW | 4632 | (LDG) D_Low (lower half of address of data string) |
| PORT3 | 4634 | (LDG) |
| DLY_RBG | 4636 | Delay Routine Register (count-down register used to generate a time delay) |
| WLD_MODE | 4638 | Weld Mode Counter (count indicative of the time elapsed since cessation of welding current (arc) used to provide for predetermined delay, e.g., 4 seconds from the when an arc is broken before the throttle setting is permitted to vary) to facilitate resumption of welding after a short pause |
| P0 | 4640 | Register with bits corresponding to microprocessor port 0 (Pins 26, 27, 30, 34, 5, 6, 7, 10) output to R/2R network 4102 |
| P2 | 4642 | Register with bits corresponding to microprocessor port 2 (Pins 35, 36, 37, 38, 39, 2, 3, 4) |
| P3 | 4644 | Register with bits corresponding to microprocessor port 3 (Pins 25, 16, 17, 18, 19, 22, 24, 23) |
| IRQ | 4646 | Interrupt enable mask (pattern of bits indicative of desired state of interrupts) |

In system 3900, microprocessor 4100 is suitably interrupt driven; various interrupt signals are generated in response to predetermined conditions to effect predetermined functions. For example, system 3900 suitably employs interrupts as set forth in the following Table 14:

TABLE 14

| INTERRUPT | TRIGGER | EFFECT |
|---|---|---|
| IRQ2 (Voltage Sense) | Reference ramp voltage at pin 18 exceeds sensor voltage applied at microcomputer pin 16 (comparator 2) | Update measurement of sensor output voltage Rail_ Voltage provided by sensor 4010 to pin 16 |
| IRQ3 (Over-Current Sense) | Low level Over_Current signal applied to microcomputer pin 25 (Port 2, Pin 1) | Turn off converter 530, set pulse population to predetermined minimum. |
| IRQ4 (Timer 0 Interval) | Time 0 time out (e.g., every 130 μsec) | Selectively generate control signals to effect control of converter 530 |
| IRQ5 (Timer 1 Interval) | Timer 1 time out (e.g., every 8.2 msec) | pulse population control |

In addition to the routines initiated in response to the various interrupts, various subroutines may be employed. Use of subroutines is particularly advantageous in instances where hardware registers are employed, to facilitate page changing. Exemplary subroutines are described in Table 15.

TABLE 15

| NAME | FUNCTION |
|---|---|
| INIIP | Initializes position of throttle to predetermined position (e.g, against stop) |
| NEGDIR | Effects movement of throttle one step in the negative direction (closes throttle one increment) |
| POSDIR | Effects movement of throttle one step in the positive direction (opens throttle one increment) |
| A to D | Outputs 8-bit count to R/2R network 4102 for generation of analog voltage ramp for application to microprocessor pin 18 |
| DELAY | Delays operation of initialization process to accommodate response time of throttle control |

Figure 47:
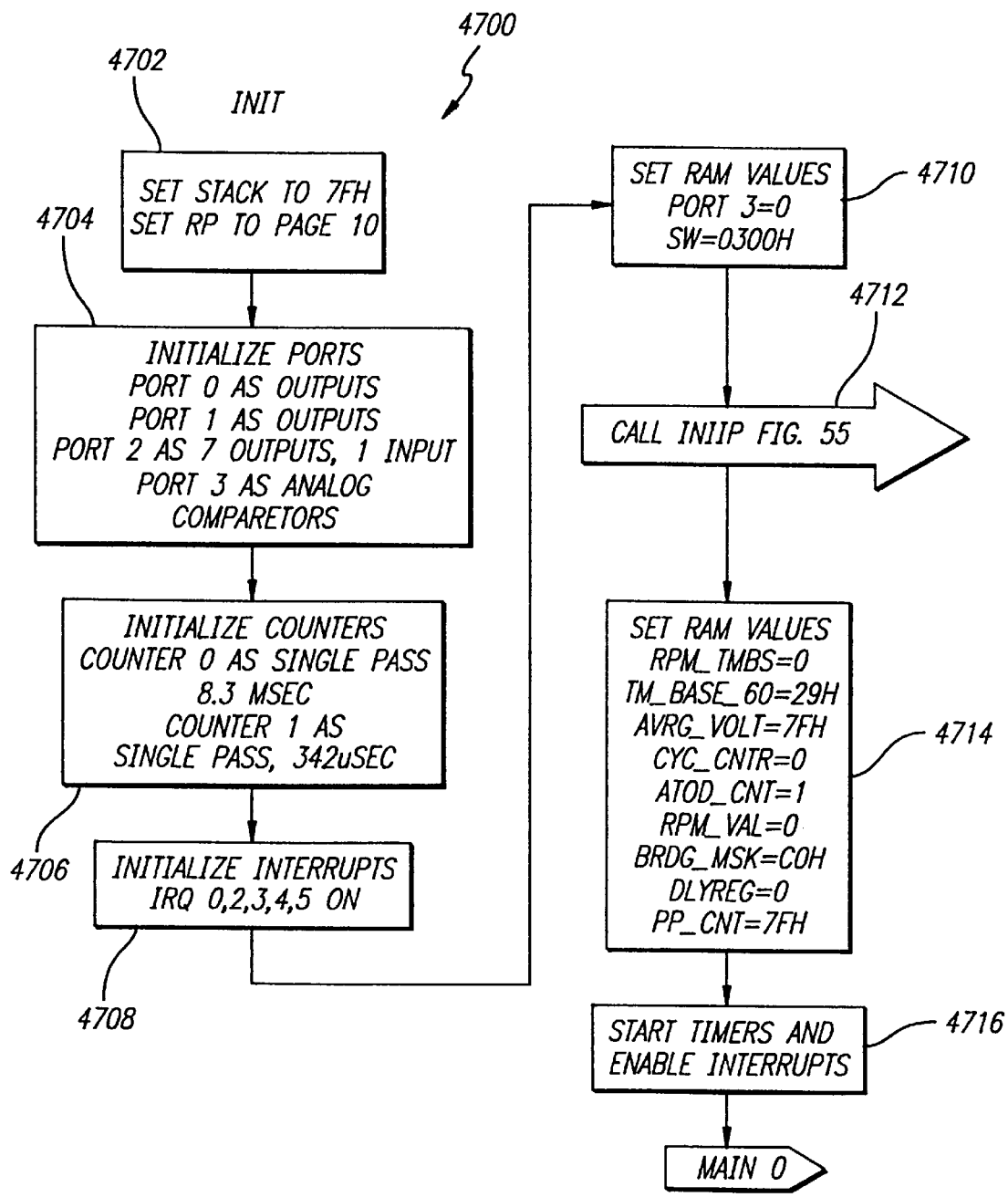
FIG. 47 is a functional flow chart of an initialization routine.
Figure 55:
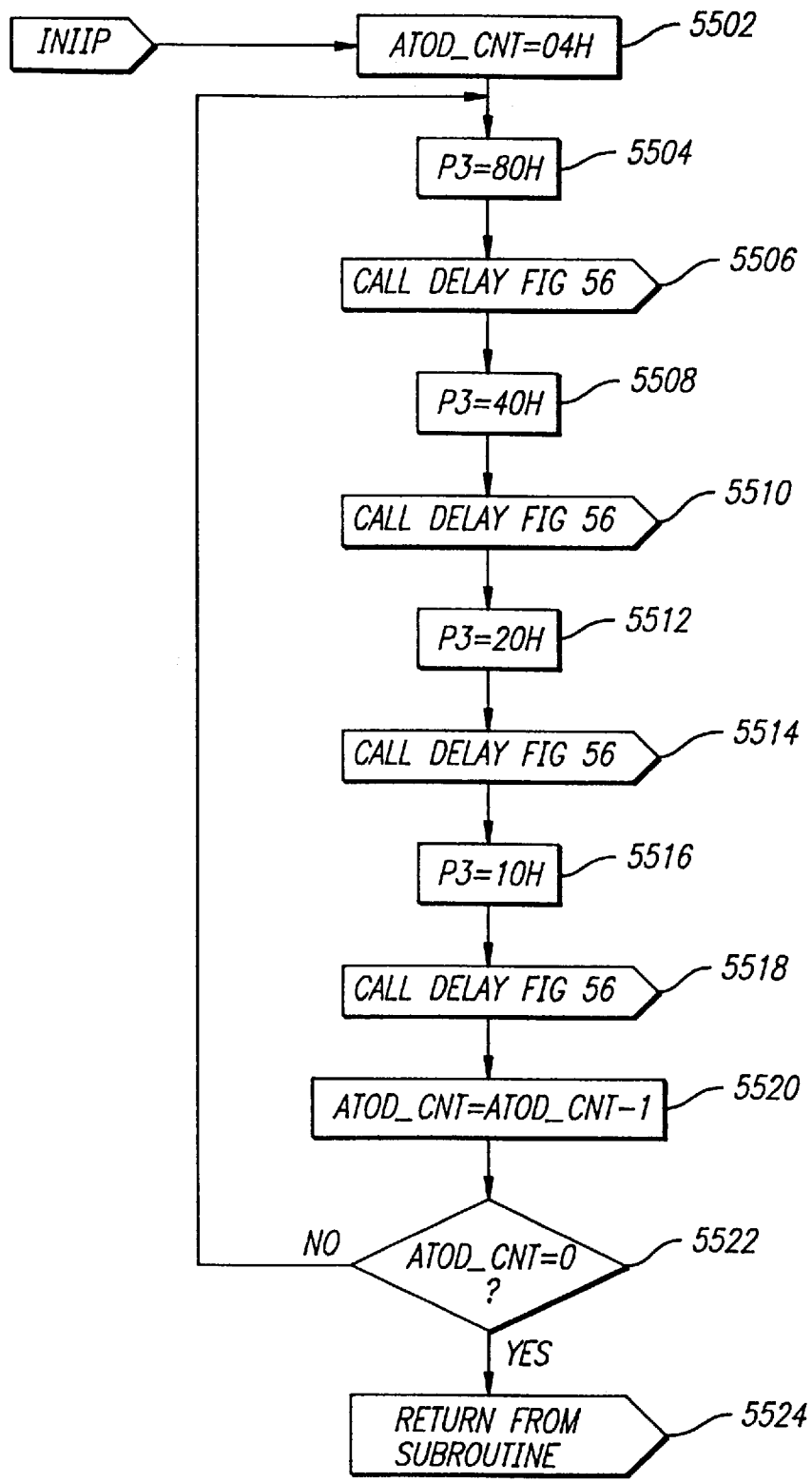
FIG. 55 is a functional flow chart of an INIIP subroutine relating to initializing the throttle.

Upon power up, the system is typically initialized. Referring to FIG. 47 a suitable initialization routine 4700: configures the microprocessor memory Step 4702; initializes the input and output ports of the microprocessor (Step 4704); initializes hardware counters as timer 0 and timer 1 (Step 4706); initializes the interrupts (Step 4708); initializes a first set of variables relating to throttle control (Step 4710); calls a throttle initialization subroutine to ensure that the throttle begins operation in a predetermined position (Step 4712) (a suitable throttle initialization subroutine will be described in conjunction with FIG. 55); sets various other variable values (Step 4714); then starts the timers and enables the interrupts (Step 4716).

Figure 48A:
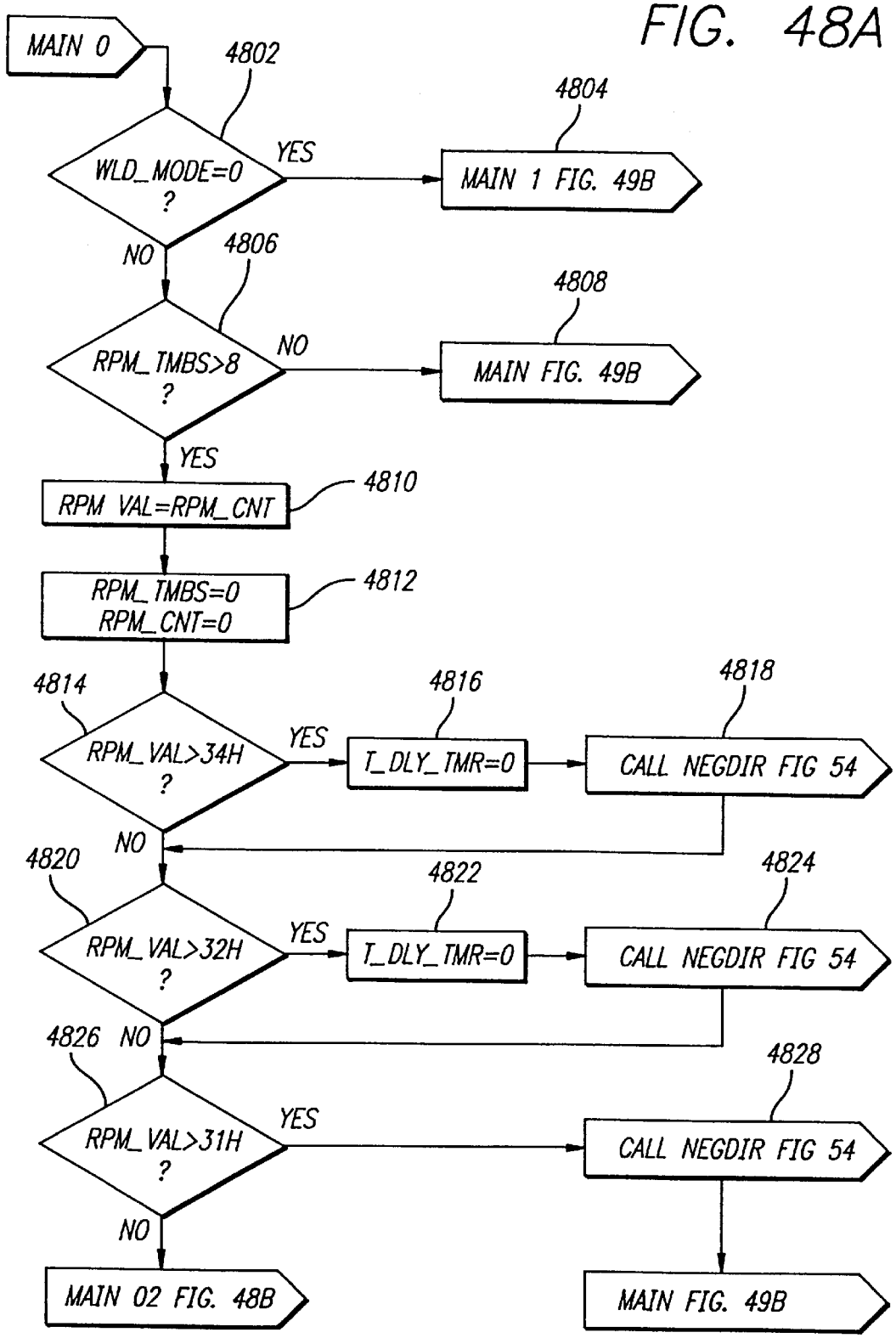
FIGS. 48A and 48B (collectively referred to as FIG. 48) are a functional flow chart of a continuous primary loop program.
Figure 48B:
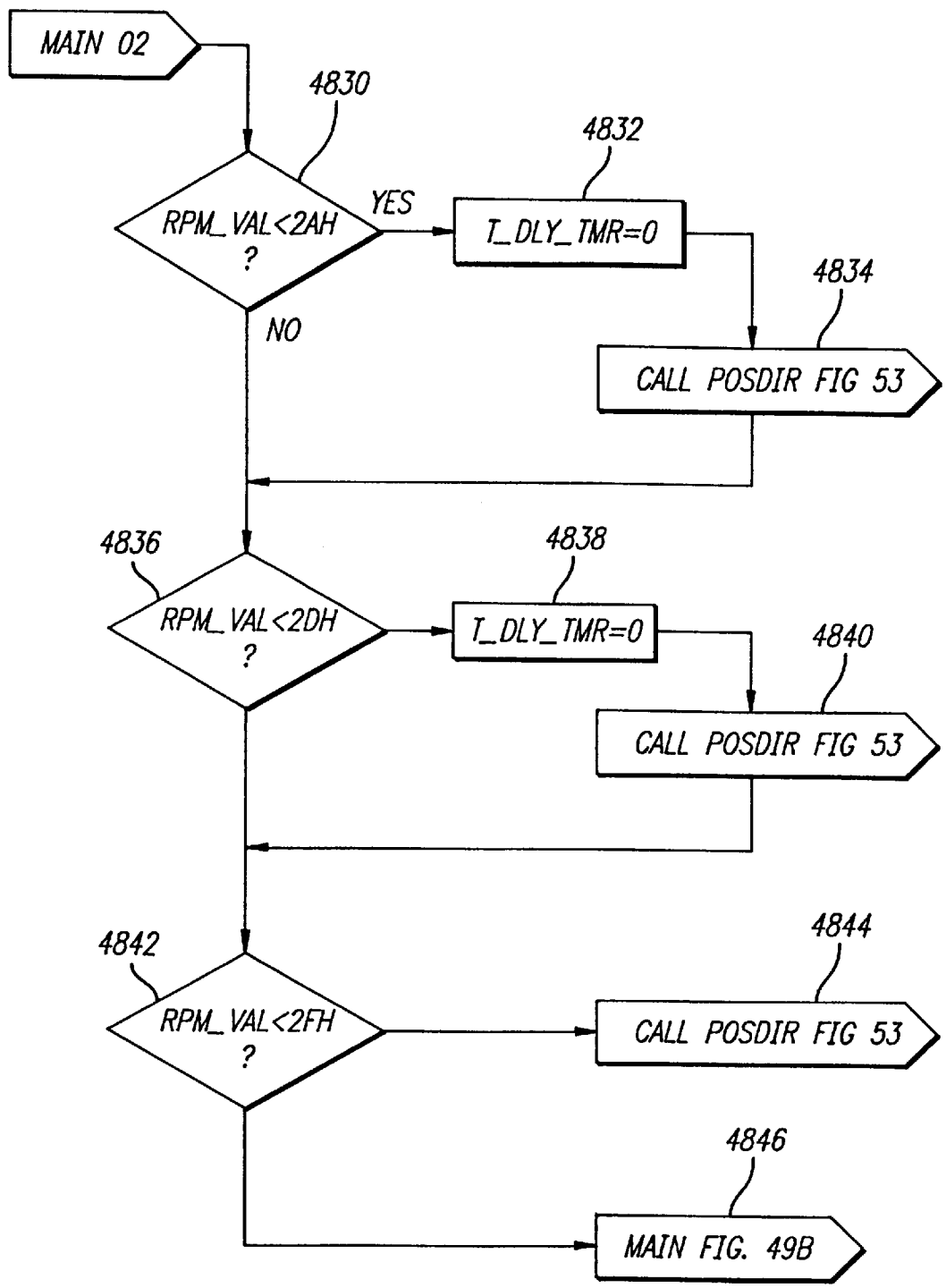

After the initialization process is completed, a continuous primary loop program is initiated to effect: operational mode control; generate the ramp reference voltage; and coordinate between inverter rail pulse population modulation control and throttle (engine speed) control of the rail voltage. More specifically, referring to FIGS. 48A and 48B (collectively referred to as FIG. 48), the operational mode of system 3900 is first determined. The value of Weld_Mode in register 4638 is tested (Step 4802). As previously noted, Weld_ Mode is a count indicative of the time elapsed since cessation of welding current (arc) used to establish a predetermined delay, e.g., 4 seconds from when an arc is broken before exiting welder mode, to facilitate resumption of welding after a short pause. If the content of Weld_Mode register 4638 is zero, the process jumps to a module (labeled Main 1) associated with inverter mode operation (Step 4804) as will be described in connection with FIG. 49.

Assuming that a welding operation is indicated (Weld_ Mode is non-zero), the engine speed measurement is updated (Step 4806). More specifically, the engine speed is averaged over a predetermined number of cycles, e.g., 4 of the (AC) output of converter 530. As previously noted, RPM_TMBS in register 4622, is indicative of the number of half cycles of the converter output that have occurred since the last engine speed measurement. Accordingly, if four cycles since the last rpm measurement have not passed, a jump is suitably effected (Step 4808) to a program module labeled Main, to update the A to D count in register 4610, if appropriate, as will be more fully described in connection with FIG. 49.

If the predetermined number (e.g., 4) of cycles of the AC output have occurred (e.g., RPM_TMBS is greater than 8), RPM_CNT in register 4616 (indicative of the number of zero crossings occurring during the four cycle period) is loaded into RPM_Val as indicative of the measured RPM (Step 4810). Output cycle count RPM_TMBS and zero crossing count RPM_CNT in registers 4622 and 4616 are then cleared (Step 4812).

During welding operations, system 3900 engine speed is maintained within a predetermined band of values bounding a predetermined desired speed, preferably providing a ratiometric corrective response in accordance with the extent the engine speed deviates from the desired value. Accordingly, after the speed measurement RPM__Val in register 4618 has been updated, as appropriate, the engine speed is tested to determine if it is within predetermined limits of the desired engine speed for welding operations, e.g., 3600 rpm. In general, an engine speed of 3600 RPM corresponds to a RPM__Val less than 31 hexadecimal (31H), and more than 2A hexadecimal (2AH) (e.g., 30H). If RPM__Val is greater than 31H the throttle is incrementally closed. Conversely, if the count RPM__Val drops below predetermined value, e.g., 2AH, the throttle is incrementally opened. If desired, ratiometric correction may be provided by comparing RPM__Val to a sequence of respective threshold values, and responding differently depending upon the extent to which the engine speed is out of limits.

Figure 53:
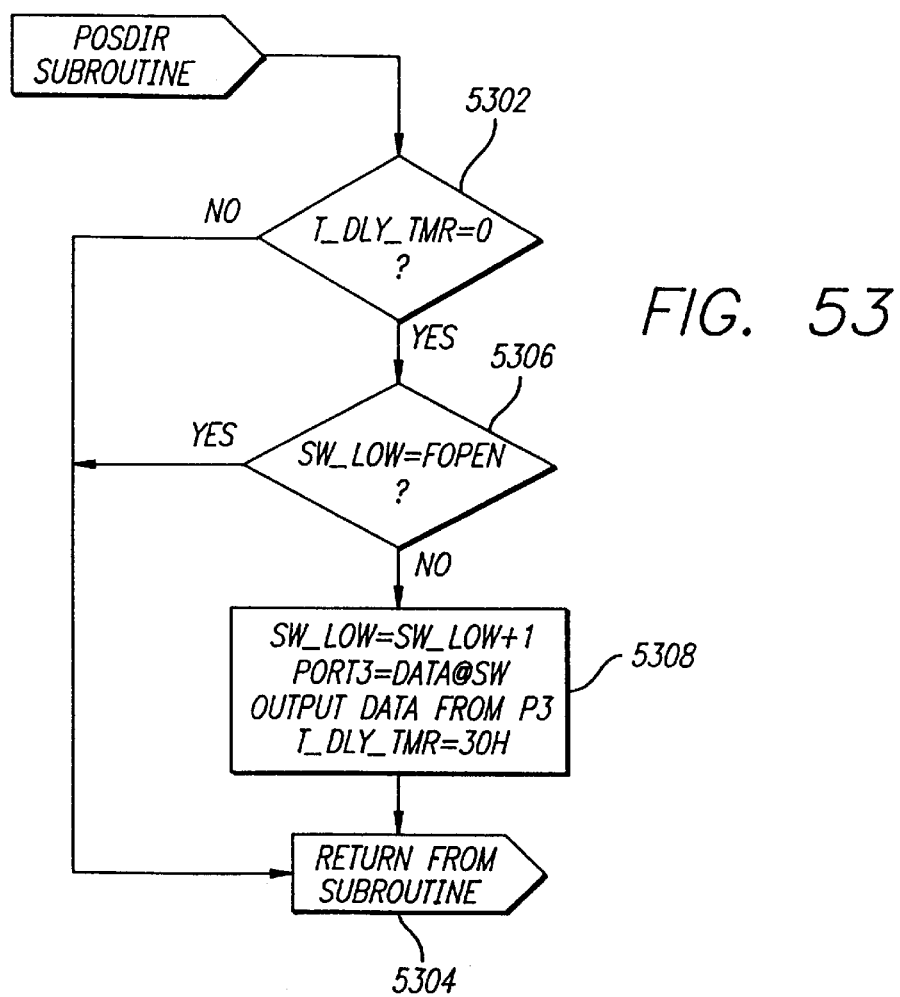
FIG. 53 is a functional flow chart of the POSDIR subroutine relating to adjusting the throttle in a positive direction.

In general, the time between successive adjustments to the throttle is controlled to ensure the throttle is permitted sufficient time to respond to the control signals and the engine has sufficient time to respond to the throttle adjustments. Throttle Recovery Time Count, T__DLY__TMR, maintained in register 4602, is typically employed to prevent changes to the throttle setting at a rate beyond the ability of the system, and particularly engine 14, to react. (Dithering to effect fractional step resolution would suitably be effected a frequency that exceeds the time constant of the linkage, but less than the inductive rise time of the step motor windings, such that the throttle plate assumes and retains the fractional step position). As will be explained in conjunction with FIGS. 53 and 54, T__DLY__TMR is set to a predetermined value when a throttle adjustment is made, and thereafter periodically decremented (every half cycle of the inverter output signal, i.e., every 8.2 milliseconds), to provide indicia of the time elapse since the last preceding adjustment to the throttle. Further adjustment of the throttle is normally not permitted until T__DLY__TMR has timed out.

However, if the engine speed is over limit by a sufficient amount, the delay timer may be, in effect, overridden. For example, RPM__Val is initially tested against a number, e.g., 34H, significantly in excess of the upper acceptable limits (Step 4814). If, e.g., 34H is exceeded, T__DLY__TMR is set to zero (Step 4816), and the subroutine NEGDIR is called to effect an immediate incremental closure of the throttle (Step 4818). The NEGDIR subroutine will hereinafter be described in conjunction with FIG. 54.

If the RPM__Val is not greater than 34H, or, if greater than 34H, upon return from the NEGDIR subroutine, RPM__Val is then tested against a predetermined count, e.g., 32H corresponding to an intermediate speed in excess of the desired upper limit (Step 4820). If the engine speed exceeds the intermediate value, i.e., RPM__Val is greater than 32H, the throttle delay timer is again overridden (cleared) (Step 4822), and the NEGDIR subroutine called (Step 4824) to effect an immediate incremental closure of the throttle.

If the RPM__Val count in register 4618 is not greater than 32H, or upon return from the NEGDIR subroutine, RPM__Val is then tested against a number corresponding to the upper limit of acceptable speeds, e.g., 31H (Step 4826). If the upper speed threshold is exceeded, i.e., RPM__Val is greater than 31H, subroutine NEGDIR is again called to incrementally close the throttle (Step 4828). However, in this case, since the speed is not severely out of limits, the throttle delay timer function is not overridden.

If the engine speed is not above the upper acceptable limit, the speed is tested against the lower limit. More specifically, RPM__Val is tested against a first predetermined number, e.g., 2AH, corresponding to a speed considerably below the acceptable lower limit of speeds (Step 4830). If the speed is below the predetermined value, throttle recovery timer T__DLY__TMR is set to zero (Step 4832), and the POSDIR subroutine called to effect an immediate incremental opening of the throttle (Step 4834). If the speed is not below the extreme value, or upon return from the POSDIR subroutine, the speed value RPM__Val is tested against an intermediate limit, e.g., 2DH (Step 4836). If RPM__Val is less than 2DH, the throttle delay function is inhibited (Step 4838), and subroutine POSDIR again called to effect an immediate incremental opening of the throttle (Step 4840).

If the engine speed is not less than the intermediate value, or upon return from the POSDIR subroutine, RPM__Val is tested against a predetermined number indicative of the lower acceptable limit of speeds, e.g., 2FH. If RPM__Val is less than 2FH, (Step 4842), the POSDIR subroutine is again called (Step 4844), but subject to the recovery timer.

If the RPM__Val is not less than 2FH, or upon return from the POSDIR subroutine, a jump to a program module labeled Main, associated with the A to D function is effected (Step 4846).

As previously noted, if Weld__Mode equals zero, processor 4100 jumps to a program module (Main 1) relating to inverter mode operation. In general, the rail voltage is suitably controlled by pulse population modulation (varying the number of SCR pulses per unit time, and hence, rail voltage) so long as the pulse population count (PP__CNT) in register 4626 is within predetermined upper and lower limits (e.g., 08 and 2FH). However, if PP__CNT ranges beyond the limits of the band, the throttle setting is varied to adjust engine speed, in effect, shifting the band of rail voltages to which the pulse population counts correspond.

As noted above, count PP__CNT in register 4626 is indicative of the desired delay period between SCR pulses to inverter rail generator 540 (e.g., a count of 08 indicates 8 microseconds between pulses); a low value of PP__CNT corresponds to short delay between pulses, and hence, high pulse population. PP__CNT is suitably initially set, during initialization (FIG. 47) to a value (e.g., 7FH) in the center of the permissible range.

Figure 49B:
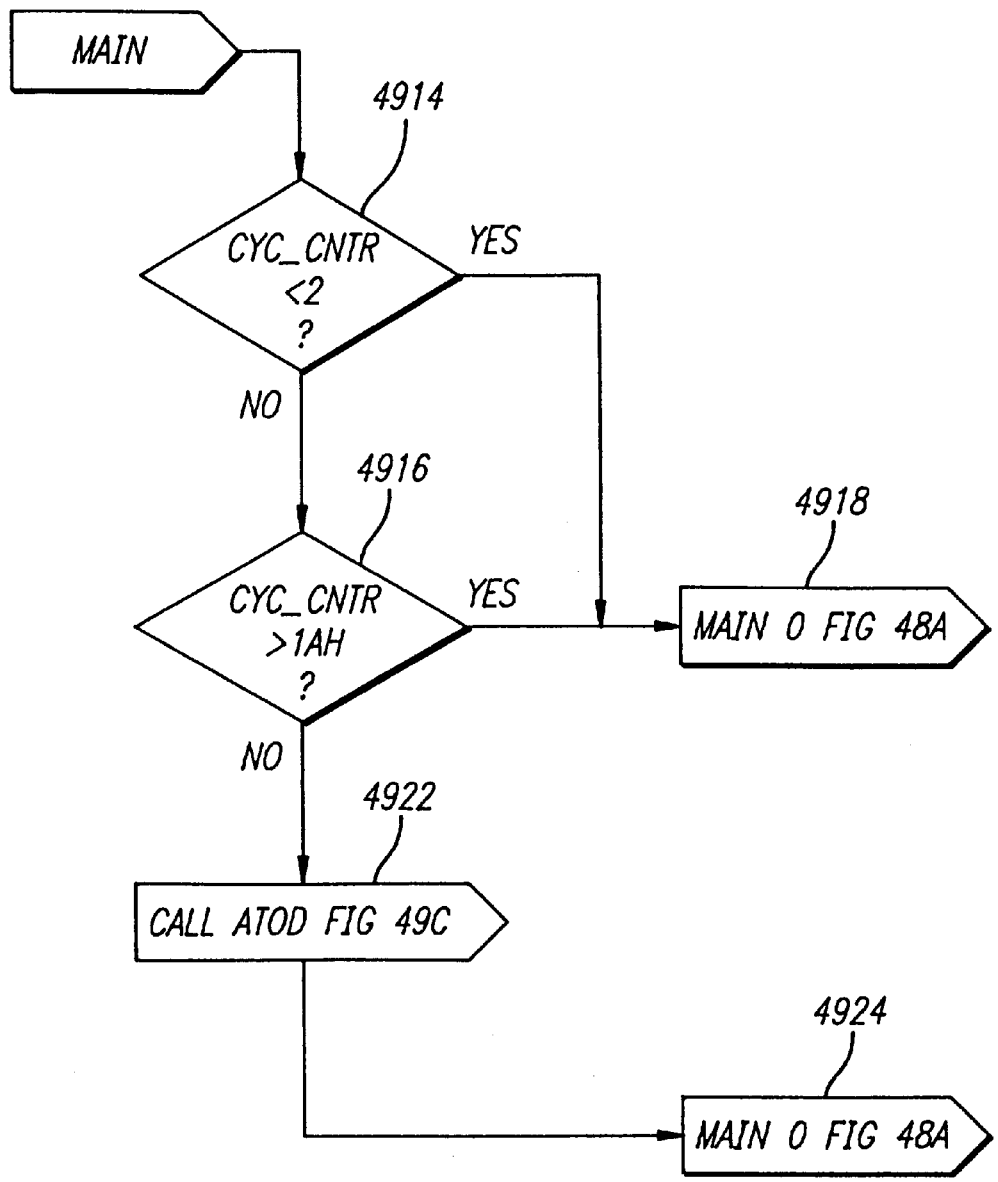
FIG. 49B is a functional block diagram of the process relating to coordinating voltage sampling with the operation of the switched capacitor of FIG. 27.

Referring to FIG. 49A, when the Main 1 module is initiated, pulse population count PP__CNT is tested against the predetermined minimum value (e.g., 08) indicative of the minimum threshold time between pulses (highest pulse population) (Step 4902). If pulse population count is below the predetermined limit, the POSDIR subroutine is called to incrementally increase engine speed (Step 4904), and a jump is effected (Step 4906) to a program module (labeled Main) relating to coordinating sampling the rail voltage with the operation of switched capacitor 2710 as will be described in conjunction with FIG. 49B.

If pulse population count PP__CNT is greater than the predetermined minimum, it is then tested against a predetermined maximum, e.g., 2FH (indicative of a predetermined maximum delay between pulses, i.e., minimum pulse population) (Step 4908). If 1S PP__CNT is -treater than, e.g., 2FH, the NEGDIR subroutine is called to incrementally close the throttle to decrease the rail voltage (Step 4910).

Figure 52A:
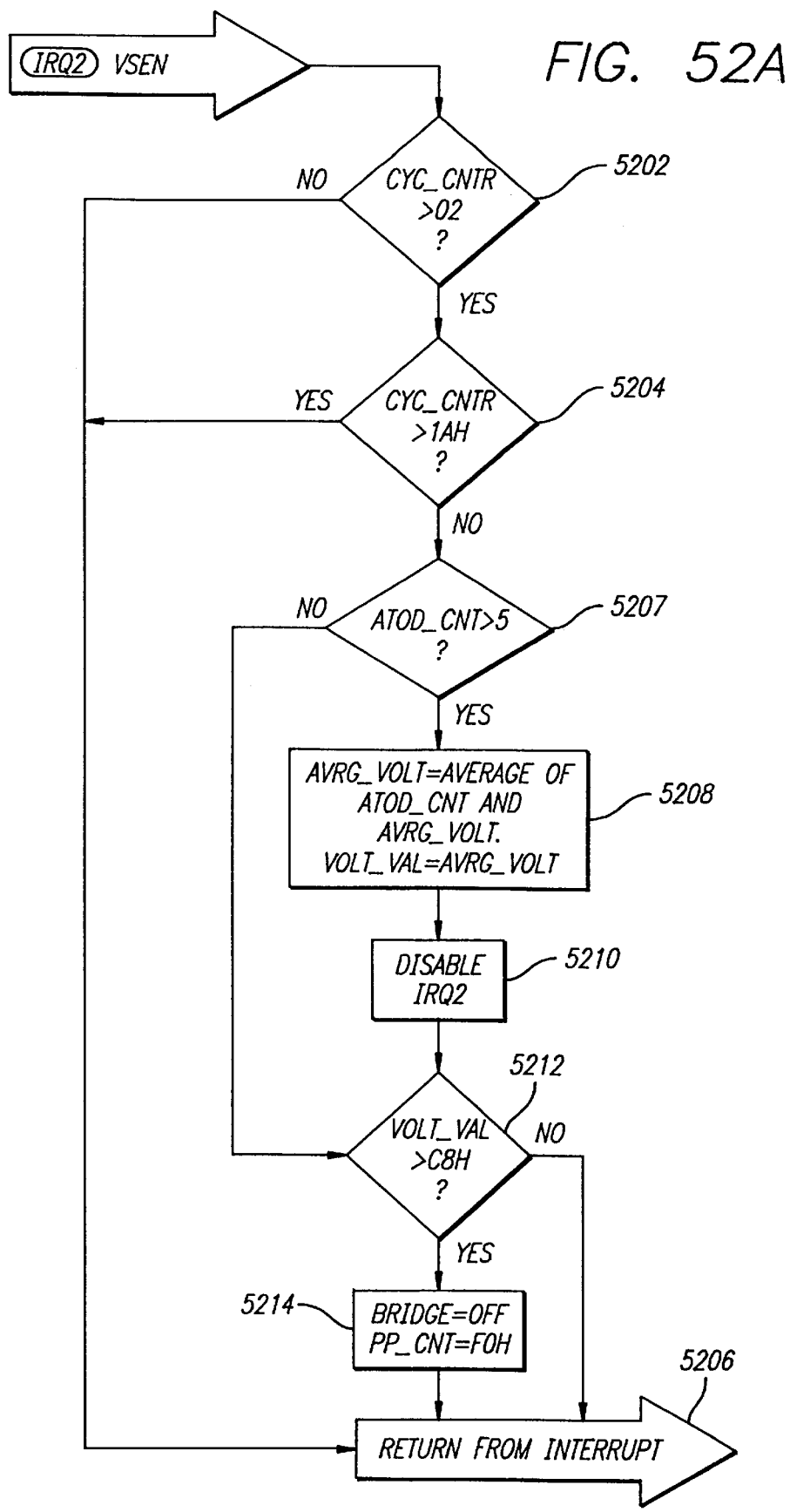
FIG. 52A is a functional flow chart of an IRQ2 routine relating to voltage sensing.

If pulse delay count PP__CNT is within acceptable limits (e.g., 2FH>PP__CNT>08), or if not, upon return from the NEGDIR proceeds to the program module labeled Main (Step 4912). Referring to FIG. 49B, the main module, in effect, synchronizes sampling of the inverter rail voltage with the operation of switch capacitor (filter) 2710; the A to D ramp voltage is suspended (not increased) during those periods when the capacitor (filter) is effectively absent from and the rail voltage is determined by comparing a signal, Rail_Volt, indicative of the actual voltage to a ramp generated by applying an incremented count R/2R network 4102. When the reference ramp exceeds the measured voltage, interrupt IRQ2 is generated, to cause the measured voltage value Volt_Val in register 4612 to be updated (averaged with the instantaneous A to D count) as will be explained in conjunction with FIG. 52.

As previously noted the instantaneous phase of the inverter output signal is maintained in register 4624. In effect, each cycle of the inverter output signal is nominally divided into two half cycles, each including a predetermined number of time segments (counts, e.g., 32). As will be more fully discussed, switched capacitor (filter) 2710 is effectively removed from the operative circuit during a predetermined portion of the beginning and end of each half cycle, e.g., the first count and last five counts. To ensure accurate measurement of the rail voltage, incrementation of the comparison ramp is suspended during those periods when the capacitor is out of the operative circuit. Accordingly, the CYC_CNTR count is tested against the lower bound (e.g., 2) (Step 4914) and upper bound (e.g., 1AH) (Step 4916) of the portion of the output half cycle during which filter 2710 is in the operative circuit. If switched capacitor (filter) 2710 is not part of the operative circuit (e.g., 2<CYC_CNTR>1AH), a jump (Step 4918) is effected to label Main 0 (FIG. 48A) and the overall process loop repeated. If, however, the value of output cycle count CYC_CNTR corresponds to a portion of the output half cycle during which switched capacitor 2710 is in the operative circuit (e.g., 1H>CYC_CNTR>2), the A to D subroutine is called (Step 4922) to increment the A to D count ATOD_TNT, and the Zero crossing count RPM_CNT, as appropriate. Upon return from the A to D subroutine, process loops back to label Main 0 (FIG. 48A) (Step 4924), and the process repeated.

Figure 49C:
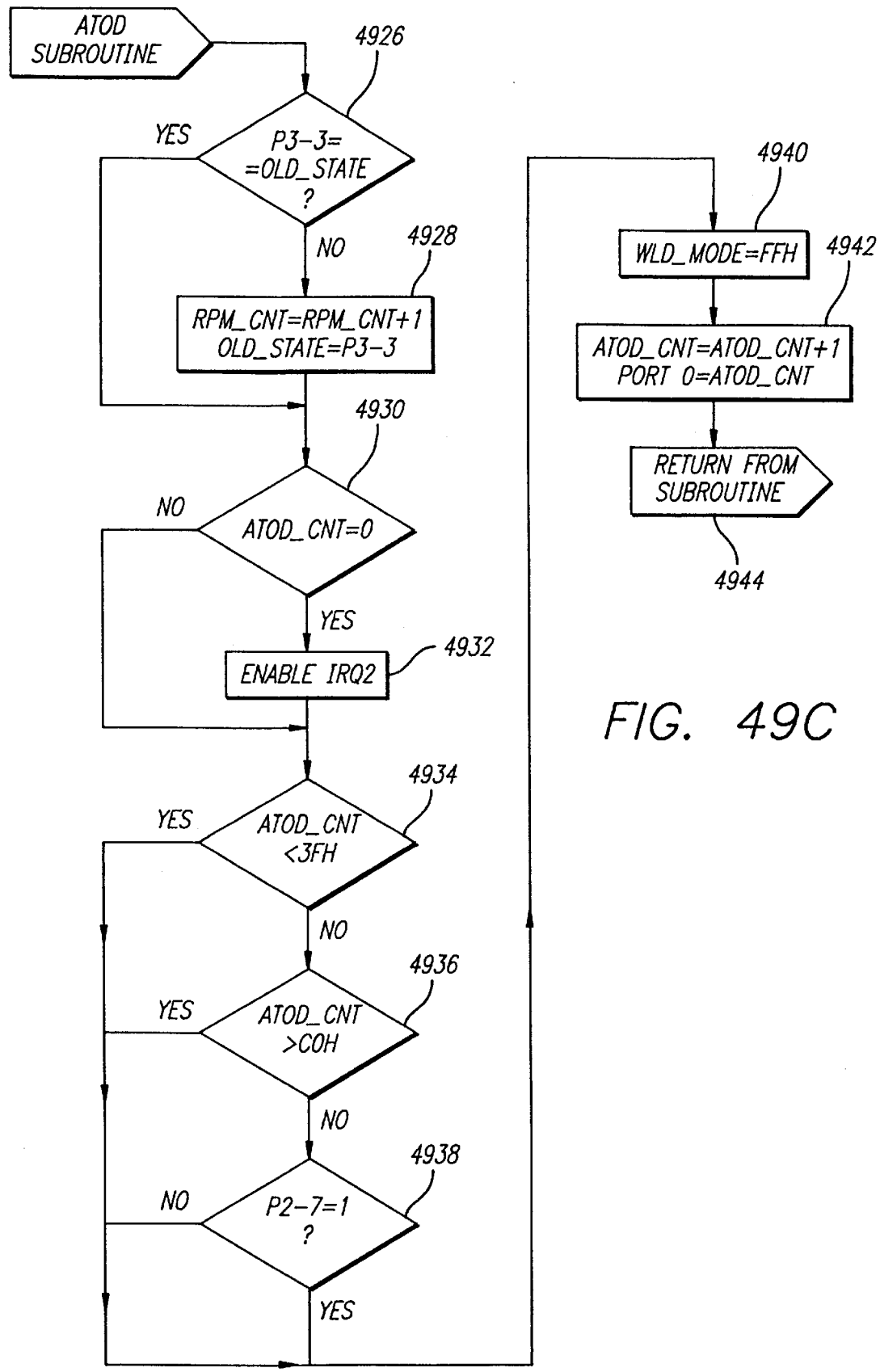
FIG. 49C is a functional flow chart of an A to D subroutine.

Referring to FIG. 49C, when the A to D subroutine is called, an initial determination is made as to whether or not there has been a change in state of the zero crossing detector. More specifically, as noted above, indicia, Old_State, of a transition in ZEROX signal (e.g., square wave with transitions at the zero crossings) received at pin 17 but not yet processed is maintained in register 4608. The state of port 3 pin 3 is tested against the value of Old_State (Step 4926) to detect changes of state.

Assuming that a change of state has occurred, RPM_CNT (the running count of zero crossings) contained in register 4616 is incremented, and the value in port 3 pin 3 (signal applied to pin 17) is loaded into the Old_State flag (Step 4928).

After RPM_CNT has been incremented, as appropriate, a test is made for the beginning of a new cycle (Step 4930). Interrupt IRQ2 may be generated only once per A to D cycle, and, once processed is disabled for the remainder of the A to D cycle. If A to D count in register 4610 has overflowed, i.e., equals 0, indicative of the beginning of a new A to D cycle, the voltage sense interrupt IRQ2 is re-enabled (Step 4932).

After interrupt IRQ2 is re-enabled, as appropriate, the delay timer for welding operations is reset, if appropriate. More specifically, the A to D count is checked to ensure that it is within a predetermined range, e.g., not less than 3FH, and not more than C0H (Steps 4934 and 4936). If the A to D count is within the predetermined range, the signal Weld_Sense applied to pin 4 of microprocessor 4100 (port 2 pin 7) is tested to determine whether the system is operating in a weld mode, i.e., whether an arc is flowing (Step 4938). If the Weld_Sense signal is active, e.g., equal to 1, the Weld_Mode timer in register 4638 is reset to a value (e.g., FFH) corresponding to the predetermined period, e.g., 4 seconds during which welding mode operation is maintained after the termination of an arc (Step 4940). If the A to D count is outside of the permissible range, or after the weld mode timer has been reset, the A to D count in register 4610 is incremented, and the count applied to R/2R network 4102 (Step 4942). A return from the subroutine is then effected (Step 4944).

Figure 50A:
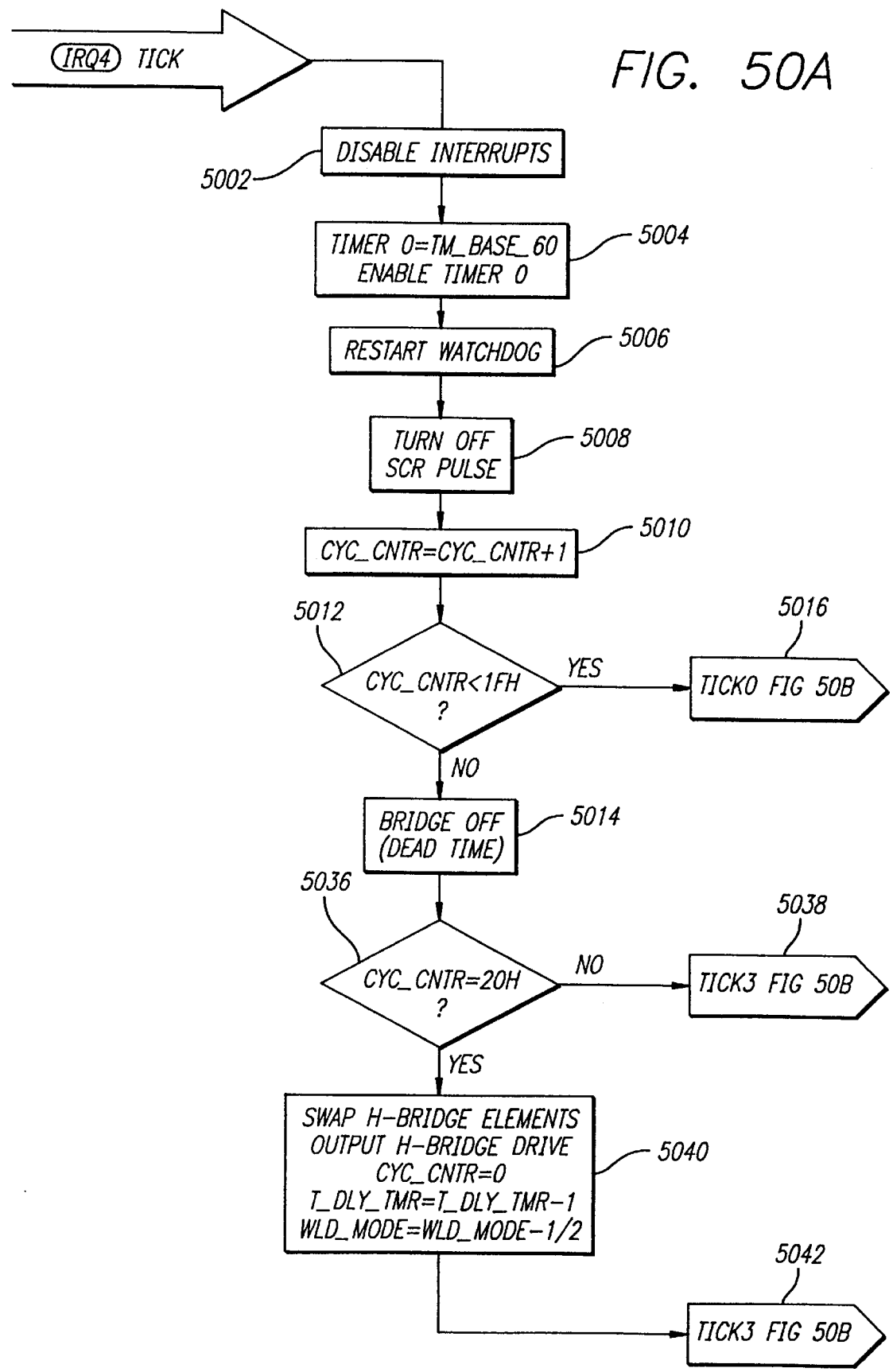
FIGS. 50A and 50B (collectively referred to as FIG. 50) is a functional flow chart of a IRQ4 interrupt routine, pertaining to pulse population modulation control of the power converter.
Figure 50B:
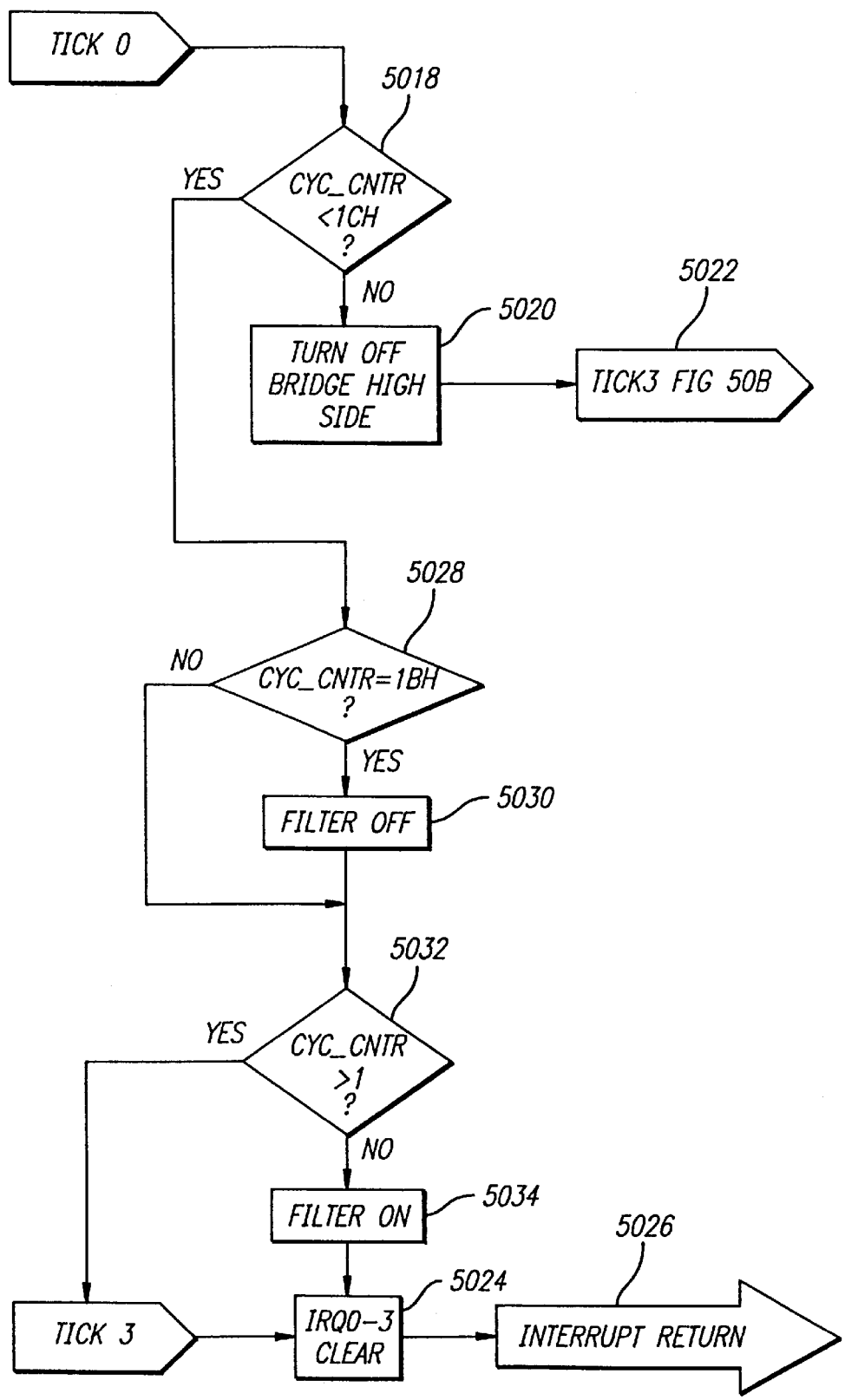

The status of power converter 530 is updated on a periodic basis. More specifically, interrupt IRQ4 (Timer 0 interval) is generated upon timeout of the timer 0 register, e.g., every 130 micro-seconds (corresponding to a predetermined fraction, e.g., 1/32nd, of a half cycle of the desired frequency, e.g., 60 Hz, of the output of converter 530). Referring now to FIGS. 50A and 50B (collectively referred to as FIG. 50), upon generation of interrupt IRQ4: the other interrupts are disabled (Step 5002) to prevent interference; timer zero is loaded with TM_BASE_60, contained in register 4604, indicative of the desired AC output frequency (e.g., 60 Hz); and the timer 0 down count reinitiated (Step 5004).

If desired, a watchdog fail-safe function can be employed; a hardware timer in processor 4100 which, if not timely reset, times out, causing processor 4100 to reinitialize operation. The watchdog timer is suitably reset every 130 microseconds, in response to IRQ4 (Step 5006).

As previously noted, control signal SCR, employed to initiate conduction in the most negatively biased (corresponding to the most negative phase) of SCR's 4008 in the inverter rail generator 4000, is suitably, a pulse, asynchronous (random) relative to the 3-phase signal from stator windings 400A and of relatively short duration, preferably just sufficient to reliably fire the SCR (e.g., in the range of 5–50 μseconds, and typically 20–50 μseconds) such, that only a single output pulse is provided at rail 542 per SCR pulse. Control pulse SCR is provided at pin 35 (port 2, pin 0) of microprocessor 4100, and reflects the content of bit 0 of P2 register 4642. Accordingly, bit 0 of P2 register 4642 is set to 0 to turn off control pulse SCR and facilitate commutation off of SCR's 4008 of inverter rail generator 540 (Step 5008). (As will be explained in conjunction with FIG. 51, bit 0 of P2 register 4642 is set to 1 to start control pulse SCR in response to IRQ5 interrupts, effected upon time out of a previously determined pulse population delay period.)

As previously noted, the count CYC_CNTR is maintained (register 4624) indicative of the instantaneous phase (e.g., number of 130 microsecond periods elapsed in) of the convertor output signal the present half cycle of the convertor output signal. The count is periodically incremented, e.g., each 130 microseconds, in response to the IRQ4 interrupt (Step 5010). The incremented count CYC_CNTR is then checked against a predetermined count generally corresponding to T1', in FIG. 28, the point at which all of the switching circuits are turned off, chosen to ensure that typical current lags are accommodated (e.g., 1FH) (Step 5012). If the count is greater than the predetermined value, e.g., 1FH, total dead time is initiated (Step 5014). More specifically, as previously noted, the control signals to converter 530, (e.g., T_L, B_L, T_R, and B_R and further control signals Cap, and Cap_Dump, if utilized) are provided at pins 36–39, and 2–3 of microprocessor 4100 (port 2, pins 1–6), and reflect the contents of P2 register 4642. Accordingly, the contents of P2 register 4642 are modified to turn off all of the switching circuits of converter 530.

If, however, the output phase count CYC_CNTR is less than the count indicative of the beginning of the dead time (e.g., 1FH), a jump is effected to the program module labeled TICKO (FIG. 50B) and a sequence of steps effected to determine whether other converter state changes are called for (Step 5016).

As previously noted, lagging currents caused by highly inductive loads are accommodated by rendering the operative high side power switch (2702 or 2704) non-conductive at the point in time corresponding to the beginning of the dead time in the desired voltage wave form (e.g., Count 1CH, corresponding to time T1 in FIG. 28). The operative low side power switch (2706 or 2708) (and hence all of the power switch circuits of converter 2700 are thereafter turned off at a subsequent time, e.g., 1FH, corresponding to time T1' in FIG. 28, to permit continued current flow of lagging currents. Accordingly, if the AC phase count CYC_CNTR is less than the value (e.g., 1FH) indicative of the beginning of the cycle dead time, (Step 5012), referring to FIG. 50B it is tested against the predetermined value (e.g., 1CH) indicative of the point in the cycle where the voltage goes to zero (corresponding to time T1 in FIG. 28) (Step 5018). If phase count CYC_CNTR is not less than, e.g., 1CH, the operative high side bridge is turned off, e.g., the bits of P2 register 4642 corresponding to the Top_Left and Top_Right control signals are set to zero (Step 5020). A jump is then effected to a program module labeled TICK3 (Step 5022) whereupon interrupts IRQ0–3 are cleared (Step 5024), to avoid erroneous readings due to switching noise, and a return from the interrupt is effected (Step 5026).

If, however, the AC phase count CYC_CNTR is less than the predetermined value (e.g., 1CH) (Step 5018), the phase count is tested (Step 5028) against a value indicative of the point in the cycle when switched capacitor 2710 is effectively removed from the circuit (e.g., 1BH) corresponding to time T4 in FIG. 28. If output phase count CYC_CNTR is equal to the predetermined value (e.g., 1BH), corresponding to time T4 in FIG. 28, switch capacitance 2710 is effectively moved from the operative circuit (Step 5030). More specifically, the contents of the P2 register 4642, and in particular the bit (port 2, pin 6) corresponding to control signal CAP_SWITCH is set to zero.

After the switched capacitor 2710 has been removed from the operative circuit (turned off) as appropriate, phase count CYC_CNTR is tested against another predetermined value (e.g., 1) corresponding to the point in the output half cycle when switched capacitance 2710 is connected into the operative circuit (Step 5032). Accordingly, if the AC phase count CYC_CNTR is not greater than 1, the contents of the port 2 register 4642 are changed to cause generation of the Cap_Switch signal (Step 5034). After the capacitor has been inserted in the operative circuit, or if CYC_CNTR is greater than 1, then IRQ0–3 are cleared (Step 5024), and a return effected (Step 5026).

Referring again to FIG. 50A, as previously noted, if in Step 5012, if CYC_CNTR is found not to be less than, e.g., 1FH, indicative of the point in the cycle when all of the switching circuits in converter 2700, the contents of P2 register 4642 are varied accordingly (Step 5014), i.e., the operative low side switching circuit (2706 or 2708) is turned off.

Output cycle count CYC_CNTR is then checked against a value corresponding to the end of the half cycle, e.g., 20H, (Step 5036). If the output cycle count is not equal to, e.g., 20H, process jumps to label TICK3 (Step 5038), IRQ0–3 are cleared (Step 5024), and a return effected (Step 5026). If, however, output cycle count CYC_CNTR is equal to 20H the system is reinitialized for the next half cycle (Step 5040). More specifically, a reversal is effected between the respective power switch circuits of converter 2700, i.e., the contents of the BRDG-MSK register are switched (XORed with 06H) to indicate the new half cycle, and the bits of Port 2 register 4642 are changed to switch between generation of T_L, B_R and T_R, B_L, or vice versa and reflected at pins 36, 37, 38 and 39; output cycle count CYC_CNTR is reset to zero; throttle delay timer T_DLY_TMR is decremented; and weld mode counter WLD_MOD is decremented by one half. The process then jumps to label TICK3 (Step 5042), any false interrupts in IRQ0–IRQ3 are cleared (Step 5024), and a return effected (Step 5026).

Figure 51A:
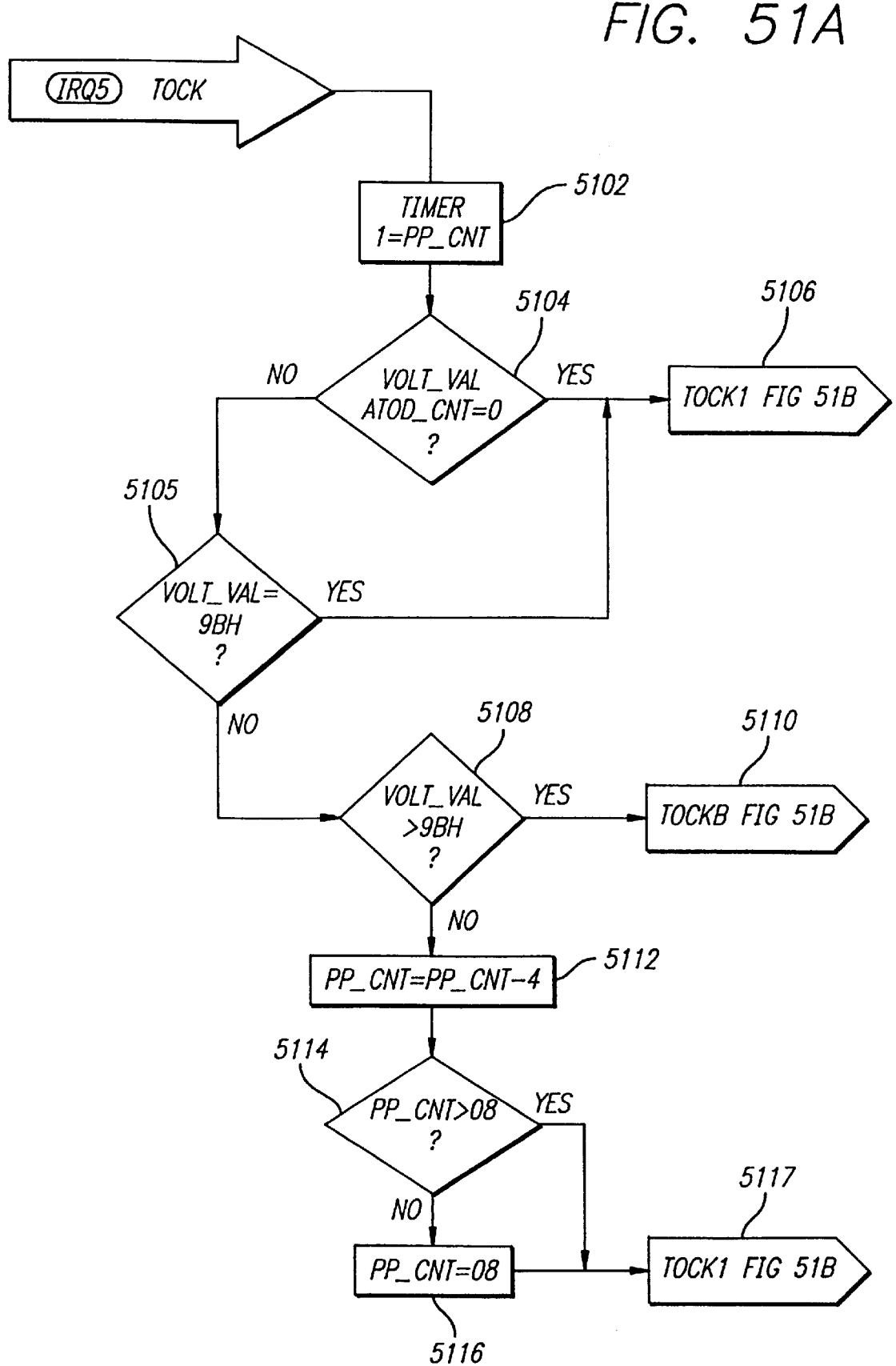
FIGS. 51A and 51B (collectively referred to as FIG. 51) is a functional flow chart of a IRQ5 interrupt routine, pertaining to pulse population modulation control of the power converter.
Figure 51B:
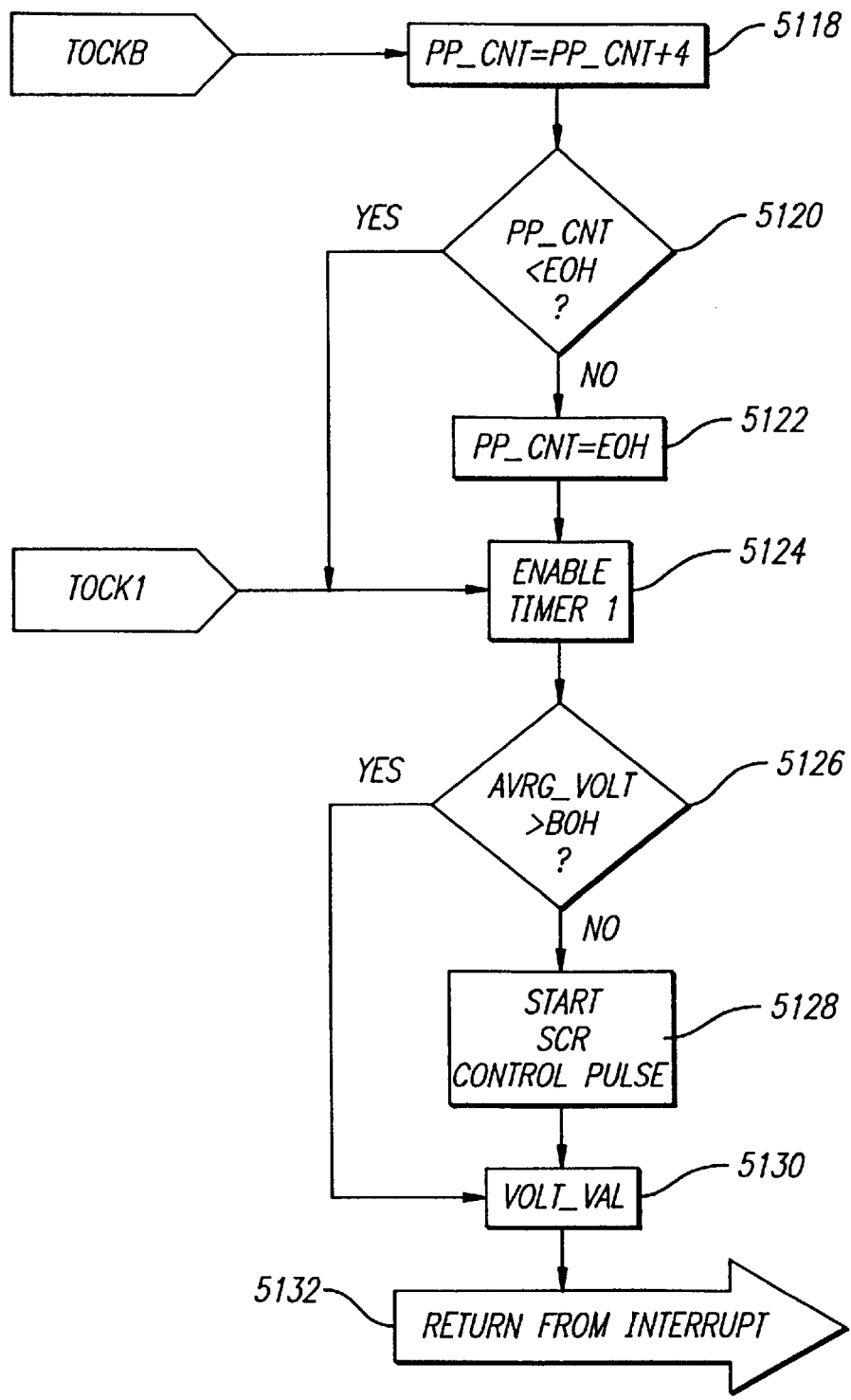

Various other functions are effected at dynamic periodic intervals, i.e., upon time-out of timer 1, reflecting a desired delay between successive pulses on the inverter rail. Referring now to FIGS. 51A and 51B (collectively referred to as FIG. 51), in response to generation of interrupt IRQ5, timer 1 is initially reloaded with a predetermined count PP_CNT from register 4626, indicative of the desired delay between successive pulses on the inverter rail 542 (Step 5102).

A test is then made to determine if a new rail voltage measurement has been acquired (Step 5104) and thus, whether or not count PP_CNT should be reviewed for adjustment to reflect changed voltage conditions. As will be discussed, VOLT_VAL in register 4612 is set to zero prior to a return from an IRQ5, and thus has a non-zero value only in the event of an intervening voltage sense interrupt IRQ2 (Step 5208, as will be discussed). Accordingly, VOLT_VAL in register 4612 is tested against zero; if VOLT_VAL is zero, no new value has been acquired, and accordingly, the adjustment process is by-passed. A jump (Step 5106) is effected to the program module labeled TOCK1, as will be described in conjunction with FIG. 51B.

Assuming that VOLT_VAL in register 4612 is non zero, the need to adjust the desired delay between successive pulses on the inverter rail 542, i.e., count PP_CNT, is indicated, and any necessary adjustment effected. VOLT_VAL is tested against a predetermined value indicative of a predetermined set point, e.g., 9BH (Step 5108). If the voltage value VOLT_VAL is greater than the predetermined value, a jump (Step 5110) is effected to module TOCKB to initiate a sequence of steps to increase population delay count PP_CNT, and thus decrease the pulse population, and rail voltage, as will be explained. If the voltage VOLT_VAL is not greater than the set point (e.g., 9BH), the pulse population delay count is decreased by a predetermined amount, e.g., 4 to increase the pulse population, and hence the voltage (Step 5112). The modified pulse population delay count PP_CNT is then tested (Step 5114) to determine if it exceeds a predetermined value, e.g., 8, corresponding to a minimum delay (maximum pulse population), and if not, is set equal to the minimum count (Step 5116), and a jump effected to TOCK1 (Step 5117).

As previously noted, if VOLT_VAL is greater than the predetermined set point, 9BH, a jump is effected to module TOCKB (Step 5110), to increase population delay count PP_CNT. More specifically, the pulse population count is increased by a predetermined increment, e.g., 4 (Step 5118). The increased count is then compared against a predetermined upper limit, e.g., E0H (Step 5120). So long as the population delay count is still less than the upper limit, a jump is effected to TOCK1 to initiate an output sequence. If, however, PP_CNT is not less than the predetermined upper limit, the count is first set to the maximum value (Step 5122), before effecting the output sequence.

If it has been determined that no new voltage reading has been taken upon which to base a change to population delay count PP_CNT (Steps 5104, 5106), or no change to the pulse population delay is necessary (Steps 5105, 5106) or after the pulse population count is increased (Steps 5108, 5110, 5118, 5120, 5122) or decreased (Steps 5112, 5114, 5116, 5117), the sequence of steps beginning at label TOCK1 is initiated to enable down counting of Time 1, and, assuming that the rail voltage is within limits, initiate control pulse SCR to turn on one of SCR's 4008.

More specifically, timer 1 is enabled to begin down counting from the prior pulse population delay count initially loaded into the timer in Step 5102 (Step 5124). When timer 1, decremented in response to each system clock pulse (e.g., 1 MHz) times out, the IRQ5 interrupt is again generated, reinitiating the cycle based upon the adjusted pulse population delay count.

In the meantime, after timer 1 has been enabled and count down initiated, the SCR control pulse is turned on, as appropriate. More specifically, the average voltage determined during the last A to D cycle is compared (on the next system clock pulse) against a predetermined value, e.g., B0H, corresponding to a predetermined maximum permissible voltage, e.g., 165 volts (Step 5126). If the average voltage is less than the maximum value, bit 0 of P2 register 4642 is set to 1 and control pulse SCR is turned on to initiate conduction in the negatively biased SCR 4008 in inverter rail generator 540 (Step 5128). After the SCR control pulse has been turned on, or if the average voltage was greater than the predetermined maximum permissible value (e.g., B0H), VOLT_VAL is reset to 0 (Step 5130) to indicate that the most recently sensed voltage has been processed. VOLT_VAL remains at zero until a new voltage reading is taken (Step 5208) as will be described in conjunction with FIG. 52A. A return is then effected (Step 5132).

As previously noted, when the reference ramp generated by R/2R network 4102 applied to pin 18 (port 3, pin 3) of microprocessor 4100 reaches the level of the signal indicative of inverter rail voltage RAIL_VOLTAGE, applied to pin 16 (port 3, pin 1) of microprocessor 4100, an interrupt IRQ2 is generated, to effect capture of indicia of rail voltage. More specifically, referring to FIG. 52A, upon generation of interrupt IRQ2, if desired, an initial test is made to ensure that switch capacitance 2710 is present in the circuit, i.e., that the output count is within the range where the switch capacitance is connected in the circuit, e.g., not less than 2 (Step 5202), or more than 1AH (Step 5204). If the output is within that part of the cycle where the capacitance is effectively out of the operative circuit, the voltage is not sampled and a return from the interrupt is effected (Step 5206). Assuming that switched capacitance 2700 is present in the operative system, the A to D count is tested against a predetermined lower level, e.g., 5 (Step 5207). A to D counts below that level are potentially within the noise floor, and preferably ignored.

Assuming that the A to D count is greater than the minimum level, indicia of a running average of the rail voltage is calculated (Step 5208). More specifically, the average of the instantaneous A to D count, in register 4610, and average volt value (AVRG_VOLT) in register 4606 is calculated, and loaded back into register 4606 as a new average voltage count. The new average voltage count is then loaded into voltage value VOLT_VAL register 4612 to indicate a new voltage reading has been taken. IRQ2 is then disabled to ensure that only one voltage reading is taken per A to D cycle (Step 5210).

If desired, a over voltage test can be effected (Step 5212); the new rail voltage value VOLT_VAL in register 4612 is tested against a predetermined maximum, e.g., C8H. If the value is exceeded, converter 2700 is inhibited (all power switch circuits turned off), and the pulse population delay count PP_CNT in register 4626 set to a predetermined value, e.g., F0H, corresponding to a relatively long delay, a1 hence low pulse population (Step 5214).

If the rail voltage does not exceed the predetermined maximum, or, if so, after the converter 2700 has been turned off, a return from the interrupt is effected (Step 5206).

Figure 52B:
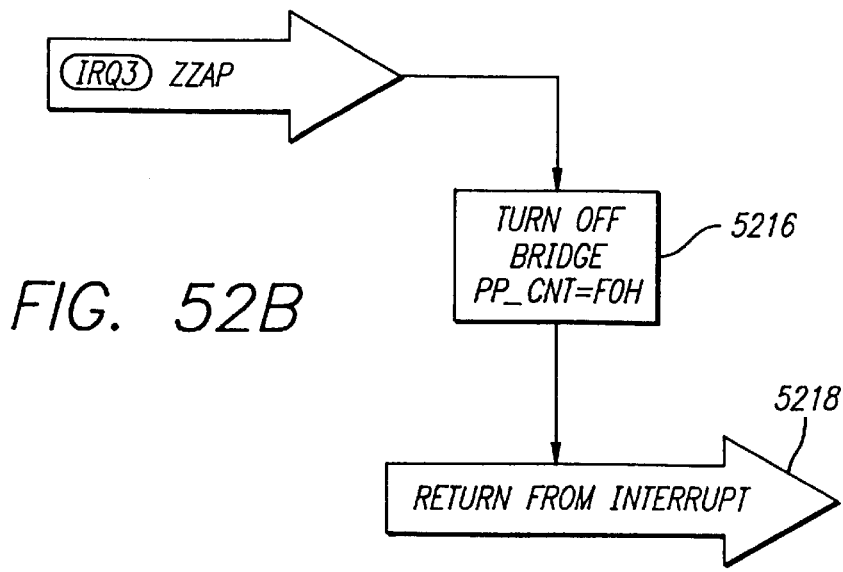
FIG. 52B is a flow chart of an IRQ3 interrupt routine, relating to over current sensing.

As previously noted, the over current signal generated by current sensor 3912 (FIG. 44) is applied to pin 25 of microprocessor 4100 (port 3 pin 0), and is generated when the integral of the output current exceeds a predetermined level. As previously noted, when the integral of the output current exceeds the predetermined level, the OVER_CURRENT signal assumes a low level, effectively disabling gating logic 4104, and thus power converter 2700. In addition, the over current signal is also applied to pin 25 of microprocessor 4100 (port 3 pin 0). Referring to FIG. 52B, upon generation of the interrupt, a recovery mode operation is initiated. The control signals to converter 530, generated at pins 36, 37, 38 and 39 are turned off, as a fail-safe. Additionally, pulse population delay count PP_CNT in register 4626 is set to a predetermined value (e.g., F0H, suitably approaching the maximum permitted value, e.g., E0H), corresponding to a relatively long delay, and hence low pulse population and low rail voltage (Step 5216). A return is then effected (Step 5218). Over the successive process cycles, pulse population delay count PP_CNT in register 4626, and the throttle setting, will be varied in accordance with the process described in conjunction with FIGS. 48 and 51 to return the system to appropriate voltage and current levels for the load conditions. Generally, during recovery, voltage and current levels are gradually increased from the relatively low starting value to desired operational levels, ramping up as the pulse population delay count PP_CNT in register 4626 is decreased, and/or throttle setting increased in response to below desired value measurements.

For example, during the next process cycle, since the pulse population count is set to a value (e.g., F0H) greater than the maximum value (2FH), (Step 4908), as previously described in conjunction with FIG. 49, the NEGDIR subroutine is called (Step 4910) to incrementally close the throttle. The engine speed will thus decrease, causing the rail voltage, and thus output current, to decrease. Likewise, upon generation of the next IRQ5 interrupt on time out of the pulse population delay period, pulse population delay count PP_CNT in register 4626 will be adjusted to reflect the variation of the rail voltage from its predetermined set point value (e.g., 9BH) (FIG. 51).

As previously noted, the POSDIR subroutine is called to incrementally open the throttle. However, a predetermined time period between successive adjustments to the throttle is employed to ensure that the system has sufficient time to respond to the throttle change. In this regard, a dithering switching frequency that minimally exceeds the time constant of the system linkage such that the throttle assumes a static position in response to the dithering, is preferably employed. The time elapsed since the last adjustment to the throttle setting is maintained in T_DLY_TMR in register 4602. Delay counter 4602 is loaded with a count (e.g., 30H) indicative of the required delay each time a positive adjustment is made to throttle position (FIG. 53; Step 5308), then decremented on a periodic basis (in response to each timer 0 interrupt, e.g., every 130 microseconds (Step 5040). More specifically, referring to FIG. 53, when POSDIR is called, delay count TDLY_TMR is initially tested against 0 to determine if the required time has elapsed (Step 5302). If the required time has not yet elapsed, no throttle adjustment is made; a return from the subroutine is effected (Step 5304). Assuming that the required time has elapsed, however, the lower half of the address of the step motor output, SW_LOW, in register 4632 is tested against a predetermined constant (Fopen) representative of the full open position of the throttle (Step 5306). If the throttle is full open, a return is effected (Step 5304). Assuming, however, that SW_LOW is not equal to Fopen, SW_LOW is incremented, the contents of a register in an array SW (pointed to by the address in registers SW_HIGH and SW_LOW) is loaded into port 3 register 4634, then output from port 3 of the microprocessor (pins 19–23). The delay time T_DLY_TMR is then set to a predetermined value, e.g., 30H, corresponding to the desired recovery time after a positive going adjustment (Step 5308).

Figure 54:
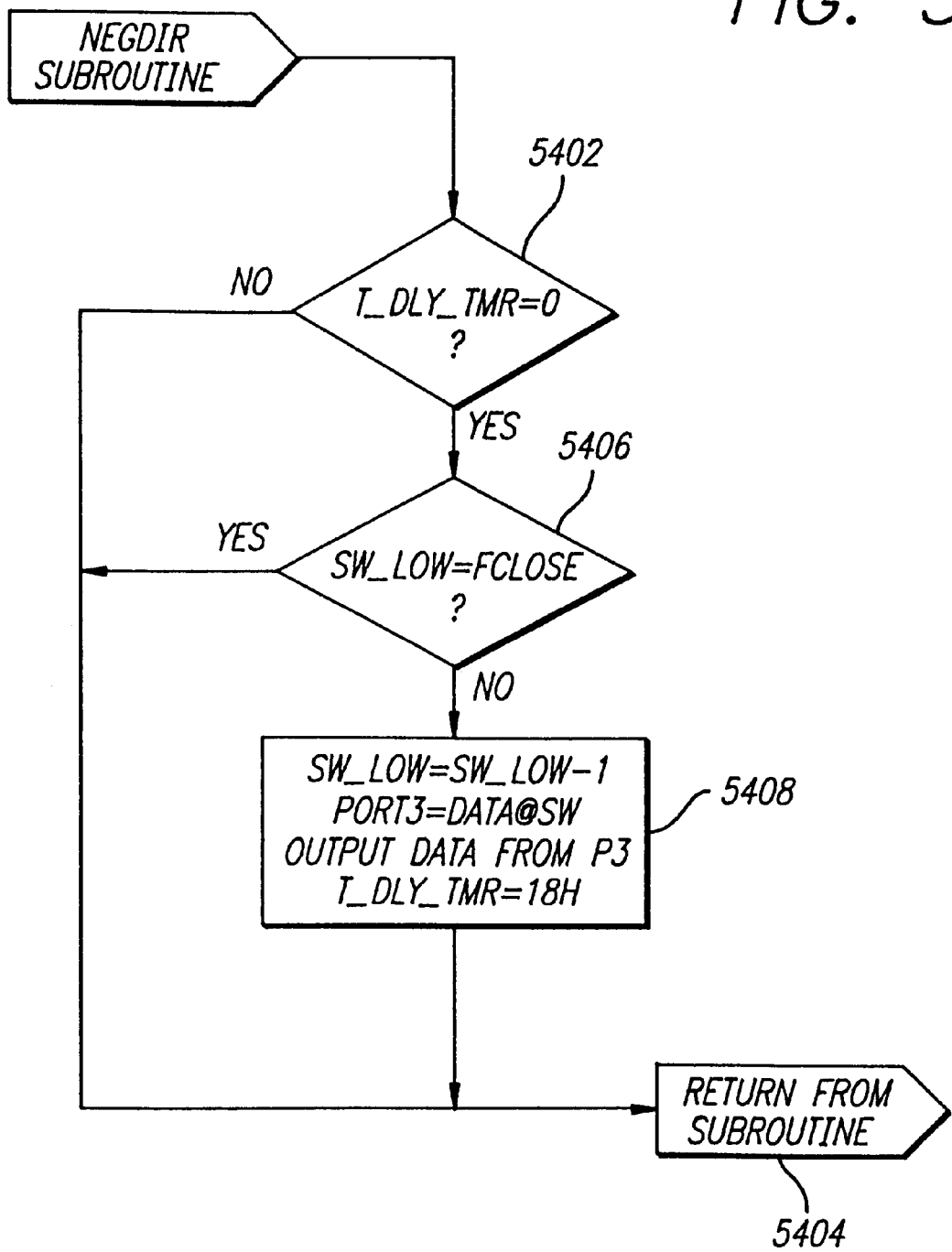
FIG. 54 is a functional flow chart of the NEGDIR subroutine relating to adjusting the throttle in a negative direction.

Similarly, when the NEGDIR subroutine is called, outputs are generated to incrementally close the throttle. Referring to FIG. 54, the time elapsed since the last adjustment to the throttle setting, T_DLY_TMR, in register 4602 is again checked (Step 5402). If the required time period has not elapsed since the last throttle adjustment, a return from the subroutine is effected (Step 5404). Assuming that the required time has elapsed, pointer SW_LOW is tested against the address of the data stream in SW array 4628 corresponding to the full closed position of the throttle (Step 5406). If the contents of SW_LOW correspond to the full closed address, a return is effected (Step 5404).

Assuming that the throttle is not fully closed, pointer SW_LOW is decremented, the data from the indicated location is loaded into port 3 register 4634, then the data output from port 3 to throttle control 36. Time delay counter T_DLY_TMR in register 4602 is then loaded with a predetermined constant, e.g., 18H, corresponding to the desired recovery time after a negative going throttle adjustment (Step 5408). It has been determined that negative going throttle adjustments require less response time than do positive going throttle adjustments; too many positive going adjustments of the throttle within a given period tends to cause the engine to flood out.

Figure 56:
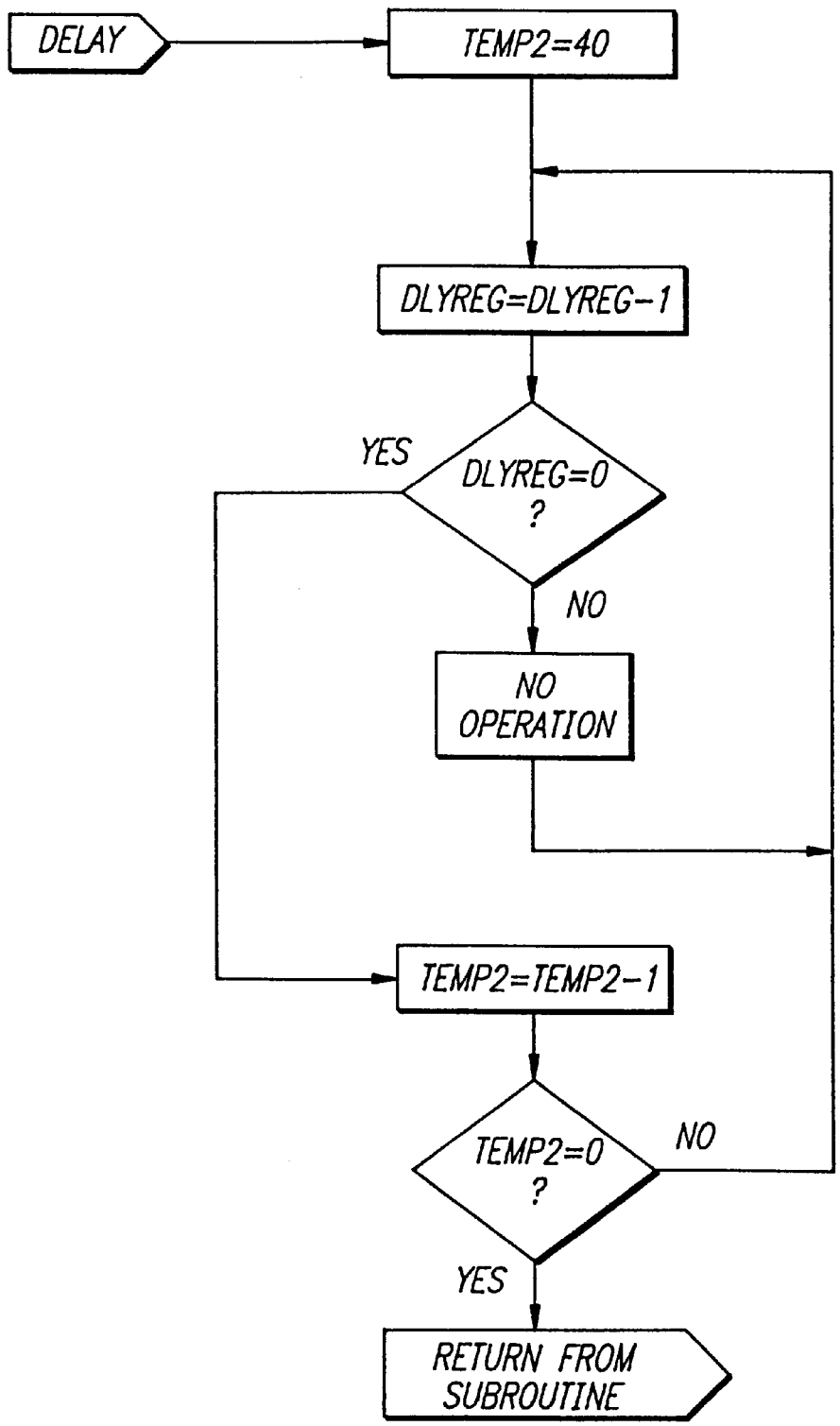
FIG. 56 is a functional flow chart of a delay routine.

As previously noted in conjunction with FIG. 47, the throttle initialization program is called to ensure that the throttle is in a known position when control is initiated. Suitably, step motor 3300 is, in effect, sequenced through a succession of activation states (e.g., successive full pole steps, omitting fractional steps and dithering) designed to ensure that, by the end of the sequence the throttle is lodged against one of stops 3610 or 3612 (FIG. 36). More specifically, referring now to FIG. 55, a count indicative of a predetermined number of cycles, e.g., 4, is established in one of the registers, e.g., A to D count register 4610 (Step 5502). A predetermined number, e.g., 80H, corresponding to a predetermined actuation state of step motor 3300 (preferably corresponding to a predetermined pole) is loaded into and output from port 3 register 4644 (Step 5504). A delay is then effected to ensure that stepper motor 3300 has fully responded to the control signals (Step 5506). The delay can be effected employing a conventional no-operation loop. A suitable loop is shown in FIG. 56.

After the delay, a predetermine value, e.g., 40H, corresponding to the next actuation state in the sequence (preferably the next full pole step) is generated (Step 5508). The delay is again effected (Step 5510). The process is repeated for each of the activation states (e.g., 20H, 10H) in the sequence (e.g., each full step), with intervening delays, in succession (Steps 5512, 5514, 5516, 5518).

The cycle is repeated a predetermined number of times, e.g., 4, to ensure that, by the end of the routine, the throttle is lodged against one of stops 3610 or 3612 (FIG. 36). The repetition count in A to D register 4610 is decremented (Step 5520), then tested to determine if the predetermined number of repetitions have been performed (Step 5512). If the predetermined number, e.g., 4 of repetitions has not been completed, the process cycles back, and Steps 5504–5522 are repeated. Once all of the repetitions have been performed, a return from the subroutine is effected (Step 5524).

In systems where separate sets of coils on the stator are employed for generating respective output signals, e.g., the battery charging signal and the inverter rail, it is desirable in some instances to employ a common control signal indicative of both outputs. As previously noted, control winding 504 is wound concurrently on stator core 302 with a predetermined one of the phases (e.g., Phase A), one of the winding groups 400 (400A) of inverter rail generator 540, and potentially coil 400 of charger rectifier 2302. Control winding 504 cooperates with regulator 506, voltage sensor 4500, regulator devices 4502 and 4504 to generate respective stable supply voltages (as described in conjunction with FIG. 45 (e.g., 5 volts, 15 volts) in various circuitry of the system and with zero crossing detector 514 to generate the ZEROX signal indicative of RPM. In addition, the output of rectifier 506 (C_RAIL) is indicative of the rail inverter rail voltage.

Since the control winding is in physical magnetic proximity, mutual inductance between coils 400A of inverter rail generator 540, and control winding 504 cause output of winding 504 to be indicative of the output of coils 400A.

More specifically, mutual inductance between control winding 504 and inverter rail winding 400A with which it is wound, creates relationship between the output voltage (C_RAIL) of rectifier 506. Thus, the output, C_RAIL of rectifier 506, can be employed as the basis for the rail voltage feedback signal to the controller 3910. Direct generation of feedback signal from the signal in control winding 504, as opposed to deriving a feedback signal directly from the rail generator winding it is particularly advantageous in that lower voltages, and, hence, less expensive components are required. However, such mutual inductance also tends to make the control winding output sensitive to changes in load.

Figure 58:
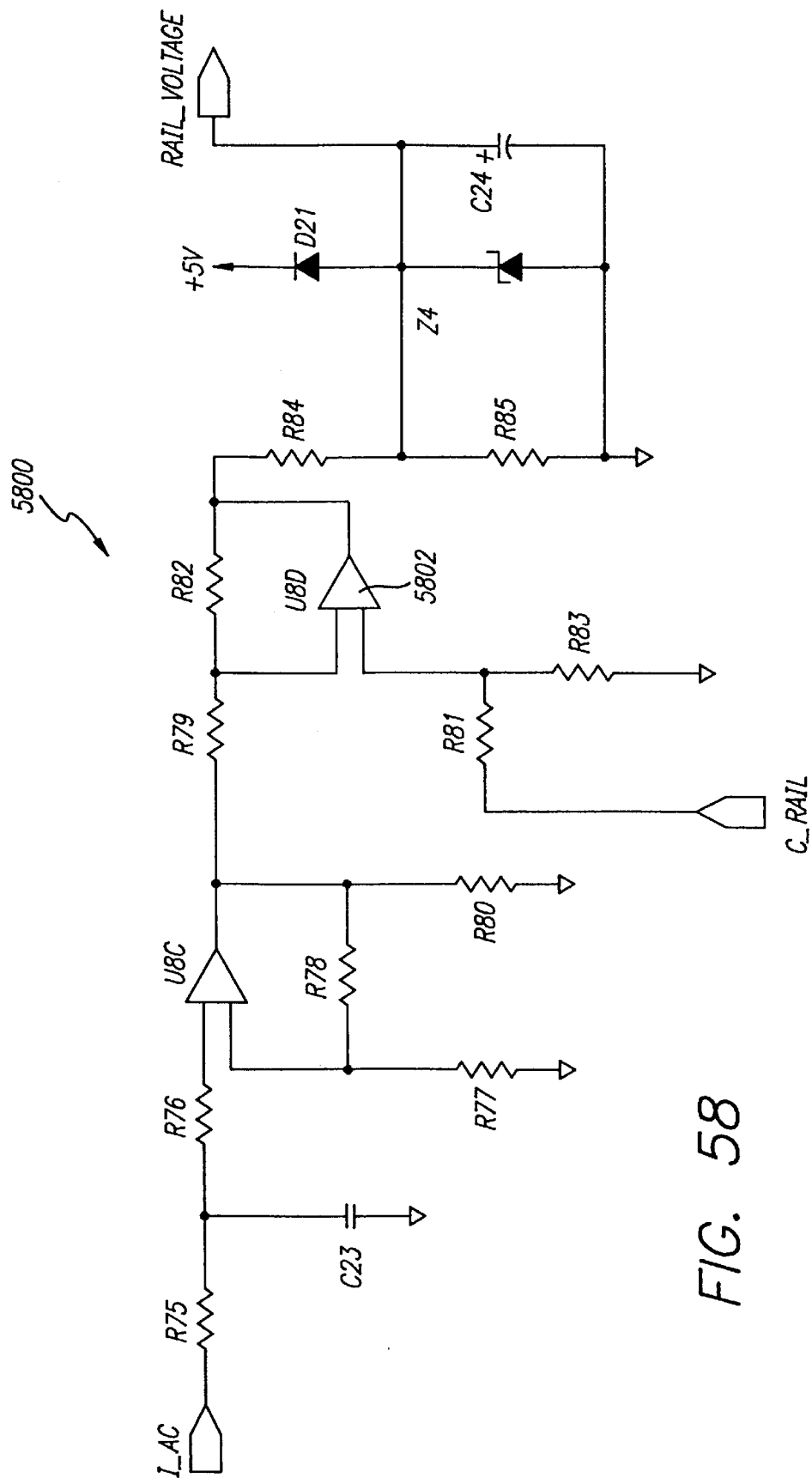
FIG. 58 is a schematic diagram of a suitable IR compensation circuit.
Figure 59:
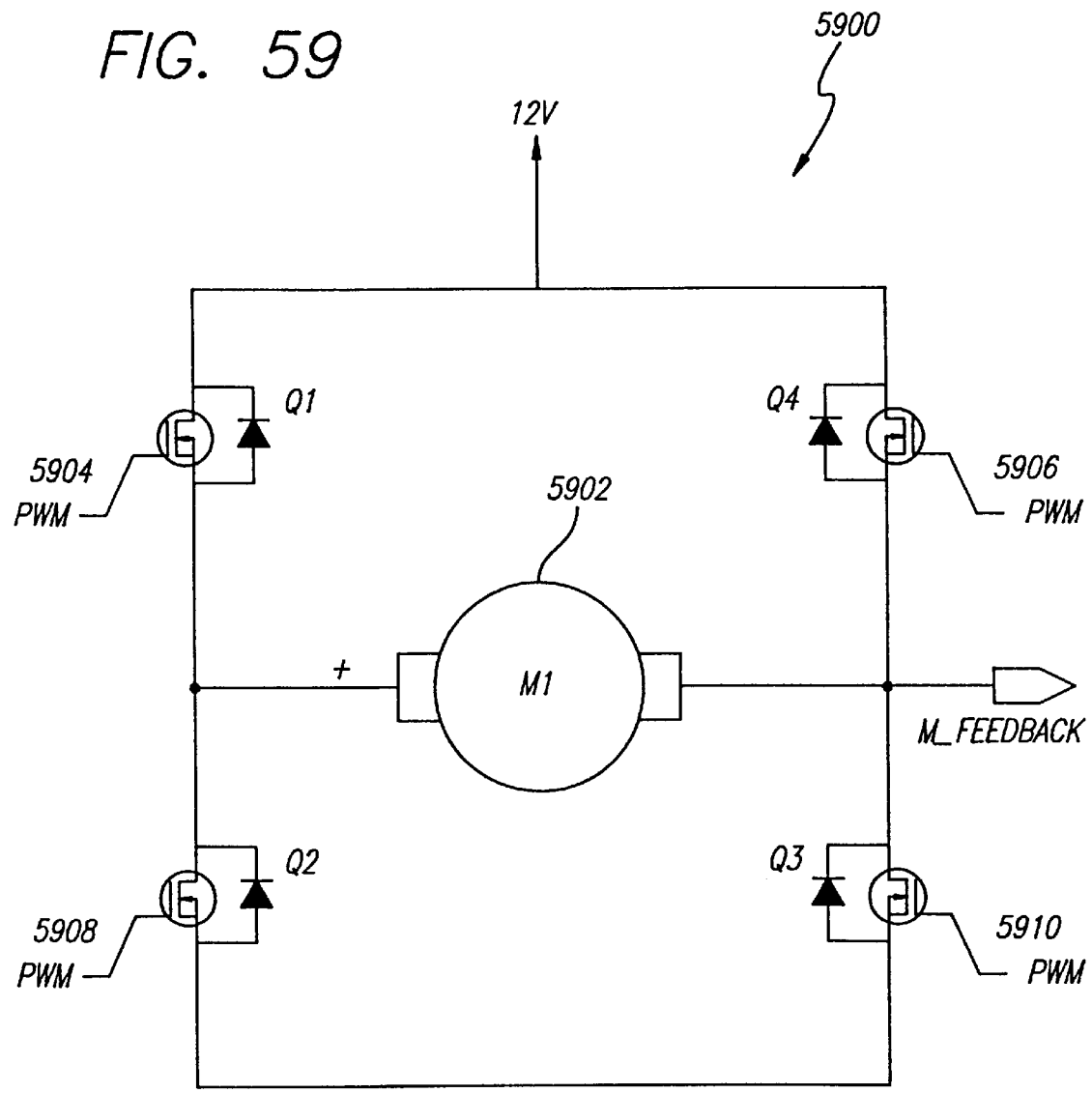
FIG. 59 is a block schematic of a throttle control employing a servo motor.

To compensate for the affects of load on the induced signal, IR compensation is preferably effected. Referring now to FIG. 58, a suitable IR compensation system 5800 for introducing an appropriate scaling factor is shown. In general, the signal indicative of the rail voltage, C_RAIL from rectifier 506, is applied to the positive input (pin 12) of a conventional summing amplifier 5802. The negative input (pin 13) is receptive of a signal indicative of the AC current, Iac (see FIG. 44A). At low load, little output current is generated, and thus, a RAIL_VOLTAGE feedback signal is determined primarily by C_RAIL. However, as load, and hence Iac increases, a larger signal is subtracted from the C_RAIL signal to compensate for increased affects of load.

It will be understood that while various of the conductors and connections are shown in the drawing as single lines, they are not so shown in a limiting sense, and may comprise plural connections or connectors as understood in the art. Similarly, various power connections and various control lines and the like various elements had been omitted from the drawing for the sake of clarity. Although the present invention has been described in conjunction with various exemplary embodiments, the invention is not limited to the specific forms shown, and it is contemplated that other embodiments of the present invention may be created without departing from the spirit of the invention. Variations in components, materials, values, structure and other aspects of the design and arrangement may be made in accordance with the present invention as expressed in the following claims.

We claim:

1. Apparatus for producing a signal simulating a desired AC waveform having a sloped rising edge, comprising:

first and second converter output terminals;

a juncture node, at a voltage of predetermined polarity and variable magnitude relative to a common rail;

a converter circuit, responsive to control signals applied thereto, for selectively effecting current paths between the juncture node and one of the first and second converter output terminals and between the common rail and the other of the first and second converter output terminals;

means, responsive to control signals applied thereto, for controllably varying the magnitude of the juncture node voltage; and a controller for selectively generating the control signals to the converter circuit and means for varying the magnitude of the juncture node voltage, to create a predetermined waveform having a sloped rising edge at the converter output terminals, simulating the desired AC waveform.

2. The apparatus of claim 1, wherein the controller comprises a programmed microcomputer.

3. The apparatus of claim 1, wherein the controller generates, in sequence:

a first control signal to the converter to cause the converter to effect a current path between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level, greater than the first level;

a third control signal to the means for varying the magnitude of the juncture node voltage, to initiate a change in the magnitude of the juncture node voltage back to the first level;

a fourth control signal to the converter to cause the converter to effectively break at least one of the current paths between the juncture node and the first converter output terminal and between the common rail and the second converter output terminal; and a fifth control signal to the converter to cause the converter to effect a current path between the juncture node and the second converter output terminal and between the common rail and the first converter output terminal.

4. The apparatus of claim 3, wherein:

the fourth control signal to the converter causes the converter to effectively break the current path between the juncture node and the first converter output terminal, and the controller generates, after the fourth control signal but before the fifth control signal, a further control signal to the converter to cause the converter to effectively break the current path between the common rail and the second converter output terminal.

5. The apparatus of claim 1, wherein the converter circuit comprises:

a first power switch circuit, electrically connected to the juncture node, and to the first converter output terminal, disposed to, responsive to control signals applied thereto, selectively effect a current path between the juncture node and the first converter output terminal; and a second power switch circuit, electrically connected to the juncture node, and to the second converter output terminal, disposed to, responsive to control signals applied thereto, selectively effect a current path between the juncture node, and the second converter output terminal;

a third power switch circuit, electrically connected to the common rail, and to the first converter output terminal, disposed to, responsive to control signals applied thereto, selectively effect a current path between the common rail and the first converter output terminal;

a fourth power switch circuit, electrically connected to the common rail, and to the second converter output terminal, disposed to, responsive to control signals applied thereto, selectively effect a current path between the common rail and the second converter output terminal.

6. The apparatus of claim 5, wherein the controller generates, in sequence:

first control signals to first and fourth power switch circuits to initiate current paths between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level, greater than the first level;

a third control signal to the means for varying the magnitude of the juncture node voltage, to initiate a change in the magnitude of the juncture node voltage back to the first level;

fourth control signals to at least one of the first and fourth power switch circuits to cause the converter to effectively break at least one of the current paths between the juncture node and the first converter output terminal and between the common rail and the second converter output terminal; and a fifth control signal to the converter to cause the converter to effect a current path between the juncture node and the second converter output terminal and between the common rail and the first converter output terminal.

7. The apparatus of claim 6, wherein:

the fourth control signal to the converter causes the converter to effectively break the current path between the juncture node and the first converter output terminal, and the controller generates, after the fourth control signal but before the fifth control signal, a further control signal to the converter to cause the converter to effectively break the current path between the common rail and the second converter output terminal.

8. The apparatus of claim 5 wherein each power switch circuit comprises a power switching device and a firing circuit for turning the power device on and off in accordance with the control signals; and the firing circuits for the first and second power switch circuits comprise means for quickly driving the associated power switching device into a saturated state when the associated control signal changes state to minimize power dissipation during the switching interval.

9. The apparatus of claim 5 wherein each power switch circuit comprises a power switching device and a firing circuit for generating actuating signals to turn the power device on and off in accordance with the control signals; and the firing circuits for the first and second power switch circuits comprise:

a capacitor;

a resistance cooperating with the capacitor to produce a predetermined discharge time constant;

a switching circuit disposed to selectively effect connections to develop a voltage on the capacitor in excess of that required to render the power switching device fully conductive during periods when the switching device is non-conductive, and provide a discharge path for the capacitor to provide the actuating signal to the switching device in response to the control signal;

the discharge time constant of the capacitor being such that the charge on the capacitor is only slightly above the threshold value required to render the power switching device fully conductive at the time the switching device is rendered non-conductive.

10. The apparatus of claim 1 wherein the means for controllably varying the magnitude of the juncture node voltage comprises:

a capacitor; and a switching circuit, for, responsive to control signals applied thereto, selectively effecting a charging path to the capacitor during dead time periods when no connection is effected by the converter, and selectively effecting a discharge path from the capacitor to the juncture node during a predetermined portion of the periods when the converter effects a current path between the juncture node and one of the first and second converter output terminals.

11. The apparatus of claim 5 wherein the means for controllably varying the magnitude of the juncture node voltage comprises:

a capacitor; and a switching circuit, for, responsive to control signals applied thereto, selectively effecting a charging path to the capacitor during dead time periods when none of the power switch circuits is conducting, and selectively effecting a discharge path from the capacitor to the juncture node during a predetermined portion of the periods when one of the power switch circuits effect a current path between the juncture node and one of the first and second converter output terminals.

12. The apparatus of claim 1 wherein the means for controllably varying the magnitude of the juncture node voltage comprises:

a capacitance, and a switching circuit, electrically connected to the capacitance, disposed to, responsive to control signals applied thereto, selectively effect a current path between the juncture node and the common rail through the capacitance.

13. The apparatus of claim 12, wherein the controller for selectively generating the control signals to the converter circuit and means for varying the magnitude of the juncture node voltage, generates:

a first control signal to the converter to cause the converter to effect a current path between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level, greater than the first level;

a third control signal to the means for varying the magnitude of the juncture node voltage, to initiate a change in the magnitude of the juncture node voltage back to the first level;

a fourth control signal to the converter to cause the converter to effectively break at least one of the current paths between the juncture node and the first converter output terminal and between the common rail and the second converter output terminal; and a fifth control signal to the converter to cause the converter to effect a current path between the juncture node and the second converter output terminal and between the common rail and the first converter output terminal.

14. The apparatus of claim 13, wherein:

the fourth control signal to the converter causes the converter to effectively break the current path between the juncture node and the first converter output terminal, and the controller generates, after the fourth control signal but before the fifth control signal, a further control signal to the converter to cause the converter to effectively break the current path between the common rail and the second converter output terminal.

15. The apparatus of claim 13, wherein:

the second control signal comprises a control signal to the switching circuit, electrically connected to the capacitance, to effect a current path between the juncture node and the common rail through the capacitance;

the third control signal comprises a control signal to the switching circuit, electrically connected to the capacitance, to effectively break the current path between the juncture node and the common rail through the capacitance.

16. The apparatus of claim 12 further including means for controllably discharging the capacitance, to facilitate generation of a relatively low voltage across the converter output terminals.

17. The apparatus of claim 12, wherein the converter circuit comprises:

a first power switch circuit, electrically connected to the juncture node, and to the first converter output terminal, disposed to, responsive to control signals applied thereto, selectively effect a current path between the juncture node and the first converter output terminal; and a second power switch circuit, electrically connected to the juncture node, and to the second converter output terminal, disposed to, responsive to control signals applied thereto, selectively effect a current path between the juncture node, and the second converter output terminal;

a third power switch circuit, electrically connected to the common rail, and to the first converter output terminal, disposed to, responsive to control signals applied thereto, selectively effect a current path between the common rail and the first converter output terminal;

a fourth power switch circuit, electrically connected to the common rail, and to the second converter output terminal, disposed to, responsive to control signals applied thereto, selectively effect a current path between the common rail and the second converter output terminal.

18. The apparatus of claim 17 including means for selectively rendering at least one of the third or fourth power switch circuits partially conductive whereby the capacitance is controllably discharged through a resistance.

19. The apparatus of claim 17 wherein at least one of the third or fourth power switch circuits comprises:
   a switching device which is rendered fully conductive by application thereto of a control signal of a first predetermined magnitude, and rendered into a linear mode of operation by application thereto of a control signal of a second predetermined magnitude; and
   driver circuits for selectively applying respective control signals of said first and second magnitudes.

20. The apparatus of claim 5 wherein at least one of the third or fourth power switch circuits comprises:
   a switching device which is rendered fully conductive by application thereto of a control signal of a first predetermined magnitude, and rendered into a linear mode of operation by application thereto of a control signal of a second predetermined magnitude; and
   driver circuits for selectively applying respective control signals of said first and second magnitudes.

21. The apparatus of claim 5 wherein:
   the first and fourth power switch circuits are independently controlled; and
   the second and third power switch circuits are independently controlled.

22. The apparatus of claim 5 wherein:
   the control signals applied to the first and fourth power switch circuits are of different duration; and
   the control signals applied to the second and third power switch circuits are of different duration.

23. The apparatus of claim 1 wherein the means for controllably varying the magnitude of the juncture node voltage comprises:
   a generator with a rotor and a stator, and
   an auxiliary winding disposed such that relative movement between rotor and stator induces a current therein; and
   a switching circuit, for, responsive to control signals applied thereto, selectively effecting a connection to the auxiliary winding during a predetermined portion of the periods when one of the power switch circuits effect a current path between the juncture node and one of the converter output terminals.

24. Apparatus comprising:
   first and second rails, adapted to have a rectified rail voltage applied therebetween;
   first and second converter output terminals;
   a first power switch circuit, electrically connected to the first rail, and to the first converter output terminal, disposed to, responsive to control signals applied thereto, selectively effect a current path between the first rail and the first converter output terminal; and
   a second power switch circuit, electrically connected to the first rail, and to the second converter output terminal, disposed to, responsive to control signals applied thereto, selectively effect a current path between the first rail, and the second converter output terminal;
   a third power switch circuit, electrically connected to the second rail, and to the first converter output terminal, disposed to, responsive to control signals applied thereto, selectively effect a current path between the second rail and the first converter output terminal; and
   a fourth power switch circuit, electrically connected to the second rail, and to the second converter output terminal, disposed to, responsive to control signals applied thereto, selectively effect a current path between the second rail and the second converter output terminal; and
   a controller for selectively generating the control signals to the power switch circuits to create a predetermined waveform having a sloped rising edge at the converter output terminals simulating a desired AC waveform; wherein
   each power switch circuit comprises a power switching device and a firing circuit for turning the power switching device on and off in accordance with the control signals; and
   the firing circuits for the first and second power switch circuits comprise means for quickly driving the associated power switching device into a saturated state when the associated control signal changes state to minimize power dissipation during the switching interval.

25. The system of claim 24 wherein the first and second power switch circuits are isolated power switch circuits and the third and fourth power switch circuits are non-isolated power switch circuits.

26. The system of claim 24 wherein the power switching device is a power transistor.

27. The system of claim 24, further comprising means for varying the magnitude of the rail voltage, wherein the controller generates, in sequence:
   first control signals to first and fourth power switch circuits to initiate current paths between the first rail and the first converter output terminal and between the second rail and the second converter output terminal, the magnitude of the rail voltage initially being at a first level;
   a second control signal to the means for varying the magnitude of the rail voltage, to initiate a change in the magnitude of the rail voltage to a second level, greater than the first level;
   a third control signal to the means for varying the magnitude of the rail voltage, to initiate a change in the magnitude of the rail voltage back to the first level;
   fourth control signals to at least one of the first and fourth power switch circuits to cause the converter to effectively break at least one of the current paths between the first rail and the first converter output terminal and between the second rail and the second converter output terminal; and
   fifth control signals to the first and fourth power switch circuits to cause the converter to effect a current path between the first rail and the second converter output terminal and between the second rail and the first converter output terminal.

28. The apparatus of claim 27, wherein:
   the fourth control signal to the converter causes the converter to effectively break the current path between the juncture node and the first converter output terminal, and
   the controller generates, after the fourth control signal but before the fifth control signal, a further control signal to the converter to cause the converter to effectively break the current path between the common rail and the second converter output terminal.

29. The apparatus of claim 24 wherein:
the first and fourth power switch circuits are independently controlled; and
the second and third power switch circuits are independently controlled.

30. The apparatus of claim 24 wherein:
the control signals applied to the first and fourth power switch circuits are of different duration; and
the control signals applied to the second and third power switch circuits are of different duration.

31. Apparatus comprising:
first and second converter output terminals;
a juncture node, receptive of a rectified signal relative to a common rail;
a first power switch circuit, electrically connected to the juncture node, and to the first converter output terminal, disposed to, responsive to control signals applied thereto, selectively effect a current path between the juncture node and the first converter output terminal; and
a second power switch circuit, electrically connected to the juncture node, and to the second converter output terminal, disposed to, responsive to control signals applied thereto, selectively effect a current path between the juncture node, and the second converter output terminal;
a third power switch circuit, electrically connected to the common rail, and to the first converter output terminal, disposed to, responsive to control signals applied thereto, selectively effect a current path between the common rail and the first converter output terminal;
a fourth power switch circuit, electrically connected to the common rail, and to the second converter output terminal, disposed to, responsive to control signals applied thereto, selectively effect a current path between the common rail and the second converter output terminal;
a capacitance;
a fifth power switch circuit, electrically connected to the capacitance, disposed to, responsive to control signals applied thereto, selectively effect a current path between the juncture node and the common rail through the capacitance; and
a controller for selectively generating the control signals to the power switch circuits to create a predetermined waveform having a sloped rising edge at the converter output terminals simulating a desired AC waveform.

32. The apparatus of claim 31 further including means for controllably discharging the capacitance, to facilitate generation of a relatively low voltage across the converter output terminals.

33. The apparatus of claim 31 including means for selectively rendering at least one of the third or fourth power switch circuits partially conductive whereby the capacitance is controllably discharged through a resistance.

34. The apparatus of claim 31 wherein at least one of the third or fourth power switch circuits comprises:
a switching device which is rendered fully conductive by application thereto of a control signal of a first predetermined magnitude, and rendered into a linear mode of operation by application thereto of a control signal of a second predetermined magnitude; and
driver circuits for selectively applying respective control signals of said first and second magnitudes.

35. The apparatus of claim 31 wherein:
the first and fourth power switch circuits are independently controlled; and the second and third power switch circuits are independently controlled.

36. The apparatus of claim 31 wherein:
the control signals applied to the first and fourth power switch circuits are of different duration; and
the control signals applied to the second and third power switch circuits are of different duration.

37. Apparatus comprising:
high, intermediate, and common DC rails, an intermediate DC rail signal being applied between the intermediate and common rails, and a high DC rail signal being applied between the high and common rails;
first and second converter output terminals;
a juncture node, receptive of the intermediate DC rail signal;
a first power switch circuit, electrically connected to the juncture node, and to the first converter output terminal, disposed to, responsive to control signals applied thereto, selectively effect a current path between the juncture node and the first converter output terminal; and
a second power switch circuit, electrically connected to the juncture node, and to the second converter output terminal, disposed to, responsive to control signals applied thereto, selectively effect a current path between the juncture node, and the second converter output terminal;
a third power switch circuit, electrically connected to the juncture node, and to the high DC rail, disposed to, responsive to control signals applied thereto, selectively effect a current path between the high DC rail and the juncture node;
a fourth power switch circuit, electrically connected to the common DC rail, and to the first converter output terminal, disposed to, responsive to control signals applied thereto, selectively effect a current path between the common DC rail and the first converter output terminal;
a fifth power switch circuit, electrically connected to the common DC rail, and to the second converter output terminal, disposed to, responsive to control signals applied thereto, selectively effect a current path between the common DC rail and the second converter output terminal; and
a controller for selectively generating the control signals to the power switch circuits to create a predetermined waveform having a sloped rising edge at the converter output terminals simulating a desired AC signal.

38. The system of claim 37 wherein the first and second power switch circuits are isolated power switch circuits and the third and fourth power switch circuits are non-isolated power switch circuits.

39. The system of claim 37 wherein each power switch circuit comprises a power switching device and a firing circuit for turning the power switching device on and off in accordance with the control signals.

40. The system of claim 39 wherein the power switching device is a power transistor.

41. The system of claim 39 wherein the firing circuits for the first, second and third power switch circuits comprise means for quickly driving the associated power switching device into a saturated state when the associated control signal changes state to minimize power dissipation during the switching interval.

42. The apparatus of claim 1, wherein the means for controllably varying the magnitude of the juncture node voltage comprises:
  a rotor, adapted for selective rotation;
  a stator, including at least one stator winding disposed such that rotation of the rotor induces current in the stator winding; and
  a switching circuit, responsive to control signals applied thereto, selectively applying a voltage developed from the current induced in the stator winding between the juncture node and common rail.

43. The apparatus of claim 42 wherein the means for controllably varying the magnitude of the juncture node voltage further comprises a capacitance disposed to develop a voltage from the current induced in the stator winding.

44. The apparatus of claim 43, further comprising means for rotating the rotor.

45. The apparatus of claim 43 wherein the means for controllably varying the magnitude of the juncture node voltage further comprises a further switching circuit disposed to selectively connect and disconnect the capacitance between the juncture node and the common rail.

46. The apparatus of claim 1, wherein the means for controllably varying the magnitude of the juncture node voltage comprises:
  a rotor, adapted for selective rotation;
  a stator, including a plurality of stator windings disposed such that rotation of the rotor induces current in the stator windings; and
  a switching circuit, responsive to control signals applied thereto, selectively completing current paths between individual stator windings and the juncture node.

47. The apparatus of claim 24 further comprising means for generating the unipolar rail voltage.

48. The apparatus of claim 46, wherein the means for generating the unipolar rail voltage comprises:
  a rotor, adapted for selective rotation;
  a stator, including at least one stator winding disposed such that rotation of the rotor induces current in the stator winding; and
  a switching circuit, responsive to control signals applied thereto, selectively applying a voltage developed from the current induced in the stator winding between the juncture node and common rail.

49. The apparatus of claim 47 wherein the means for generating the unipolar rail voltage further comprises a capacitance disposed to develop a voltage from the current induced in the stator winding.

50. The apparatus of claim 48 wherein the means for generating the unipolar rail voltage further comprises a further switching circuit disposed to selectively connect and disconnect the capacitance between the juncture node and the common rail.

51. The apparatus of claim 31 further comprising means for generating the junction node signal.

52. The apparatus of claim 50, wherein the means for generating the junction node signal comprises:
  a rotor, adapted for selective rotation;
  a stator, including at least one stator winding disposed such that rotation of the rotor induces current in the stator winding; and
  a switching circuit, responsive to control signals applied thereto, selectively effecting a current path between the stator winding and the juncture node.

53. The apparatus of claim 51, further comprising means for rotating the rotor.

54. Apparatus for producing a signal simulating a desired AC waveform having a sloped rising edge, comprising:
  first and second converter output terminals;
  a juncture node, at a voltage of variable magnitude relative to a common rail;
  a converter circuit, responsive to respective control signals applied thereto, for selectively effecting current paths between the juncture node and one of the first and second converter output terminals and between the common rail and the other of the first and second converter output terminals;
  means, responsive to control signals applied thereto, for controllably varying the magnitude of the juncture node voltage; and
  means, for selectively generating the control signals to the converter circuit and to the means for varying the magnitude of the juncture node voltage, to create a predetermined waveform at the converter output terminals simulating the desired AC waveform.

55. The apparatus of claim 53, wherein the controller generates, in sequence:
  a first control signal to the converter to cause the converter to effect a current path between the juncture node and the first converter output terminal and between the common rail and the second converter output terminal, the magnitude of the juncture node voltage initially being at a first level;
  a second control signal to the means for varying the magnitude of the juncture node voltage, to initiate a change in the magnitude of the juncture node voltage to a second level, greater than the first level;
  a third control signal to the means for varying the magnitude of the juncture node voltage, to initiate a change in the magnitude of the juncture node voltage back to the first level;
  a fourth control signal to the converter to cause the converter to effectively break at least one of the current paths between the juncture node and the first converter output terminal and between the common rail and the second converter output terminal; and
  a fifth control signal to the converter to cause the converter to effect a current path between the juncture node and the second converter output terminal and between the common rail and the first converter output terminal.

56. The apparatus of claim 54, wherein:
  the fourth control signal to the converter causes the converter to effectively break the current path between the juncture node and the first converter output terminal; and
  the controller generates, after the fourth control signal but before the fifth control signal, a further control signal to the converter to cause the converter to effectively break the current path between the common rail and the second converter output terminal.

57. The apparatus of claim 53, wherein the converter circuit comprises:
  a first power switch circuit, electrically connected to the juncture node, and to the first converter output terminal, disposed to, responsive to control signals applied thereto, selectively effect a current path between the juncture node and the first converter output terminal;
  a second power switch circuit, electrically connected to the juncture node, and to the second converter output terminal, disposed to, responsive to control signals applied thereto, selectively effect a current path between the juncture node, and the second converter output terminal;

a third power switch circuit, electrically connected to the common rail, and to the first converter output terminal, disposed to, responsive to control signals applied thereto, selectively effect a current path between the common rail and the first converter output terminal; and a fourth power switch circuit, electrically connected to the common rail, and to the second converter output terminal, disposed to, responsive to control signals applied thereto, selectively effect a current path between the common rail and the second converter output terminal.

58. The apparatus of claim 56, wherein the controller generates, in sequence:

first control signals to first and fourth power switch circuits to initiate current paths between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level, greater than the first level;

a third control signal to the means for varying the magnitude of the juncture node voltage, to initiate a change in the magnitude of the juncture node voltage back to the first level;

fourth control signals to at least one of the first and fourth power switch circuits to cause the converter to effectively break at least one of the current paths between the juncture node and the first converter output terminal and between the common rail and the second converter output terminal; and a fifth control signal to the converter to cause the converter to effect a current path between the juncture node and the second converter output terminal and between the common rail and the first converter output terminal.

59. The apparatus of claim 57, wherein:

the fourth control signal to the converter causes the converter to effectively break the current path between the juncture node and the first converter output terminal; and the controller generates, after the fourth control signal but before the fifth control signal, a further control signal to the converter to cause the converter to effectively break the current path between the common rail and the second converter output terminal.

60. The apparatus of claim 56 wherein each power switch circuit comprises a power switching device and a firing circuit for turning the power device on and off in accordance with the control signals; and the firing circuits for the first and second power switch circuits comprise means for quickly driving the associated power switching device into a saturated state when the associated control signal changes state to minimize power dissipation during the switching interval.

61. The apparatus of claim 56 wherein each power switch circuit comprises a power switching device and a firing circuit for generating actuating signals to turn the power device on and off in accordance with the control signals; and the firing circuits for the first and second power switch circuits comprise:

a capacitor;

a resistance cooperating with the capacitor to produce a predetermined discharge time constant; and a switching circuit disposed to selectively effect connections to develop a voltage on the capacitor in excess of that required to render the power switching device fully conductive during periods when the switching device is non-conductive, and provide a discharge path for the capacitor to provide the actuating signal to the switching device in response to the control signal, the discharge time constant of the capacitor being such that the charge on the capacitor is only slightly above the threshold value required to render the power switching device fully conductive at the time the switching device is rendered non-conductive.

62. The apparatus of claim 53 wherein the means for controllably varying the magnitude of the juncture node voltage comprises:

a capacitor; and a switching circuit, for, responsive to control signals applied thereto, selectively effecting a charging path to the capacitor during dead time periods when no connection is effected by the converter, and selectively effecting a discharge path from the capacitor to the juncture node during a predetermined portion of the periods when the converter effects a current path between the juncture node and one of the first and second converter output terminals.

63. The apparatus of claim 56 wherein the means for controllably varying the magnitude of the juncture node voltage comprises:

a capacitor; and a switching circuit, for, responsive to control signals applied thereto, selectively effecting a charging path to the capacitor during dead time periods when none of power switch circuits are during a predetermined portion of the periods when one of the power switch circuits effect a current path between the juncture node and one of the first and second converter output terminals.

64. The apparatus of claim 53 wherein the means for controllably varying the magnitude of the juncture node voltage comprises:

a capacitance; and a switching circuit, electrically connected to the capacitance, disposed to, responsive to control signals applied thereto, selectively effect a current path between the juncture node and the common rail through the capacitance.

65. The apparatus of claim 63, wherein the controller for selectively generating the control signals to the converter circuit and means for varying the magnitude of the juncture node voltage, generates:

a first control signal to the converter to cause the converter to effect a current path between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level, greater than the first level;

a third control signal to the means for varying the magnitude of the juncture node voltage, to initiate a change in the magnitude of the juncture node voltage back to the first level;

a fourth control signal to the converter to cause the converter to effectively break at least one of the current paths between the juncture node and the first converter output terminal and between the common rail and the second converter output terminal; and a fifth control signal to the converter to cause the converter to effect a current path between the juncture node and the second converter output terminal and between the common rail and the first converter output terminal.

66. The apparatus of claim 64, wherein:

the fourth control signal to the converter causes the converter to effectively break the current path between the juncture node and the first converter output terminal; and the controller generates, after the fourth control signal but before the fifth control signal, a further control signal to the converter to cause the converter to effectively break the current path between the common rail and the second converter output terminal.

67. The apparatus of claim 64, wherein:

the second control signal comprises a control signal to the switching circuit, electrically connected to the capacitance, to effect a current path between the juncture node and the common rail through the capacitance; and the third control signal comprises a control signal to the switching circuit, electrically connected to the capacitance, to effectively break the current path between the juncture node and the common rail through the capacitance.

68. The apparatus of claim 63 further including means for controllably discharging the capacitance, to facilitate generation of a relatively low voltage across the converter output terminals.

69. The apparatus of claim 63, wherein the converter circuit comprises:

a first power switch circuit, electrically connected to the juncture node, and to the first converter output terminal, disposed to, responsive to control signals applied thereto, selectively effect a current path between the juncture node and the first converter output terminal;

a second power switch circuit, electrically connected to the juncture node, and to the second converter output terminal, disposed to, responsive to control signals applied thereto, selectively effect a current path between the juncture node, and the second converter output terminal;

a third power switch circuit, electrically connected to the common rail, and to the first converter output terminal, disposed to, responsive to control signals applied thereto, selectively effect a current path between the common rail and the first converter output terminal; and a fourth power switch circuit, electrically connected to the common rail, and to the second converter output terminal, disposed to, responsive to control signals applied thereto, selectively effect a current path between the common rail and the second converter output terminal.

70. The apparatus of claim 68 including means for selectively rendering at least one of the third or fourth power switch circuits partially conductive whereby the capacitance is controllably discharged through a resistance.

71. The apparatus of claim 68 wherein at least one of the third or fourth power switch circuits comprises:

a switching device which is rendered fully conductive by application thereto of a control signal of a first predetermined magnitude, and rendered into a linear mode of operation by application thereto of a control signal of a second predetermined magnitude; and driver circuits for selectively applying respective control signals of said first and second magnitudes.

72. The apparatus of claim 56 wherein at least one of the third or fourth power switch circuits comprises:

a switching device which is rendered fully conductive by application thereto of a control signal of a first predetermined magnitude, and rendered into a linear mode of operation by application thereto of a control signal of a second predetermined magnitude; and driver circuits for selectively applying respective control signals of said first and second magnitudes.

73. The apparatus of claim 56 wherein:

the first and fourth power switch circuits are independently controlled; and the second and third power switch circuits are independently controlled.

74. The apparatus of claim 56 wherein:

the control signals applied to the first and fourth power switch circuits are of different duration; and the control signals applied to the second and third power switch circuits are of different duration.

75. The apparatus of claim 53 wherein the means for controllably varying the magnitude of the juncture node voltage comprises:

a generator with a rotor and a stator;

an auxiliary winding disposed such that relative movement between rotor and stator induces a current therein; and a switching circuit, for, responsive to control signals applied thereto, selectively effecting a connection to the auxiliary winding during a predetermined portion of the periods when one of the power switch circuits effect a current path between the juncture node and one of the converter output terminals.

76. Apparatus for a producing a signal simulating a desired AC waveform, comprising:

first and second converter output terminals;

a juncture node, at a voltage of variable magnitude relative to a common rail;

a converter circuit, responsive to respective control signals applied thereto, for selectively effecting current paths between the juncture node and one of the first and second converter output terminals and between the common rail and the other of the first and second converter output terminals;

means, responsive to control signals applied thereto, for controllably varying the magnitude of the juncture node voltage;

a controller for selectively generating, in sequence:

a first control signal to the converter to cause the converter to effect a current path between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level; greater than the first level;

a third control signal to the means for varying the magnitude of the juncture node voltage, to initiate a change in the magnitude of the juncture node voltage back to the first level;

a fourth control signal to the converter to cause the converter to effectively break at least one of the current paths between the juncture node and the first converter output terminal and between the common rail and the second converter output terminal;

a fifth control signal to the converter to cause the converter to effect a current path between the juncture node and the second converter output terminal and between the common rail and the first converter output terminal; and the control signals to the converter circuit and means for varying the magnitude of the juncture node voltage, effecting a predetermined waveform at the converter output terminals simulating the desired AC waveform.

77. The apparatus of claim 75, wherein:

the fourth control signal to the converter causes the converter to effectively break the current path between the juncture node and the first converter output terminal; and the controller generates, after the fourth control signal but before the fifth control signal, a further control signal to the converter to cause the converter to effectively break the current path between the common rail and the second converter output terminal.

78. Apparatus for producing a signal simulating a desired periodic AC waveform comprising:

first and second converter output terminals;

a juncture node, at a voltage of variable magnitude relative to a common rail;

a converter circuit comprising;

a first power switch circuit, electrically connected to the juncture node, and to the first converter output terminal, disposed to, responsive to control signals applied thereto, selectively effect a current path between the juncture node, and the first converter output terminal;

a second power switch circuit, electrically connected to the juncture node, and to the second converter output terminal, disposed to, responsive to control signals applied thereto, selectively effect a current path between the juncture node, and the second converter output terminal;

a third power switch circuit, electrically connected to the common rail, and to the first converter output terminal, disposed to, responsive to control signals applied thereto, selectively effect a current path between the common rail and the first converter output terminal;

a fourth power switch circuit, electrically connected to the common rail, and to the second converter output terminal, disposed to, responsive to control signals applied thereto, selectively effect a current path between the common rail and the second converter output terminal;

means, responsive to control signals applied thereto, for controllably varying the magnitude of the juncture node voltage; and a controller for selectively generating control signals at periodic predetermined times in the desired AC waveform to the converter circuit and to the means for varying the magnitude of the juncture node voltage, to create a predetermined waveform at the converter output terminals simulating the desired AC waveform.

79. The apparatus of claim 5, wherein the controller generates, in sequence:

first control signals to first and fourth power switch circuits to initiate current paths between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level, greater than the first level;

a third control signal to the means for varying the magnitude of the juncture node voltage, to initiate a change in the magnitude of the juncture node voltage back to the first level;

fourth control signals to at least one of the first and fourth power switch circuits to cause the converter to effectively break at least one of the current paths between the juncture node and the first converter output terminal and between the common rail and the second converter output terminal; and a fifth control signal to the converter to cause the converter to effect a current path between the juncture node and the second converter output terminal and between the common rail and the first converter output terminal.

80. The apparatus of claim 79, wherein:

the fourth control signal to the converter causes the converter to effectively break the current path between the juncture node and the first converter output terminal; and the controller generates, after the fourth control signal but before the fifth control signal, a further control signal to the converter to cause the converter to effectively break the current path between the common rail and the second converter output terminal.

81. The apparatus of claim 77 wherein each power switch circuit comprises a power switching device and a firing circuit for turning the power device on and off in accordance with the control signals; and the firing circuits for the first and second power switch circuits comprise means for quickly driving the associated power switching device into a saturated state when the associated control signal changes state to minimize power dissipation during the switching interval.

82. The apparatus of claim 77 wherein each power switch circuit comprises a power switching device and a firing circuit for generating actuating signals to turn the power device on and off in accordance with the control signals; and the firing circuits for the first and second power switch circuits comprise:

a capacitor;

a resistance cooperating with the capacitor to produce a predetermined discharge time constant; and a switching circuit disposed to selectively effect connections to develop a voltage on the capacitor in excess of that required to render the power switching device fully conductive during periods when the switching device is non-conductive, and provide a discharge path for the capacitor to provide the actuating signal to the switching device in response to the control signal the discharge time constant of the capacitor being such that the charge on the capacitor is only slightly above the threshold value required to render the power switching device fully conductive at the time the switching device is rendered non-conductive.

83. The apparatus of claim 77 wherein the means for controllably varying the magnitude of the juncture node voltage comprises:

a capacitor; and a switching circuit, for, responsive to control signals applied thereto, selectively effecting a charging path to the capacitor during dead time periods when none of power switch circuits are conducting, and selectively effecting a discharge path from the capacitor to the juncture node during a predetermined portion of the periods when one of the power switch circuits effect a current path between the juncture node and one of the first and second converter output terminals.

84. The apparatus of claim 77 wherein the means for controllably varying the magnitude of the juncture node voltage comprises:

a capacitance; and a switching circuit, electrically connected to the capacitance, disposed to, responsive to control signals applied thereto, selectively effect a current path between the juncture node and the common rail through the capacitance.

85. The apparatus of claim 83 further including means for controllably discharging the capacitance, to facilitate generation of a relatively low voltage across the converter output terminals.

86. The apparatus of claim 77 wherein at least one of the third or fourth power switch circuits comprises:

a switching device which is rendered fully conductive by application thereto of a control signal of a first predetermined magnitude, and rendered into a linear mode of operation by application thereto of a control signal of a second predetermined magnitude; and driver circuits for selectively applying respective control signals of said first and second magnitudes.

87. The apparatus of claim 77 wherein:

the first and fourth power switch circuits are independently controlled; and the second and third power switch circuits are independently controlled.

88. The apparatus of claim 77 wherein:

the control signals applied to the first and fourth power switch circuits are of different duration; and the control signals applied to the second and third power switch circuits are of different duration.

89. Apparatus for producing a signal simulating a desired periodic AC waveform comprising:

first and second converter output terminals;

a juncture node, at a voltage of variable magnitude relative to a common rail;

a converter circuit, responsive to respective control signals applied thereto, for selectively effecting current paths between the juncture node and one of the first and second converter output terminals and between the common rail and the other of the first and second converter output terminals;

a capacitance;

a switching circuit, electrically connected to the capacitance, disposed to, responsive to control signals applied thereto, selectively effect a current path between the juncture node and the common rail through the capacitance; and a controller for selectively generating control signals at periodic times in the desired AC waveform to the converter circuit and to the switching circuit, to create a predetermined waveform at the converter output terminals simulating the desired AC waveform.

90. The apparatus of claim 88, wherein the controller for selectively generating the control signals to the converter circuit and means for varying the magnitude of the juncture node voltage, generates:

a first control signal to the converter to cause the converter to effect a current path between the juncture node and the first converter output terminal and between the common rail and the second converter output terminal, the magnitude of the juncture node voltage initially being at a first level;

a second control signal to the means for varying the magnitude of the juncture node voltage, to initiate a change in the magnitude of the juncture node voltage to a second level, greater than the first level;

a third control signal to the means for varying the magnitude of the juncture node voltage, to initiate a change in the magnitude of the juncture node voltage back to the first level;

a fourth control signal to the converter to cause the converter to effectively break at least one of the current paths between the juncture node and the first converter output terminal and between the common rail and the second converter output terminal; and a fifth control signal to the converter to cause the converter to effect a current path between the juncture node and the second converter output terminal and between the common rail and the first converter output terminal.

91. The apparatus of claim 89, wherein:

the fourth control signal to the converter causes the converter to effectively break the current path between the juncture node and the first converter output terminal; and the controller generates, after the fourth control signal but before the fifth control signal, a further control signal to the converter to cause the converter to effectively break the current path between the common rail and the second converter output terminal.

92. The apparatus of claim 89, wherein:

the second control signal comprises a control signal to the switching circuit, electrically connected to the capacitance, to effect a current path between the juncture node and the common rail through the capacitance; and the third control signal comprises a control signal to the switching circuit, electrically connected to the capacitance, to effectively break the current path between the juncture node and the common rail through the capacitance.

93. The apparatus of claim 88 further including means for controllably discharging the capacitance, to facilitate generation of a relatively low voltage across the converter output terminals.

94. The apparatus of claim 89 wherein said periodic times a rising edge and a falling edge of the predetermined waveform.

95. The apparatus of claim 89 wherein a present half-cycle of the predetermined waveform includes a pulse having a leading portion, an internal portion, and a trailing portion, the pulse being between the first and third portion, wherein the control signals are generated to the switching circuit such that the current path between the juncture node and the common rail is not effected during the leading portion and the trailing portion of the pulse.

96. The apparatus of claim 95 wherein the desired waveform includes a dead time between the trailing portion of the present half-cycle and a successive leading portion of the pulse of a successive half-cycle, the successive leading portion having the same position in the next successive half-cycle as the leading portion of the successive half-cycle.

* * * * *

UNITED STATES PATENT AND TRADEMARK OFFICE
CERTIFICATE OF CORRRECTION

Page 1 of 2

PATENT NO. : 5,900,722
DATED : May 4, 1999
INVENTOR(S) : Harold C. Scott, et al.

It is certified that error appears in the above-identified patent and that said Letters Patent is hereby corrected as shown below: Title page: Item [56] insert the following:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 4,571,501 | 02-18-86 | Crosby | | | |

FOREIGN PATENT OR PUBLISHED FOREIGN PATENT APPLICATION

| | DOCUMENT NUMBER | PUBLICATION DATE | COUNTRY OR PATENT OFFICE | CLASS | SUBCLASS | TRANSLATION YES | NO |
|---|---|---|---|---|---|---|---|
| | 58-046868 A | 18 Mar 83 | Japan | | | | |
| | 03-180276 A | 06 Aug 91 | Japan | | | | |
| | 07-117461 A | 09 May 95 | Japan | | | | |

UNITED STATES PATENT AND TRADEMARK OFFICE
CERTIFICATE OF CORRRECTION

PATENT NO. : 5,900,722
DATED : May 4, 1999
INVENTOR(S) : Harold C. Scott, et al.

It is certified that error appears in the above-identified patent and that said Letters Patent is hereby corrected as shown below:

OTHER DOCUMENTS (Including Author, Title, Date, Pertinent Pages, Etc.)

| |
|---|
| Vassilios G. Agelidis et al, AN OPTIMUM MODULATION STRATEGY FOR A NOVEL "NOTCH" COMMUTATED 3-PWM INVERTER, 1 January 1994, IEEE TRANSACTIONS ON INDUSTRY APPLICATIONS, Vol. 30, NR. 1, PAGES 52-60, XP000434068 |
| Bimal K Bose et al, ELECTROLYTIC CAPACITOR ELIMINATION IN POWER ELECTRONIC SYSTEM BY HIGH FREQUENCY ACTIVE FILTER, Sept 28-Oct 1, 1991, Vol. 1 Pages 869-878, Institute of Electrical and Electronics Engineers XP000280233 |
| Masserant, B. J. et al, IGBT CONVERTOR WITH ACTIVE SNUBBER FOR SOFT SWITCHING, 7 November 1991, Electronics Letters, Vol. 27, Nr. 23, Pages 2160-2162, XP 000268357 |

Signed and Sealed this

Fourteenth Day of September, 1999

Attest:

Q. TODD DICKINSON

*Attesting Officer*   *Acting Commissioner of Patents and Trademarks*